(12) United States Patent
Bradwell et al.

(10) Patent No.: US 11,840,487 B2
(45) Date of Patent: *Dec. 12, 2023

(54) CERAMIC MATERIALS AND SEALS FOR HIGH TEMPERATURE REACTIVE MATERIAL DEVICES

(71) Applicant: Ambri Inc., Marlborough, MA (US)

(72) Inventors: David J. Bradwell, Sudbury, MA (US); Brian Neltner, Somerville, MA (US); Vimal Pujari, Northborough, MA (US); Michael J. McNeley, Boston, MA (US); Greg A. Thompson, Kenmore, WA (US); Chia-Ying Lee, Cambridge, MA (US); David S. Deak, Mountain View, CA (US); Hari P. Nayar, Woburn, MA (US)

(73) Assignee: AMBRI, INC., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,168

(22) Filed: Feb. 11, 2022

(65) Prior Publication Data
US 2022/0263168 A1     Aug. 18, 2022

Related U.S. Application Data

(63) Continuation of application No. 16/829,965, filed on Mar. 25, 2020, now Pat. No. 11,289,759, which is a
(Continued)

(51) Int. Cl.
*H01M 50/186*     (2021.01)
*H01M 50/191*     (2021.01)
(Continued)

(52) U.S. Cl.
CPC ........... *C04B 37/026* (2013.01); *C22C 27/04* (2013.01); *H01M 10/39* (2013.01);
(Continued)

(58) Field of Classification Search
CPC ............ H01M 50/186; H01M 50/183; H01M 50/172; H01M 50/191; H01M 10/39; H01M 10/399
See application file for complete search history.

(56) References Cited

U.S. PATENT DOCUMENTS

| 11,374 A | 7/1854 | Leue |
|---|---|---|
| 2,587,443 A | 2/1952 | Crabtree |

(Continued)

FOREIGN PATENT DOCUMENTS

| AU | 2014229643 A1 | 9/2015 |
|---|---|---|
| AU | 2016225020 A1 | 9/2017 |

(Continued)

OTHER PUBLICATIONS

Advisory Action Before Filing of Appeal Brief dated May 10, 2012 for U.S. Appl. No. 12/839,130.
(Continued)

*Primary Examiner* — Kenneth J Douyette
(74) *Attorney, Agent, or Firm* — Wilson Sonsini Goodrich & Rosati

(57) ABSTRACT

The disclosure provides seals for devices that operate at elevated temperatures and have reactive metal vapors, such as lithium, sodium or magnesium. In some examples, such devices include energy storage devices that may be used within an electrical power grid or as part of a standalone system. The energy storage devices may be charged from an electricity production source for later discharge, such as when there is a demand for electrical energy consumption.

19 Claims, 41 Drawing Sheets

Related U.S. Application Data continuation of application No. 15/690,863, filed on Aug. 30, 2017, now Pat. No. 10,637,015, which is a continuation of application No. PCT/US2016/021048, filed on Mar. 4, 2016.

(60) Provisional application No. 62/128,838, filed on Mar. 5, 2015, provisional application No. 62/208,518, filed on Aug. 21, 2015.

(51) Int. Cl.
| | |
|---|---|
| *H01M 50/176* | (2021.01) |
| *H01M 50/147* | (2021.01) |
| *C04B 37/02* | (2006.01) |
| *H01M 10/39* | (2006.01) |
| *C22C 27/04* | (2006.01) |

(52) U.S. Cl.
CPC ....... *H01M 10/399* (2013.01); *H01M 50/147* (2021.01); *H01M 50/176* (2021.01); *H01M 50/186* (2021.01); *H01M 50/191* (2021.01); *C04B 2237/122* (2013.01); *C04B 2237/123* (2013.01); *C04B 2237/124* (2013.01); *C04B 2237/366* (2013.01); *C04B 2237/403* (2013.01); *C04B 2237/72* (2013.01); *C04B 2237/74* (2013.01); *H01M 2220/10* (2013.01); *H01M 2300/0057* (2013.01)

(56) References Cited

U.S. PATENT DOCUMENTS

| | | | |
|---|---|---|---|
| 3,057,946 A | 10/1962 | Eidensohn | |
| 3,238,437 A | 3/1966 | Foster et al. | |
| 3,245,836 A | 4/1966 | Agruss | |
| 3,404,035 A | 10/1968 | Kummer et al. | |
| 3,419,432 A | 12/1968 | Hesson | |
| 3,488,221 A | 1/1970 | Hiroshi et al. | |
| 3,507,703 A | 4/1970 | Laszlo | |
| 3,535,214 A | 10/1970 | Rene | |
| 3,588,573 A | 6/1971 | Chen et al. | |
| 3,607,405 A | 9/1971 | Harold | |
| 3,607,407 A | 9/1971 | Harry | |
| 3,635,765 A | 1/1972 | Greenberg | |
| 3,663,295 A | 5/1972 | Baker | |
| 3,666,560 A * | 5/1972 | Cairns et al. ......... | H01M 4/745 429/231.95 |
| 3,716,409 A | 2/1973 | Cairns et al. | |
| 3,770,506 A | 11/1973 | Rightmire et al. | |
| 3,775,181 A | 11/1973 | Ryerson | |
| 3,833,420 A | 9/1974 | Will | |
| 3,833,421 A | 9/1974 | Rubischko et al. | |
| 3,833,422 A | 9/1974 | Will et al. | |
| 3,837,918 A | 9/1974 | Nakabayashi | |
| 3,839,779 A * | 10/1974 | Walker ................ | H01M 50/186 228/122.1 |
| 3,870,561 A | 3/1975 | Charbonnier et al. | |
| 3,877,984 A | 4/1975 | Werth | |
| 3,878,296 A | 4/1975 | Vine et al. | |
| 3,884,715 A | 5/1975 | Gay et al. | |
| 3,887,396 A | 6/1975 | Walsh et al. | |
| 3,898,096 A | 8/1975 | Heredy et al. | |
| 3,907,589 A | 9/1975 | Gay et al. | |
| 3,915,742 A | 10/1975 | Battles et al. | |
| 3,926,673 A | 12/1975 | Saridakis | |
| 3,930,888 A | 1/1976 | Bowser et al. | |
| 3,933,521 A | 1/1976 | Vissers et al. | |
| 3,941,612 A | 3/1976 | Steunenberg et al. | |
| 3,947,291 A | 3/1976 | Yao et al. | |
| 3,954,504 A | 5/1976 | Zellhoefer | |
| 3,959,012 A | 5/1976 | Liang et al. | |
| 3,960,594 A | 6/1976 | Fritz et al. | |
| 3,969,139 A | 7/1976 | Lai | |
| 3,980,495 A | 9/1976 | Roche et al. | |
| 3,988,164 A | 10/1976 | Liang et al. | |
| 4,002,807 A | 1/1977 | Ludwig | |
| 4,011,374 A | 3/1977 | Kaun | |
| 4,015,054 A | 3/1977 | Cleaver et al. | |
| 4,018,969 A | 4/1977 | Fischer et al. | |
| 4,029,860 A | 6/1977 | Vissers et al. | |
| 4,032,614 A | 6/1977 | Lewis | |
| 4,044,194 A | 8/1977 | Evans et al. | |
| 4,060,667 A | 11/1977 | Askew et al. | |
| 4,061,841 A | 12/1977 | Sharma et al. | |
| 4,065,602 A | 12/1977 | Roche et al. | |
| 4,069,372 A | 1/1978 | Voinov | |
| 4,107,401 A | 8/1978 | Goodson et al. | |
| 4,125,683 A | 11/1978 | Beckford et al. | |
| 4,130,500 A | 12/1978 | Melendres et al. | |
| 4,164,608 A | 8/1979 | Coetzer | |
| 4,169,120 A | 9/1979 | Miller | |
| 4,189,529 A | 2/1980 | Birt et al. | |
| 4,195,123 A | 3/1980 | Jumel | |
| RE30,353 E | 7/1980 | Voinov | |
| 4,216,273 A | 8/1980 | Cadart et al. | |
| 4,238,553 A | 12/1980 | Gerlach et al. | |
| 4,265,984 A | 5/1981 | Kaye | |
| 4,287,268 A | 9/1981 | Coetzer | |
| 4,287,269 A | 9/1981 | Coetzer et al. | |
| 4,299,890 A | 11/1981 | Rea et al. | |
| 4,315,974 A | 2/1982 | Athearn et al. | |
| 4,338,380 A | 7/1982 | Erickson et al. | |
| 4,360,574 A | 11/1982 | Park | |
| 4,367,159 A | 1/1983 | Mrazek et al. | |
| 4,405,433 A | 9/1983 | Payne | |
| 4,407,912 A | 10/1983 | Virkar et al. | |
| 4,457,989 A | 7/1984 | Coetzer | |
| 4,510,210 A | 4/1985 | Hunt | |
| 4,565,751 A | 1/1986 | Faust et al. | |
| 4,582,553 A | 4/1986 | Buchta | |
| 4,588,663 A | 5/1986 | Mason et al. | |
| 4,596,637 A | 6/1986 | Kozarek et al. | |
| 4,622,111 A | 11/1986 | Brown et al. | |
| 4,657,830 A | 4/1987 | Kagawa | |
| 4,692,390 A | 9/1987 | Roy | |
| 4,764,437 A | 8/1988 | Kaun | |
| 4,800,143 A | 1/1989 | Harbach et al. | |
| 4,818,638 A | 4/1989 | Roy | |
| 4,833,046 A | 5/1989 | Roy | |
| 4,849,682 A | 7/1989 | Bauer et al. | |
| 4,877,695 A | 10/1989 | Cipriano et al. | |
| 4,886,715 A | 12/1989 | McCullough, Jr. et al. | |
| 4,929,521 A | 5/1990 | Cipriano et al. | |
| 4,945,012 A | 7/1990 | Bugga et al. | |
| 4,945,257 A | 7/1990 | Marrocco, III | |
| H816 H | 9/1990 | Carder et al. | |
| 4,954,403 A | 9/1990 | Plichta et al. | |
| 4,965,146 A | 10/1990 | McCullough et al. | |
| 4,975,344 A | 12/1990 | Wedlake et al. | |
| 4,999,097 A | 3/1991 | Sadoway | |
| 5,011,748 A | 4/1991 | Shacklette et al. | |
| 5,024,737 A | 6/1991 | Claus et al. | |
| 5,034,290 A | 7/1991 | Sands et al. | |
| 5,039,351 A | 8/1991 | Cooper et al. | |
| 5,044,551 A | 9/1991 | Tanaka et al. | |
| 5,139,895 A | 8/1992 | Roy et al. | |
| 5,185,068 A | 2/1993 | Sadoway | |
| 5,198,638 A | 3/1993 | Massacesi | |
| 5,254,232 A | 10/1993 | Sadoway | |
| 5,284,562 A | 2/1994 | Beck et al. | |
| 5,286,359 A | 2/1994 | Richards et al. | |
| 5,369,547 A | 11/1994 | Evans | |
| 5,380,406 A | 1/1995 | Horton et al. | |
| 5,392,191 A | 2/1995 | Thomas et al. | |
| 5,407,119 A | 4/1995 | Churchill et al. | |
| 5,429,895 A | 7/1995 | Lian et al. | |
| 5,469,325 A | 11/1995 | Evans | |
| 5,476,733 A | 12/1995 | Coetzer et al. | |
| 5,491,037 A | 2/1996 | Kawakami | |
| 5,529,858 A | 6/1996 | Wicker et al. | |
| 5,532,078 A | 7/1996 | Redey et al. | |
| 5,536,600 A | 7/1996 | Kaun | |
| 5,538,813 A | 7/1996 | Li | |

(56) References Cited

U.S. PATENT DOCUMENTS

| | | |
|---|---|---|
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | Mackenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,798,308 A | 8/1998 | Chatterjee et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,035,617 B2 | 5/2015 | Parakulam et al. |

(56) References Cited

U.S. PATENT DOCUMENTS

| | | |
|---|---|---|
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,437,864 B2 | 9/2016 | Tan et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,297,870 B2 | 5/2019 | Bradwell |
| 10,541,451 B2 | 1/2020 | Bradwell et al. |
| 10,566,662 B1 | 2/2020 | Nayar et al. |
| 10,608,212 B2 | 3/2020 | Bradwell et al. |
| 10,637,015 B2 | 4/2020 | Thompson et al. |
| 10,903,528 B2 | 1/2021 | Ouchi et al. |
| 11,196,091 B2 | 12/2021 | Bradwell et al. |
| 11,211,641 B2 | 12/2021 | Bradwell et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2006/0187614 A1 | 8/2006 | Ushio et al. |
| 2007/0067119 A1 | 3/2007 | Loewen et al. |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0241689 A1 | 10/2008 | Takami et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1 | 1/2011 | Bradwell et al. |
| 2011/0020694 A1 | 1/2011 | Khakhalev et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0144861 A1 | 6/2011 | Lakirovich et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0086128 A1 | 4/2012 | Ponoth et al. |
| 2012/0091806 A1 | 4/2012 | Tsutsumi et al. |
| 2012/0094194 A1 | 4/2012 | Visco et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar et al. |
| 2012/0328910 A1 | 12/2012 | La et al. |
| 2012/0328930 A1 | 12/2012 | Inagaki et al. |
| 2012/0328935 A1 | 12/2012 | Matsui et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |

(56) References Cited

U.S. PATENT DOCUMENTS

| | | |
|---|---|---|
| 2013/0130085 A1 | 5/2013 | Choi |
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0149567 A1 | 6/2013 | Schaefer |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2013/0315659 A1 | 11/2013 | Kumar et al. |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0242466 A1 | 8/2014 | Murashi et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0280480 A1 | 10/2015 | Mitri et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0186235 A1 | 6/2016 | Joseph et al. |
| 2016/0190607 A1 | 6/2016 | Wyser et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0259648 A1 | 9/2017 | Putcha et al. |
| 2017/0263951 A1 | 9/2017 | Kanno et al. |
| 2017/0309979 A1 | 10/2017 | Lee et al. |
| 2017/0338451 A9 | 11/2017 | Bradwell et al. |
| 2017/0358941 A1 | 12/2017 | Mitri et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0191162 A1 | 7/2018 | Hanada et al. |
| 2019/0089013 A1 | 3/2019 | Ouchi et al. |
| 2019/0115632 A1 | 4/2019 | Beuning et al. |
| 2019/0123369 A1 | 4/2019 | Ma et al. |
| 2019/0296276 A1 | 9/2019 | Bradwell et al. |
| 2020/0076006 A1 | 3/2020 | Bradwell et al. |
| 2020/0176824 A1 | 6/2020 | Bradwell et al. |
| 2021/0036273 A1 | 2/2021 | Thompson et al. |
| 2021/0376394 A1 | 12/2021 | Bradwell et al. |
| 2022/0013835 A1 | 1/2022 | Bradwell et al. |
| 2022/0077508 A1 | 3/2022 | Nayar et al. |
| 2023/0282892 A1 | 9/2023 | Bradwell et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 1578553 A | 2/2005 |
| CN | 1743056 A | 3/2006 |
| CN | 1750309 A | 3/2006 |
| CN | 101436780 A | 5/2009 |
| CN | 101506117 A | 8/2009 |
| CN | 101519313 A | 9/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 202076339 U | 12/2011 |
| CN | 102498589 A | 6/2012 |
| CN | 102646808 A | 8/2012 |
| CN | 103001239 A | 3/2013 |
| CN | 202797170 U | 3/2013 |
| CN | 103137916 A | 6/2013 |
| CN | 103342556 A | 10/2013 |
| CN | 103367663 A | 10/2013 |
| CN | 104364930 A | 2/2015 |
| CN | 105190984 A | 12/2015 |
| CN | 105659415 A | 6/2016 |
| CN | 105830247 A | 8/2016 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| GB | 2062939 A | 5/1981 |
| JP | S4933815 B1 | 9/1974 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 A | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 3355377 B2 | 12/2002 |
| JP | 2003146771 A | 5/2003 |
| JP | 2007157373 A | 6/2007 |
| JP | 2010206101 A | 9/2010 |
| JP | 2010214396 A | 9/2010 |
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013055193 A | 3/2013 |
| JP | 2013537361 A | 9/2013 |
| JP | 2014154337 A | 8/2014 |
| JP | 2014526114 A | 10/2014 |
| JP | 2016510936 A | 4/2016 |

(56) References Cited

FOREIGN PATENT DOCUMENTS

| | | |
|---|---|---|
| JP | 2016535392 A | 11/2016 |
| KR | 20120059106 A | 6/2012 |
| RU | 2031491 C1 | 3/1995 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015066359 A1 | 5/2015 |
| WO | WO-2016050329 A1 | 4/2016 |
| WO | WO-2016138499 A1 | 9/2016 |
| WO | WO-2016141354 A2 | 9/2016 |
| WO | WO-2018/052797 | 3/2018 |
| WO | WO-2018/187777 | 11/2018 |

OTHER PUBLICATIONS

Advisory Action Before Filing of Appeal Brief dated Jun. 8, 2012 for U.S. Appl. No. 12/839,130.

Agruss. The Thermally Regenarative Liquid-Metal Cell, J. Electrochem. Soc. Nov. 1963; 110(11):1097-1103.

Allanore, A. Features and Challenges of Molten Oxide Electrolytes for Metal Extraction. Journal of The Electrochemical Society, 162 (1): E13-E22 (2015). Published Nov. 25, 2014.

Allanore, et al. A new anode material for oxygen evolution in molten oxide electrolysis. Nature, vol. 497, May 16, 2013, pp. 353-356 and Online Methods Section. Published online May 8, 2013.

ATI Technical Data Sheet, ATI 18CrCb Stainless Steel, Feb. 17, 2014.

Atthey. A Mathematical Model for Fluid Flow in a Weld Pool at High Currents. J. Fluid Mech. 1980; 98(4):787-801.

Biswas, et al. Towards Implementation of Smart Grid: An Updated Review on Electrical Energy Storage Systems. Smart Grid and Renewable Energy. 2013; 4:122-132. Published online Feb. 2013.

Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.

Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.

Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.

Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.

Bradwell. Liquid metal batteries: ambipolar electrolysis and alkaline earth electroalloying cells. Thesis. Massachusetts Institute of Technology. Dept. of Materials Science and Engineering. 2011.

Bradwell. Technical and economic feasibility of a high-temperature self-assembling battery. Thesis. Department of Material Science and Engineering. MIT. 2006.

Cairns, et al. Galvanic Cells with Fused-Salt Electrolytes. AEC Research and Development. 220 pages, Nov. 1967.

Cairns, et al. High Temperature Batteries Research in high-temperature electrochemistry reveals compact, powerful energy-storage cells. Science. Jun. 20, 1969; 164(3886):1347-1355.

Cerablak™ technology. Atfi Surface Science Solutions. http://www.atfinet.com/index.php/technology. Accessed Feb. 24, 2016.

Chuang. Floating capacitor active charge balancing for PHEV application. Thesis. Ohio State University. 2010.

Co-pending U.S. Appl. No. 13/999,704, inventors David; S. Deak et al., filed Mar. 14, 2014.

Co-pending U.S. Appl. No. 15/628,538, inventor Bradwell; David J., filed Jun. 20, 2017.

Co-pending U.S. Appl. No. 16/740,178, inventors Nayarhari et al., filed Jan. 10, 2020.

Co-pending U.S. Appl. No. 17/136,432, inventors Nayarhari et al., filed Dec. 29, 2020.

Co-pending U.S. Appl. No. 17/510,056, inventors Bradwelldavid; J. et al., filed Oct. 25, 2021.

Co-pending U.S. Appl. No. 17/529,171, inventors Bradwelldavid; J. et al., filed Nov. 17, 2021.

Crowley, B. New battery could be solar power's BFF video. http://money.cnn.com/video/technology/2012/08/16/bsg-liquid-metal-battery-energy.cnnmoney.CNN Money, 2012. Accessed Jun. 29, 2015.

Cubicciotti, et al. Metal-Salt Interactions at High Temperatures: The Solubilities of Some alkaline Earth Metals in their Halides. J. Am. Chem. Soc. 1949; 71(6):2149-2153.

Davis, J.R., Effect of temperature on properties. ASM specialty handbook—Copper and copper alloys. ASM international. 2001: pp. 430-439.

Donald Sadoway: The Colbert Report video. http://thecolbertreport.cc.com/videos/8uddyg/donald-sadoway. The Colbert Report, Oct. 22, 2012. Accessed Jun. 29, 2015.

Donald Sadoway: The missing link to renewable energy Youtube Video. https://www.youtube.com/watch?v=Sddb0Khx0yA. TED, Mar. 2012. Accessed Jun. 29, 2015.

Dworkin, et al. The Electrical Conductivity of Solutions of Metals in their Molten Halides. VIII. alkaline Earth Metal Systems. J. Phys. Chem. Jul. 1966; 70(7):2384.

Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.

(56) References Cited

OTHER PUBLICATIONS

Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R50. Alger, Oct. 7, 2014. Accessed Jun. 29, 2015.
EP17851347.9 Extended European Search Report dated Mar. 16, 2020.
EP18194103.0 Extended European Search Report dated Mar. 19, 2019.
EP18781400.9 Extended European Search Report dated Dec. 11, 2020.
"European Extended Search Report and opinion dated May 29, 2017 for EP Application No. 14857245."
European search report and search opinion dated Feb. 12, 2014 for EP Application No. 13196841.4.
European search report and search opinion dated May 6, 2016 for EP Application No. 13847926.
European search report and search opinion dated May 13, 2016 for EP Application No. 13846301.
European supplemental search report and opinion dated Mar. 16, 2017 for EP Application No. 14853610.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Avallable at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.gepower.com/content/dam/gepower- renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International preliminary report on patentability dated Mar. 31, 2016 for PCT Application No. PCT/US2014/056367.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of The Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kaufman, J.G., Application of aluminum alloys and tempers. Introduction to aluminum alloys and tempers—Preface. ASM International. 2000; pp. 87-118.
Kaufman, J.G., Properties and Characteristics of Aluminum and Aluminum Alloys. Fire Resistance of Aluminum and Aluminum Alloys and Measuring the Effects of Fire Exposure on the Properties of Aluminum Alloys. 2016. 9 Pages.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of The Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Lee, et al., Oxidation Behavior of Copper at a Temperature below 300° C. and the Methodology for Passivation. Materials Research. 2016; 19(1): 51-56.
Li, et al. High Performance Liquid Metal Battery with Environmentally Friendly Antimony-Tin Positive Electrode. ACS Appl

(56) References Cited

OTHER PUBLICATIONS

Mater Interfaces. May 25, 2016;8(20):12830-5. doi: 10.1021/acsami. 6b02576. Epub May 5, 2016.With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Liquid Metal Battery Research Company website. http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
McAlister, A. J. The Al—Li (Aluminum-Lithium) System. Bulletin of Alloy Phase Diagrams, vol. 3, No. 2, 1982, pp. 177-178. doi: 10.1007/BF02892377.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sources 275 (2015) 370-376. Available online Oct. 29, 2014.
Norbert Weber et al., Sloshing instability and electrolyte layer rupture in liquid metal batteries. arxiv.org, Cornell university library, 201 OLIN library cornell university ithaca, NY 14853, Dec. 12, 2016, XP081362128.
Notice of allowance dated Jan. 6, 2015 for U.S. Appl. No. 13/237,215.
Notice of allowance dated Jan. 11, 2018 for U.S. Appl. No. 15/136,337.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.
Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549."
Office action dated Mar. 14, 2014 for U.S. Appl. No. 13/237,215.
Office action dated Mar. 16, 2012 for U.S. Appl. No. 12/839,130.
"Office action dated Mar. 27, 18 for U.S. Appl. No. 15/140,434."
"Office action dated Apr. 18, 2018 for U.S. Appl. No. 14/975,587."
"Office action dated Apr. 20, 2018 for U.S. Appl. No. 15/057,732."
"Office action dated May 1, 2017 for U.S. Appl. No. 14/678,602."
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838."
"Office action dated Jun. 15, 2017 for U.S. Appl. No. 14/687,838"
"Office action dated Jun. 25, 2018 for U.S. Appl. No. 15/063,842."
Office action dated Jun. 30, 2016 for U.S. Appl. No. 14/536,563.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.
"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of The Electrochemical Society. 2014; 161(12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.

(56) References Cited

OTHER PUBLICATIONS

"SPATOCCO, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 24, 2018.
PCT/US2018/026601 International Search Report dated Jul. 30, 2018.
PCT/US2019/066231 International Search Report and Written Opinion dated Mar. 2, 2020.
Pflanz, K. A Liquid Layer Solution for the Grid. http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Qingsong; Wang et al, "Thermal Runaway Caused Fire and Explosion of Lithium Ion Battery", Journal of Power Sources, 2012, 208, 210-224.
Response After Final Rejection dated Apr. 27, 2012 for U.S. Appl. No. 12/839,130.
RU2031491C1 English translation. Nikolaev et al., Russia. Mar. 20, 1995.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. In Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 17, 2021.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.
U.S. Appl. No. 15/130,129 Office Action dated Jul. 3, 2019.
U.S. Appl. No. 15/130,129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
U.S. Appl. No. 16/293,288 Office Action dated Sep. 28, 2021.
U.S. Appl. No. 16/592,621 Notice of Allowance dated Feb. 23, 2022.
U.S. Appl. No. 16/592,621 Office Action dated Jul. 6, 2021.
U.S. Appl. No. 16/593,278 Notice of Allowance dated Mar. 24, 2022.
U.S. Appl. No. 16/718,020 Notice of Allowance dated Jul. 28, 2021.
U.S. Appl. No. 16/829,965 Notice of Allowance Nov. 19, 2021.
U.S. Appl. No. 16/858,189 Notice of Allowance dated Aug. 18, 2021.
Vassiliev, et al. A new proposal for the binary (Sn,Sb) phase diagram and its thermodynamic properties based on a new e.m.f study Journal of Alloys and Compounds 247 (1997) 223-233.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Weaver, et al. The Sodium1Tin Liquid-Metal Cell. J. Electrochem. Soc., 109 (8), 653-657 (Aug. 1962).

(56) References Cited

OTHER PUBLICATIONS

Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 volume 146, issue 1, 8-14.
Zhang; et al. Pyrite FeS2 as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.
U.S. Appl. No. 17/670,168 Notice of Allowance dated Jul. 19, 2023.
U.S. Appl. No. 18/166,814 Notice of Allowance dated Oct. 12, 2023.
U.S. Appl. No. 18/196,225 Notice of Allowance dated Aug. 24, 2023.
U.S. Appl. No. 18/218,412 Office Action dated Aug. 24, 2023.

\* cited by examiner

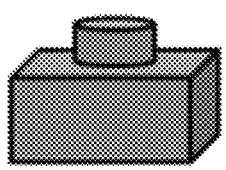
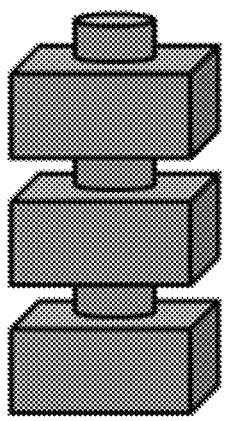
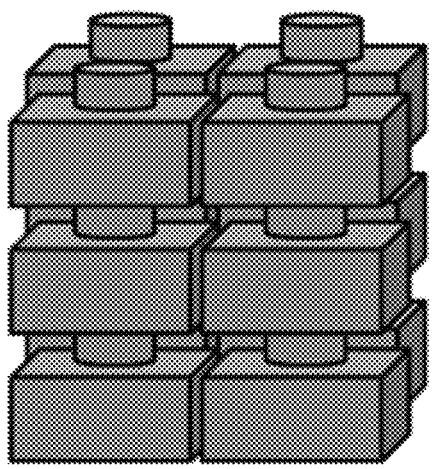
FIG. 1

A
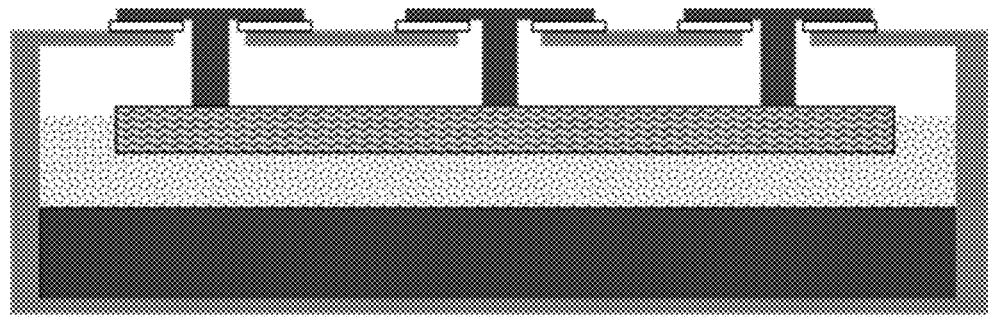
B
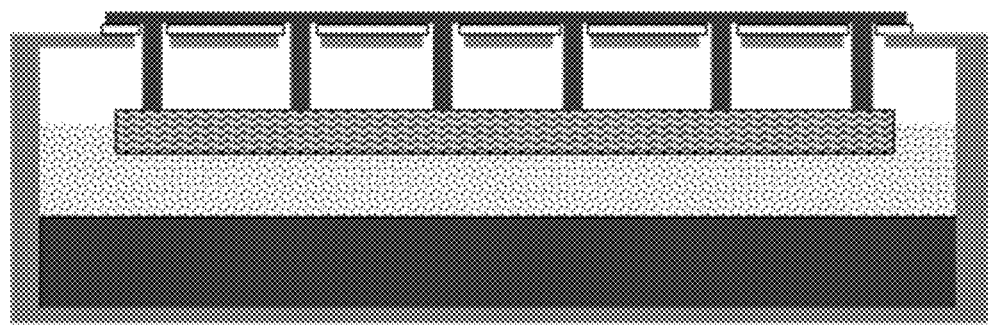
FIG. 6

CERAMIC MATERIALS AND SEALS FOR HIGH TEMPERATURE REACTIVE MATERIAL DEVICES

CROSS-REFERENCE

This application is a continuation of U.S. application Ser. No. 16/829,965, filed Mar. 25, 2020, now U.S. Pat. No. 11,289,759, which is a continuation of U.S. application Ser. No. 15/690,863, filed Aug. 30, 2017, now U.S. Pat. No. 10,637,015 which is a continuation of PCT Application Serial No. PCT/US2016/021048, filed Mar. 4, 2016, which claims priority to U.S. Provisional Application No. 62/128,838, filed Mar. 5, 2015, and U.S. Provisional Application No. 62/208,518, filed Aug. 21, 2015, each of which is entirely incorporated herein by reference.

BACKGROUND

Various devices are configured for use at elevated (or high) temperatures. Examples of such devices include elevated temperature batteries, which are devices capable of converting stored chemical energy into electrical energy. Batteries may be used in many household and industrial applications. Another example of a high temperature device is a chemical vapor deposition chamber such as those used in the fabrication of semiconductor devices. Another example of a high temperature device is a chemical process vessel, a transfer pipe, or storage vessel designed to process, transport, contain and/or store reactive metals. These devices typically may operate at a temperature at or in excess of 300° C.

SUMMARY

Recognized herein are various limitations associated with elevated (or high) temperature devices. For instance, some batteries operate at high temperatures (e.g., at least about 100° C. or 300° C.) and have reactive material vapors (e.g., reactive metal vapors such as, for example, vapors of lithium, sodium, potassium, magnesium or calcium) that may need to be sufficiently contained within the devices. Other examples of high temperature reactive material devices include nuclear (e.g., fusion and/or fission) reactors that use a molten salt or metal (e.g., molten sodium or lithium or molten sodium- or lithium-containing alloys) as a coolant, devices for manufacturing semiconductors, heterogeneous reactors, and devices for producing (e.g., processing) and/or handling (e.g., transporting or storing) reactive materials (e.g., reactive chemicals such as, for examples, a chemical with a strong chemical reducing capability, or reactive metals such as, for example, lithium or sodium). Such devices may need to be sufficiently sealed from an external environment during use (e.g., to prevent device failure, prolong device use, or avoid adverse health effects on users or operators of such devices), and/or may need a protective lining in the device to avoid corrosion of the container.

The present disclosure provides ceramic materials that may be used in high temperature devices and/or in other devices, including, for example, strengthened ceramics used in ballistic protection systems and devices (e.g., ballistic penetration resistant armor).

The present disclosure provides seals and/or reactor vessel linings for energy storage devices and other devices having (e.g., containing or comprising) reactive materials (e.g., reactive metals) and operating at high temperatures (e.g., at least about 100° C. or 300° C.). The energy storage devices (e.g., batteries) may be used within an electrical power grid or as part of a standalone system. The batteries may be charged from an electricity production source for later discharge when there is a demand for electrical energy consumption.

An aspect of the present disclosure provides an electrochemical cell comprising (a) a container comprising a reactive material maintained at a temperature of at least about 200° C.; and (b) a double seal that seals the container from an environment external to the container. The double seal comprises a first seal that is stable when in contact with the reactive material and a second seal that is stable when in contact with the external environment, such that (i) the first seal comprises a solid material that is not stable when in contact with the external environment or (ii) the second seal comprises a solid material that is not stable when in contact with the reactive material. In some cases, (i) the first seal comprises a solid material that is not stable when in contact with the external environment and (ii) the second seal comprises a solid material that is not stable when in contact with the reactive material. The reactive material can comprise a reactive metal or vapor thereof. The reactive metal can be molten or liquid. The reactive material can comprise molten salt or a vapor thereof. The first seal can resist corrosion by molten lithium or a molten lithium salt. The second seal can resist oxidation by air resulting in an increase in a leakage rate of the second seal. The first seal and the second seal can each be hermetic. The first seal and the second seal can each provide a seal between the container and a conductor that protrudes through the container through an aperture in the container. The first seal and the second seal can each comprise a ceramic component and a metal collar adjacent to the ceramic component. The double seal can comprise a seal arranged in a circumferential configuration, a seal arranged in a stacked configuration, or a combination thereof. In some cases, the electrochemical cell further comprises a pocket filled with inert gas between the first seal and the second seal. The double seal can surround a conductor, a thermocouple or a voltage sensor coupled to the container. The double seal can electrically isolate the conductor from the container.

Another aspect of the present disclosure provides a method to seal an electrochemical cell comprising (a) providing a container comprising a reactive material maintained at a temperature of at least about 200° C.; and (b) sealing the container with a double seal that seals the container from an environment external to the container. The double seal comprises a first seal that is stable when in contact with the reactive material and a second seal that is stable when in contact with the external environment, such that (i) the first seal comprises a solid material that is not stable when in contact with the external environment or (ii) the second seal comprises a solid material that is not stable when in contact with the reactive material. The sealing can comprise (i) sealing the first seal in an environment comprising a first inert gas, thereby capturing the first inert gas inside the container; (ii) sealing the second seal, thereby forming a pocket between the first seal and the second seal; (iii) filling the pocket with a second inert gas via a port; and (iv) sealing the port, thereby sealing the pocket and capturing the second inert gas in the pocket. The first or second inert gas can comprise helium (He), or a mixture of argon (Ar) and helium. The first or second inert gas can comprise between about 1% and 5% He with balance Ar. The port can comprise a hole through a conductor that protrudes through the container through an aperture in the container, or a hole through a bushing between the first seal and the second seal. The sealing in (iv) can comprise closing the port via a weld.

Another aspect of the present disclosure provides an electrochemical cell comprising (a) a container comprising a reactive material maintained at a temperature of at least about 200° C.; and (b) a seal in the container that seals the container from an environment external to the container. The seal comprises a ceramic component exposed to the reactive material and at least two metal sleeves joined to the ceramic component. The seal is arranged in a stacked configuration with face-sealing interfaces that are substantially perpendicular to a direction parallel to a conductor that passes through the seal. At least one of the face-sealing interfaces is configured as a concentric accordion joint. The at least two metal sleeves are flexible, thereby allowing the seal to absorb at least a portion of internal thermal stresses during operation of the electrochemical cell. The seal can be hermetic. The ceramic component can comprise aluminum nitride (AlN). The at least two metal sleeves can comprise zirconium (Zr) or stainless steel. The temperature can be at least about 300° C. The seal can be maintained at a temperature of least about 300° C. The seal can be stable when in contact with the reactive material and not stable when in contact with the external environment. In some cases, the electrochemical cell further comprises additional ceramic components distributed in a vertically symmetric configuration around the ceramic component. In some cases, the electrochemical cell further comprises a first coupler between the container and a first of the at least two metal sleeves. The first coupler can be flexible, thereby allowing the seal to absorb at least a portion of internal thermal stresses. In some cases, the electrochemical cell further comprises a second coupler between the conductor and a second of the at least two metal sleeves. The at least two metal sleeves, the first coupler and the second coupler can be configured with 30° slopes to allow for (i) self-fixturing of the seal during assembly at room temperature and/or (ii) when the seal is at its brazing temperature. The face-sealing interfaces can comprise 0.060" wide braze joints. The ceramic component can be chamfered. The at least two metal sleeves and the first coupler can comprise angled self-fixturing features. The conductor can self-fixture with the second coupler.

Another aspect of the present disclosure provides an electrochemical cell comprising (a) a container comprising a reactive material maintained at a temperature of at least about 200° C.; and (b) a seal in the container that seals the container from an environment external to the container. The seal comprises a ceramic component and at least two metal sleeves joined to the ceramic component. The seal is stable when in contact with the external environment. The seal is not stable when in contact with the reactive material. The seal can be hermetic. The temperature can be at least about 300° C. The seal can be maintained at a temperature of least about 300° C. In some cases, the ceramic component is not exposed to the reactive material. In some cases, the electrochemical cell further comprises an additional seal that is stable when in contact with the reactive material nested within the seal. The seal can be configured to bear a vertical load of at least about 10 Newtons, thereby allowing at least a portion of the load to be transferred to the container as opposed to the additional seal. The ceramic component can comprise alumina. The at least two metal sleeves can comprise alloy 42. A coefficient of thermal expansion (CTE) of at least one of the at least two metal sleeves can substantially match a CTE of the ceramic component, thereby reducing internal stresses within the ceramic component. The seal can have a height above a top plate of the container of less than about 2 inches, thereby reducing spacing between vertically stacked electrochemical cells. A conductor can protrude through the container through an aperture in the container. The seal can have an outer diameter of at least about 1 inch, or the aperture can be at least about 0.5 inches in diameter. A first of the at least two metal sleeves can be joined to the ceramic component and the conductor via a braze joint with a braze length of less than about 0.080 inches, thereby reducing thermal stresses at the braze joint.

Another aspect of the present disclosure provides an electrochemical cell comprising (a) a container comprising a reactive material maintained at a temperature of at least about 200° C.; and (b) a seal in the container that seals the container from an environment external to the container. The seal comprises a ceramic component exposed to the reactive material and a metal sleeve joined to the ceramic component. The seal is arranged in a stacked configuration with one or more sealing interfaces that are perpendicular to a direction parallel to a conductor that passes through the seal. The ceramic component comprises a protruding portion that substantially protrudes beyond at least one of the one or more sealing interfaces. The seal can be hermetic. The ceramic component can comprise aluminum nitride (AlN). The metal sleeve can comprise zirconium (Zr). The metal sleeve can be joined to the container. The protruding portion can be adjacent to the conductor. The protruding portion can substantially protrude beyond a sealing interface on the ceramic component. The sealing interface on the ceramic component can comprise a braze joint. The protruding portion can have a thickness that substantially exceeds a thickness of the braze joint, thereby allowing the protruding portion to substantially protrude beyond the braze joint. The ceramic component can increase or physically block an electrical shorting path between the conductor and the metal sleeve. The protruding portion can further protrude downward from the seal in a direction parallel to the conductor to allow fixturing of the seal and/or the conductor. In some cases, the electrochemical cell further comprises an additional metal sleeve joined to the conductor. The metal sleeve can be joined to the container at a bottom surface of the ceramic component and the additional metal sleeve can be joined to the conductor at a top surface of the ceramic component. The metal sleeves can be joined to the ceramic component via braze joints with substantially the same braze lengths, thereby reducing asymmetric forces on the seal. The ceramic component can comprise an inner diameter chamfer. Each of the braze joints can be 0.080 inches wide and 0.002 inches thick. Adjacent solid materials can have substantially matching coefficients of thermal expansion, thus reducing potential for cracks forming within the ceramic upon brazing or cell operation. In some cases, the electrochemical cell further comprises additional ceramic components adjacent to the ceramic component. The ceramic component can be positioned in the center of a vertical stack of ceramic components. The seal can be stable when in contact with the reactive material. In some cases, the electrochemical cell further comprises an additional seal that is stable when in contact with the external environment and within which the seal is nested. The ceramic component can be compressed upon thermal expansion of the conductor, the container, the additional seal, or a combination thereof.

Another aspect of the present disclosure provides an electrochemical cell comprising (a) a container comprising a reactive material maintained at a temperature of at least about 200° C.; and (b) a seal in the container that seals the container from an environment external to the container. The seal comprises a ceramic component exposed to the reactive material and a metal sleeve joined to the ceramic component. The seal is arranged in a stacked configuration with one or more sealing interfaces that are perpendicular to a direction parallel to a conductor that passes through the seal. An axially symmetric cross-section of the ceramic component comprises at least two portions that are not parallel or perpendicular to each other. The ceramic component can be substantially L-shaped. The ceramic component can comprise an inner diameter chamfer. The reactive material can comprise an alkali metal or an alkaline earth metal. The reactive material can comprise magnesium (Mg), calcium (Ca), sodium (Na), potassium (K), lithium (Li), or any combination thereof. The reactive material can further comprise one or more of tin, lead, bismuth, antimony, tellurium, and selenium. The reactive material further can comprise a Group 12 element. The ceramic material can (i) be stable when in contact with lithium, (ii) be stable when in contact with air, (iii) have a coefficient of thermal expansion (CTE) substantially similar to a CTE of stainless steel, and (iv) be electrically insulating. The ceramic material can comprise aluminum nitride (AlN), silicon nitride ($Si_3N_4$), magnesium oxide (MgO) or neodymium oxide ($Nd_2O_3$). The container and/or the conductor can comprise 400-series steel, 300-series steel, nickel, titanium, zirconium, or any combination thereof. In some cases, the electrochemical cell further comprises a sheath or liner between at least a portion of the reactive material and the container. The sheath or liner can comprise graphite. In some cases, the electrochemical cell further comprises a lining or coating that covers an interior portion of the container. The lining or coating can comprise an oxide material with a coefficient of thermal expansion (CTE) substantially similar to a CTE of the container. The CTE of the oxide material can differ from the CTE of the container by less than about 20%. The oxide material can be stable when in contact with the reactive material. The oxide material can comprise one or more of neodymium oxide ($Nd_2O_3$), cerium oxide ($CeO_2$) and lanthanum oxide ($La_2O_3$), the container can comprise stainless steel, and the reactive material can comprise lithium.

Another aspect of the present disclosure provides an electrochemical cell comprising (a) a container comprising a reactive material maintained at a temperature of at least about 200° C.; and (b) a seal in the container that seals the container from an environment external to the container. The seal comprises a ceramic component exposed to the reactive material and a metal sleeve joined to the ceramic component. The ceramic component comprises a lanthanide oxide. The ceramic component comprises grains with a size of less than about 50 microns (μm). The lanthanide oxide can comprise neodymium oxide ($Nd_2O_3$). The seal can further comprise a metallization layer bonded to the ceramic component, wherein the ceramic component and the metallization layer form a pre-metallized ceramic component, wherein the metallization layer comprises greater than 50 at % niobium (Nb). In some cases, the ceramic component further comprises less than or equal to about 10 weight percent yttrium oxide ($Y_2O_3$). The ceramic component can further comprise greater than or equal to about 5 weight percent silicon carbide (SiC). The metal sleeve can comprise alloy 52 or 18CrCb ferritic stainless steel. In some cases, the ceramic component further comprises greater than or equal to about 3 weight percent of a different oxide material. In some cases, the seal further comprises a first layer coated onto the ceramic component, the first layer comprising yttrium (Y). The seal can further comprise a second layer coated onto the first layer, the second layer comprising chromium (Cr) or rhenium (Re). The ceramic component, the first layer and the second layer can form a pre-metallized ceramic component. The seal can further comprise a third layer joining the pre-metallized ceramic component to the metal sleeve, the third layer comprising a nickel (Ni)-based material. The materials of the first, second and third layers can form at most one intermetallic compound with each other. The first, second and third layers can form a layered braze between the ceramic component and the metal sleeve. In some cases, the seal further comprises a metallization powder bonded to the ceramic component to form a first layer and a second layer on the ceramic component. The ceramic component, the first layer and the second layer can form a pre-metallized ceramic component. At least one of the first layer and second layer can comprise a mutual reaction compound of the metallization powder and the ceramic component. The metallization powder can comprise a metal powder mixed with a ceramic or glass material. The metallization powder can comprise a metal selected from at least one of manganese (Mn) and molybdenum (Mo). The metallization powder can comprise at least about 10% Mn, at least about 10%, 20%, 50%, or 70% Mo and at least about 2% aluminum nitride (AlN). The first layer can comprise a mutual reaction compound of the ceramic or glass material and the ceramic component. The second layer can comprise the metal. The ceramic or glass material can comprise aluminum nitride (AlN), and the mutual reaction compound can comprise $Nd_2AlO_3N$. The metallization powder can be applied to the ceramic component as a slurry or paint. The metallization powder can be melted at a temperature of greater than or equal to about 1330° C. The seal can further comprise a third layer joining the pre-metallized ceramic component to the metal sleeve, the third layer comprising nickel (Ni), copper (Cu) or a combination thereof. The first, second and third layers can form a layered braze between the ceramic component and the metal sleeve. The container can further comprise a lining or coating comprising an oxide material that covers an interior portion of the container. The oxide material can be stable when in contact with the reactive material. The oxide material can comprise a lanthanide oxide. The container can further comprise a molten metal negative electrode that comprises at least a portion of the reactive material. At the temperature of the electrochemical cell, the ceramic component can be stable (i) when in contact with the reactive material or (ii) when in contact with the external environment. At the temperature of the electrochemical cell, the ceramic component can be stable (i) when in contact with the reactive material and (ii) when in contact with the external environment. The reactive material can be lithium. The ceramic component can comprise grains with a size of less than about 10 μm. The metal sleeve can comprise stainless steel, and the ceramic component can have a coefficient of thermal expansion that is less than about 10% different than a coefficient of thermal expansion of the metal sleeve. The metal sleeve can comprise a nickel alloy, and the ceramic component can have a coefficient of thermal expansion that is less than about 10% different than a coefficient of thermal expansion of the metal sleeve. The metal sleeve can comprise at least about 40% nickel. The metal sleeve can comprise at least about 50% nickel. The metal sleeve can comprise at least about 95% or 99% nickel. The seal can surround a conductor that protrudes through the container through an aperture in the container.

Another aspect of the present disclosure provides an electrochemical cell comprising (a) a container comprising a reactive material maintained at a temperature of at least about 200° C.; and (b) a seal in the container that isolates the container from an environment external to the container. The seal comprises a ceramic component exposed to the reactive material and a metal sleeve joined to the ceramic component. The ceramic component comprises a primary ceramic material and a secondary ceramic material. The primary ceramic material comprises aluminum nitride (AlN). The secondary ceramic material increases a strength of the primary ceramic material by at least about 1%. The secondary ceramic material can comprise yttrium oxide ($Y_2O_3$), silicon carbide (SiC), or a combination thereof. The secondary ceramic material can be included in the ceramic component in an amount that is greater than or equal to about 3 weight percent $Y_2O_3$, greater than or equal to about 25 volume percent SiC, or a combination thereof. The secondary ceramic material can be included in the ceramic component in an amount that is less than or equal to about 3 weight percent $Y_2O_3$, less than or equal to about 25 volume percent SiC, or a combination thereof. The secondary ceramic material can be included in the ceramic component in an amount that is less than about 5 or 3 weight percent $Y_2O_3$, greater than or equal to about 15 or 25 volume percent SiC, or a combination thereof. The secondary ceramic material can be included in the ceramic component in an amount that is greater than or equal to about 3 weight percent $Y_2O_3$, less than about 25 volume percent SiC, or a combination thereof. The seal can be stable when in contact with the reactive material. The metal sleeve can have a coefficient of thermal expansion that is greater than or equal to about 10 microns per meter per degree Celsius (μm/m/° C.). The ceramic component can comprise grains with a size of less than about 50 microns (μm). The primary ceramic material and the secondary ceramic material can comprise grains with different sizes. The seal can further comprise a metallization powder bonded to the ceramic component to form a first layer and a second layer on the ceramic component. The metallization powder can comprise a metal powder and a ceramic or glass material. The ceramic component, the first layer and the second layer can form a pre-metallized ceramic component. The metallization powder can comprise a metal selected from at least one of manganese (Mn) and molybdenum (Mo). The metallization powder can comprise at least about 10% Mn, at least about 10% Mo and at least about 2% neodymium oxide ($Nd_2O_3$). The metallization powder can comprise at least about 10% Mn, at least about 10% Mo and at least about 10% neodymium oxide ($Nd_2O_3$). The metallization powder can comprise at least about 10% Mn, at least about 10% Mo and at least about 20% neodymium oxide ($Nd_2O_3$). The first layer can comprise a mutual reaction compound of the ceramic or glass material and the ceramic component. The second layer can comprise the metal. The mutual reaction compound can comprise $Nd_2AlO_3N$. The seal can further comprise a third layer joining the pre-metallized ceramic component to the metal sleeve, the third layer comprising nickel (Ni), copper (Cu) or a combination thereof. At least a portion of the third layer can comprise at least about 82% Ni. The first, second and third layers can form a layered braze between the ceramic component and the metal sleeve.

In another aspect, the present disclosure provides a ceramic material comprising at least about 30 weight percent (wt %) neodymium oxide ($Nd_2O_3$), wherein the ceramic material has a strength of greater than or equal to about 150 MPa.

In some embodiments, the ceramic material comprises at least about 40 wt % $Nd_2O_3$. In some embodiments, the ceramic material comprises at least about 50 wt % $Nd_2O_3$.

In some embodiments, the ceramic material comprises at least one of $Nd_2O_3$, $ZrO_2$ and $Nd_2Zr_2O_7$ crystal structures, and wherein the ceramic material comprises less than or equal to about 38.7 atomic percent (at %) Nd and 60.2 at % O, and greater than or equal to about 1.1 at % Zr as measured on an atomic percentage basis.

In some embodiments, the ceramic material further comprises at least one of SiC, TiC and $Y_2O_3$. In some embodiments, the ceramic material further comprises at least one of tetragonal zirconia polycrystal (TZP), $ZrO_2$, SiC, TiC and $Y_2O_3$. In some embodiments, at least a portion of the ceramic material comprises grains with a size of less than about 50 microns (μm). In some embodiments, a grain size of the SiC in the ceramic material is less than about 1 μm. In some embodiments, the ceramic material has a coefficient of thermal expansion (CTE) of between about 8 ppm/K and 11 ppm/K for a temperature range of between about 20° C. and 500° C. In some embodiments, the ceramic material retains mechanical strength after exposure to air at a temperature of at least about 400° C. for at least about 100 hours. In some embodiments, the ceramic material retains mechanical strength after being submerged in a reactive material at a temperature of at least about 400° C. for at least about 8 hours. In some embodiments, the reactive material comprises lithium metal-saturated molten LiCl—LiBr—LiF salts. In some embodiments, the ceramic material retains mechanical strength after being submerged in water at a temperature of at least about 25° C. for at least about 100 hours. In some embodiments, the ceramic material further comprises greater than or equal to about 15 at % Nd, 1.5 at % Zr, 5.2 at % Ti and 5.2 at % C, and less than or equal to about 54.1 at % O. In some embodiments, the ceramic material further comprises greater than or equal to about 15 at % Nd, 2.5 at % Y, 2.3 at % Zr, 7.1 at % Si and 7.1 at % C, and less than or equal to about 51.9 at % O.

In some embodiments, the ceramic material has a strength greater than or equal to about 200 MPa. In some embodiments, the ceramic material has a strength greater than or equal to about 300 MPa. In some embodiments, the ceramic material functions as a dielectric insulator in a device that contains one or more reactive materials. In some embodiments, the device operates at a temperature of at least about 300° C. In some embodiments, the device is associated with a nuclear fission or fusion reactor. In some embodiments, the ceramic material functions as a protective lining in a reactor chamber that contains reactive material. In some embodiments, the reactor chamber contains reactive material at an operating temperature of greater than about 300° C. In some embodiments, the reactive material is a reactive liquid metal. In some embodiments, the dielectric insulator is part of a gas-tight seal. In some embodiments, the device is a liquid metal battery cell. In some embodiments, the liquid metal battery cell comprises molten lithium metal and molten salts. In some embodiments, the liquid metal battery cell is operated at a temperature of at least about 300° C. In some embodiments, the seal comprises a ceramic-to-metal joint. In some embodiments, the ceramic-to-metal joint comprises a layered assembly that includes the ceramic material, and a braze layer bonded to a metal sleeve. In some embodiments, the ceramic-to-metal joint further comprises a metallization layer bonded between the ceramic material and the braze layer. In some embodiments, the metallization layer comprises a primary metallization metal that includes niobium (Nb). In some embodiments, the metallization layer further comprises a secondary metallization metal that includes Ti, Cr, Al, Mo or any combination thereof. In some embodiments, the metallization layer comprises a ceramic powder material comprising $Nd_2O_3$, AlN, $Y_2O_3$, $TiO_2$, $Al_2O_3$, CaO, SrO or any combination thereof. In some embodiments, the braze layer comprises a Ni-based braze alloy. In some embodiments, the braze layer comprises BNi-2, BNi-7 or BNi-5b braze alloy.

In some embodiments, the metal sleeve comprises 18CrCb ferritic stainless steel, 441 stainless steel, Inconel 600, ATI alloy 600 or Hastelloy S. In some embodiments, the metal sleeve material has a thickness of greater than or equal to about 75 μm.

Another aspect of the present disclosure provides a ceramic material comprising aluminum nitride (AlN); and at least one of silicon carbide (SiC) and titanium carbide (TiC), wherein at least a portion of the at least one of SiC and TiC is in particle form other than whiskers. The ceramic material can have a grain size of less than about 50 microns (μm) and a porosity of less than about 1%.

In some embodiments, the ceramic material further comprises yttria ($Y_2O_3$), and wherein the ceramic material comprises about 3 weight percent (wt %) $Y_2O_3$ and at least about 25 volume percent (vol %) SiC. In some embodiments, the ceramic material has a tensile strength greater than about 400 MPa.

In some embodiments, a device for protecting against ballistic penetration comprises the ceramic material. In some embodiments, the device is ballistic armor.

In some embodiments, a high temperature device containing reactive material(s) comprises a seal comprising the ceramic material.

In some embodiments, the ceramic material further comprises at least about 3 wt % $Nd_2O_3$. In some embodiments, the ceramic material further comprises at least about 5 wt % $Nd_2AlNO_3$. In some embodiments, the ceramic material further comprises at least about 5 vol % SiC. In some embodiments, the ceramic material further comprises at least about 20 vol % SiC. In some embodiments, the ceramic material has a tensile strength of at least about 400 MPa.

In some embodiments, a device for holding reactive material(s) at an operating temperature greater than about 300° C. comprises a seal comprising the ceramic material.

In some embodiments, ballistic armor comprises the ceramic material.

In some embodiments, a grain size of the SiC in the ceramic material is less than or equal to about 1 μm. In some embodiments, the grain size of the SiC in the ceramic material is less than or equal to about 0.7 μm. In some embodiments, the grain size of the SiC in the ceramic material is less than or equal to about 0.45 μm.

In some embodiments, the ceramic material comprises at least about 30 weight percent (wt %) AlN. In some embodiments, the SiC is in particle form other than whiskers.

In some embodiments, the ceramic material further comprises greater than or equal to about 20 at % Al, 20 at % N, 0.6 at % Y, 0.8 at % O, 5.2 at % Si, and 5.2 at % C. In some embodiments, the ceramic material further comprises greater than or equal to about 20 at % Al, 20 at % N, 0.4 at % Nd, 0.6 at % O, 5.2 at % Si, and 5.2 at % C. In some embodiments, the ceramic material further comprises greater than or equal to about 20 at % Al, 20 at % N, 0.4 at % Nd, 0.6 at % O, 1.8 at % Ti, and 1.8 at % C. In some embodiments, the ceramic material further comprises at least about 5 wt % TiC.

In another aspect, the present disclosure provides an electrochemical cell comprising (a) a container comprising a reactive material maintained at a temperature of at least about 200° C.; (b) a seal in the container that isolates the container from an environment external to the container, the seal comprising a ceramic component exposed to the reactive material and a metal sleeve joined to the ceramic component; and (c) a coating on an external surface of the seal to protect the metal sleeve and/or the ceramic component from excessive oxidation, the coating comprising phosphorus (P) and oxygen (O).

In some embodiments, the electrochemical cell further comprises aluminum (Al). In some embodiments, the coating comprises aluminophosphate glass. In some embodiments, the coating comprises Al—O—Al bonds. In some embodiments, the coating comprises nanometer scale carbon particles. In some embodiments, the nanometer scale carbon particles are encapsulated within the aluminophosphate glass. In some embodiments, the coating comprises phosphate glass. In some embodiments, the coating comprises amorphous glass.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" or "FIG." herein), of which:

FIG. 1 is an illustration of an electrochemical cell (A) and a compilation (e.g., battery) of electrochemical cells (B and C);

FIG. 6 shows examples of current collectors combined into a shared lid assembly (A and B);

DETAILED DESCRIPTION

Figure 2:
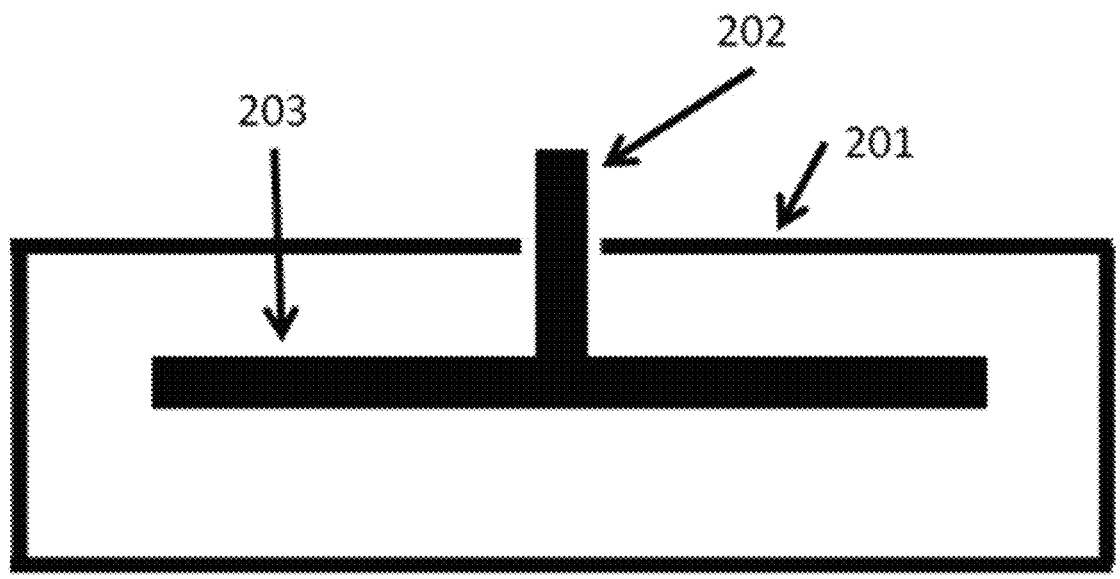
FIG. 2 is a schematic cross-sectional illustration of a housing having a conductor in electrical communication with a current collector pass through an aperture in the housing.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "direct metal-to-metal joining" or "direct metal-to-metal joint," as used herein, generally refers to an electrical connection where two metal surfaces are brought into contact (e.g., by forming a braze or a weld). In some examples, direct metal-to-metal joints do not include wires.

The term "electronically," as used herein, generally refers to a situation in which electrons can readily flow between two or more components with little resistance. Components that are in electronic communication with one another can be in electrical communication with one another.

The term "vertical," as used herein, generally refers to a direction that is parallel to the force of gravity.

The term "stable," as used herein to describe a material, generally refers to a material that is thermodynamically stable, chemically stable, thermochemically stable, electrochemically stable, kinetically stable, or any combination thereof. A stable material may be substantially thermodynamically, chemically, thermochemically, electrochemically and/or kinetically stable. A stable material may not be substantially chemically or electrochemically reduced, attacked or corroded. Any aspects of the disclosure described in relation to stable, thermodynamically stable or chemically stable materials may equally apply to thermodynamically stable, chemically stable, thermochemically stable and/or electrochemically stable materials at least in some configurations.

Ceramic Materials and Seals for High-Temperature Devices

The present disclosure provides a seal or a corrosion resistant lining for a high-temperature device. The device can be a high temperature reactive material device that contains/comprises one or more reactive materials. For example, the high-temperature device can contain a reactive material. In some cases, the device can be a high-temperature reactive metal device. The device can be, without limitation, for the production and/or handling of a reactive material, such as, for example, a reactive metal (e.g., lithium, sodium, magnesium, aluminum, titanium and/or other reactive metals) and/or a chemical with a strong chemical reducing capability (e.g., reactive chemical), for semiconductor manufacturing, for a nuclear reactor (e.g., nuclear fusion/fission reactor, nuclear reactor that uses a molten salt or metal, such as, for example, molten sodium or lithium or molten sodium- or lithium-containing alloys, as a coolant), for a heterogeneous reactor, for a chemical processing device, for a chemical transportation device, for a chemical storage device, or for a battery (e.g., a liquid metal battery). For instance, some batteries operate at high temperatures (e.g., at least about 100° C. or 300° C.) and have reactive metal vapors (e.g., lithium, sodium, potassium, magnesium, or calcium) that may need to be sufficiently contained within the battery. In some examples, such high-temperature devices operate, are heated to and/or maintained at a temperature of at least about 100° C., 150° C., 200° C., 250° C., 300° C., 350° C., 400° C., 450° C., 500° C., 550° C., 600° C., 650° C., 700° C., 750° C., 800° C., 850° C., 900° C. or more. At such temperatures, one or more components of the device can be in a liquid (or molten) or vaporized state.

The corrosion resistant lining may comprise a ceramic material. The ceramic material may function as a protective lining in a reactor chamber that contains reactive material. For example, the reactor chamber may contain reactive material at an operating temperature of, for example, greater than about 300° C. or 400° C. The reactive material may comprise or be a reactive liquid metal and/or molten salt(s). In some cases (e.g., in some nuclear reactors), molten salt may be used instead of liquid metal. The molten salt may contain dissolved liquid reactive metal.

The ceramic material may function as a dielectric insulator in a device that contains one or more reactive materials. The device may operate at a temperature of, for example, at least about 300° C. or 400° C. The device may be associated with a nuclear fission or fusion reactor. The dielectric insulator may be part of a seal (e.g., a gas-tight seal). The ceramic material may be used in a seal of a device that contains reactive materials and operates at a temperature of greater than about 300° C.

The seal can comprise a ceramic material (e.g., aluminum nitride (AlN)) that is in contact with the reactive material (e.g., a reactive metal or molten salt) contained in the device. The ceramic material can be capable of being chemically resistant to a reactive material (e.g., a reactive material contained in the device, such as, for example, reactive metal or molten salt). The ceramic material can be capable of being chemically resistant to the reactive material when the device operates at a high temperature (e.g., at least about 100° C., 150° C., 200° C., 250° C., 300° C., 350° C., 400° C., 500° C., 600° C., 700° C., 800° C. or 900° C.).

The seal can comprise a metal collar or sleeve (e.g., made from stainless steel (SS), zirconium, nickel, a nickel-based alloy or a chromium-based alloy). A sleeve and/or the collar design can be coefficient of thermal expansion (CTE)-accommodating (e.g., can accommodate differences in CTE (also "CTE mismatch" herein)). In some cases, a sleeve can be a collar. A collar can be conical. For example, a collar can be a conical metal (e.g., stainless steel) collar. Any aspects of the disclosure described in relation to collars may equally apply to sleeves at least in some configurations, and vice versa.

The seal can comprise an active metal braze disposed between the ceramic material and at least one of the metal collar/sleeve and the device. The active metal braze can comprise a metal species that chemically reduces the ceramic material (e.g., titanium (Ti) or zirconium (Zr)).

The seal can surround an electrically conductive feedthrough (and can electrically isolate the feed-through from a housing of the device), a thermocouple or a voltage sensor. For example, the ceramic material can be an insulator.

In some examples, the seal may be capable of being chemically resistant to reactive materials in the device at a temperature of at least about 100° C., 150° C., 200° C., 250° C., 300° C., 350° C., 400° C., 500° C., 600° C., 700° C., 800° C. or 900° C. In some examples the seal may be capable of being chemically resistant to reactive materials at such temperatures for at least about 6 months, 1 year, 2 years, 5 years, 10 years, 20 years or more. In some examples, the device can be a high-temperature reactive metal device, and the seal can be capable of being chemically resistant to materials in the device that comprise the reactive metal. In an example, the seal is capable of being resistant to lithium vapor at a temperature of at least about 300° C. for at least about one year. The seal can retain the reactive material (e.g., vapors of the reactive material) in the device. For example, the seal can retain reactive metal vapors and/or molten salt vapors in the device.

Electrochemical Cells, Devices and Systems

The present disclosure provides electrochemical energy storage devices (e.g., batteries) and systems. An energy storage device may form or be provided within an energy storage system. The electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge. A cell can include a negative electrode of material 'A' and a positive electrode of material 'B', denoted as A∥B. The positive and negative electrodes can be separated by an electrolyte. A cell can also include a housing, one or more current collectors, and a seal (e.g., a high temperature electrically isolating seal).

In some examples, an electrochemical cell is a liquid metal battery cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkaline earth metal (e.g., magnesium, calcium) or alkali metal (e.g., lithium, sodium, potassium) negative electrode, an electrolyte, and a molten metal positive electrode. The molten metal positive electrode can include, for example, one or more of tin, lead, bismuth, antimony, tellurium and selenium. For example, the positive electrode can include Pb, a Pb—Sb alloy or Bi. The positive electrode can also include one or more transition metals or d-block elements (e.g., Zn, Cd, Hg) alone or in combination with other metals, metalloids or non-metals, such as, for example, a Zn—Sn alloy or Cd—Sn alloy. In some examples, the positive electrode can comprise a metal or metalloid that has only one stable oxidation state (e.g., a metal with a single or singular oxidation state). Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali or alkaline earth metal alloyed in the positive electrode.

In some examples, an electrochemical energy storage device includes a liquid metal negative electrode, a liquid metal positive electrode, and a liquid salt electrolyte separating the liquid metal negative electrode and the liquid metal positive electrode. The negative electrode can include an alkali or alkaline earth metal, such as lithium, sodium, potassium, rubidium, cesium, magnesium, barium, calcium, sodium, or combinations thereof. The positive electrode can include elements selected from transition metals, d-block elements (e.g., Group 12) or Group IIIA, IVA, VA and VIA of the periodic table of the elements (e.g., zinc, cadmium, mercury, aluminum, gallium, indium, silicon, germanium, tin and lead), pnicogens (e.g., arsenic, bismuth and antimony), chalcogens (e.g., sulfur, tellurium and selenium), or any combination thereof. In some examples, the positive electrode comprises a Group 12 element of the periodic table of the elements, such as one or more of zinc (Zn), cadmium (Cd) and mercury (Hg). In some cases, the positive electrode may form a eutectic or off-eutectic mixture (e.g., enabling lower operating temperature of the cell in some cases). In some examples, the positive electrode comprises a first positive electrode species and a second positive electrode species at a ratio (mol-%) of about 20:80, 40:60, 50:50, 60:40, or 80:20 of the first positive electrode species to the second electrode species. In some examples, the positive electrode comprises Sb and Pb at a ratio (mol-%) of about 20:80, 40:60, 50:50, 60:40, or 80:20 Sb to Pb. In some examples, the positive electrode comprises between about 20 mol-% and 80 mol-% of a first positive electrode species mixed with a second positive electrode species. In some cases, the positive electrode comprises between about 20 mol-% and 80 mol-% Sb (e.g., mixed with Pb). In some cases, the positive electrode comprises between about 20 mol-% and 80 mol-% Pb (e.g., mixed with Sb). In some examples, the positive electrode comprises one or more of Zn, Cd, Hg, or such material(s) in combination with other metals, metalloids or non-metals, such as, for example, a Zn—Sn alloy, Zn—Sn alloy, Cd—Sn alloy, Zn—Pb alloy, Zn—Sb alloy, or Bi. In an example, the positive electrode can comprise about 15:85, 50:50, 75:25 or 85:15 mol-% Zn:Sn.

The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte (e.g., in Type 1 or Type 2 chemistries) includes lithium chloride. In some examples, the electrolyte can comprise sodium fluoride (NaF), sodium chloride (NaCl), sodium bromide (NaBr), sodium iodide (NaI), lithium fluoride (LiF), lithium chloride (LiCl), lithium bromide (LiBr), lithium iodide (LiI), potassium fluoride (KF), potassium chloride (KCl), potassium bromide (KBr), potassium iodide (KI), calcium fluoride ($CaF_2$), calcium chloride ($CaCl_2$), calcium bromide ($CaBr_2$), calcium iodide ($CaI_2$), or any combination thereof. In another example, the electrolyte includes magnesium chloride ($MgCl_2$). As an alternative, the salt of the active alkali metal can be, for example, a non-chloride halide, bistriflimide, fluorosulfano-amine, perchlorate, hexaflourophosphate, tetrafluoroborate, carbonate, hydroxide, nitrate, nitrite, sulfate, sulfite, or combinations thereof. In some cases, the electrolyte can comprise a mixture of salts (e.g., 25:55:20 mol-% LiF:LiCl:LiBr, 50:37:14 mol-% LiCl:LiF:LiBr, 34:32.5:33.5 mol-% LiCl—LiBr—KBr, etc.). The electrolyte may exhibit low (e.g., minimal) electronic conductance. For example, the electrolyte can have an electronic transference number (i.e., percentage of electrical (electronic and ionic) charge that is due to the transfer of electrons) of less than or equal to about 0.03% or 0.3%.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., 150° C., 200° C., 250° C., 300° C., 350° C., 400° C., 450° C., 475° C., 500° C., 550° C., 600° C., 650° C. or about 700° C. The battery cell may be heated to and/or maintained at a temperature of at least about 100° C., 150° C., 200° C., 250° C., 300° C., 350° C., 400° C., 450° C., 475° C., 500° C., 550° C., 600° C., 650° C., 700° C., 800° C. or 900° C. In such a case, the negative electrode, electrolyte and positive electrode can be in a liquid (or molten) state. In some situations, the battery cell is heated to between about 200° C. and 600° C., 500° C. and 550° C. or 450° C. and 575° C.

In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells are maintained at a given operating temperature (e.g., a cell operating temperature above the freezing point of at least one of the liquid components) without the need for additional energy to be supplied to the system to maintain the operating temperature.

Electrochemical cells of the disclosure may be adapted to cycle between charged (or energy storage) modes and discharged modes. In some examples, an electrochemical cell can be fully charged, partially charged or partially discharged, or fully discharged.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

Cells may have voltages. Charge cutoff voltage (CCV) may refer to the voltage at which a cell is fully or substantially fully charged, such as a voltage cutoff limit used in a battery when cycled in a constant current mode. Open circuit voltage (OCV) may refer to the voltage of a cell (e.g., fully or partially charged) when it is disconnected from any circuit or external load (i.e., when no current is flowing through the cell). Voltage or cell voltage, as used herein, may refer to the voltage of a cell (e.g., at any state of charge or charging/discharging condition). In some cases, voltage or cell voltage may be the open circuit voltage. In some cases, the voltage or cell voltage can be the voltage during charging or during discharging. Voltages of the present disclosure may be taken or represented with respect to reference voltages, such as ground (0 volt (V)), or the voltage of the opposite electrode in an electrochemical cell.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode). A cell can comprise materials that are configured for use in Type 2 mode of operation. A cell can comprise materials that are configured for use in Type 1 mode of operation. In some cases, a cell can be operated in both a high voltage (Type 2) operating mode and the low voltage (Type 1) operating mode. For example, a cell with positive and negative electrode materials that are ordinarily configured for use in a Type 1 mode can be operated in a Type 2 mode of operation. A cell can be cycled between Type 1 and Type 2 modes of operation. A cell can be initially charged (or discharged) under Type 1 mode to a given voltage (e.g., 0.5 V to 1 V), and subsequently charged (then discharged) under Type 2 mode to a higher voltage (e.g., 1.5 V to 2.5 V, or 1.5 V to 3 V). In some cases, cells operated under Type 2 mode can operate at a voltage between electrodes that can exceed those of cells operated under Type 1 mode. In some cases, Type 2 cell chemistries can operate at a voltage between electrodes that can exceed those of Type 1 cell chemistries operated under Type 1 mode. Type 2 cells can be operated in Type 2 mode.

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Li, Na, K, Mg, Ca). During charging, the alloy at the positive electrode can disassociate to yield cations of the negative electrode material (e.g., $Li^+$, $Na^+$, $K^+$, $Mg^{2+}$, $Ca^{2+}$), which migrates into the electrolyte. The electrolyte can then provide cations (e.g., the cation of the negative electrode material) to the negative electrode, where the cations accept one or more electrons from an external circuit and are converted back to a neutral metal species, which replenishes the negative electrode to provide a cell in a charged state. A Type 1 cell can operate in a push-pop fashion, in which the entry of a cation into the electrolyte results in the discharge of the same cation from the electrolyte.

In an example Type 2 cell, in a discharged state the electrolyte comprises cations of the negative electrode material (e.g., $Li^+$, $Na^+$, $K^+$, $Mg'$, $Ca^{2+}$), and the positive electrode comprises positive electrode material (e.g., Sb, Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten (e.g., to avoid corrosion from Zn), tungsten carbide or molybdenum negative collector not comprising Fe—Ni foam. Concurrently, positive electrode material from the positive electrode sheds electrons (e.g., to a positive current collector) and dissolves into the electrolyte as cations of the positive electrode material (e.g., $Sb^{3+}$, $Pb^{2+}$, $Sn^{2+}$, $Zn^{2+}$, $Hg^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

In some implementations, negative electrode material may not need to be provided at the time of assembly of a cell that can be operated in a Type 2 mode. For example, a Li∥Pb cell or an energy storage device comprising such cell(s) can be assembled in a discharged state having only a Li salt electrolyte and a Pb or Pb alloy (e.g., Pb—Sb) positive electrode (i.e., Li metal may not be required during assembly).

Although electrochemical cells of the present disclosure have been described, in some examples, as operating in a Type 1 mode or Type 2 mode, other modes of operation are possible. Type 1 mode and Type 2 mode are provided as examples and are not intended to limit the various modes of operation of electrochemical cells disclosed herein.

In some cases, an electrochemical cell comprises a liquid metal negative electrode (e.g., sodium (Na) or lithium (Li)), a liquid (e.g., LiF—LiCl—LiBr, LiCl—KCl or LiCl—LiBr—KBr) or solid ion-conducting electrolyte (e.g., β″-alumina ceramic), and a liquid or semi-solid positive electrode (e.g., a solid matrix or particle bed impregnated with a liquid or molten electrolyte). Such a cell can be a high temperature battery. One or more such cells can be provided in an electrochemical energy storage device. The negative electrode may comprise an alkali or alkaline earth metal, such as, for example, lithium, sodium, potassium, magnesium, calcium, or any combination thereof. The positive electrode and/or electrolyte may comprise a liquid chalcogen or a molten chalcogen-halogen compound (e.g., elemental, ionic or other form of sulfur (S), selenium (Se) or tellurium (Te)), a molten salt comprising a transition metal halide (e.g., halides comprising Ni, Fe, Cr, Mn, Co or V, such as, for example, $NiCl_3$ or $FeCl_3$), a solid transition metal (e.g., particles of Ni, Fe, Cr, Mn, Co or V), sulfur, one or more metal sulfides (e.g., $FeS_2$, FeS, $NiS_2$, $CoS_2$, or any combination thereof), a liquid or molten alkali halometallate (e.g., comprising Al, Zn or Sn) and/or other (e.g., supporting) compounds (e.g., NaCl, NaF, NaBr, NaI, KCl, LiCl or other alkali halides, bromide salts, elemental zinc, zinc-chalcogen or zinc-halogen compounds, or metallic main-group metals or oxygen scavengers such as, for example, aluminum or transition metal-aluminum alloys), or any combination thereof. The solid ion-conducting electrolyte may comprise a beta alumina (e.g., β"-alumina) ceramic capable of conducting sodium ions at elevated or high temperature. In some instances, the solid ion-conducting electrolyte operates above about 100° C., 150° C., 200° C., 250° C., 300° C. or 350° C.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer, a gel or a paste. In a further example, at least one battery electrode can be a solid, a gel or a paste. Furthermore, in some examples, the electrodes and/or electrolyte may not include metal. Aspects of the disclosure are applicable to a variety of energy storage/transformation devices without being limited to liquid metal batteries.

Batteries and Housings

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell (e.g., positive electrode) can contact and be electrically coupled with an endwall of the container. A second one of the electrodes of the cell (e.g., negative electrode) can contact and be electrically coupled with a conductive feed-through or conductor (e.g., negative current lead) on the container lid (collectively referred to herein as "cell lid assembly," "lid assembly" or "cap assembly" herein). An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g., graphite sheath or crucible). In some cases, a housing and/or container may be a battery housing and/or container.

A cell can have any cell and seal configuration disclosed herein. For instance, the active cell materials can be held within a sealed steel/stainless steel container with a high temperature seal on the cell lid. A negative current lead can pass through the cell lid (and be sealed to the cell lid by the dielectric high temperature seal), and connect with a porous negative current collector (e.g., metal foam) suspended in an electrolyte. In some cases, the cell can use a graphite sheath, coating, crucible, surface treatment or lining (or any combination thereof) on the inner wall of the cell crucible (e.g., container). In other cases, the cell may not use a graphite sheath, coating, crucible, surface treatment or lining on an inner wall of the cell crucible (e.g., container).

During cell operation, material (e.g., Fe) from a wall of the cell can react under the higher voltage potential (e.g., Type 2 mode), and ionize as a soluble species in the electrolyte. Hence, the wall material can dissolve into the electrolyte and subsequently interfere with the cell's electrochemistry. For example, the dissolved material can deposit on the negative electrode, which, in some cases, can grow as dendrites and stretch across the electrolyte to one or more walls of the cell, or toward the positive electrode, which can result in a short failure. The present disclosure provides various approaches for suppressing or otherwise helping minimize the dissolution of solid (passive) cell material such as Fe and its potentially negative effects on cell performance by, for example, formation of dendrites and cell shorting. In some cases, a cell can be designed such that increased spacing between the negative electrode and a wall of the cell suppresses or otherwise helps minimize the ability of dendrites from forming and shorting the wall to the inner wall. A cell can include an electrically insulating, and chemically stable sheath or coating between one or more walls of the cell and the negative electrode, electrolyte and/or positive electrode to minimize or prevent shorting to the one or more walls of the cell. In some cases, the cell can be formed of a non-ferrous container or container lining, such as a carbon-containing material (e.g., graphite), or a carbide (e.g., SiC, TiC), or a nitride (e.g., TiN, BN), or a chemically stable metal (e.g., Ti, Ni, B). The container or container lining material may be electrically conductive. Such non-limiting approaches can be used separately or in combination, for suppressing or otherwise helping minimize chemical interactions with Fe or other cell wall materials, and any subsequent negative effects on cell performance.

A cell may have a set of dimensions. In some cases, a cell can be greater than or equal to about 4 inches wide, 4 inches deep and 2.5 inches tall. In some cases, a cell can be greater than or equal to about 8 inches wide, 8 inches deep and 2.5 inches tall. In some examples, any given dimension (e.g., height, width or depth) of an electrochemical cell can be at least about 1, 2, 2.5, 3, 3.5, 4, 4.5, 5, 5.5, 6, 6.5, 7, 7.5, 8, 8.5, 9, 9.5, 10, 12, 14, 16, 18 or 20 inches. In an example, a cell (e.g., each cell) can have dimensions of greater than or equal to about 4 inches×4 inches×2.5 inches. In another example, a cell (e.g., each cell) can have dimensions of greater than or equal to about 8 inches×8 inches×2.5 inches. In some cases, a cell may have greater than or equal to about 50 Watt-hours of energy storage capacity. In some cases, a cell may have at least about 200 Watt-hours of energy storage capacity.

One or more electrochemical cells ("cells") may be arranged in groups. Examples of groups of electrochemical cells include modules, packs, cores, CEs and systems.

A module can comprise cells that are attached together in parallel by, for example, mechanically connecting the cell housing of one cell with the cell housing of an adjacent cell (e.g., cells that are connected together in an approximately horizontal packing plane). In some cases, the cells are connected to each other by joining features that are part of and/or connected to the cell body (e.g., tabs protruding from the main portion of the cell body). A module can include a plurality of cells in parallel. A module can comprise any number of cells, e.g., at least about 2, 3, 4, 5, 6, 7, 8, 9, 10, 11, 12, 13, 14, 15, 16, 17, 18, 19, 20 or more cells. In some cases, a module comprises at least about 4, 9, 12 or 16 cells. In some cases, a module is capable of storing greater than or equal to about 700 Watt-hours of energy and/or delivering at least about 175 Watts of power. In some cases, a module is capable of storing at least about 1080 Watt-hours of energy and/or delivering at least about 500 Watts of power. In some cases, a module is capable of storing at least about 1080 Watt-hours of energy and/or delivering at least about 200 Watts (e.g., greater than or equal to about 500 Watts) of power. In some cases, a module can include a single cell.

A pack can comprise modules that are attached through different electrical connections (e.g., vertically). A pack can comprise any number of modules, e.g., at least about 1, 2, 3, 4, 5, 6, 7, 8, 9, 10, 11, 12, 13, 14, 15, 16, 17, 18, 19, 20 or more modules. In some cases, a pack comprises at least about 3 modules. In some cases, a pack is capable of storing at least about 2 kilo-Watt-hours of energy and/or delivering at least about 0.4 kilo-Watts (e.g., at least about 0.5 kilo-Watts or 1.0 kilo-Watts) of power. In some cases, a pack is capable of storing at least about 3 kilo-Watt-hours of energy and/or delivering at least about 0.75 kilo-Watts (e.g., at least about 1.5 kilo-Watts) of power. In some cases, a pack comprises at least about 6 modules. In some cases, a pack is capable of storing greater than or equal to about 6 kilo-Watt-hours of energy and/or delivering at least about 1.5 kilo-Watts (e.g., greater than or equal to about 3 kilo-Watts) of power.

A core can comprise a plurality of modules or packs that are attached through different electrical connections (e.g., in series and/or parallel). A core can comprise any number of modules or packs, e.g., at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50 or more packs. In some cases, the core also comprises mechanical, electrical, and thermal systems that allow the core to efficiently store and return electrical energy in a controlled manner. In some cases, a core comprises at least about 12 packs. In some cases, a core is capable of storing at least about 25 kilo-Watt-hours of energy and/or delivering at least about 6.25 kilo-Watts of power. In some cases, a core comprises at least about 36 packs. In some cases, a core is capable of storing at least about 200 kilo-Watt-hours of energy and/or delivering at least about 40, 50, 60, 70, 80, 90 or 100 kilo-Watts or more of power.

A core enclosure (CE) can comprise a plurality of cores that are attached through different electrical connections (e.g., in series and/or parallel). A CE can comprise any number of cores, e.g., at least about 1, 2, 3, 4, 5, 6, 7, 8, 9, 10, 11, 12, 13, 14, 15, 16, 17, 18, 19, 20 or more cores. In some cases, the CE contains cores that are connected in parallel with appropriate by-pass electronic circuitry, thus enabling a core to be disconnected while continuing to allow the other cores to store and return energy. In some cases, a CE comprises at least 4 cores. In some cases, a CE is capable of storing at least about 100 kilo-Watt-hours of energy and/or delivering greater than or equal to about 25 kilo-Watts of power. In some cases, a CE comprises 4 cores. In some cases, a CE is capable of storing greater than or equal to about 100 kilo-Watt-hours of energy and/or delivering greater than or equal to about 25 kilo-Watts of power. In some cases, a CE is capable of storing greater than or equal to about 400 kilo-Watt-hours of energy and/or delivering at least about 80 kilo-Watts, e.g., greater than or equal to about 80, 100, 120, 140, 160, 180, 200, 250 or 300 kilo-Watts or more of power.

A system can comprise a plurality of cores or CEs that are attached through different electrical connections (e.g., in series and/or parallel). A system can comprise any number of cores or CEs, e.g., at least about 2, 3, 4, 5, 6, 7, 8, 9, 10, 11, 12, 13, 14, 15, 16, 17, 18, 19, 20 or more cores. In some cases, a system comprises 20 CEs. In some cases, a system is capable of storing greater than or equal to about 2 mega-Watt-hours of energy and/or delivering at least about 400 kilo-Watts (e.g., about or at least about 500 kilo-Watts or 1000 kilo-Watts) of power. In some cases, a system comprises 5 CEs. In some cases, a system is capable of storing greater than or equal to about 2 mega-Watt-hours of energy and/or delivering at least about 400 kilo-Watts, e.g., at least about 400, 500, 600, 700, 800, 900, 1,000, 1,200, 1,500, 2,000, 2,500, 3,000 or 5,000 kilo-Watts or more of power.

A group of cells (e.g., a core, a CE, a system, etc.) with a given energy capacity and power capacity (e.g., a CE or a system capable of storing a given amount of energy) may be configured to deliver at least about 10%, 20%, 30%, 40%, 50%, 60%, 70%, 80%, 90% or 95%, or about 100% of a given (e.g., rated) power level. For example, a 1000 kW system may be capable of also operating at 500 kW, but a 500 kW system may not be able to operate at 1000 kW. In some cases, a system with a given energy capacity and power capacity (e.g., a CE or a system capable of storing a given amount of energy) may be configured to deliver less than about 100%, 110%, 125%, 150%, 175% or 200% of a given (e.g., rated) power level, and the like. For example, the system may be configured to provide more than its rated power capacity for a period of time that is less than the time it may take to consume its energy capacity at the power level that is being provided (e.g., provide power that is greater than the rated power of the system for a period of time corresponding to less than about 1%, 10% or 50% of its rated energy capacity).

A battery can comprise one or more electrochemical cells connected in series and/or parallel. A battery can comprise any number of electrochemical cells, modules, packs, cores, CEs or systems. A battery may undergo at least one charge/discharge or discharge/charge cycle ("cycle").

A battery can comprise one or more (e.g., a plurality of) electrochemical cells. The cell(s) can include housings. Individual cells can be electrically coupled to one another in series and/or in parallel. In series connectivity, the positive terminal of a first cell is connected to a negative terminal of a second cell. In parallel connectivity, the positive terminal of a first cell can be connected to a positive terminal of a second, and/or additional, cell(s). Similarly, cell modules, packs, cores, CEs and systems can be connected in series and/or in parallel in the same manner as described for cells.

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of one or more electrochemical cells). The cells can be arranged in parallel, in series, or both in parallel and in series (C). Further, as described in greater detail elsewhere herein, the cells can be arranged in groups (e.g., modules, packs, cores, CEs, systems, or any other group comprising one or more electrochemical cells). In some cases, such groups of electrochemical cells may allow a given number of cells to be controlled or regulated together at the group level (e.g., in concert with or instead of regulation/control of individual cells).

Electrochemical cells of the disclosure (e.g., Type 1 cell operated in Type 2 mode, Type 1 cell operated in Type 1 mode, or Type 2 cell) may be capable of storing, receiving input of ("taking in") and/or discharging a suitably large amount of energy (e.g., substantially large amounts of energy). In some instances, a cell is capable of storing, taking in and/or discharging greater than or equal to about 1 watt-hour (Wh), 5 Wh, 25 Wh, 50 Wh, 100 Wh, 250 Wh, 500 Wh, 1 kilo-Watt-hour (kWh), 1.5 kWh, 2 kWh, 3 kWh, 5 kWh, 10 kWh, 15 kWh, 20 kWh, 30 kWh, 40 kWh or 50 kWh. It is recognized that the amount of energy stored in an electrochemical cell and/or battery may be less than the amount of energy taken into the electrochemical cell and/or battery (e.g., due to inefficiencies and losses). A cell can have such energy storage capacities upon operating at any of the current densities herein.

The cell can have a suitable energy storage capacity. In an example, a cell comprises an anode and a cathode. The cell can be capable of storing at least about 10 Wh of energy. At least one of the anode and the cathode can be a liquid metal. In another example, an electrochemical cell comprises an electrically conductive housing comprising a liquid metal (including liquid metal alloys) that is liquid at an operating temperature of, for example, at least about 200° C. The electrochemical cell may be capable of storing at least about 50 Wh or 270 Wh of energy. The liquid metal can be configured (e.g., as part of an electrochemical cell) to store/release charge during charge/discharge of the electrochemical cell. The electrochemical cell can comprise a conductor in electrical contact with the liquid metal. The conductor can protrude through the electrically conductive housing through an aperture in the electrically conductive housing. The electrochemical cell can comprise a seal that seals the conductor to the electrically conductive housing. In some cases, the seal electrically isolates the conductor from the electrically conductive housing.

A cell can be capable of providing a current at a current density of at least about 10 milli-amperes per square centimeter (mA/cm$^2$), 20 mA/cm$^2$, 30 mA/cm$^2$, 40 mA/cm$^2$, 50 mA/cm$^2$, 60 mA/cm$^2$, 70 mA/cm$^2$, 80 mA/cm$^2$, 90 mA/cm$^2$, 100 mA/cm$^2$, 200 mA/cm$^2$, 300 mA/cm$^2$, 400 mA/cm$^2$, 500 mA/cm$^2$, 600 mA/cm$^2$, 700 mA/cm$^2$, 800 mA/cm$^2$, 900 mA/cm$^2$, 1 A/cm$^2$, 2 A/cm$^2$, 3 A/cm$^2$, 4 A/cm$^2$, 5 A/cm$^2$ or 10 A/cm$^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95%, and the like. In some instances, a cell can be capable of operating at a charge efficiency (e.g., Coulombic charge efficiency) of at least about 10%, 20%, 30%, 40%, 50%, 60%, 70%, 80%, 85%, 90%, 95%, 98%, 99%, 99.5%, 99.9%, 99.95%, 99.99%, and the like.

In a charged state, electrochemical cells of the disclosure (e.g., Type 1 cell operated in Type 2 mode, Type 1 cell operated in Type 1 mode, or Type 2 cell) can have (or can operate at) a voltage of at least about 0 V, 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some cases, a cell can have an open circuit voltage (OCV) of at least about 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In an example, a cell has an open circuit voltage greater than about 0.5 V, 1 V, 2 V or 3 V. In some cases, a charge cutoff voltage (CCV) of a cell is from greater than or equal to about 0.5 V to 1.5 V, 1 V to 3 V, 1.5 V to 2.5 V, 1.5 V to 3 V or 2 V to 3 V in a charged state. In some cases, a charge cutoff voltage (CCV) of a cell is at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some cases, a voltage of a cell (e.g., operating voltage) is between about 0.5 V and 1.5 V, 1 V and 2 V, 1 V and 2.5 V, 1.5 V and 2.0 V, 1 V and 3 V, 1.5 V and 2.5 V, 1.5 V and 3 V or 2 V and 3 V in a charged state. A cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1,000 cycles, 2,000 cycles, 3,000 cycles, 4,000 cycles, 5,000 cycles, 10,000 cycles, 20,000 cycles, 50,000 cycles, 100,000 cycles or 1,000,000 or more cycles (also "charge/discharge cycles" herein).

In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container or seal. A cell can be operated without a substantial decrease in capacity. The operating lifetime of a cell can be limited, in some cases, by the life of the container, seal and/or cap of the cell. During operation at an operating temperature of the cell, the cell can have a negative electrode, electrolyte and positive electrode in a liquid (or molten) state.

An electrochemical cell of the present disclosure can have a response time of any suitable value (e.g., suitable for responding to disturbances in the power grid). In some instances, the response time is less than or equal to about 100 milliseconds (ms), 50 ms, 10 ms, 1 ms, and the like. In some cases, the response time is at most about 100 ms, 50 ms, 10 ms, 1 ms, and the like.

A compilation or array of cells (e.g., battery) can include any suitable number of cells, such as at least about 2, 5, 10, 50, 100, 500, 1000, 5000, 10000, and the like. In some examples, a battery includes at least about 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000 or 1,000,000 cells.

In some implementations, one or more types of cells can be included in energy storage systems of the present disclosure. For example, an energy storage device can comprise Type 2 cells or a combination of Type 1 cells and Type 2 cells (e.g., 50% Type 1 cells and 50% Type 2 cells). Such cells can be operated under Type 2 mode. In some cases, a first portion of the cells may be operated in Type 1 mode, and a second portion of the cells may be operated in Type 2 mode.

Batteries of the disclosure may be capable of storing and/or taking in a suitably large amount of energy (e.g., a substantially large amount of energy) for use with a power grid (i.e., a grid-scale battery) or other loads or uses. In some instances, a battery is capable of storing, taking in and/or discharging greater than or equal to about 1 watt-hour (Wh), 5 Wh, 25 Wh, 50 Wh, 100 Wh, 250 Wh, 500 Wh, 1 kilo-Watt-hour (kWh), 1.5 kWh, 2 kWh, 3 kWh, 5 kWh, 10 kWh, 15 kWh, 20 kWh, 25 kWh, 30 kWh, 40 kWh, 50 kWh, 100 kWh, 500 kWh, 1 mega-Watt-hour (MWh), 1.5 MWh, 2 MWh, 3 MWh, 4 MWh, 5 MWh, 10 MWh, 25 MWh, 50 MWh or 100 MWh.

The battery can be any suitable size (e.g., have a suitable energy storage capacity). In an example, a battery comprises a plurality of electrochemical cells connected in series. The battery can be capable of storing at least about 10 kWh of energy and can have an operating temperature of, for example, at least about 250° C. Each of the electrochemical cells can have at least one liquid metal electrode. In some cases, the battery is capable of storing at least about 30 kWh or 100 kWh of energy. In another example, a group of cells is capable of storing at least about 10 kWh of energy.

In some instances, the cells and cell housings are stackable. Any suitable number of cells can be stacked. Cells can be stacked side-by-side, on top of each other, or both. In some instances, at least about 3, 6, 10, 50, 100 or 500 cells are stacked. In some cases, a stack of 100 cells is capable of storing and/or taking in at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100 or more electrochemical cells.

An electrochemical energy storage device can include one or more individual electrochemical cells. An electrochemical cell can be housed in a container, which can include a container lid (e.g., cell cap) and seal component. The device can include at least 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the container from the container lid. Such a component may be constructed from an electrically insulating material, such as, for example, glass, oxide ceramics, nitride ceramics, chalcogenides, or a combination thereof (e.g., ceramic, silicon oxide, aluminum oxide, nitrides comprising boron nitride, aluminum nitride, zirconium nitride, titanium nitride, carbides comprising silicon carbide, titanium carbide, or other oxides comprising of lithium oxide, calcium oxide, barium oxide, yttrium oxide, silicon oxide, aluminum oxide, or lithium nitride, lanthanum oxide, or any combinations thereof).

A cell can be hermetically or non-hermetically sealed. Further, in a group of cells (e.g., a battery), each of the cells can be hermetically or non-hermetically sealed. If the cells are not hermetically sealed, the group of cells or battery (e.g., several cells in series or parallel) can be hermetically sealed.

The seal may be made hermetic by one or more methods. For example, the seal may be subject to relatively high compressive forces (e.g., greater than about 1,000 psi or 10,000 psi) between the container lid and the container in order to provide a seal in addition to electrical isolation. Alternatively, the seal may be bonded through a weld, a braze, or other chemically adhesive material that joins relevant cell components to the insulating sealant material.

In an example, a cell housing comprises an electrically conductive container, a container aperture and a conductor in electrical communication with a current collector. The conductor may pass through the container aperture and can be electrically isolated from the electrically conductive container. The housing may be capable of hermetically sealing a cell which is capable of storing at least about 10 Wh of energy.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell can comprise an electrically conductive housing and a conductor in electrical communication with a current collector. The conductor protrudes through the housing through an aperture in the housing and may be electrically isolated from the housing.

A cell housing may comprise an electrically conductive container and a conductor in electrical communication with a current collector. The conductor may protrude through the housing and/or container through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. The ratio of the area of the aperture to the area of the container and/or housing may be less than or equal to about 0.5, 0.4, 0.3, 0.2, 0.15, 0.1, 0.05, 0.01, 0.005 or 0.001 (e.g., less than about 0.1).

The housing can be capable of enclosing a cell that is capable of storing, taking in and/or discharging any suitable amount of energy, as described in greater detail elsewhere herein. For example, the housing can be capable of enclosing a cell that is capable of storing, taking in and/or discharging less than about 100 Wh, equal to about 100 Wh, more than about 100 Wh or at least about 10 Wh or 25 Wh of energy.

Figure 3:
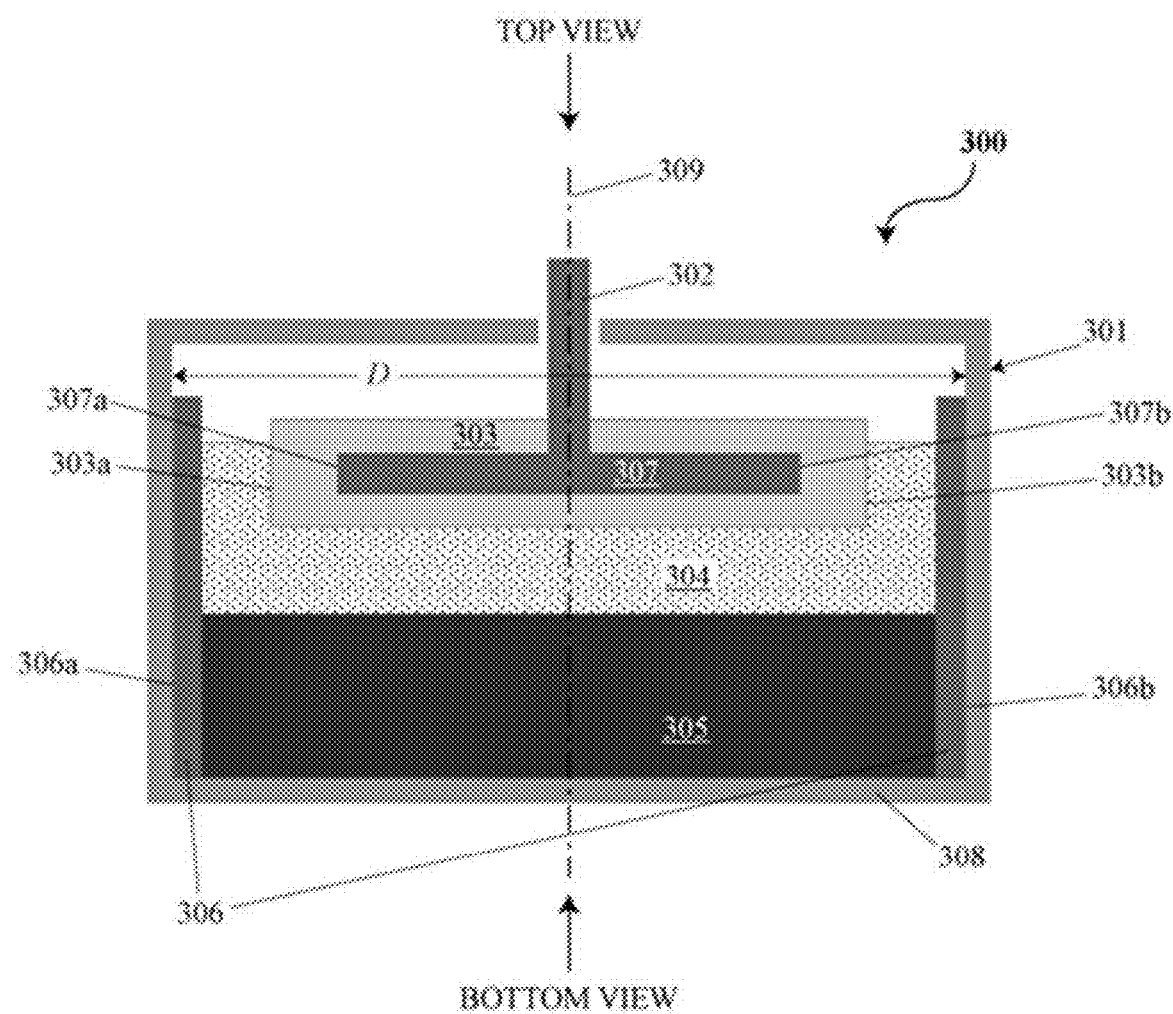
FIG. 3 is a cross-sectional side view of an electrochemical cell or battery.

FIG. 3 is a cross-sectional side view of an electrochemical cell or battery 300 comprising a housing 301, an electrically conductive feed-through (i.e., conductor, such as a conductor rod) 302 that passes through an aperture in the housing and is in electrical communication with a liquid metal negative electrode 303, a liquid metal positive electrode 305, and a liquid salt electrolyte 304 between the liquid metal electrodes 303, 305. The cell or battery 300 can be configured for use with cell chemistries operated under a low voltage mode ("Type 1 mode") or high voltage mode ("Type 2 mode"), as disclosed elsewhere herein. The conductor 302 may be electrically isolated from the housing 301 (e.g., using electrically insulating seals). The negative current collector 307 may comprise foam material 303 that behaves like a sponge, and the negative electrode liquid metal soaks into the foam. The liquid metal negative electrode 303 is in contact with the liquid salt electrolyte 304. The liquid salt electrolyte is also in contact with the positive liquid metal electrode 305. The positive liquid metal electrode 305 can be in electrical communication with the housing 301 along the side walls and/or along the bottom end wall of the housing. In some examples, the electrochemical cell or battery 300 may comprise two or more conductors passing through one or more apertures and in electrical communication with the liquid metal negative electrode 303. In some instances, a separator structure (not shown) may be arranged within the electrolyte 304 between the liquid negative electrode 303 and the (liquid) positive electrode 305.

The housing may include a container and a container lid (e.g., cell cap). The container and container lid may be connected mechanically (e.g., welded). In some cases, the mechanical connection may comprise a chemical connection. In some instances, the container lid is electrically isolated from the container. The cell lid may or may not be electrically isolated from the negative current lead in such instances. In some instances, the container lid is electrically connected to the container (e.g., cell body). The cell lid may then be electrically isolated from the negative current lead. During operation (e.g., when in a molten state), the container lid and the container can be connected electronically (e.g., through a direct electrical connection, such as, for example, via a welded lid-to-cell body joint, or ionically through the electrolyte and the electrodes). The negative current lead may be electrically isolated from the container and/or container lid (e.g., cell cap), via, for example, the use of an electrically insulating hermetic seal. In some examples, an electrically insulating barrier (e.g., seal) may be provided between the negative current lead and the container lid. The seal can be in the form of a gasket, for example, and placed between the container lid, and the container. The housing 301 can be constructed from an electrically conductive material such as, for example, steel, iron, stainless steel, low carbon steel, graphite, nickel, nickel based alloys, titanium, aluminum, molybdenum, tungsten, or conductive compounds such as nitrides (e.g., silicon carbide or titanium carbide), or a combination thereof (e.g., alloy).

The housing 301 can comprise a housing (or container) interior 306. The housing interior 306 may include, but is not limited to, a sheath (e.g., a graphite sheath), a coating, a crucible (e.g., a graphite crucible), a surface treatment, a lining, or any combination thereof. In one example, the housing interior 306 is a sheath. In another example, the housing interior 306 is a crucible. In yet another example, the housing interior 306 is a coating or surface treatment. The housing interior 306 may be thermally conductive, thermally insulating, electrically conductive, electrically insulating, or any combination thereof. For example, the housing interior (e.g., sheath, crucible and/or coating) 306 can be constructed from a material such as, for example, graphite, carbide (e.g., SiC, TiC, etc.), nitride (e.g., BN, TiN, etc.), alumina, titania ($TiO_2$), silica ($SiO_2$), magnesia, boron nitride, rare-earth oxides (e.g., a lanthanide oxide or a mixture of lanthanide oxides, such as, for example, neodymium oxide ($Nd_2O_3$), cerium oxide ($CeO_2$), lanthanum oxide ($La_2O_3$), samarium oxide ($Sm_2O_3$), or any combination thereof), a mixed oxide (e.g., any combination of calcium oxide, aluminum oxide, silicon oxide, lithium oxide, magnesium oxide, lanthanide oxide, neodymium oxide, etc.), or any combination thereof. In some cases, the housing interior 306 may be provided for protection of the housing (e.g., for protecting the stainless steel material of the housing from corrosion). In some cases, the housing interior can be anti-wetting to the liquid metal positive electrode. In some cases, the housing interior can be anti-wetting to the liquid electrolyte. For example, the housing interior 306 can be used to limit or prevent corrosion of the container and/or to limit or prevent wetting of the cathode material up the side wall, and may be constructed from an electrically conductive material, such as steel, stainless steel, tungsten, molybdenum, nickel, nickel-based alloys, graphite, titanium, or titanium nitride.

The housing may comprise a lining component or lining (e.g., an electrically insulating or electrically conductive lining component that is thinner than the cell body) of a separate metal or compound, or a coating (e.g., an electrically insulating or electrically conductive coating), such as, for example, a steel housing with a graphite lining or with a nitride coating or lining (e.g., boron nitride, aluminum nitride, titanium nitride), a carbide coating or lining (e.g., silicon carbide, titanium carbide), a rare-earth oxide coating or lining (e.g., $Nd_2O_3$, $CeO_2$, $La_2O_3$), or a coating or lining of titanium or other stable (e.g., chemically stable) metal (e.g., Ni, B). The lining and/or coating can exhibit favorable properties and functions, including surfaces that are anti-wetting to the positive electrode liquid metal. For example, the housing interior may be anti-wetting (e.g., substantially non-wetting) to the liquid cathode metal, thereby limiting or preventing it from wetting up the side-wall of the container. In some cases, the lining and/or coating may include an oxide material (e.g., yttrium oxide, zirconium oxide, samarium oxide, neodymium oxide, cerium oxide, calcium oxide or magnesium oxide) that is stable (e.g., chemically stable) with one or more portions of the cell (e.g., molten salt, reactive metal such as lithium, etc.) that are in liquid or solid contact with the oxide material. In some cases, the lining and/or coating (e.g., lining and/or coating comprising magnesium oxide, yttrium oxide, neodymium oxide, lanthanum oxide or cerium oxide) may have a coefficient of thermal expansion (CTE) that is similar or about equal to the CTE of the housing material (e.g., stainless steel). For example, some rare-earth oxides (e.g., $Nd_2O_3$) have a CTE that closely matches the CTE of stainless steel while also being stable (e.g., thermodynamically stable) with reactive materials (e.g., lithium) and/or the molten salts herein. The lining and/or coating may be a separate cell component that is physically placed within the housing, or the lining may be directly formed onto the housing surface to form a coating (e.g., via plasma spray coating, sputtering, precipitation-based coating process, thermally grown oxidation layer, or any other coating processes). The CTE of the lining and/or coating may differ from the CTE of the housing by less than about 1%, 5%, 10%, 20% or 50%. The lining and/or coating may comprise a mixture of different materials that has a CTE that more closely matches that of the housing compared to the CTE of one or more (e.g., any) individual constituent materials (e.g., positive electrode material, negative electrode material, electrolyte material). For example, the lining and/or coating may comprise a mixture that has a CTE that matches the CTE of the housing at least about 5%, 10%, 15%, 25%, 50% or 75% closer than the CTE of one or more (e.g., any) individual constituent materials. The lining and/or coating may protect the container from higher voltages (e.g., voltages greater than about 1 V, 1.5 V, 2 V or 2.5 V). The lining and/or coating may be used instead of a crucible (e.g., a graphite crucible), which may, for example, reduce cell cost and increase cell capacity. In some cases, additives to the lining and/or coating (e.g., Ni or other ductile metals) may be included. The additives may provide increased ductility and/or lower elastic modulus of the housing interior material. In some cases, the lining (e.g., graphite lining) and/or coating can be dried by heating above room temperature in air or dried in a vacuum oven before or after being placed inside the cell housing. Drying or heating the lining and/or coating can remove moisture from the lining and/or coating prior to adding the electrolyte, positive electrode, or negative electrode to the cell housing. Any aspects of the disclosure described in relation to a coating may equally apply to a lining or a surface treatment at least in some configurations, and vice versa.

The housing 301 may include a thermally and/or electrically insulating sheath or crucible 306. In this configuration, the negative electrode 303 may extend laterally between the side walls of the housing 301 defined by the sheath or crucible without being electrically connected (i.e., shorted) to the positive electrode 305. Alternatively, the negative electrode 303 may extend laterally between a first negative electrode end 303a and a second negative electrode end 303b. In this configuration, the sheath or crucible may or may not be thermally and/or electrically insulating. For example, the sheath or crucible may be electrically conductive. When an electrically insulating sheath or crucible 306 is not provided, the negative electrode 303 may have a diameter (or other characteristic dimension, illustrated in FIG. 3 as the distance from 303a to 303b) that is less than the diameter (or other characteristic dimension such as width for a cuboid container, illustrated in FIG. 3 as the distance D) of the cavity defined by the housing 301.

As shown in the example in FIG. 3, the sheath or other housing interior (e.g., crucible, coating) 306 can have an annular cross-sectional geometry that can extend laterally between a first sheath end 306a and a second sheath end 306b. The sheath may be dimensioned (illustrated in FIG. 3 as the distance from 306a to 306b) such that the sheath is in contact and pressed up against the side walls of the cavity defined by the housing cavity 301. In some cases, the sheath (e.g., graphite sheath) can be dried by heating above room temperature in air or dried in a vacuum oven before or after being placed inside the cell housing. Drying or heating the sheath may remove moisture from the sheath prior to adding the electrolyte, positive electrode, or negative electrode to the cell housing.

The cell may comprise an electrically conductive crucible or coating that lines the side walls and bottom inner surface of the cell housing, referred to as a cell housing liner, preventing direct contact of the positive electrode with the cell housing. In an example, the cell can comprise a cell housing liner instead of a sheath. In another example, the sheath may be very thin and can be a coating. The cell housing liner may limit or prevent wetting of the positive electrode between the cell housing and the cell housing liner or sheath and may prevent direct contact of the positive electrode on the bottom surface of the cell housing. The cell housing liner or sheath (e.g., coating) can cover just the inside of the walls, and/or, can also cover the bottom of the inside of the container. The cell housing liner or sheath may not fit perfectly with the housing 301 which may hinder the flow of current between the cell housing liner or sheath and the cell housing. To ensure adequate electronic conduction between the cell housing liner or sheath and the cell housing, a liquid of metal that has a low melting point (e.g., Pb, Sn, Bi), can be used to provide a strong electrical connection between the cell housing liner or sheath (e.g., sheath/coating) and the cell housing. This layer can allow for easier fabrication and assembly of the cell. For example, the crucible can be made to be in electronic contact with the cell housing using a thin layer of a conductive liquid metal or semi-solid metal alloy located between the crucible and the cell housing, such as the elements Pb, Sn, Sb, Bi, Ga, In, Te, or a combination thereof.

The housing 301 can also include a first (e.g., negative) current collector or lead 307 and a second (e.g., positive) current collector 308. The negative current collector 307 may be constructed from an electrically conductive material such as, for example, nickel-iron (Ni—Fe) foam, stainless steel foam, Ni-plated iron foam, foam of another metal alloy, perforated steel disk, sheets of corrugated steel, sheets of expanded metal mesh, etc. The negative current collector 307 may be configured as a plate or foam that can extend laterally between a first collector end 307a and a second collector end 307b. The negative current collector 307 may have a collector diameter that is less than or similar to the diameter of the cavity defined by the housing 301. In some cases, the negative current collector 307 may have a collector diameter (or other characteristic dimension, illustrated in FIG. 3 as the distance from 307a to 307b) that is less than or similar to the diameter (or other characteristic dimension, illustrated in FIG. 3 as the distance from 303a to 303b) of the negative electrode 303. The positive current collector 308 may be configured as part of the housing 301; for example, the bottom end wall of the housing may be configured as the positive current collector 308, as illustrated in FIG. 3. Alternatively, the current collector may be discrete from the housing and may be electrically connected to the housing. In some cases, the positive current collector may not be electrically connected to the housing. The present disclosure is not limited to any particular configurations of the negative and/or positive current collector configurations.

The negative electrode 303 can be contained within the negative current collector (e.g., foam) 307. In this configuration, the electrolyte layer comes up in contact with the bottom, sides, and/or the top of the foam 307. The metal contained in the foam (i.e., the negative electrode material) can be held away from the sidewalls of the housing 301, such as, for example, by the absorption and retention of the liquid metal negative electrode into the foam, thus allowing the cell to run without the insulating sheath 306. In some cases, a graphite sheath or graphite cell housing liner (e.g., graphite crucible) may be used to prevent the positive electrode from wetting up along the side walls, which can prevent shorting of the cell.

Current may be distributed substantially evenly across a positive and/or negative liquid metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than or equal to about 105%, 115%, 125%, 150%, 175%, 200%, 250% or 300% of the average density of current flowing across the surface. In some examples, the minimum density of current flowing across an area of the surface is greater than or equal to about 50%, 60%, 70%, 80%, 90% or 95% of the average density of current flowing across the surface.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

The combined volume of positive and negative electrode material (the combined volume of anode and cathode material) may be greater than or equal to about 5%, 10%, 20%, 30%, 40%, 50%, 60%, 70%, 80%, 90% or 95% of the volume of the battery (e.g., as defined by the outer-most housing of the battery, such as a shipping container). The combined volume of anode and cathode material may be at least about 5%, 10%, 20%, 30%, 40%, 60% or 75% of the volume of the cell. The combined volume of the positive and negative electrodes material may increase or decrease (e.g., in height) during operation due to growth or expansion, or shrinkage or contraction, respectively, of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid mutual reaction compound (also "mutual reaction product" herein), which may have a density that is the same, lower, or higher than the densities of the positive and/or negative electrode materials. Although the mass of material in the electrochemical cell or battery 300 may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a mutual reaction product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

In some cases, a cell can include one or more alloyed products that are liquid, semi-liquid (or semi-solid), or solid. The alloyed products can be immiscible (or, in some cases, soluble) with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode or electrolyte, or at a location (e.g., interface) between the negative electrode and the electrolyte or between the positive electrode and the electrolyte, or any combination thereof. In an example, an alloyed product is an intermetallic between the positive electrode and the electrolyte (see, for example, FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
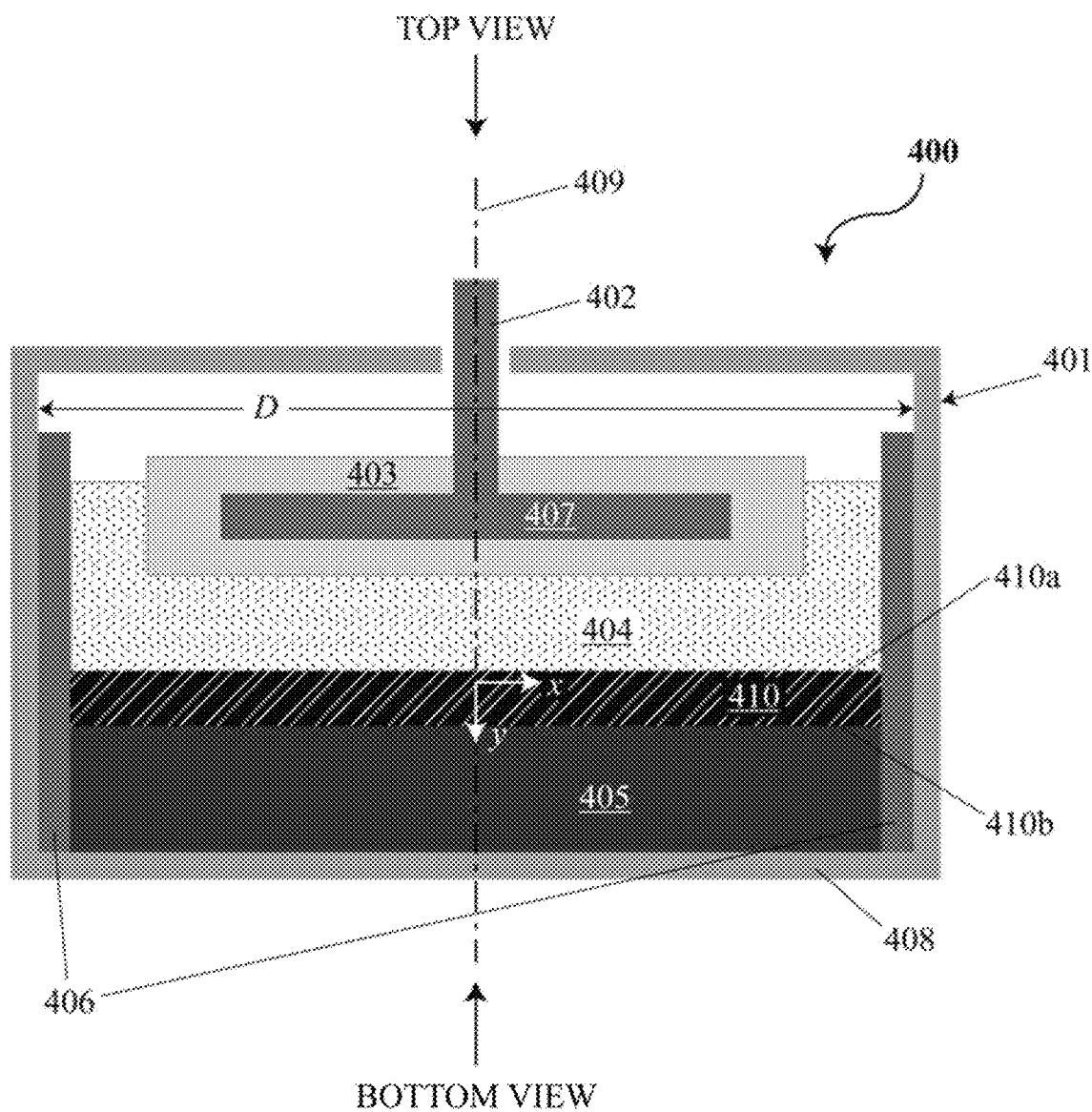
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound of a material originating from the negative electrode 403 and positive electrode material 405. For example, a negative liquid metal electrode 403 can comprise an alkali or alkaline earth metal (e.g., Na, Li, K, Mg, or Ca), the positive liquid metal electrode 405 can comprise one or more of transition metal, d-block (e.g., Group 12), Group IIIA, IVA, VA or VIA elements (e.g., lead and/or antimony and/or bismuth), and the intermetallic layer 410 can comprise a mutual reaction compound or product thereof (e.g., alkali plumbide, antimonide or bismuthide, e.g., $Na_3Pb$, $Li_3Sb$, $K_3Sb$, $Mg_3Sb_2$, $Ca_3Sb_2$, or $Ca_3Bi_2$). An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid salt electrolyte 404. The mutual reaction compound (or product) can be solid or semi-solid. In an example, the intermetallic layer 410 can form at the interface between the liquid metal cathode 405 and the liquid salt electrolyte 404. In some cases, the intermetallic layer 410 may exhibit liquid properties (e.g., the intermetallic may be semi-solid, or it may be of a higher viscosity or density than one or more adjacent phases/materials).

The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can include a thermally and/or electrically insulating sheath 406. In an example, the negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg∥Sb chemistry may contain magnesium ions within the electrolyte as well as other salts (e.g., $MgCl_2$, NaCl, KCl, or a combination thereof). In some cases, in a discharged state, the cell is deficient in Mg in the negative electrode and the positive electrode comprises and alloy of Mg—Sb. In such cases, during charging, Mg is supplied from the positive electrode, passes through the electrolyte as a positive ion, and deposits onto the negative current collector as Mg. In some examples, the cell has an operating temperature of at least about 300° C., 350° C., 400° C., 450° C., 475° C., 500° C., 550° C., 600° C., 650° C., 700° C. or 750° C., and in some cases between about 650° C. and 750° C. In a charged state, all or substantially all the components of the cell can be in a liquid state. Alternative chemistries exist, including Ca-Mg||Bi comprising a calcium halide constituent in the electrolyte (e.g., $CaF_2$, KF, LiF, $CaCl_2$, KCl, LiCl, $CaBr_2$, KBr, LiBr, or combinations thereof) and operating, for example, above about 500° C., Ca-Mg||Sb-Pb comprising a calcium halide constituent in the electrolyte (e.g., $CaF_2$, KF, LiF, $CaCl_2$, KCl, LiCl, $CaBr_2$, KBr, LiBr, or combinations thereof) and operating, for example, above about 500° C., Li||Pb-Sb cells comprising a lithium-ion containing halide electrolyte (e.g., LiF, LiCl, LiBr, or combinations thereof) and operating, for example, between about 350° C. and about 550° C., and Na||Pb cells comprising a sodium halide as part of the electrolyte (e.g., NaCl, NaBr, NaI, NaF, LiCl, LiF, LiBr, LiI, KCl, KBr, KF, KI, $CaCl_2$, $CaF_2$, $CaBr_2$, $CaI_2$, or combinations thereof) and operating, for example, above about 300° C. In some cases, the product of the discharge reaction may be an intermetallic compound (e.g., $Mg_3Sb_2$ for the Mg||Sb cell chemistry, $Li_3Sb$ for the Li||Pb-Sb chemistry, $Ca_3Bi_2$ for the Ca-Mg||Bi chemistry, or $Ca_3Sb_2$ for the Ca-Mg||Pb-Sb chemistry), where the intermetallic layer may develop as a distinct solid phase by, for example, growing and expanding horizontally along a direction x and/or growing or expanding vertically along a direction y at the interface between the positive electrode and the electrolyte. The growth may be axially symmetrical or asymmetrical with respect to an axis of symmetry 409 located at the center of the cell or battery 400. In some cases, the intermetallic layer is observed under Type 1 mode of operation but not Type 2 mode of operation. For example, the intermetallic layer (e.g., the intermetallic layer in FIG. 4) may not form during operation of a Type 2 cell.

A person of skill in the art will recognize that the battery housing components may be constructed from materials other than the examples provided above. One or more of the electrically conductive battery housing components, for example, may be constructed from metals other than steel and/or from one or more electrically conductive composites. In another example, one or more of the electrically insulating components may be constructed from dielectrics other than the aforementioned glass, mica and vermiculite. The present invention therefore is not limited to any particular battery housing materials.

Cell Lid Assemblies and Adhesive Seals

Figure 5:
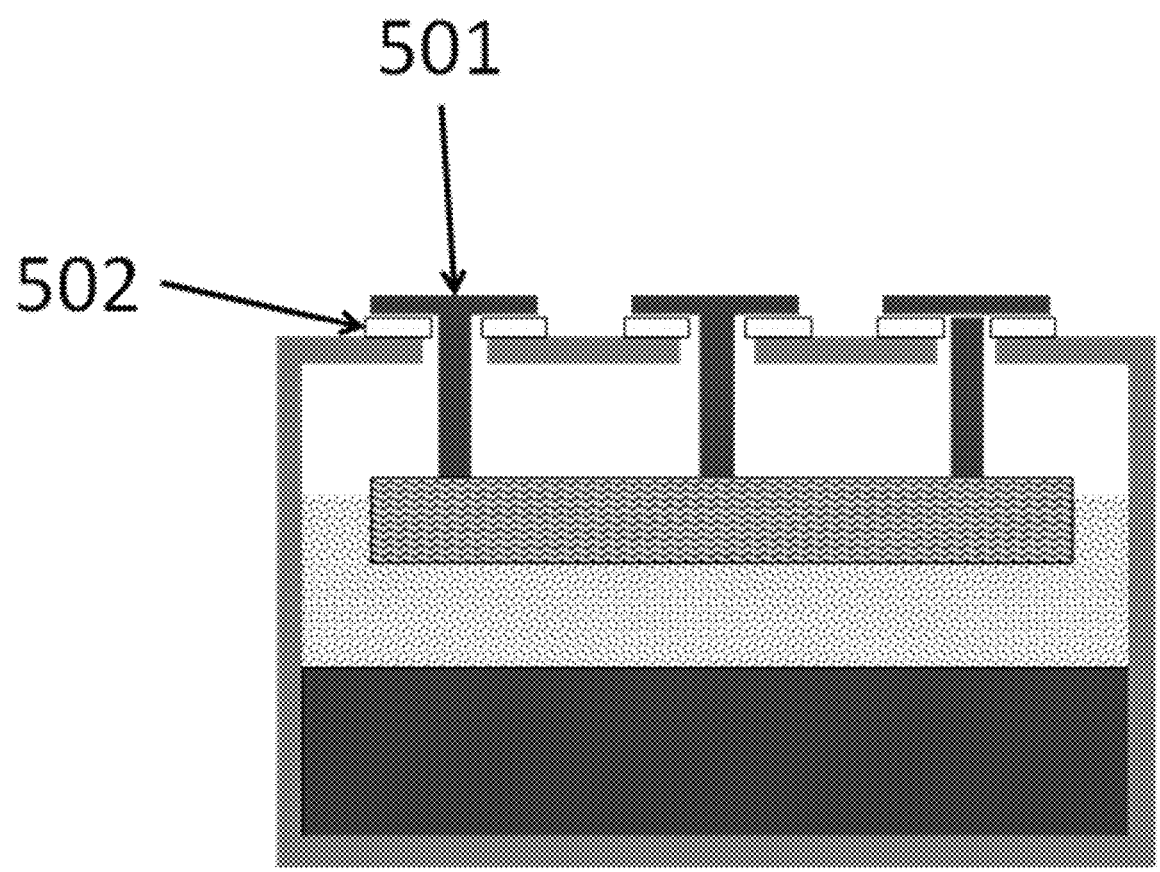
FIG. 5 is a schematic cross-sectional illustration of an electrochemical cell having feed-throughs that are electrically insulated from a housing with dielectric seal components.

Cell lid assemblies can use adhesive seals to achieve a gas tight and electrically insulating seal. As seen in FIG. 5, a conductive feed-through 501 can be electrically isolated from the housing and the housing can be sealed by an adhesive sealing material 502 disposed between the feed-through and the housing. The adhesive sealing material can include any sealant material capable of adhering to the components of the cell lid assembly that are to be sealed.

In some cases, for cells that are sealed with adhesive dielectric seals, a pressure of less than 1 psi may be sufficient to maintain a gas tight seal. In some cases, at least a portion of the pressure can be supplied by the weight of one or more electrochemical cells stacked upon each other in a battery. The adhesive seal material can comprise a glass seal or a brazed ceramic, such as, for example, alumina with Cu—Ag braze alloy, or other ceramic-braze combination.

In a stacked battery configuration, it may be desirable to reduce head space (e.g., inside a cell chamber or cavity) so that relatively more of the volume of the cell can comprise anode and cathode material (e.g., such that the cell can have a higher energy storage capacity per unit volume). In some instances, the height of the head space (e.g., as measured from the top of the feed-through to the top surface of the anode) is a small fraction of the height of the battery (e.g., as measured from the top of the feed-through to the bottom surface of the housing). In some examples, the head space is at most or equal to about 5%, 10%, 15%, 20% or 25% of the height of the battery.

In some examples, the electrolyte can have a thickness (measured as the distance between negative electrode/electrolyte and positive electrode/electrolyte interfaces) of at least about 0.01 cm, 0.05 cm, 0.1 cm, 0.5 cm, 0.8 cm, 1.0 cm, 1.3 cm, 1.5 cm, 2 cm, 3 cm, 4 cm, 5 cm, 6 cm, 7 cm, 8 cm, 9 cm or 10 cm for a cell having a thickness of at least about 1 cm, 2 cm, 3 cm, 4 cm, 5 cm, 6 cm, 7 cm, 8 cm, 9 cm, 10 cm or more. In some examples, a cell has a thickness of at most about 3 cm or 4 cm, and an electrolyte with a thickness of at most about 1 cm or 2 cm.

In some situations, the use of a few or only a single conductive feed-through can result in uneven current distribution in an electrode (e.g., in the negative electrode). A plurality of conductive feed-throughs (also "conductors" herein) can more evenly distribute the current in the electrode. In some implementations, an electrochemical energy storage device comprises a housing, a liquid metal electrode, a current collector in contact with the liquid metal electrode, and a plurality of conductors that are in electrical communication with the current collector and protrude through the housing through apertures in the housing. In some examples, current is distributed substantially evenly across the liquid metal electrode.

In some examples, the liquid metal electrode is in contact with an electrolyte along a surface (and/or interface) and the current flowing across the surface (and/or interface) is uniform. The current flowing through any portion of the surface (and/or interface) may not deviate substantially from the average current through the surface. In some examples, the maximum density of current flowing across an area of the surface (and/or interface) is less than about 105%, 115%, 125%, 150%, 175%, 200%, 250% or 300% of the average density of current flowing across the surface (and/or interface). In some examples, the minimum density of current flowing across an area of the surface (and/or interface) is greater than about 50%, 60%, 70%, 80%, 90% or 95% of the average density of current flowing across the surface (and/or interface).

FIG. 6 shows examples of cells with multiple conductive feed-throughs. In these configurations, current collectors can be combined into a shared lid assembly for each cell. Such cell lid assemblies may be used with cells of any size. The electrochemical storage device and/or housings can comprise any number of conductive feed-throughs (e.g., 1, 2, 3, 4, 5, 6, 7, 8, 9, 10, 11, 12, 13, 14, 15, 16, 17, 18, 19, 20 or more). In some cases, the conductive feed-throughs are separate (A). In some cases, the conductive feed-throughs share a common upper portion (B).

Features and Properties of Seals

The seal can be an important part of a high temperature system containing reactive metals (e.g., a liquid metal battery). Provided herein is a method for choosing materials suitable for forming a seal and methods for designing a suitable seal for a system containing reactive liquid metals or liquid metal vapors and/or reactive molten salt(s) or reactive molten salt vapors such as, for example, a liquid metal battery (e.g., based on the selection of these materials, and considerations of thermal, mechanical and electrical properties). The seal can also be used as part of an electrically isolated feed-through connected to a vessel comprising reactive liquid metals or reactive metal vapors for applications other than energy storage, such as fusion reactors comprising molten or high pressure Li vapor, or other applications that involve liquid sodium, potassium, and/or lithium. The use of stable ceramic and electronically conductive materials can also be appropriate for applications with reactive gases such as those used in semiconductor material processing or device fabrication.

The seal can be electrically insulating and gas-tight (e.g., hermetic). The seals can be made of materials that are not attacked by the liquid and vapor phases of system/vessel components (e.g., cell components), such as, for example, molten sodium (Na), molten potassium (K), molten magnesium (Mg), molten calcium (Ca), molten lithium (Li), Na vapor, K vapor, Mg vapor, Ca vapor, Li vapor, or any combination thereof. The method identifies a seal comprising an aluminum nitride (AlN) or silicon nitride ($Si_3N_4$) ceramic and an active alloy braze (e.g., Ti, Fe, Ni, B, Si or Zr alloy-based) as being thermodynamically stable with most reactive metal vapors, thus allowing for the design of a seal that is not appreciably attacked by metal or metal vapors.

In some implementations, the seal can physically separate the negative current lead (e.g., a metal rod that extends into the cell cavity) from the positively charged cell body (e.g., the cell can (also "container" herein) and lid). The seal can act as an electrical insulator between these cell components, and hermetically isolate the active cell components (e.g., the liquid metal electrodes, the liquid electrolyte, and vapors of these liquids). In some cases, the seal prevents external elements from entering the cell (e.g., moisture, oxygen, nitrogen, and other contaminants that may negatively affect the performance of the cell). Some examples of general seal specifications are listed in TABLE 1. Such specifications (e.g., properties and/or metrics) can include, but are not limited to, hermeticity, electrical insulation, durability, Coulombic efficiency (e.g., charge efficiency or round-trip efficiency), DC-DC efficiency, discharge time, and capacity fade rate.

TABLE 1

EXAMPLES OF GENERAL SEAL SPECIFICATIONS

| Specification | Example Value |
|---|---|
| The seal can have these properties under operating conditions: | |
| Hermetic | <1 × $10^{-8}$ atm cc/s He total leak rate |
| Electrically insulating | >1 kOhm impedance across seal |
| Durable | maintain integrity for >20 years |
| Battery metrics: | |
| Coulombic efficiency | >98% (@ ~200 mA/cm$^2$) |
| DC-DC efficiency | >70% (@ ~200 mA/cm$^2$) |
| Discharge time | 4-6 hours (@ ~200 mA/cm$^2$) |
| Capacity fade rate | <0.02%/cycle |

The seal can be hermetic, for example, to a degree quantified by a leak rate of helium (He) (e.g., leak rate from a device at operating conditions (e.g., at operating temperature, operating pressure, etc.) filled with He). In some examples, the leak rate of helium (He) can be less than about $1\times10^{-6}$ atmospheric cubic centimeters per second (atm cc/s), $5\times10^{-7}$ atm cc/s, $1\times10^{-7}$ atm cc/s, $5\times10^{-8}$ atm cc/s or $1\times10^{-8}$ atm cc/s. In some cases, the leak rate of He is equivalent to the total leak rate of He leaving the system (e.g., cell, seal). In other cases, the leak rate of He is the equivalent total He leak rate if one atmosphere of He pressure was placed across the sealed interface, as determined from the actual pressure/concentration differential of He across the sealed interface and the measured He leak rate.

The seal can provide any suitably low helium leak rate. In some cases, the seal provides a helium leak rate of no more than or equal to about $1\times10^{-10}$, $1\times10^{-9}$, $1\times10^{-8}$, $1\times10^{-7}$, $5\times10^{-7}$, $1\times10^{-6}$, $5\times10^{-6}$, $1\times10^{-5}$ or $5\times10^{-5}$ atmosphere-cubic centimeters per second (atm-cc/s) at a temperature (e.g., a storage temperature of the cell, an operating temperature of the cell, and/or a temperature of the seal) of greater than or equal to about −25° C., 0° C., 25° C., 50° C., 200° C., 350° C., 450° C., 550° C. or 750° C. The seal can provide such helium leak rates when the electrochemical cell has been operated (e.g., at rated capacity) for a period of, for example, at least about 1 month, 6 months, 1 year, 5 years, 10 years, 20 years or more. In some cases, the seal provides such helium leak rates when the electrochemical cell has been operated for at least about 350 charge/discharge cycles (or cycles), 500 cycles, 1,000 cycles, 3,000 cycles, 10,000 cycles, 50,000 cycles, 75,000 cycles or 150,000 cycles.

The seal can electrically isolate the conductor from the electrically conductive housing. The degree of electrical isolation can be quantified by measuring the impedance across the seal. In some cases, the impedance across the seal is greater than or equal to about 0.05 kilo-Ohms (kOhm), 0.1 kOhm, 0.5 kOhm, 1 kOhm, 1.5 kOhm, 2 kOhm, 3 kOhm, 5 kOhm, 10 kOhm, 50 kOhm, 100 kOhm, 500 kOhm, 1,000 kOhm, 5,000 kOhm, 10,000 kOhm, 50,000 kOhm, 100,000 kOhm or 1,000,000 kOhm at any operating, resting, or storing temperature. In some cases, the impedance across the seal is less than about 0.1 kOhm, 1 kOhm, 5 kOhm, 10 kOhm, 50 kOhm, 100 kOhm, 500 kOhm, 1,000 kOhm, 5,000 kOhm, 10,000 kOhm, 50,000 kOhm, 100,000 kOhm or 1,000,000 kOhm at any operating, resting, or storing temperature. The seal can provide electrical isolation when the electrochemical cell has been operated (e.g., at rated capacity) for a period of, for example, at least about 1 month, 6 months, 1 year or more. In some cases, the seal provides the electrical isolation when the electrochemical cell has been operated for at least about 350 charge/discharge cycles (or cycles), 500 cycles, 1,000 cycles, 3,000 cycles, 10,000 cycles, 50,000 cycles, 75,000 cycles or 150,000 cycles. The seal can provide electrical isolation when the electrochemical cell has been operated for a period of at least about 1 year, 5 years, 10 years, 20 years, 50 years or 100 years. In some cases, the seal provides the electrical isolation when the electrochemical cell has been operated for greater than or equal to about 350 charge/discharge cycles.

The seal can be durable. In some examples, the seal can maintain integrity for at least about 1 month, 2 months, 6 months, 1 year, 2 years, 5 years, 10 years, 15 years, 20 years or more. The seal can have such properties and/or metrics under operating conditions.

In some examples, a battery or device comprising the seal can have a Coulombic efficiency (e.g., measured at a current density of about 20 mA/cm$^2$, 200 mA/cm$^2$ or 2,000 mA/cm$^2$) of at least about 50%, 55%, 60%, 65%, 70%, 75%, 80%, 85%, 90%, 95%, 96%, 97%, 98%, 99%, 99.5%, 99.8%, 99.9% or more. In some examples, a battery or device comprising the seal can have a DC-DC efficiency (e.g., measured at a current density of about 200 mA/cm$^2$ or 220 mA/cm$^2$) of at least about 50%, 55%, 60%, 65%, 70%, 75%, 80%, 85%, 90%, 95% or more. In some examples, a battery or device comprising the seal can have a discharge time (e.g., measured at a current density of about 200 mA/cm$^2$ or 220 mA/cm$^2$) of at least about 1 hour, 2 hours, 3 hours, 4 hours, 5 hours, 6 hours, 7 hours, 8 hours, 9 hours, 10 hours or more. In some examples, a battery or device comprising the seal can have a discharge time (e.g., measured at a current density of about 200 mA/cm$^2$ or 220 mA/cm$^2$) between about 4 hours and 6 hours, 2 hours and 6 hours, 4 hours and 8 hours or 1 hour and 10 hours. In some examples, a battery or device comprising the seal can have a capacity fade rate (e.g., discharge capacity fade rate) of less than about 10%/cycle, 5%/cycle, 1%/cycle, 0.5%/cycle, 0.1%/cycle, 0.08%/cycle, 0.06%/cycle, 0.04%/cycle, 0.02%/cycle, 0.01%/cycle, 0.005%/cycle, 0.001%/cycle, 0.0005%/cycle, 0.0002%/cycle, 0.0001%/cycle, 0.00001%/cycle or less. The capacity fade rate can provide a measure of the change (decrease) in discharge capacity in '% per cycle' (e.g., in % per charge/discharge cycle).

In some cases, the seal allows the electrochemical cell to achieve on one or more given operating conditions (e.g., operating temperature, temperature cycling, voltage, current, internal atmosphere, internal pressure, vibration, etc.). Some examples of operating conditions are described in TABLE 2. Such operating conditions can include, but are not limited to, metrics such as, for example, operating temperature, idle temperature, temperature cycling, voltage, current, internal atmosphere, external atmosphere, internal pressure, vibration, and lifetime.

TABLE 2

EXAMPLES OF OPERATING CONDITIONS FOR CELLS

| Item | Example description | Example metrics |
| --- | --- | --- |
| Operating temperature | The normal temperature experienced by the seal during operation. | 440° C. to 550° C. |
| Idle temperature | The temperature experienced by the seal while battery is idle (e.g., in manufacturing, during transport, battery in off-mode). | −25° C. to 50° C. |
| Temperature cycling | The seal can experience infrequent but large amplitude thermal cycles over the course of battery operating lifetime. | −25° C. to 700° C. with at least about 10 thermal cycles |
| Voltage | The voltage drop across the seal. | 0 V to 3 V |
| Current | The electric current flowing through materials that interface with the seal. | 0 A to 500 A |
| Internal atmosphere | The seal is exposed to vapors of reactive alkali metals or reactive alkaline earth metals and halide salts from within the battery. | 0.133 Pa or 0.001 torr vapor pressure of alkali metals or alkaline earth metals and halide salts |
| External atmosphere | The atmosphere that the seal is exposed to from the externals of the battery, e.g., ambient air, high moisture. | Air at 0° C. to 550° C. accompanied by 100% relative humidity |
| Internal pressure | Vacuum gradient or positive pressure across the seal. | 0.5 atm to 4.0 atm |
| Vibration | The seal can be exposed to vibrations caused during manufacturing, transportation, installation, operation, and rare events (e.g., drops, shock impact). | Capable of handling vibrational loading analogous to transportation when used in cell or system application. |
| Lifetime | The expected lifetime of a seal in full operation. | 20 year life with <1% failure |

In some examples, an operating temperature (e.g., temperature experienced by the seal during operation) is at least about 100° C., 200° C., 300° C., 400° C., 500° C., 600° C., 700° C., 800° C., 900° C. or more. In some examples, the temperature experienced by the seal during operation is between about 440° C. and 550° C., 475° C. and 550° C., 350° C. and 600° C. or 250° C. and 650° C. In an example, an operating temperature of about 400° C. to about 500° C., about 450° C. to about 550° C., about 450° C. to about 500° C. or about 500° C. to about 600° C., or an operating temperature of at least about 200° C. (e.g., suitable for cell chemistries that can operate as low as 200° C.) can be achieved. In some cases, the temperature experienced by the seal may be about equal to the operating temperature of the electrochemical cell or high temperature device (e.g., energy storage device). In some cases, the temperature experienced by the seal may differ from the operating temperature of the electrochemical cell or high temperature device (e.g., by at least, less than or equal to about 1° C., 5° C., 10° C., 20° C., 50° C., 100° C., 150° C., 200° C., and the like). In an example, an electrochemical cell comprises a reactive material maintained at a temperature (e.g., operating temperature of the cell) of at least about 200° C., and the temperature of the seal is at least about 200° C. (e.g., the same as the operating temperature of the cell, or different than the operating temperature of the cell). In some cases, the operating temperature of the seal can be lower or higher than the operating temperature of the electrochemical cell or high temperature device.

In some examples, an idle temperature (e.g., temperature experienced by the seal while device (e.g., battery) is idle, such as, for example, in manufacturing, during transport, device (e.g., battery) in off-mode, etc.) is greater than about −25° C., −10° C., 0° C., 15° C., 20° C. or 30° C. In some examples, the idle temperature is less than about 30° C., 20° C., 15° C., 0° C., −10° C., −25° C. or less. In some examples, the temperature experienced by the seal while the device is idle is between about −25° C. and 50° C.

In some examples, temperature cycling (e.g., infrequent but large amplitude thermal cycles over the course of device (e.g., battery) operating lifetime that the seal can experience) is over a range of at least about 100° C., 200° C., 300° C., 400° C., 500° C., 600° C., 700° C., 800° C. or 900° C. In some examples, the temperature cycling is over a range of less than about 100° C., 200° C., 300° C., 400° C., 500° C., 600° C., 700° C., 800° C. or 900° C. In an example, the temperature cycling is between about −25° C. and 700° C. The seal may withstand (e.g., continue to meet all required specifications) such temperature cycling after at least about 1 thermal cycle, 5 thermal cycles, 10 thermal cycles, 20 thermal cycles, 40 thermal cycles, 80 thermal cycles, 100 thermal cycles or 1000 thermal cycles. In some cases, the cell and seal can be thermally cycled at least about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100 or more times per year (e.g., going from room temperature up to operating temperature). The seal may be capable of withstanding brief temperature excursions above or below typical operating temperature range limits. For example, the seal may be capable of withstanding temperature excursions for greater than or equal to about 1 hour, 2 hours, 3 hours, 4 hours, 5 hours, 6 hours, 7 hours, 8 hours, 9 hours, 10 hours, 12 hours, 14 hours, 16 hours, 18 hours, 20 hours, 22 hours, 24 hours or more. In some cases, such temperature excursions may not exceed 700° C.

In some examples, voltage (e.g., voltage drop across the seal) is at least about 0.1 V, 0.5 volt (V), 1 V, 1.5 V, 2 V, 2.5 V, 3 V, 4 V, 5 V, 6 V, 7 V, 8 V, 9 V or 10 V. In some examples, the voltage is less than about 0.1 V, 0.5 V, 1 V, 1.5 V, 2 V, 2.5 V, 3 V, 4 V, 5 V, 6 V, 7 V, 8 V, 9 V or 10 V. In some examples, the voltage drop across the seal is between about 0 V and 3 V or 0 V and 10 V.

In some examples, current (e.g., electric current flowing through materials that interface with the seal) is at least about 0 ampere (A), 5 A, 10 A, 25 A, 50 A, 100 A, 150 A, 200 A, 250 A, 300 A, 350 A, 400 A, 450 A or 500 A. In some examples, the current is less than about 0 A, 5 A, 10 A, 25 A, 50 A, 100 A, 150 A, 200 A, 250 A, 300 A, 350 A, 400 A, 450 A or 500 A. In some examples, the electric current flowing through materials that interface with the seal is between about 0 A and 500 A.

In some examples, internal atmosphere (e.g., vapors of reactive materials, such as, for example, alkali metals or reactive alkaline earth metals and halide salts from within the device (e.g., battery) that the seal is exposed to), comprises at least about $1 \times 10^{-5}$ torr, $5 \times 10^{-5}$ torr, $1 \times 10^{4}$ torr, $5 \times 10^{-4}$ torr, $1 \times 10^{-3}$ torr, $5 \times 10^{-3}$ torr, $1 \times 10^{-2}$ torr, $5 \times 10^{-2}$ torr, $1 \times 10^{-1}$ torr, $5 \times 10^{-1}$ torr or 1 torr vapor pressure of alkali metals or alkaline earth metals and halide salts. In some examples, the internal atmosphere comprises less than about $1 \times 10^{-5}$ torr, $5 \times 10^{-5}$ torr, $1 \times 10^{4}$ torr, $5 \times 10^{4}$ torr, $1 \times 10^{-3}$ torr, $5 \times 10^{-3}$ torr, $1 \times 10^{-2}$ torr, $5 \times 10^{-2}$ torr, $1 \times 10^{-1}$ torr, $5 \times 10^{-1}$ torr or 1 torr vapor pressure of alkali metals or alkaline earth metals and halide salts. In some examples, the internal atmosphere that the seal is exposed to comprises at least about 0.001 torr (about 0.133 Pa) or 0.01 torr (about 1.33 Pa) vapor pressure of alkali metals or alkaline earth metals and halide salts. In some examples, the internal atmosphere that the seal is exposed to comprises less than about 0.001 torr (about 0.133 Pa) or 0.01 torr (about 1.33 Pa) vapor pressure of alkali metals or alkaline earth metals and halide salts.

The external surface of the cell and seal can be exposed to the atmosphere (e.g., ambient environment comprising $O_2$, $N_2$, Ar, $CO_2$, $H_2O$). In some examples, external atmosphere (e.g., atmosphere that the seal is exposed to from the externals of the device (e.g., battery) such as, for example, ambient air, high moisture, etc.) is at a temperature of at least about 0° C., 50° C., 100° C., 150° C., 200° C., 250° C., 300° C., 350° C., 400° C., 450° C., 500° C., 550° C., 600° C., 700° C., 750° C., 800° C., 850° C. or 900° C. In some examples, the external atmosphere is at a temperature of less than about 0° C., 50° C., 100° C., 150° C., 200° C., 250° C., 300° C., 350° C., 400° C., 450° C., 500° C., 550° C., 600° C., 700° C., 750° C., 800° C., 850° C. or 900° C. In some examples, the atmosphere that the seal is exposed to from the externals of the device is at a temperature of between about 0° C. and 550° C., 350° C. and 600° C. or 250° C. and 650° C. (e.g., accompanied by 100% relative humidity). Such temperatures can be accompanied by greater than or equal to about 10%, 20%, 30%, 40%, 50%, 60%, 70%, 80%, 90% or 100% relative humidity. For example, such temperatures are accompanied by 100% relative humidity.

In some examples, internal pressure (e.g., vacuum gradient or positive pressure across the seal) can be at least about 0 atm, 0.1 atm, 0.2 atm, 0.4 atm, 0.6 atm, 0.8 atm, 1 atm, 1.5 atm, 2 atm, 2.5 atm, 3 atm, 3.5 atm, 4 atm or 5 atm. In some examples, the internal pressure can be less than about 0 atm, 0.1 atm, 0.2 atm, 0.4 atm, 0.6 atm, 0.8 atm, 1 atm, 1.5 atm, 2 atm, 2.5 atm, 3 atm, 3.5 atm, 4 atm or 5 atm. In some examples, the vacuum gradient or positive pressure across the seal is between about 0.5 atm and 4.0 atm.

The seal may be capable of handling vibration (e.g., vibrations caused during manufacturing, transportation, installation, operation, and rare events such as, for example, drops or shock impact that the seal can be exposed to). In an example, the seal is capable of handling vibrational loading analogous to transportation (e.g., when used in a cell or system application).

The seal may have a given lifetime (e.g., expected lifetime of the seal in full operation). In some examples, the lifetime of seal is at least about 1 month, 2 months, 6 months, 1 year, 2 years, 5 years, 10 years, 15 years, 20 years or more. The seal can have such lifetimes at operation (e.g., utilization) of at least about 20%, 40%, 60%, 80%, 90%, or full operation. The seal can have such lifetimes at a failure rate of less than about 75%, 50%, 40%, 40%, 30%, 20%, 15%, 10%, 5%, 1%, 0.1%, 0.01% or 0.001%. In an example, the seal has a 20 year life with less than about 1% failure, or a 20 year life with less than about 10% failure.

The seal may have a cycle life (e.g., number of complete charge/discharge cycles of the cell that the seal is able to support before its performance degrades and/or before the capacity of the electrochemical cell/battery/energy storage device falls below, for example, 80% of its original capacity) of at least about 10, 50, 100, 150, 200, 250, 300, 350, 400, 450, 500, 600, 700, 800, 900, 1,000, 1,500, 2,000, 3000, 5000, 10,000, 20,000, 50,000, 100,000 cycles.

External cell dimensions may impact system design and performance. For example, a seal height may be limited to a given distance above a cell top plate (e.g., top surface of the cell container lid). In some cases, seal height can be less than about 2 inches, 1 inch, ½ inch (e.g., since spacing between cells can change the thermal environment within a stack cell chamber), ¼ inch or ⅛ inch above the cell top plate. In some cases, the resistance of the conductor (e.g., negative current lead) that conducts electric current from outside the cell through the aperture in the cell lid is sufficiently low. For example, the resistance of the conductor is sufficiently low to achieve a given system efficiency (e.g., greater than or equal to about 40%, 50%, 60%, 75%, 80%, 90%, 95% or 99% energy efficiency). In some instances, a decreasing diameter or radial circumference of the conductor may allow for a more robust seal to be formed around the conductor, but lead to an increase in resistance of the conductor. In such instances, the resistance of the conductor can be decreased or minimized to a value sufficient for a robust seal to be formed (e.g., the resistance of the conductor in the seal can be as low as possible as long as a robust seal can be made, and the conductor can be large enough to achieve low resistance but small enough to achieve a robust seal around it). The resistance may be less than about 200 milliohms (mOhm), 100 mOhm, 80 mOhm, 50 mOhm, 30 mOhm, 10 mOhm, 3 mOhm, 1 mOhm, 0.75 mOhm, 0.5 mOhm, 0.3 mOhm, 0.1 mOhm, 0.075 mOhm, 0.05 mOhm, 0.03 mOhm or 0.01 mOhm.

The chemical stability of the materials (e.g., cell lid assembly materials, adhesive seal material(s), etc.) can be considered (e.g., to ensure the durability of the seal during all possible temperatures that the system may reach). The seal may be exposed to one or more different atmospheres, including the cell internals (internal atmosphere) and open air (external atmosphere). For example, the seal can be exposed to typical air constituents including moisture, as well as to potentially corrosive active materials in the cell. In some implementations, a hermetic seal is provided. A hermetically sealed battery or battery housing can prevent an unsuitable amount of air, oxygen, nitrogen, and/or water from leaking or otherwise entering into the battery. A hermetically sealed battery or battery housing can prevent an unsuitable amount of one or more gases surrounding the battery (e.g., air or any component(s) thereof, or another type of surrounding atmosphere or any component(s) thereof) from leaking or otherwise entering into the battery. In some cases, a hermetically sealed cell or cell housing can prevent gas or metal/salt vapors (e.g., helium, argon, negative electrode vapors, electrolyte vapors) from leaking from the cell.

A hermetically sealed battery or battery housing may prevent an unsuitable amount of air, oxygen, nitrogen, and/or water into the battery (e.g., an amount such that the battery maintains at least about 80% of its energy storage capacity and/or maintains a round-trip Coulombic efficiency of at least about 90% per cycle when charged and discharged at least about 100 mA/cm$^2$ for at least about one year, 2 years, 5 years, 10 years or 20 years). In some instances, the rate of oxygen, nitrogen, and/or water vapor transfer into the battery is less than about 0.25 milli-liter (mL) per hour, 0.02 mL per hour, 0.002 mL per hour or 0.0002 mL per hour when the battery is contacted with air at a pressure that is at least about (or less than about) 0 atmospheres (atm), 0.1 atm, 0.2 atm, 0.3 atm, 0.4 atm, 0.5 atm, 0.6 atm, 0.7 atm, 0.8 atm, 0.9 atm or 0.99 atm higher than, or at least about (or less than about) 0.1 atm, 0.2 atm, 0.5 atm or 1 atm lower than the pressure inside the battery and a temperature of between about 400° C. and 700° C. In some instances, the rate of metal vapor, molten salt vapor, or inert gas transfer out of the battery is less than about 0.25 mL per hour, 0.02 mL per hour, 0.002 mL per hour or 0.0002 mL per hour when the battery is contacted with air at a pressure of greater than or equal to about 0.5 atm, 1 atm, 1.5 atm, 2 atm, 2.5 atm, 3 atm, 3.5 atm or 4 atm less than the pressure inside the battery and a temperature between about 400° C. and 700° C. In some examples, the number of moles of oxygen, nitrogen, or water vapor that leaks into the cell over a given period (e.g., at least about a 1 month period, 6 month period, 1 year period, 2 year period, 5 year period, 10 year period or more) is less than about 10%, 5%, 3%, 1%, 0.5%, 0.1%, 0.05% or 0.5% of the number of moles of active material (e.g., active metal material) in the cell.

The seal can meet one or more specifications, including, but not limited to: electrically insulating and hermetic, ability to function at operating temperature for duration of lifespan, thermal cycle-ability, sufficiently high electrical conductivity of the conductor (e.g., negative current lead), configuration that does not excessively protrude from cell body, inner surface chemically stable with liquids and vapors of active components, outer surface stable in air, ability to avoid arcing under high potentials, etc.

Pressure Relief

A sealed high temperature device containing reactive materials may in some cases experience an increase in internal pressure (e.g., if the temperature of the device is increased above the boiling point of one or more of the materials within the device). The device may comprise a metal housing (e.g., stainless steel cell body) and a metal housing lid (e.g., stainless steel cell lid) that are joined (e.g., brazed or welded) together. The cell lid may comprise a high temperature seal. In the event of a pressure build-up inside the device, the device may rupture. In some cases, the device may rupture, eject material, and result in a hazardous event. It may be desirable for the device to comprise a component that relieves pressure before it reaches a hazardous level. It may also be desirable that the pressure relief component is in a gaseous head space of the device such that the pressure is released via the escape of gaseous components rather than liquid components.

In some implementations, the seal may be designed to serve as the pressure relief component (e.g., to be the weakest portion of the device that will allow the pressure that may build inside the device to be released through the seal) above a critical pressure and/or above a critical temperature. One or more seals may be provided on the device (e.g., a seal around a conductor, a dedicated pressure relief seal, a seal around a conductor that also provides pressure relief, etc.). In some cases, the seal releases pressure when the device and/or seal is heated above the melting point of the braze material that is used to create the metal-to-ceramic sealed interfaces. In some cases, the strength and/or geometry of the ceramic-to-metal joints in the seal are designed to fail (e.g., leak) before the metal-to-metal joints of the device housing and/or lid (and/or before the metal-to-metal joints of the seal). For example, one or more of the ceramic-to-metal brazes in the seal may be weaker than the metal-to-metal welds of the device housing and/or lid. In some examples, the critical pressure inside the device can be greater than about 1 atm, 2 atm, 3 atm, 4 atm, 5 atm, 10 atm, 20 atm, 50 atm, or 100 atm. In some examples, the critical temperature (e.g., of the device and/or of the seal) can be greater than about 300° C., 400° C., 500° C., 600° C., 700° C., 800° C., 900° C., 1000° C., 1100° C., 1200° C., 1300° C., or 1400° C.

Materials, Chemical Compatibility and Coefficients of Thermal Expansion

Materials and features of seals herein may be configured to achieve suitable materials (e.g., chemical, mechanical, thermal) compatibility. Materials compatibility may include, for example, suitable matching of coefficients of thermal expansion (CTEs), suitable Young's modulus characteristics (e.g., low Young's modulus metal materials) and/or suitable ductility characteristics (e.g., one or more components with high ductility). Seals may incorporate structural features that can compensate for CTE mismatch.

Materials may be selected to achieve low CTE mismatch between various (e.g., pairs of) seal materials and/or housing (e.g., cell lid and/or body) materials. Materials may be selected to achieve low stress (e.g., stress due to CTE mismatch) at joint(s) between various (e.g., pairs of) seal materials and/or housing materials. A joint between various seal materials and/or housing materials may be of a given type (e.g., ceramic-to-metal or metal-to-metal). In an example, a ceramic material has a CTE that suitably (e.g., substantially) matches a CTE of a cell lid or body, thereby decreasing or minimizing stress(es) (e.g., stress(es) at one or more ceramic-to-metal joint(s) between the ceramic material and the cell lid or body). In another example, a ceramic material has a CTE that is suitably (e.g., substantially) different than the CTE of the cell lid or body. In this instance, a metal collar or sleeve that is a better CTE match or has one or more other properties that reduce the ceramic-to-metal joint stress may be used. The metal collar or sleeve may move the CTE stress from the ceramic joint (e.g., from the ceramic-to-metal joint between the ceramic and the metal collar or sleeve) to the cell lid or body joint (e.g., to the metal-to-metal joint between the metal collar or sleeve and the cell lid or body). The ceramic material may have a CTE that suitably (e.g., substantially) matches a CTE of the metal collar or sleeve. The ceramic material may have a CTE that is suitably (e.g., substantially) different than the CTE of the metal collar or sleeve. The ceramic-to-metal seal joint stress(es) can be reduced, for example, by using a ductile metal collar or sleeve (e.g., comprising at least about 95% or 99% Ni) and/or by using a ductile braze material (e.g., comprising at least about 95% or 99% Ag, Cu or Ni). The ductile braze material may be used to reduce stress(es) at the ceramic-to-metal joint between the ceramic and the cell lid or body or to reduce stress(es) at the ceramic-to-metal joint between the ceramic and metal collar or sleeve.

The seal can be made of any suitable material (e.g., such that the seal forms a hermetic seal and an electrical isolation). In some cases, the seal comprises a ceramic material and a braze material. The ceramic material can have a CTE that is matched to the housing material such that the electrochemical cell maintains suitable gas-tight and/or electrically insulating properties during operation and/or start-up of the battery. The ceramic material may have a CTE that matches a CTE of the braze material and/or the cell top (e.g., lid or cap, or any component of a cell lid assembly) or body. In some cases, the CTEs of the ceramic material, braze material and cell top or body may not be identically matched, but may be sufficiently close to minimize stresses during the braze operation and subsequent thermal cycles in operation. In some cases, the CTE of the ceramic material may not be sufficiently close to the CTE of the cell top or body (e.g., in some cases resulting in an unstable and/or unreliable ceramic-to-metal joint which may lose its leak-tight property). The seal can comprise a collar (e.g., a thin metal collar) or sleeve (e.g., to overcome the CTE mismatch between a ceramic material and the cell lid or cell body). The collar or sleeve can be a metal collar or sleeve. The collar or sleeve can be brazed to the ceramic (e.g., via a braze material) and joined to the cell lid and/or the negative current lead that protrudes through the cell lid and into the cell cavity. A suitable collar or sleeve material may be selected in order to reduce the resulting stresses at the ceramic-to-metal joint (e.g., by reducing the CTE mismatch), increase the resulting stress at the collar or sleeve-to-cell lid or body joint (e.g., by increasing the CTE mismatch), or a combination thereof. The seal can comprise features that alleviate CTE mismatches between the ceramic and the cell lid and/or the negative current lead. Any aspects of the disclosure described in relation to the cell top or body (e.g., CTE, joint stress, configuration and/or formation, etc.) may equally apply to the cell top and body at least in some configurations. Any aspects of the disclosure described in relation to the cell top may equally apply to the cell body at least in some configurations, and vice versa.

Materials herein may have temperature-dependent properties. Such properties may include, for example, CTE and/or yield strength. For example, the CTE of a material may be measured across a given (e.g., specified) temperature range. Thus, a material may have one CTE value over the range of, for example, 20° C. to 200° C. (e.g., 10 ppm/K), and another CTE value over the range of, for example, 20° C. to 400° C. (e.g., 12 ppm/K). Such properties may or may not change continuously with temperature (e.g., the CTE may be a continuous function with temperature). In another example, yield strength may be a function of temperature. Values of the yield strength of materials herein (e.g., of a metal collar or sleeve material) may be provided at one or more temperatures at or below braze temperature (e.g., at about 1100° C. or lower for some metal collar or sleeve materials). Values of temperature-dependent properties herein may be taken to be at any relevant temperature or range. Features and characteristics such as, for example, CTE mismatch may in some cases vary with temperature. Values of CTE mismatch herein may apply at any temperature, or at a given temperature or range of temperatures (e.g., the values may be maximum values, values at a steady-state operating temperature, average values from room temperature up to operating temperature, etc.).

The CTE of the ceramic material may be at least about 3 microns per meter per degree Celsius ($\mu$m/m/° C., same as parts per million per degree Kelvin (ppm/K)), 4 $\mu$m/m/° C., 5 $\mu$m/m/° C., 6 $\mu$m/m/° C., 7 $\mu$m/m/° C., 8 $\mu$m/m/° C., 9 $\mu$m/m/° C., 10 $\mu$m/m/° C., 11 $\mu$m/m/° C., 12 $\mu$m/m/° C., 13 $\mu$m/m/° C. or 14 $\mu$m/m/° C. The CTE of the ceramic material may be less than or equal to about 3 $\mu$m/m/° C., 4 $\mu$m/m/° C., 5 $\mu$m/m/° C., 6 $\mu$m/m/° C., 7 $\mu$m/m/° C., 8 $\mu$m/m/° C., 9 $\mu$m/m/° C., 10 $\mu$m/m/° C., 11 $\mu$m/m/° C., 12 $\mu$m/m/° C., 13 $\mu$m/m/° C. or 14 $\mu$m/m/° C. The CTE of the ceramic material may be between about 4 $\mu$m/m/° C. and 14 $\mu$m/m/° C., 6 $\mu$m/m/° C. and 13 $\mu$m/m/° C., or 8 $\mu$m/m/° C. and 11 $\mu$m/m/° C. In some cases, the ceramic material comprises at least about 50% AlN and has a CTE of less than about 5 $\mu$m/m/° C. In some cases, the ceramic material comprises at least about 50% neodymium oxide ($Nd_2O_3$), lanthanum oxide ($La_2O_3$) or cerium oxide ($CeO_2$) and has a CTE of greater than about 8 $\mu$m/m/° C., 9 $\mu$m/m/° C., 10 $\mu$m/m/° C., 11 $\mu$m/m/° C. or 12 $\mu$m/m/° C. The ceramic material may have such CTE values for a temperature range of, for example, between about 25° C. and 400° C., 20° C. and 500° C., 25° C. and 500° C., 25° C. and 600° C., 25° C. and 900° C., or 25° C. and 1000° C.

The CTE of the metal collar or sleeve may be at least about 5 $\mu$m/m/° C., 6 $\mu$m/m/° C., 7 $\mu$m/m/° C., 8 $\mu$m/m/° C., 9 $\mu$m/m/° C., 10 $\mu$m/m/° C., 11 $\mu$m/m/° C., 12 $\mu$m/m/° C., 13 $\mu$m/m/° C., 14 $\mu$m/m/° C., 15 $\mu$m/m/° C., 16 $\mu$m/m/° C., 17 $\mu$m/m/° C., 18 $\mu$m/m/° C., 19 $\mu$m/m/° C. or 20 $\mu$m/m/° C. The CTE of the metal collar or sleeve may be less than or equal to about 20 $\mu$m/m/° C., 19 $\mu$m/m/° C., 18 $\mu$m/m/° C., 17 $\mu$m/m/° C., 16 $\mu$m/m/° C., 15 $\mu$m/m/° C., 14 $\mu$m/m/° C., 13 $\mu$m/m/° C., 12 $\mu$m/m/° C., 11 $\mu$m/m/° C., 10 $\mu$m/m/° C., 9 $\mu$m/m/° C., 8 $\mu$m/m/° C., 7 $\mu$m/m/° C., 6 $\mu$m/m/° C. or 5 $\mu$m/m/° C. In some cases, the metal collar or sleeve comprises Zr and has a CTE of less than or equal to about 7 $\mu$m/m/° C. In some cases, the metal collar or sleeve comprises Ni (e.g., at least about 95% or 99% Ni, or at least about 40% Ni and at least about 40% Fe by weight) and has a CTE of greater than or equal to about 6 $\mu$m/m/° C., 7 $\mu$m/m/° C., 8 $\mu$m/m/° C., 9 $\mu$m/m/° C., 10 $\mu$m/m/° C., 11 $\mu$m/m/° C., 12 $\mu$m/m/° C., 13 $\mu$m/m/° C., 14 $\mu$m/m/° C., 15 $\mu$m/m/° C., 16 $\mu$m/m/° C., 17 $\mu$m/m/° C., 18 $\mu$m/m/° C., 19 $\mu$m/m/° C. or 20 $\mu$m/m/° C. The metal collar or sleeve may comprise greater than or equal to about 5%, 10%, 15%, 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 65%, 70%, 75%, 80%, 85%, 90%, 95% or 99% Ni (e.g., by weight). The metal collar or sleeve may comprise such Ni compositions in combination with greater than or equal to about 5%, 10%, 15%, 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 65%, 70%, 75%, 80%, 85%, 90%, 95% or 99% Fe (e.g., by weight). Such Ni or Ni—Fe compositions (e.g., alloys) may comprise one or more other elements (e.g., C, Co, Mn, P, S, Si, Cr and/or Al) with individual concentrations or a total concentration of less than or equal to about 1%, 0.9%, 0.8%, 0.7%, 0.6%, 0.5%, 0.4%, 0.3%, 0.15%, 0.1%, 0.09%, 0.08%, 0.07%, 0.06%, 0.05%, 0.04%, 0.03%, 0.025%, 0.01% or 0.005%. In some cases, the metal collar or sleeve comprises greater than or equal to about 50.5% Ni, greater than or equal to about 48% Fe, and less than or equal to about 0.60% Mn, 0.30% Si, 0.005% C, 0.25% Cr, 0.10% Co, 0.025% P and/or 0.025% S (e.g., alloy 52). In some cases, the metal collar or sleeve comprises greater than or equal to about 41% Ni, greater than or equal to about 58% Fe, and less than or equal to about 0.05% C, 0.80% Mn, 0.40% P, 0.025% S, 0.30% Si, 0.250% Cr and/or 0.10% Al (e.g., alloy 42). In some cases, the metal collar or sleeve comprises an Fe alloy with between about 17.5% and 19.5% Cr, between about 0.10% and 0.50% Ti, between about 0.5% and 0.90% niobium, less than or equal to about 1% Ni, 1% Si, 1% Mn, 0.04% phosphorus, 0.03% nitrogen, 0.03% sulfur and/or 0.03% carbon, and a balance of Fe (e.g., 18CrCb ferritic stainless steel). Such Fe alloy (e.g., 18CrCb ferritic stainless steel) may have a CTE of about 8 ppm/K, 9 ppm/K, 10 ppm/K, 11 ppm/K or 12 ppm/K. In some cases, the metal collar or sleeve comprises an Fe alloy with between about 17.5% and 18.5% Cr, between about 0.10% and 0.60% Ti, between about 0.3% and 0.90% niobium, less than about 1% Si, 1% Mn, 0.04% phosphorus, 0.015% sulfur and/or 0.03% carbon, and a balance of Fe (e.g., grade 441 stainless steel). Such Fe alloy (e.g., 441 stainless steel) may have a CTE of about 9 ppm/K, 10 ppm/K, 11 ppm/K, 12 ppm/K, 13 ppm/K or 14 ppm/K. In some cases, the metal collar or sleeve comprises a Ni alloy with at least about 72% Ni, between about 14% and 17% Cr, between about 6% and 10% Fe, and less than about 0.15% C, 1% Mn, 0.015% S, 0.50% Si and/or 0.5% Cu (e.g., Inconel 600). Such Ni alloy (e.g., Inconel 600) may have a CTE of about 12 ppm/K, 13 ppm/K, 14 ppm/K, 15 ppm/K, 16 ppm/K or 17 ppm/K. In some cases, the metal collar or sleeve comprises a Ni alloy with less than about 0.05% C, 0.25% Mn and/or 0.002% S, less than or equal to about 0.20% Si, 15.5% Cr, 8% Fe and/or 0.1% Cu, and a balance of Ni and Co (e.g., ATI alloy 600). Such Ni alloy (e.g., ATI alloy 600) may have a CTE of about 12 ppm/K, 13 ppm/K, 14 ppm/K, 15 ppm/K, 16 ppm/K or 17 ppm/K. In some cases, the metal collar or sleeve comprises greater than or equal to about 67% Ni, less than about 2% Co, 0.02% C, 0.015% B, 0.35% Cu, 1.0% W, 0.020% P and/or 0.015% S, between about 14.5% and 17% Cr, between about 14% and 16.5% Mo, between about 0.2% and 0.75% Si, between about 0.30% and 1.0% Mn, between about 0.10% and 0.50% Al, between about 0.01% and 0.10% La, and less than or equal to about 3% Fe (e.g., Hastelloy S). Such alloy (e.g., Hastelloy S) may have a CTE of about 12 ppm/K, 13 ppm/K, 14 ppm/K, 15 ppm/K, 16 ppm/K or 17 ppm/K. The metal collar or sleeve may have the aforementioned CTE values for a temperature range of, for example, between about 25° C. and 400° C., 20° C. and 500° C., 25° C. and 500° C., 25° C. and 600° C., 25° C. and 900° C., or 25° C. and 1000° C.

The seal may comprise one or more braze materials (e.g., same or different braze materials at different joints when using a metal collar or sleeve, or one braze material when the joining the ceramic material directly to the cell lid or body). The CTE of a braze material may be at least about 3 microns per meter per degree Celsius (μm/m/° C.), 4 μm/m/° C., 5 μm/m/° C., 6 μm/m/° C., 7 μm/m/° C., 8 μm/m/° C., 9 μm/m/° C., 10 μm/m/° C., 11 μm/m/° C., 12 μm/m/° C., 13 μm/m/° C., 14 μm/m/° C., 15 μm/m/° C., 16 μm/m/° C., 17 μm/m/° C., 18 μm/m/° C., 19 μm/m/° C. or 20 μm/m/° C. The CTE of the braze material may be less than or equal to about 3 microns per meter per degree Celsius (μm/m/° C.), 4 μm/m/° C., 5 μm/m/° C., 6 μm/m/° C., 7 μm/m/° C., 8 μm/m/° C., 9 μm/m/° C., 10 μm/m/° C., 11 μm/m/° C., 12 μm/m/° C., 13 μm/m/° C., 14 μm/m/° C., 15 μm/m/° C., 16 μm/m/° C., 17 μm/m/° C., 18 μm/m/° C., 19 μm/m/° C. or 20 μm/m/° C. The braze material may have such CTE values for a temperature range of, for example, between about 25° C. and 400° C., 20° C. and 500° C., 25° C. and 500° C., 25° C. and 600° C., 25° C. and 900° C., or 25° C. and 1000° C.

The stress(es) at the ceramic-to-metal joint may be reduced by brazing the ceramic to a metal with a suitably (e.g., sufficiently) low yield strength. By creating a joint between a strong ceramic and a metal (e.g., metal collar or sleeve) with sufficiently low strength, stresses generated at the ceramic-to-metal braze joint may be released by plastically deforming the metal rather than the cracking the ceramic. In some cases, the ductile metal collar or sleeve comprises a Ni alloy comprising greater than or equal to about 95% or 99% (e.g., greater than or equal to about 95 wt %, or greater than or equal to about 99 wt %) Ni. The Ni alloy may also comprise less than or equal to about 0.25% Cu, 0.35% Mn and/or 0.40% Fe. The metal collar or sleeve may comprise any suitably ductile metal material described herein. In some cases, a yield strength of the metal collar or sleeve is less than or equal to about 50 MPa, 60 MPa, 70 MPa, 80 MPa, 90 MPa, 100 MPa, 150 MPa, 200 MPa, 250 MPa, 300 MPa, 350 MPa, 400 MPa, 450 MPa, 500 MPa, 600 MPa, 700 MPa, 800 MPa, 900 MPa or 1000 MPa. The metal collar or sleeve may have such yield strengths at a temperature of, for example, greater than or equal to about 25° C., 400° C., 500° C., 600° C., 700° C., 800° C., 900° C., 1000° C. or 1100° C. For example, a metal collar or sleeve can have a yield strength of less than or equal to about 350 MPa at a temperature of greater than or equal to about 500° C.

The stress(es) at the ceramic-to-metal joint may be reduced by using a braze material that is suitably (e.g., sufficiently) ductile. A ductile braze material may comprise silver (Ag), copper (Cu) and/or nickel (Ni). The braze material may comprise, for example, at least about 95% or 99% Ag (e.g., by weight), at least about 95% or 99% Cu (e.g., by weight) or at least about 95% or 99% Ni (e.g., by weight). The braze material may comprise any suitably ductile braze material described herein. The ductile braze material may have a yield strength of less than or equal to about 10 MPa, 20 MPa, 30 MPa, 40 MPa, 50 MPa, 60 MPa, 70 MPa, 80 MPa, 90 MPa, 100 MPa, 150 MPa, 200 MPa, 250 MPa, 300 MPa, 350 MPa, 400 MPa, 450 MPa, 500 MPa, 600 MPa, 700 MPa, 800 MPa, 900 MPa or 1000 MPa. The braze material may have such yield strengths at a temperature of, for example, greater than or equal to about 25° C., 400° C., 500° C., 600° C., 700° C., 800° C., 900° C., 1000° C. or 1100° C. In some cases, braze materials may be coated (e.g., Ni coated).

The seal may comprise one or more metallization materials (e.g., metallization powders). The CTE of a metallization material (e.g., after the metallization layer is formed) may be at least about 3 μm/m/° C., 4 μm/m/° C., 5 μm/m/° C., 6 μm/m/° C., 7 μm/m/° C., 8 μm/m/° C., 9 μm/m/° C., 10 μm/m/° C., 11 μm/m/° C., 12 μm/m/° C., 13 μm/m/° C., 14 μm/m/° C., 15 μm/m/° C., 16 μm/m/° C., 17 μm/m/° C., 18 μm/m/° C., 19 μm/m/° C. or 20 μm/m/° C. The CTE of the metallization material (e.g., after the metallization layer is formed) may be less than or equal to about 3 microns per meter per degree Celsius (μm/m/° C.), 4 μm/m/° C., 5 μm/m/° C., 6 μm/m/° C., 7 μm/m/° C., 8 μm/m/° C., 9 μm/m/° C., 10 μm/m/° C., 11 μm/m/° C., 12 μm/m/° C., 13 μm/m/° C., 14 μm/m/° C., 15 μm/m/° C., 16 μm/m/° C., 17 μm/m/° C., 18 μm/m/° C., 19 μm/m/° C. or 20 μm/m/° C. The metallization material may have such CTE values for a temperature range of, for example, between about 25° C. and 400° C., 20° C. and 500° C., 25° C. and 500° C., 25° C. and 600° C., 25° C. and 900° C., or 25° C. and 1000° C. The Young's modulus of a metallization material may be less than about 50 giga-Pascals (GPa), 75 GPa, 100 GPa, 150 GPa or 500 GPa. The metallization material may have such Young's modulus values for a temperature of, for example, 25° C., 300° C., 400° C., 500° C., 600° C., 900° C., or 1000° C. The metallization material may be chemically stable in air and/or when exposed to reactive materials in the device at a temperature of greater than or equal to about 200° C., 300° C., 400° C., 500° C., 600° C., 900° C., or 1000° C.

In some cases, the maximum difference in CTE (e.g., between any two (or more) of the ceramic material, metallization material, braze material, metal collar or sleeve, and cell top or body) can be less than about 0.01 microns per meter per degree Celsius (μm/m/° C.), 0.02 μm/m/° C., 0.05 μm/m/° C., 0.1 μm/m/° C., 0.2 μm/m/° C., 0.3 μm/m/° C., 0.5 μm/m/° C., 0.75 μm/m/° C., 1 μm/m/° C., 2 μm/m/° C., 3 μm/m/° C., 5 μm/m/° C., 7 μm/m/° C., 10 μm/m/° C. or 15 μm/m/° C. For example, a metal collar or sleeve (e.g., comprising a Ni—Fe alloy such as, for example, alloy 42, alloy 52, 18CrCb ferritic stainless steel, ATI alloy 600 or Hastelloy S) may have a CTE that suitably matches (e.g., within less than about 3 μm/m/° C., or within less than about 1 μm/m/° C.) the CTE of the ceramic (e.g., comprising an $Nd_2O_3$ ceramic such as, for example, $Nd_2O_3$ with 5% $Y_2O_3$ and 5% SiC). In some cases, a difference in CTE (e.g., between any two (or more) of the ceramic material, braze material, metal collar or sleeve, and cell top or body) can be greater than or equal to about 0.01 microns per meter per degree Celsius (μm/m/° C.), 0.02 μm/m/° C., 0.05 μm/m/° C., 0.1 μm/m/° C., 0.2 μm/m/° C., 0.3 μm/m/° C., 0.5 μm/m/° C., 0.75 μm/m/° C., 1 μm/m/° C., 2 μm/m/° C., 3 μm/m/° C., 5 μm/m/° C., 7 μm/m/° C., 10 μm/m/° C. or 15 μm/m/° C. For example, a braze material (e.g., ductile braze material) may have a CTE that is suitably (e.g., at least about 1 μm/m/° C.) different than the CTE of the ceramic.

The seal may comprise a ceramic material and a braze material. In some cases, the ceramic material is stable (e.g., thermodynamically stable) when in contact with (e.g., does not chemically react with) one or more reactive materials (e.g., reactive liquid metals or reactive liquid metal vapors such as, for example, molten lithium or lithium vapor). In some cases, the ceramic material (e.g., $Nd_2O_3$) is stable when in contact with air (or any other type of external atmosphere). In some cases, the ceramic material is stable with, is not substantially attacked by (e.g., the material may have a slight surface reaction, but does not progress into degradation or attack of the bulk of the material) and does not substantially dissolve into the molten salt. Examples of ceramic materials include, but are not limited to, aluminum nitride (AlN), beryllium nitride ($Be_3N_2$), boron nitride (BN), calcium nitride ($Ca_3N_2$), silicon nitride ($Si_3N_4$), aluminum oxide ($Al_2O_3$), beryllium oxide (BeO), calcium oxide (CaO), cerium oxide ($CeO_2$ or $Ce_2O_3$), erbium oxide ($Er_2O_3$), lanthanum oxide ($La_2O_3$), magnesium oxide (MgO), neodymium oxide ($Nd_2O_3$), samarium oxide ($Sm_2O_3$), scandium oxide ($Sc_2O_3$), ytterbium oxide ($Yb_2O_3$), yttrium oxide ($Y_2O_3$), zirconium oxide ($ZrO_2$), yttria partially stabilized zirconia (YPSZ), boron carbide ($B_4C$), silicon carbide (SiC), titanium carbide (TiC), zirconium carbide (ZrC), titanium diboride ($TiB_2$), chalcogenides, quartz, glass, or any combination thereof. The ceramic material may be electrically insulating (e.g., the ceramic material may have a resistivity greater than about $10^2$ Ohm-cm, $10^4$ Ohm-cm, $10^6$ Ohm-cm, $10^8$ Ohm-cm, $10^{10}$ Ohm-cm, $10^{12}$ Ohm-cm, $10^{14}$ Ohm-cm or $10^{16}$ Ohm-cm). The ceramic material may have a CTE that is (e.g., substantially) similar to (e.g., less than or equal to about 0.1%, 0.5%, 1%, 2%, 3%, 4%, 5%, 6%, 7%, 8%, 9%, 10%, 15%, 20%, 25%, 30%, 35%, 40%, 45% or 50% different than) a CTE of stainless steel (e.g., grade 430 stainless steel, 441 stainless steel or 18CrCb ferritic stainless steel) or nickel alloy (e.g., an alloy comprising greater than or equal to about 50% Ni and greater than or equal to about 48% Fe, such as, for example, alloy 52). In an example, a ceramic material comprising $Nd_2O_3$ has a CTE (e.g., at least about 9 μm/m/° C., such as, for example, between about 9 μm/m/° C. and about 10 μm/m/° C.) that substantially matches (e.g., within less than about 5%, 10%, 20%, 40%, 60% or 80%) the CTE of a metal collar or sleeve that comprises Fe and/or Ni (e.g., a metal collar or sleeve that comprises one or more alloys described elsewhere herein, such as, for example, alloy 52, 18CrCb ferritic stainless steel, 441 stainless steel, Inconel 600, ATI alloy 600 or Hastelloy S). The ceramic material may be selected, for example, based on stability, corresponding material set, cost (e.g., $Nd_2O_3$ may in some cases be lower cost than AlN), electrical and mechanical properties, etc. The ceramic material may comprise a mixture of materials of different composition and/or morphology, as described in greater detail elsewhere herein (e.g., primary and secondary ceramic materials). The ceramic material may comprise one or more materials that have only one stable charged oxidation state. For example, the materials included in the ceramics (e.g., included in the overall ceramic material, or included in primary or secondary material(s) individually) may only exist in one stable charged oxidation state (e.g., $Nd_2O_3$).

In some cases, the braze material comprises one or more braze constituents such that at least one braze constituent has low solubility in the reactive material, the reactive material has low solubility in at least one braze constituent, at least one braze constituent does not react (e.g., form intermetallic alloys with) the reactive material at the operating temperature of the device, and/or the braze material melts above the operating temperature of the device. The reactive material can be, for example, a reactive metal. In some examples, the braze material comprises at least one braze constituent that has low solubility in the reactive metal. In some examples, the reactive metal has low solubility in the braze constituent. In some examples, the braze constituent does not form intermetallic alloys with the reactive metal at the operating temperature of the device. In some examples, the braze constituent and/or braze material melts above the operating temperature of the device. In some examples, the braze constituent(s) may include Ti, Ni, Y, Re, Cr, Zr, and/or Fe and the reactive metal may include lithium (Li).

Examples of braze constituent materials include, but are not limited to, aluminum (Al), beryllium (Be), copper (Cu), chromium (Cr), iron (Fe), manganese (Mn), molybdenum (Mo), nickel (Ni), niobium (Nb), rubidium (Rb), scandium (Sc), silver (Ag), tantalum (Ta), rhenium (Re), titanium (Ti), vanadium (V), yttrium (Y), zirconium (Zr), phosphorus (P), boron (B), carbon (C), silicon (Si), or any combination thereof. In some instances, the ceramic material comprises aluminum nitride (AlN) and the braze material comprises titanium (Ti). In some cases, the braze material comprises a mixture of two or more materials (e.g., 3 materials). The materials may be provided in any proportion. For example, the braze can comprise 3 materials at a ratio (e.g., in weight-%, atomic-%, mol-% or volume-%) of about 30:30:40 or 40:40:20. In some cases, the braze material comprises a mixture of Ti—Ni—Zr. In some instances, the braze comprises at least about 20, 30 or 40 weight-% titanium, at least about 20, 30% or 40 weight-% nickel, and at least about 20, 30, 40, 50 or 60 weight-% zirconium. In some instances, the braze comprises less than about 20, 30 or 40 weight-% titanium, less than about 20, 30% or 40 weight-% nickel, and less than about 20, 30, 40, 50 or 60 weight-% zirconium. In some instances, the braze comprises about 18% Ti, about 60% Zr, about 22% Ni (e.g., on a weight-%, atomic-%, mol-% or volume-% basis). In some instances, the braze comprises about 7% Ti, about 67% Zr, and about 26% Ni (e.g., on a weight-%, atomic-%, mol-% or volume-% basis). In some instances, the braze comprises at least about 5, 10, 15, 20, 25, 30, 35, 40, 45, 50, 55, 60, 65, 70, 75, 80, 85, 90, 95 or more weight-%, atomic-%, mol-% or volume-% of titanium, nickel or zirconium (or any other braze material herein). In some instances, the braze comprises less than or equal to about 5, 10, 15, 20, 25, 30, 35, 40, 45, 50, 55, 60, 65, 70, 75, 80, 85, 90, 95 or more weight-%, atomic-%, mol-% or volume-% of titanium, nickel or zirconium (or any other braze material herein). In some instances, the braze comprises greater than or equal to about 82% Ni, and less than or equal to about 7% Cr, 3% Fe, 4.5% Si, 3.2% B and/or 0.06% C (e.g., BNi-2 braze). In some instances, the braze comprises greater than or equal to about 82% Ni, and less than or equal to about 15% Cr, 4.0% B and/or 0.06% C (e.g., BNi-9 braze). In some instances, the braze comprises greater than or equal to about 82% Ni, and less than or equal to about 15% Cr, 7.3% Si, 0.06% C and/or 1.4% B (e.g., BNi-5b braze). In some instances, the braze comprises yttrium, chromium or rhenium, and nickel.

To facilitate the use of certain braze materials (e.g., non-active braze materials) to bond the ceramic material to a metal collar or sleeve, a layer comprising metal (also "metallization layer" and "pre-metallization layer" herein) may first be applied to the ceramic material via a pre-metallization step (e.g., the metallization layer may be applied to the ceramic material by a coating process). For example, a metallization layer with a controlled layer thickness may be applied onto the ceramic material by sputter-coating or by vacuum or controlled atmosphere (e.g., Ar or $N_2$ with $H_2$ gas) high temperature thermal treatment (e.g., sintering the metallization layer onto the ceramic) without bonding a metal collar or sleeve to the braze material. The pre-metallization step may enable, for example, a subsequent brazing step to bond the pre-metallized ceramic surface to a metal collar or sleeve by using a preferred braze material that may not bond to the ceramic material directly (e.g., the braze material may not bond to the ceramic material without a metallization layer).

A metallization layer may comprise metallization material (also "pre-metallization material" herein). As described in greater detail elsewhere herein, the metallization material may include one or more metal and/or non-metal materials (e.g., one or more metals, ceramics, silicon oxide glass, etc.). Application of a metallization material may result in formation of one or more layers of the pre-metallization layer. The sublayer(s) may be formed in one step (e.g., a processing step using a single metallization material may result in the formation of two sublayers) or may result from multiple processing steps (e.g., multiple processing steps using different metallization materials). A metallization material may include a braze material. For example, at least a portion (e.g., some portion) of the braze material (e.g., yttrium, titanium or aluminum) may be applied as metallization material via a pre-metallization step. In some instances, a pre-metallization material may be referred to as a pre-metallization braze material. The metallization material may be different from a braze material. In some instances, a material may be referred to as a metallization material instead of a braze material. For example, when applying a metal coating as a powder and bonding that powder to the ceramic, the powder may be referred to as a metallization powder rather than a braze powder. Such nomenclature may distinguish between a braze material that may melt during a thermal process onto the ceramic and/or metal, and a metallization material (e.g., powder) that may effectively sinter onto the ceramic during a thermal process and may not melt (e.g., may not fully melt) during the thermal process.

At least a portion of the metallization material (e.g., yttrium, titanium or aluminum) applied via the pre-metallization step may be applied onto the ceramic via sputtering and subsequently covered by a layer of a material that is stable in air (e.g., Cr, Re or Ni) up to and beyond a given (e.g., intended or certified) operating temperature of the seal and/or the cell comprising the seal (e.g., temperatures ranging from room temperature to within about 5%, 10%, 20%, 30%, 50% or more of the intended operating temperature). The pre-metallization material application process may occur in stages, resulting in a layered structure comprising a first layer (e.g., an active layer) adjacent to the ceramic and a second layer (e.g., a protective layer) that covers the first layer. The second layer may be applied to the first layer using the same coating process (e.g., a sputter-coated thin layer of Y may be covered with a protective layer of Cr or Re in the same sputtering process step) or via a separate coating process (e.g., a different coating process such as, for example, Ni-plating). The active layer may comprise a metal (e.g., yttrium or titanium) that is capable of thermodynamically reducing the metal constituent in the ceramic (e.g., $Nd_2O_3+2Y \rightarrow Y_2O_3+2Nd$, or $AlN+Ti \rightarrow TiN+Al$). The protective layer may comprise a metal (e.g., Ni, Re, Cr, Si or Al), a high temperature metal alloy, a non-metal (e.g., $Al_2O_3$, $SiO_2$, MgO, AlN or another stable ceramic material), or any combination thereof. The resulting pre-metallized ceramic may comprise an assembly comprising a bulk ceramic component and a metallization layer (e.g., a thin layer of metallization material). The resulting pre-metallized ceramic may comprise, for example, an assembly comprising a bulk ceramic component, a thin layer of an active braze material (also "active layer" herein), and/or a thin layer of a protective material (also "protective layer" herein) that covers the active layer. The resulting pre-metallized ceramic may then be brazed (e.g., vacuum-brazed or hydrogen atmosphere-brazed) to a metal collar or sleeve (e.g., collar or sleeve comprising stainless steel) using a pre-metallized-ceramic-to-metal braze (e.g., Ni-based, Al-based or Cu-based braze), forming a third layer (e.g., pre-metallized-ceramic-to-metal layer). If the protective layer is a metal, the metal may be selected such that it forms none or a small number (e.g., less than or equal to 1, 2 or 3) of intermetallic compounds (e.g., brittle intermetallic compounds) with the active layer and/or with the pre-metallized-ceramic-to-metal-collar/sleeve braze layer (also "pre-metallized-ceramic-to-metal layer" herein). The metal may be selected such that it does not form intermetallic compounds (e.g., brittle intermetallic compounds) with the active layer and/or with the pre-metallized-ceramic-to-metal-collar/sleeve braze layer. For example, using Re or Cr as the protective layer may result in metal-to-metal interfaces that include none or at most one (e.g., brittle) intermetallic compound (e.g., Cr may not form intermetallic compounds with Y or Ni, and Re may not form intermetallic compounds with Ni and may only form one intermetallic compound with Y). The protective layer may be selected based on its stability in air at the operating temperature of the seal and/or its stability when in the presence of (e.g., in contact with) the reactive material (e.g., reactive metal) contained within the housing. In an example, a braze joint comprises a layered structure with a bulk ceramic comprising $Nd_2O_3$ ceramic, a thin (e.g., sputter-coated or applied via yttrium hydride ($YH_3$)) layer comprising yttrium metal, a thin (e.g., sputter-coated) layer comprising chromium or rhenium, a layer comprising nickel and/or copper (e.g., applied via a brazing process that joins the chromium or rhenium layer to a metal collar or sleeve), and a metal collar or sleeve comprising stainless steel, nickel or nickel alloys. The layer adjacent to the metal collar or sleeve may comprise greater than or equal to about 10%, 20%, 30%, 40%, 50%, 60%, 70%, 72%, 74%, 76%, 78%, 80%, 82%, 84%, 86%, 88%, 90%, 92%, 94%, 96%, 98% or 99% Ni (e.g., by weight). The layer adjacent to the metal collar or sleeve may comprise such Ni compositions in combination with one or more other elements (e.g., Cr, Fe, Si, B and/or C) with individual concentrations or a total concentration of less than or equal to about 20%, 17.5%, 15%, 12.5%, 10%, 9%, 8%, 7%, 6%, 5%, 4.5%, 4%, 3.6%, 3.2%, 3%, 2%, 1%, 0.08%, 0.05% or 0.01% (e.g., by weight). The layer adjacent to the metal collar or sleeve may comprise greater than or equal to about 82% Ni (e.g., BNi-2 braze, BNi-5b braze or BNi-9 braze). The layer adjacent to the metal collar or sleeve may comprise a braze alloy with greater than about 30% Ti, 30% Cu, 90% Cu, 30% Al, 30% Ag or 80% Ag. A seal comprising copper may comprise a thin layer of Ni that is plated or applied to the exposed braze (e.g., copper) surfaces.

A pre-metallization layer (also "metallization layer" herein) may be applied by bonding (e.g., sintering, at least partially melting and/or otherwise joining) a metallization material (e.g., metallization powder) onto the surface of the ceramic material. The pre-metallization layer may comprise one or more layers (e.g., one or more sublayers, such as, for example, an active layer and a protective layer), and/or one or more constituents. In some cases, the pre-metallization layer can comprise separate active and protective layers. In some cases, the active layer can simultaneously be a protective layer (e.g., a separate protective layer may not be needed). A protective layer may or may not be considered part of the pre-metallization layer. The metallization material may comprise metal powder. The metal metallization powder may comprise one or more metals including, for example, manganese, molybdenum, tungsten, niobium, and/or tantalum. The metallization material (e.g., metallization powder) may comprise metal powder mixed with one or more other materials (e.g., polymers, organic dispersants, water-based solvents, ceramics, glass, or any combination thereof) to form a slurry or paint that can be applied to the ceramic (e.g., prior to melting). In an example, the ceramic material (e.g., AlN or $Nd_2O_3$) may be bonded to a layer of metallization powder comprising tungsten particles by heating to at least about 1000° C., 1200° C., 1400° C., 1600° C., 1800° C. or 2000° C. The bonding may include sintering. The bonding may include at least partially melting one or more components of the metallization material (e.g., thereby aiding the sintering). For example, in some Mo—Mn metallization powders that comprise mostly Mo, the Mn may form some liquid phase during the metallization process and then constitutionally freeze and alloy with Mo, thus partially melting the metallization powder during the process. Partially melting the metallization powder in this way may aid in fully sintering the metallization layer onto the ceramic. Other examples of Mo—Mn metallization powders may include low melting point alloys; such alloys may or may not be suitable as metallization powders. After bonding the metallization powder to the ceramic, the metallization layer (e.g., tungsten (W)) may be plated with nickel. In another example, the metallization powder (e.g., manganese (Mn) and/or molybdenum (Mo)) may be bonded (e.g., sintered, at least partially melted), for example, near or above (e.g., at greater than or equal to) about 1330° C., 1400° C., 1500° C., 1550° C. or 1600° C. After the metallization powder is bonded to the ceramic material, it may be coated or plated with Ni to decrease or prevent corrosion or oxidation.

The metallization layer may comprise one or more primary metal constituents that may be chosen based on a CTE that closely matches a ceramic material (e.g., $Nd_2O_3$), a low Young's modulus, stability in air at elevated (e.g., operating) temperatures, or any combination thereof. In some examples, a difference between a CTE of the ceramic material and a CTE of the primary metallization metal constituent may be less than or equal to about 3 ppm/K, 2 ppm/K, 1.5 ppm/K, 1 ppm/K, 0.5 ppm/K, 0.25 ppm/K, 0.1 ppm/K or 0.025 ppm/K. In some examples, a CTE of a primary metallization metal constituent may be less than or equal to about 6.5 ppm/K, 7 ppm/K, 7.5 ppm/K, 8 ppm/K, 8.5 ppm/K, 9 ppm/K, 9.5 ppm/K, 10 ppm/K, 10.5 ppm/K, 11 ppm/K, 11.5 ppm/K or 12 ppm/K. The CTEs may be for a temperature range of, for example, between about 20° C. and 1000° C., or 20° C. and 500° C. A primary metallization metal constituent may have or be chosen based on a low Young's modulus value. A primary metallization metal constituent may have or be chosen based on a Young's modulus value of, for example, less than about 200 giga-Pascals (GPa), 150 GPa, 100 GPa, 75 GPa or 50 GPa. The primary metallization metal constituent may be, for example, niobium (Nb) or tantalum (Ta). The metallization material may also include one or more secondary metallization metals. The secondary metallization metals may improve physical, thermal, chemical and/or mechanical properties, such as, for example, stability in air at or above the target service temperature or operating temperature of the device (e.g., a temperature of at least about 500° C., 550° C., 600° C., 650° C., 700° C., 800° C. or 900° C.). The secondary metallization metals may include, for example, Ti, Al, Cr, Mo, Ta, Nb and/or Ni. The resulting metallization metal alloy may comprise Nb with greater than or equal to about 20 atomic-% (at %) Ti, 5 at % Mo, 2 at % Mo, 5 at % Al, 5 at % Ni, 10 at % Si and/or 5 at % Cr. In some examples, the metallization metal alloy comprises greater than or equal to about 50 at % Nb, 60 at % Nb, 70 at % Nb, 80 at % Nb, 90 at % Nb, or 95 at % Nb. In some examples, the metallization metal alloy comprises about 95 at % Nb and 5 at % Mo, 20 at % Ti and 80% Nb, 40 at % Ti and 60 at % Nb, 90 at % Nb and 5 at % each of Mo and Ni, or 80 at % Nb and 20 at % Al. In an example, Nb may have a CTE that closely matches $Nd_2O_3$ and a low Young's modulus (high elasticity), and may be made air stable by alloying with, for example, Ti, Mo, Al or Cr.

The metallization powder may comprise one or more ceramic or glass constituents. A ceramic or glass constituent may react with the ceramic material of the seal (also "seal ceramic material" herein) to form one or more (e.g., new) ceramic or glass materials (e.g., compounds such as, for example, mutual reaction compounds of the ceramic material and the ceramic or glass constituent of the metallization powder) that may, for example, aid in creating a mechanical bond between the pre-metallization layer and the ceramic material. In an example, the seal ceramic material comprises AlN and the metallization powder comprises at least about 10% Mn, at least about 10%, 20%, 50%, or 70% Mo and at least about 2%, 5%, 10% 15% or 20% $Nd_2O_3$. After the pre-metallization, the seal may comprise a layered structure including the bulk AlN seal ceramic material, a layer comprising $Nd_2AlO_3N$ ceramic (e.g., formed as AlN+ $Nd_2O_3 \rightarrow Nd_2AlO_3N$ during melting and/or bonding of the seal ceramic material and the metallization powder) and a layer comprising Mn and/or Mo. In another example, the seal ceramic material comprises $Nd_2O_3$ and the metallization powder comprises at least about 10% Mn, at least about 10% Mo and at least about 2% AlN. After the pre-metallization, the seal may comprise a layered structure including the bulk $Nd_2O_3$ seal ceramic material, a layer comprising $Nd_2AlO_3N$ ceramic (e.g., formed as $Nd_2O_3$+ AlN→$Nd_2AlO_3N$ during melting and/or bonding of the seal ceramic material and the metallization powder) and a layer comprising Mn and/or Mo. The bulk seal ceramic material, the layer comprising $Nd_2AlO_3N$ ceramic (e.g., an active layer) and the layer comprising Mn and/or Mo (e.g., a protective layer) may form a pre-metallized ceramic component. At least one of the metallization layers (e.g., the active layer) may comprise one or more reaction products of the seal ceramic material and the metallization powder. In some cases, the metallization powder may comprise Nb metal and/or a Nb metal alloy mixed with a ceramic powder (e.g., $Nd_2O_3$, AlN, $Y_2O_3$, SrO, MgO, $Al_2O_3$ or $TiO_2$). For example, the metallization layer may comprise a Nd alloy (e.g., about 95 at % Nb and about 5 at % Mo, about 90% Nb and about 5 at % each of Mo and Ni, or about 80 at % Nb and about 20 at % Ti) with at least about 5 mol %, 10 mol % or 15 mol % $Nd_2O_3$ ceramic powder. In some cases, a size of the metallization powder particles or a resulting metal or ceramic grain size may be less than about 1 micrometer (µm), 5 µm, 10 µm, 15 µm, 20 µm, 30 µm, 40 µm, 50 µm, 60 µm, 80 µm, 100 µm, 150 µm or 500 µm. In some cases, open porosity of the metallization layer may be less than about 50%, 30%, 20%, 10%, 5%, 2%, 1% or 0.5%.

The seal may further comprise one or more additional layers (e.g., coated or plated onto the pre-metallized ceramic component or on each other). For example, the seal may further comprise one or more plated and/or brazed layers of Ni, Ni alloy and/or Cu. The pre-metallized layer (e.g., a pre-metallized layer comprising $Nd_2AlO_3N$ and Mn and/or Mo sublayers, or a pre-metallized layer comprising W) may be Ni-plated (e.g., plated with Ni to prevent one or more portions of the pre-metallized layer such as, for example, tungsten, from oxidizing). This Ni-plated layer may be relatively thin. For example, the seal ceramic material may be metallized with Mo/Mn and the metallization layer may then be Ni-plated, or the seal ceramic material may be metallized with W and the metallization layer may then be Ni-plated. The Ni-plated layer (the Ni-plated pre-metallized ceramic component) may then be brazed to a metal (e.g., Fe—Ni alloy, Ni or SS) collar or sleeve using a braze comprising Cu or Ni (e.g., Cu, Ni or Ni alloy braze, such as for example, a Cu braze foil, a Cu paste, a BNi-2, BNi-5b or BNi-9 braze foil or a BNi-based braze paste). This braze layer may be thicker than the Ni-plated layer. When using a Cu braze, the brazed assembly may be Ni-plated after the brazing process (e.g., to cover the exposed Cu and/or to prevent the Cu from oxidizing or electromigrating). For example, after brazing with a Cu braze foil or paste, the braze joint may have some Cu exposed (e.g., on the edge of the braze and metal collar/sleeve joint). Such exposed metal surfaces may be Ni-plated (e.g., to ensure that the Cu is adequately covered to prevent Cu-electromigration).

The ceramic-to-metal seal joint may comprise metallization material comprising Mn and/or Mo that is bonded to the seal ceramic material. The metallization material may also comprise one or more ceramic or glass constituents. The metallization material may be bonded to the seal ceramic material using, for example, a high temperature process. For example, the ceramic-to-metal seal joint may comprise $Nd_2O_3$ as the seal ceramic material, a first metallization layer (e.g., an active layer) comprising $Nd_2AlO_3N$, a second metallization layer (e.g., a protective layer) comprising Mn, Mo, Nb, Ta and/or W, a first layer comprising Ni (e.g., a thin layer of Ni that is plated), a second layer comprising Ni (e.g., Ni alloy) or Cu (e.g., a braze layer of Ni, Ni alloy or Cu that may be thicker than the first layer), and a metal collar or sleeve (e.g., comprising greater than or equal to about 95% or 99% Ni, a Ni—Fe alloy, 18CrCb ferritic stainless steel, 441 stainless steel, Inconel 600, ATI alloy 600, Hastelloy S, or another stainless steel grade). In some cases, when the second layer comprises Cu, at least a portion of the second layer (e.g., the portion that is not covered by the metal collar or sleeve or by the first layer) may be covered by a third layer comprising Ni (e.g., another thin layer of Ni that is plated). In some cases, the second layer may comprise greater than or equal to about 82% Ni (e.g., BNi-2, BNi-9 braze or BNi-5b braze).

The ceramic-to-metal seal joint may comprise metallization material comprising W that is bonded to the seal ceramic material. The metallization material may or may not also comprise one or more ceramic or glass constituents (e.g., the tungsten may in some cases be bonded without an oxide bonding layer, without a glass frit and/or without being mixed with a ceramic). The metallization material may be bonded to the seal ceramic material using, for example, a high temperature process. For example, the ceramic-to-metal seal joint may comprise AlN or $Nd_2O_3$ as the seal ceramic material, a metallization layer (e.g., an active/protective layer) comprising W, a first layer comprising Ni (e.g., a thin layer of Ni that is plated), a second layer comprising Ni (e.g., Ni alloy) or Cu (e.g., a braze layer of Ni, Ni alloy or Cu that may be thicker than the first layer), and a metal collar or sleeve (e.g., comprising greater than or equal to about 95% or 99% Ni, a Ni—Fe alloy, or a stainless steel). In some cases, when the second layer comprises Cu, at least a portion of the second layer (e.g., the portion that is not covered by the metal collar or sleeve or by the first layer) may be covered by a third layer comprising Ni (e.g., another thin layer of Ni that is plated). In some cases, the second layer may comprise greater than or equal to about 82% Ni (e.g., BNi-2, BNi9 or BNi-5b braze).

In some implementations, a ceramic-to-metal brazed joint may be formed by a metallization process followed by a brazing process. In some implementations, the metallization step may not be needed and the ceramic-to-metal brazed joint may be formed directly by an active braze step (e.g., using a Ti-containing braze).

The ceramic-to-metal seal joint may comprise a $Nd_2O_3$ ceramic material, a metallization layer, a braze layer, and a metal sleeve or collar. The ceramic material, metallization layer, braze layer, and metal sleeve or collar may be sequentially bonded to each other to form a gas-tight bonded barrier/interface. For example, the ceramic-to-metal joint may include a ceramic material comprising $Nd_2O_3$ which is bonded to a metallization layer comprising niobium (e.g., Nb—Ti, Nb—Mo, Nb—Ni or Nb—Mo—Ni) and which may also be interspersed with ceramic particles (e.g., $Nd_2O_3$, AlN, $Y_2O_3$, $TiO_2$ and/or CaO), a braze layer (e.g., a Ni-based braze alloy, such as, for example, BNi-2, BNi-9 or BNi-5b braze), and a metal sleeve or collar (e.g., Fe— or Ni-based metal alloy, 18CrCb ferritic stainless steel, 441 stainless steel, Inconel 600, ATI alloy 600, Hastelloy S or alloy 52). In an example, the ceramic-to-metal joint may include a ceramic comprising $Nd_2O_3$ (e.g., $Nd_2O_3$ with greater than or equal to about 5 wt % SiC, 5 wt % $ZrO_2$ and/or 3 wt % $Y_2O_3$, or AlN with greater than or equal to about 3% $Nd_2O_3$), a Nd—Mo—Ni metallization layer (e.g., comprising about 85% Nb, 10% Mo and 5% Ni) interspersed with about 10 wt % $Nd_2O_3$ ceramic powder (e.g., with grain size less than about 100 microns), a braze alloy layer of BNi-2, BNi-9 or BNi-5b braze alloy, and a metal sleeve or collar (e.g., 18CrCb ferritic stainless steel, 441 stainless steel, ATI alloy 600, Hastelloy S or Inconel 600). The ceramic material layer may have a thickness of greater than about 1 mm, the metallization layer may have a thickness of less than or equal to about 50 µm, the braze alloy layer may have a thickness of less than or equal to about 100 µm, and the metal sleeve or collar may have a thickness of greater than or equal to about 100 µm.

The ceramic-to-metal seal joint may comprise $Nd_2O_3$ ceramic material, a titanium-containing braze alloy (e.g., Ni alloys comprising Ti, Al and/or Si, such as, for example, Ni with about 27 wt % Ti and about 10 wt % Al), and a metal sleeve or collar material (e.g., alloy 52, 18CrCb ferritic stainless steel, 441 stainless steel, Inconel 600, ATI alloy 600 or Hastelloy S). In an example, the ceramic-to-metal joint may include an $Nd_2O_3$ ceramic material (e.g., $Nd_2O_3$ with greater than or equal to about 5 wt % SiC, 5 wt % $ZrO_2$ and/or 3 wt % $Y_2O_3$), a Ni—Ti—Al braze alloy layer, and a metal sleeve or collar of 18CrCb ferritic stainless steel. The ceramic material layer may have a thickness of greater than about 1 mm thickness, the metallization layer may have a thickness of less than or equal to about 25 µm, the braze alloy layer may have a thickness of less than or equal to about 100 µm, and the metal sleeve or collar may have a thickness of greater than or equal to about 75 µm.

Other suitable brazing material(s) may be added to the braze to improve chemical stability, change the melting temperature, or change mechanical properties (e.g., change the CTE of the braze, change the ductility of the braze, etc.). One or more layers may be formed under modified conditions (e.g., in a surrounding atmosphere with a different composition or in the presence of a suitable reactive material). Such modifications may alter the composition of the aforementioned layered structure. The metal collar or sleeve may in some cases be substituted by a different metal component (e.g., cell lid or body comprising stainless steel) and/or combined with an additional metal component. Any aspects of the disclosure described in relation to ceramic-to-metal joints comprising a metal collar or sleeve may equally apply to ceramic-to-metal joints comprising a metal component other than the metal collar or sleeve (e.g., a cell lid or body) at least in some configurations.

The ceramic material may comprise a main (also "primary" herein) ceramic material (e.g., AlN, $Nd_2O_3$ or $Y_2O_3$) and a secondary ceramic material that is also thermodynamically stable, such as, for example, $Y_2O_3$, $La_2O_3$ and/or any other ceramic material described herein (e.g., AlN, $Be_3N_2$, BN, $Ca_3N_2$, $Si_3N_4$, $Al_2O_3$, BeO, CaO, $Ce_2O_3$, $Er_2O_3$, MgO, $Nd_2O_3$, $Sm_2O_3$, $Sc_2O_3$, $Yb_2O_3$, $ZrO_2$, YPSZ, $B_4C$, SiC, TiC, ZrC, $TiB_2$, chalcogenides, quartz, glass, or any combination thereof). The main ceramic material (e.g., AlN or $Nd_2O_3$) may comprise, for example, greater than or equal to about 0.1%, 0.5%, 1%, 2%, 3%, 4%, 5%, 6%, 7%, 8%, 9%, 10%, 15%, 20%, 25%, 30%, 35%, 40%, or 45% of the secondary ceramic material (or a combination of secondary materials) by weight (or, in some cases, by mole or by volume). In some instances, the secondary ceramic material serves to improve one or more characteristics of the ceramic (e.g., increase the strength of the ceramic) by, for example, lowering a sintering temperature of the ceramic (e.g., thereby reducing the grain size), by forming a glassy phase between the grains of the main ceramic material to promote tortuous crack growth path, and/or by one or more other strengthening mechanisms for ceramic toughening. One or more of such strengthening mechanisms may increase the energy required for a crack to propagate. In some cases, the primary and/or secondary ceramic materials may have different dimensions, geometries, aspect ratios and/or other characteristics (e.g., regardless of the particle sizes). For example, a secondary ceramic material may be in a form that increases the strength of the ceramic, such as cuboidal-like shapes, spherical particles, elongated needle-like structures, whiskers, rods and/or other suitable form(s). Elongated shapes, such as, for example, needle-like structures, whiskers and/or rods, may have an aspect ratio (e.g., the ratio between the smallest dimensional length and the longest dimensional length) of at least about 10, 20, 50, 100, 200, 500 or 1000. The secondary ceramic material (e.g., $Y_2O_3$ and/or SiC added to AlN) may increase the strength of the primary ceramic material by at least about 0.1%, 0.5%, 1%, 2%, 3%, 4%, 5%, 6%, 7%, 8%, 9%, 10%, 15%, 20%, 25%, 30%, 40%, 50%, 60%, 70%, 80%, 90%, 100%, 120%, 140%, 160%, 180%, 200%, 250%, 300%, 350%, 400%, 450%, 500%, 600%, 700%, 800%, 900%, 1000%, and the like. A ceramic material comprising two or more ceramic material components (e.g., a primary ceramic material and a secondary ceramic material) may substitute a ceramic material comprising a single ceramic material component at least in some configurations, and vice versa.

The ceramic material may be densified (e.g., a material comprising separable powder particles may be converted to a more mechanically robust material where the particles have fused together) through high temperature processes such as, for example, sintering. In some cases, densification (e.g., sintering) may be performed to reduce an amount of porosity (e.g., percentage of volume within the bulk of a ceramic material not occupied by the ceramic material) from greater than or equal to about 50% (in an un-sintered sample) to less than or equal to about 10%, 9%, 8%, 7%, 6%, 5%, 4%, 3%, 2%, 1.5%, 1%, 0.75%, 0.5%, 0.25% or 0.1%. In some cases, the densified ceramic material may have a density that is greater than or equal to about 85%-of-theoretical-density (% TD), 90% TD, 92% TD, 94% TD, 96% TD, 98% TD or 99% TD (e.g., greater than about 96% TD). In some instances (e.g., at levels greater than about 96% TD for some materials), pores may no longer be connected to one another, the material may be substantially gas-tight and/or rates of corrosion may be considerably reduced (e.g., the density may reach "close pore" density). The sintering temperature and/or sintering time may differ depending on sintering conditions (e.g., under different atmospheres). The sintering temperature may be related to the sintering time (e.g., a lower sintering temperature may require a longer sintering time). The sintering temperature of the ceramic may be at least about 1000° C., 1200° C., 1300° C., 1400° C., 1500° C., 1600° C., 1700° C., 1800° C., 1900° C. or 2000° C. under different atmospheres (e.g., air, nitrogen or argon). The sintering time of the ceramic (e.g., at such temperatures and/or under different atmospheres) may be at least about 10 minutes (min), 20 min, 30 min, 40 min, 50 min, 60 min, 70 min, 80 min, 90 min, 100 min, 110 min, 120 min, 180 min, 240 min or 300 min. For example, the ceramic may be sintered at a sintering temperature of at least about 1000° C., 1200° C., 1300° C., 1400° C., 1500° C., 1600° C., 1700° C., 1800° C., 1900° C. or 2000° C. under different atmospheres (e.g., air, nitrogen or argon) for a period of at least about 10 minutes (min), 20 min, 30 min, 40 min, 50 min, 60 min, 70 min, 80 min, 90 min, 100 min, 110 min, 120 min, 180 min, 240 min or 300 min. Sintering may be performed at a pressure of at less than or equal to about 0.1 atm, 0.5 atmospheres (atm), 0.95 atm, 1 atm, 2 atm, 5 atm, 10 atm, 25 atm, 50 atm, 75 atm, 100 atm, 200 atm, 500 atm, 1000 atm, 2000 atm, 5000 atm, 10,000 atm, 20,000 atm, 50,000 atm or 100,000 atm (e.g., at such temperatures and/or under different atmospheres).

Sintering may be combined (or in some cases replaced) with one or more other processing steps. Such processing steps may be applied before, during and/or after sintering. The processing may include, for example, one or more manufacturing processes used to reduce the porosity and/or increase the density of a material. Manufacturing processes applied to one type of material (e.g., metal) may in some cases be advantageously applied to another type of material (e.g., ceramic). In some cases, the sintering process may involve a "hot press" procedure where the ceramic powder is heated to an elevated temperature in a controlled atmosphere (e.g., deep vacuum, partial vacuum, or a gas comprising Ar, $N_2$ and/or $H_2$) while a uniaxial force is applied to the ceramic to, for example, increase the rate of sintering, decrease the time it takes to reach a given density (e.g., near or about 100% density), and/or decrease the sintering temperature. The uniaxial force may be, for example, at least about 0.01 MPa, 0.1 MPa, 1 MPa, 10 MPa, 20 MPa, 30 MPa, 50 MPa, 100 MPa, 500 MPa or 1000 MPa. In some cases, a hot isostatic press (also known as a "HIP" processing) may be applied to the ceramic (e.g., after sintering). The hot isostatic press may be applied to the ceramic directly after sintering. The hot isostatic press may be applied to the ceramic at a temperature of less than or equal to about 1000° C., 1200° C., 1300° C., 1400° C., 1500° C., 1600° C., 1700° C., 1800° C., 1900° C. or 2000° C. The hot isostatic press may be applied to the ceramic (e.g., at such temperatures) at a pressure of at least about 10 atm, 50 atm, 100 atm, 200 atm, 500 atm, 1000 atm, 2000 atm, 5000 atm, 10,000 atm, 20,000 atm, 50,000 atm or 100,000 atm. The hot isostatic press may be applied to the ceramic (e.g., at such temperatures and/or pressures) for a period of at least about 10 min, 20 min, 30 min, 40 min, 50 min, 60 min, 70 min, 80 min, 90 min, 100 min, 110 min, 120 min, 180 min, 240 min or 300 min. For example, the hot isostatic press may be applied to the ceramic by changing the temperature to less than or equal to about 1000° C., 1200° C., 1300° C., 1400° C., 1500° C., 1600° C., 1700° C., 1800° C., 1900° C. or 2000° C. and increasing the pressure to at least about 10 atm, 50 atm, 100 atm, 200 atm, 500 atm, 1000 atm, 2000 atm, 5000 atm, 10,000 atm, 20,000 atm, 50,000 atm or 100,000 atm for a period of at least about 10 min, 20 min, 30 min, 40 min, 50 min, 60 min, 70 min, 80 min, 90 min, 100 min, 110 min, 120 min, 180 min, 240 min or 300 min.

The ceramic material may have a porosity (e.g., after densification by sintering) of less than or equal to about 5%, 4.5%, 4%, 3.5%, 3%, 2.5%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0.009%, 0.008%, 0.007%, 0.006% or 0.005% (e.g., less than about 1% or 0.5%).

In some instances, the ceramic comprises a main ceramic material (e.g., greater than about 50, 60, 70, 80, 90, 95 or more weight-%) that is thermodynamically stable with the contents of the cell (e.g., the reactive metal and molten salt), and a secondary ceramic material (e.g., MgO) that is not stable (e.g., not stable with the contents of the cell, and/or not stable with the atmosphere outside the cell) at sufficiently low quantities (e.g., less than about 40%, 35%, 30%, 25%, 20%, 15%, 10% or 5% on a weight, atomic, molar or volumetric basis). The secondary ceramic material may be present (e.g., exist) as particles dispersed throughout the bulk of the main ceramic material (e.g., in such a way that most of the secondary ceramic particles are not in direct contact with other secondary ceramic particles). In some cases, the secondary ceramic material particles may strengthen the overall ceramic material by establishing local regions of stress concentration to promote crack tip deflection and/or crack tip pinning. In some cases, the secondary ceramic material may be added to the main ceramic material to tune the CTE of the overall ceramic material to more closely match the CTE of the metal collar or sleeve and/or cell lid or body. In some cases, the secondary ceramic material may be added to the main ceramic material to increase overall strength. For example, the secondary ceramic material may be added to the main ceramic material to increase overall strength by existing in a phase-transformation-able state that absorbs energy as cracks propagate through the ceramic (e.g., yttria-stabilized $ZrO_2$ with about 3 mol % $Y_2O_3$). When exposed to reactive metal(s) and/or molten salt(s) and/or air, the secondary ceramic particle on the surface may be attacked, but the secondary ceramic particles dispersed throughout the bulk of the main ceramic material may not be attacked, thus enabling the ceramic material to be chemically stable when exposed to the reactive metal(s) and/or molten salt(s).

The ceramic material (also "ceramic" herein) may comprise a primary (also "main" herein) ceramic material and one or more secondary ceramic materials. In some examples, the ceramic material comprises a primary ceramic material (e.g., yttrium oxide ($Y_2O_3$), neodymium oxide ($Nd_2O_3$) or aluminum nitride (AlN)) and greater than or equal to about 0.1%, 0.5%, 1%, 2%, 3%, 4%, 5%, 6%, 7%, 8%, 9%, 10%, 12%, 12.5%, 15%, 20%, 25%, 30%, 35%, 40% or 45% by weight (also "weight percent," "wt %" or "weight-%" herein) of a secondary ceramic material (e.g., aluminum nitride (AlN), beryllium nitride ($Be_3N_2$), boron nitride (BN), calcium nitride ($Ca_3N_2$), silicon nitride ($Si_3N_4$), aluminum oxide ($Al_2O_3$, also "alumina" herein), beryllium oxide (BeO), calcium oxide (CaO), cerium oxide ($Ce_2O_3$), erbium oxide ($Er_2O_3$), lanthanum oxide ($La_2O_3$), magnesium oxide (MgO, also "magnesia" herein), yttrium oxide ($Y_2O_3$, also "yttria" herein), neodymium oxide ($Nd_2O_3$, also "neodymia" herein), samarium oxide ($Sm_2O_3$), scandium oxide ($Sc_2O_3$), yttrium oxide ($Yb_2O_3$, also "yttria" herein), zirconium oxide ($ZrO_2$, also "zirconia" herein), yttria partially stabilized zirconia (YPSZ), tetragonal zirconia polycrystal (TZP), e.g., tetragonal crystal structure $ZrO_2$ with about 3 mol % $Y_2O_3$), boron carbide ($B_4C$), silicon carbide (SiC), titanium carbide (TiC), zirconium carbide (ZrC), titanium diboride ($TiB_2$), chalcogenides, quartz, glass, or any combination thereof). In some examples, the ceramic material comprises a primary ceramic material and less than about 0.1%, 0.5%, 1%, 2%, 3%, 4%, 5%, 6%, 7%, 8%, 9%, 10%, 12%, 12.5%, 15%, 20%, 25%, 30%, 35%, 40% or 45% by weight of a secondary ceramic material. A given ceramic material (e.g., $Y_2O_3$, $Nd_2O_3$ or AlN) may be a primary ceramic material in some instances and a secondary ceramic material in other instances. In some examples, the ceramic comprises a primary ceramic material (e.g., $Y_2O_3$, $Nd_2O_3$ or AlN) with greater than or equal to about 0.1%, 0.5%, 1%, 2%, 3%, 4%, 5%, 6%, 7%, 8%, 9%, 10%, 12%, 12.5%, 15%, 20%, 25%, 30%, 35%, 40% or 45% by weight of a secondary ceramic material (or a combination of secondary ceramic materials). In some examples, the ceramic comprises a primary ceramic material (e.g., $Y_2O_3$, $Nd_2O_3$ or AlN) with less than about 0.1%, 0.5%, 1%, 2%, 3%, 4%, 5%, 6%, 7%, 8%, 9%, 10%, 12%, 12.5%, 15%, 20%, 25%, 30%, 35%, 40% or 45% by weight of a secondary ceramic material (or a combination of secondary ceramic materials). The ceramic material may be substantially or wholly formed of the primary ceramic material. The amount/level/concentration of the secondary ceramic material may apply to an individual secondary ceramic material (e.g., the amount of the secondary ceramic material may apply to each individual secondary ceramic material, the ceramic material may comprise individual secondary ceramic materials in the same or different amounts, etc.) in a mixture of secondary ceramic materials, or to the secondary ceramic material mixture as a whole. Such compositions may be provided, for example, using primary and/or secondary ceramic material(s) that comprise grains (e.g., grains of given grain size(s)).

Other additives may also be included in the ceramic material and/or the secondary ceramic material(s) at lower amounts/levels (e.g., as other smaller percentage additives). Such amount/levels may be, for example, less than or equal to about 3%, 2.5%, 2%, 1.8%, 1.6%, 1.4%, 1.2%, 1%, 0.9%, 0.8%, 0.7%, 0.6%, 0.5%, 0.4%, 0.3%, 0.2%, 0.1%, 0.05%, 0.025%, 0.01% or 0.005% (e.g., wt % or mol %) of the ceramic material, or of one or more secondary ceramic materials. In an example, SiC secondary ceramic material may contain less than or equal to about 2% carbon and less than or equal to about 0.5% boron. In another example, TZP may comprise less than or equal to about 3 mol % $Y_2O_3$ and/or less than or equal to about 0.1-0.4 wt % $Al_2O_3$.

The ceramic material may comprise $Nd_2O_3$. The ceramic material may comprise a primary ceramic material (e.g., $Nd_2O_3$), and one or more secondary ceramic materials (e.g., $Y_2O_3$, SiC, AlN, TiC, $ZrO_2$, TZP, or any combination thereof). The ceramic material may be substantially or wholly formed of the primary ceramic material. The ceramic material may comprise various levels of secondary ceramic material(s). For example, the ceramic material may comprise a first secondary ceramic material and a second secondary ceramic material. The ceramic material may comprise the first secondary ceramic material (e.g., $Y_2O_3$) at a concentration greater than or equal to about 3 wt %, 5 wt % or 10 wt %. As an alternative, the ceramic material may comprise the first secondary ceramic material (e.g., $Y_2O_3$) at a concentration less than about 10 wt %, 5 wt % or 3 wt %. The ceramic material may comprise the first secondary ceramic material in combination with at least the second secondary ceramic material (e.g., SiC, AlN, TiC, $ZrO_2$ or TZP), the second secondary ceramic material being at a concentration greater than or equal to about 3 wt % or 5 wt %. As an alternative, the ceramic material may comprise the first secondary ceramic material in combination with at least the second secondary ceramic material (e.g., SiC, AlN, TiC, $ZrO_2$ or TZP), the second secondary ceramic material being at a concentration less than about 5 wt % or 3 wt %. The ceramic material may comprise the second secondary ceramic material without the first secondary ceramic material. The first secondary material may be selected, for example, among the aforementioned one or more secondary materials (e.g., SiC, AlN, TiC, $ZrO_2$ or TZP may be selected instead of $Y_2O_3$). The second secondary material may then be suitably selected from the remainder of the one or more secondary ceramic materials. The ceramic material may comprise additional secondary ceramic materials (e.g., at similar or different concentrations). Such additional secondary ceramic materials may be selected, for example, among the aforementioned one or more secondary ceramic materials not selected as the first secondary ceramic material and the second secondary ceramic material. The ceramic material and/or the secondary ceramic material(s) may comprise one or more additives as described elsewhere herein.

The ceramic material may have a tensile yield strength greater than or equal to about 50 MPa, 100 MPa, 150 MPa, 200 MPa, 250 MPa, 300 MPa, 350 MPa, 400 MPa, 450 MPa, 500 MPa, 550 MPa, 600 MPa, 700 MPa, 800 MPa, 900 MPa or 1000 MPa.

There are various examples of such ceramic material compositions. The ceramic material may comprise $Nd_2O_3$ (e.g., greater than about 30 wt % $Nd_2O_3$), and greater than or equal to about 3 wt % SiC. The ceramic material may comprise $Nd_2O_3$ (e.g., greater than 30 wt % $Nd_2O_3$), and greater than or equal to about 3 wt % $Y_2O_3$ and/or greater than or equal to about 3 wt % SiC. The ceramic material may comprise $Nd_2O_3$ (e.g., greater than about 30 wt % $Nd_2O_3$), and greater than or equal to about 3 wt % $Y_2O_3$ and/or greater than or equal to about 5% SiC. The ceramic material may comprise $Nd_2O_3$ (e.g., greater than about 30 wt % $Nd_2O_3$), and less than or equal to about 3 wt % $Y_2O_3$ and/or greater than or equal to about 5% SiC. The ceramic material may comprise $Nd_2O_3$ (e.g., greater than about 30 wt % $Nd_2O_3$), and less than or equal to about 5 wt % SiC. The ceramic material may comprise $Nd_2O_3$, and less than or equal to about 5 wt % $Y_2O_3$ and/or less than or equal to about 5 wt % SiC. The ceramic material may comprise $Nd_2O_3$, and less than or equal to about 5 wt % $Y_2O_3$ and/or greater than or equal to about 5 wt % SiC. The ceramic material may comprise $Nd_2O_3$, and less than or equal to about 10 wt % $Y_2O_3$ and/or greater than or equal to about 5 wt % SiC. The ceramic material may comprise $Nd_2O_3$, and less than or equal to about 10 wt % $Y_2O_3$ and/or less than about 5 wt % SiC. In an example, the ceramic material comprises $Nd_2O_3$, and less than about 5 wt % $Y_2O_3$ and greater than about 5 wt % SiC. The ceramic material may comprise $Nd_2O_3$ (e.g., greater than about 30 wt % $Nd_2O_3$), and greater than or equal to about equal to 5 wt % TiC. The ceramic material may comprise $Nd_2O_3$ (e.g., greater than about 30 wt % $Nd_2O_3$), and greater than or equal to about 5 wt % TiC and greater than or equal to about 3 wt % $ZrO_2$.

The composition of a material (e.g., ceramic material) may be described, defined and/or specified in various ways. The composition of a ceramic material may be specified in terms of the composition of the raw materials (e.g., powders) used to create the ceramic material. For example, if a ceramic material is fabricated from and/or comprises about 90 wt % $Nd_2O_3$ powder, 5 wt % TZP powder and 5 wt % SiC powder, the ceramic material composition may be specified in terms of its constituents as about 90 wt % $Nd_2O_3$, 5 wt % TZP and 5 wt % SiC. During the sintering process (e.g., hot pressing or HIP), the constituents may change phase and/or interact with each other. For example, TZP may interact with $Nd_2O_3$ in one or more ways, including, for example, forming $Nd_2Zr_2O_7$ as a separate phase from both TZP and $Nd_2O_3$, and/or diffusing into the $Nd_2O_3$ crystal structure. During diffusion into the $Nd_2O_3$ crystal structure, the Zr atoms may substitutionally replace Nd atoms in the crystal structure to create a mixed composition with a crystal structure similar to the $Nd_2O_3$ crystal structure (e.g., $(Nd,Zr)_2O_3$). In some cases, more than two metal elements may exist in the same crystal structure (e.g., $Y_2O_3$ and $ZrO_2$ may both diffuse into the $Nd_2O_3$ crystal structure to make $(Nd,Zr,Y)_2O_3$). In an example, the ceramic material may comprise greater than about 30 wt % $Nd_2O_3$, and less than or equal to about 5 wt % $Y_2O_3$, at greater than or equal to about 15 wt % $Nd_2Zr_2O_7$, and greater than or equal to about 5 wt % SiC. Such a composition of crystal structures/phases (or at least a subset thereof) may result from sintering and/or may be used in as a raw material.

As evidenced, for example, by the presence and amounts of the remaining old phase (e.g., TZP), new phase (e.g., $Nd_2Zr_2O_7$) and changed neighboring phase(s) (e.g., $(Nd,Zr)_2O_3$), the composition of a sintered ceramic material may be specified in multiple ways in addition to (or based on) the composition of the raw materials (e.g., powders) used to make a ceramic material.

In one approach, the composition of a ceramic material may be specified in terms of the atomic percent (also "atomic-%" and "at %" herein) of an element in the ceramic material (e.g., in the final (e.g., sintered) ceramic material). For example, the atomic percentage of Nd, Y, Zr, O, Si and/or C atoms in a ceramic material may be measured and used as a way to specify the composition of the ceramic material. Methods for measuring atomic percentages in a material may include, for example, mass spectroscopy (e.g., inductively coupled plasma mass spectroscopy (ICP-MS)) and/or other established analytical techniques. Some techniques, such as ICP-MS, may include dissolving a material in a solution (e.g., aqueous and/or acidic bath containing $H_2O$), thus making it difficult to determine the relative atomic percent of certain elements (e.g., H, O). The composition of the ceramic material may therefore be specified by measuring the "relative" atomic percentages of a group of elements (e.g., metals, or a list of elements excluding O, H, C, and/or N). In an example, a ceramic material is specified in terms of the atomic percentages of metallic elements or a subset of all the elements (e.g., elements excluding H, C, O, N). Other techniques (e.g., combustion and infrared detection, inert gas fusion, vacuum hot extraction, etc.) may be used to detect remaining atoms (e.g., H, C, O, N) present in the ceramic material. In some instances, multiple different analytical techniques can be used on different portions of the same material to determine atoms present and establish an accurate atomic percentage composition measurement of all elements present.

Another approach to specifying the composition of a ceramic material may include specifying the crystal structures present as measured through some analytical technique (e.g., X-ray diffraction (XRD)). Crystal structure analysis may provide estimates of the composition of the material, but may not reach desired levels of precision of each measured phase. For example, a ceramic material fabricated from 85 wt % $Nd_2O_3$, 5 wt % $Y_2O_3$, 5 wt % TZP and 5 wt % SiC may be analyzed using crystal structure analysis (e.g., XRD). The analysis may detect the presence of $Nd_2O_3$, $Nd_2Zr_2O_7$, $(Nd,Zr)_2O_3$, $Y_2O_3$, $SiO_2$, $NdC_2$ and/or SiC crystal structures; however, this process may not be able to provide sufficiently precise relative amounts (e.g., the analysis may be unable to resolve within less than about 2% or 10% of each crystal structure present in a sample). The composition of the ceramic material may therefore be specified by specifying which crystal structures are present in the ceramic material (e.g., in the final ceramic material) and the relative atomic percentages (either based on all types of elements in the sample, or based on a subset of elements, such as, for example, the relative percentages of metals in the sample). For example, the composition of a material comprising 85 wt % $Nd_2O_3$, 5 wt % $Y_2O_3$, 5 wt % TZP and 5 wt % SiC may be specified in terms of the relative wt %, vol % and/or mol % of raw materials, and/or may be specified as a material comprising $Nd_2O_3$, $Y_2O_3$, $(Nd,Zr,Y)_2O_3$, $NdZr_2O_7$ and/or SiC crystal structures with about 71 at % Nd, 6 at % Y, 17 at % Si and 6 at % Zr on a metals basis (excluding O and C atoms) or about 29 at % Nd, 3 at % Y, 7 at % Si, 7 at % C, 2 at % Zr and 52 at % O (accounting for all elements).

The relative atomic percentages of elements and/or metal may be calculated and/or determined based on the relative percentages of raw materials (compounds) in a given ceramic composition (e.g., in wt % or mol %). Compositions of ceramic materials specified herein in terms of the relative amounts of the raw materials (e.g., powders) used to fabricate the ceramic material may therefore also cover or include ceramic materials specified in terms of crystal structures present (e.g., in a final state) and/or atomic percentages (e.g., relative atomic percentages based on all elements present or on a subset of elements such as metals or elements excluding H, O and/or C). It will be appreciated that a ceramic composition specified herein in terms of a raw material composition may include or be equivalent to one or more ceramic compositions with (i) atomic percentages (e.g., atomic percentages as measured in the final ceramic material or in any intermediate states) corresponding to the raw material composition (e.g., specification of raw material(s) also covers the final material as specified in at %), (ii) one or more crystal structures (e.g., number and/or identity of crystal structures) resulting (e.g., after sintering) from the raw materials, or (iii) a combination thereof (e.g., if raw materials are specified then the final material can be specified). A given raw material composition may result in one or more final materials having the same atomic percentages, and the same or different crystal structure(s). For example, crystal structure(s) may depend on sintering conditions. Ceramic materials specified herein in terms of raw material compositions and/or atomic percentages may be understood to include final materials having any crystal structure(s). Such crystal structure(s) may be as described herein (e.g., in relation to TABLE 4). It will also be appreciated that a given final ceramic composition may be obtained using different raw materials. For example, different raw powders may be used to fabricate a ceramic material with the same final composition in atomic percent. The composition in atomic percentages (e.g., as specified, or as calculated based on raw material composition) may therefore be understood to define a ceramic material composition fabricated or manufactured from any raw material composition/mixture (e.g., from a raw material composition that includes $Nd_2Zr_2O_7$ as well as from (e.g., instead of) a raw material composition that includes $Nd_2O_3$ and $ZrO_2$). The ceramic material may have such atomic percentages at any point in time (e.g., during and after sintering, or throughout any other transformation). Further, it will be appreciated that a ceramic composition specified in terms of, for example, intermediate crystal structures (e.g., crystal structures present at any point during sintering and/or other transformation) may be the same ceramic composition as specified herein in terms of raw material composition, atomic percentages and/or final crystal structure(s). Any aspects of the disclosure described in relation to a ceramic composition specified in terms of raw material composition may equally apply to a ceramic composition specified in terms of atomic percent and/or in terms of crystal structure(s) or phase(s) present (e.g., in the final material, or in some cases, in one or more intermediate materials).

In some cases, individual ceramic compounds (e.g., $Nd_2O_3$, $Y_2O_3$, TZP or SiC) may exist as multiple different crystal structures (e.g., the same compound, say, $Nd_2O_3$, may exist as a hexagonal phase, cubic or a monoclinic crystal structure/phase). In some cases, one or more given (e.g., specific) crystal structures may be desired as they may provide improved chemical, electrical, mechanical or thermal properties (e.g., improved corrosion resistance, chemical stability, electrical resistance, bond strength with metallization or braze layer, strength, fracture toughness and/or CTE). Further details may be provided to further specify or define a ceramic material, including, for example, nominal grain size of constituent materials/compounds (which may be the same for each constituent material/compound, or different for different constituent material/compounds), typical shape or form of constituent materials/grains (e.g., spherical, whiskers or rods), porosity, and/or other physical properties as described elsewhere herein (e.g., CTE, yield strength, fracture toughness and/or chemical stability).

Some examples of ceramic material compositions comprising $Nd_2O_3$ are provided in TABLE 4. Examples of raw materials with amounts/levels, atomic percentages (including oxygen and carbon atoms), and crystal structures that may be present in the resulting (e.g., final) ceramic materials are provided. It will be appreciated that only a subset of the listed phases may be present (e.g., see examples provided in parentheses in the rightmost "Crystal structures" column in TABLE 4). The first ceramic material constituent in each row in the "Ceramic constituents" column may be considered the primary ceramic material (e.g., $Nd_2O_3$), and all other ceramic materials in the row may be considered secondary ceramic materials.

The ceramic material may comprise a given ceramic constituent at a level greater than or equal to one or more given values, at a level less than or equal to one or more given values, or a combination thereof. For example, composition #1 may comprise less than or equal to about 98 wt % of the ceramic constituent $Nd_2O_3$, greater than or equal to about 30 wt % or 50 wt % of the ceramic constituent $Nd_2O_3$, or a combination thereof. A combination of upper and lower bounds (limits) may define a range (e.g., range with or without endpoint(s) included). The primary ceramic material (e.g., $Nd_2O_3$) may form greater than or equal to about 30 wt %, 40 wt %, 50 wt %, 60 wt % or 70 wt % of the ceramic material for the compositions listed in TABLE 4 (e.g., the primary ceramic material may form greater than about 30 wt %, 40 wt %, 50 wt %, 60 wt % or 70 wt % of the final ceramic material). For example, composition #1 may comprise between about 30 wt %, 40 wt %, 50 wt %, 60 wt % or 70 wt % and 98 wt % $Nd_2O_3$, composition #17 may comprise between about 30 wt % or 40 wt % and 50 wt % $Nd_2O_3$, and composition #18 may comprise between about 30 wt % and 40 wt % $Nd_2O_3$. Examples of such ranges are provided in TABLE 4.

Also provided in TABLE 4 are examples of atomic percentages. For example, composition #1 may comprise less than or equal to about 38.8 at % Nd, greater than or equal to about 15 at % Nd, or a combination thereof (between about 15 at % and 38.8 at % Nd).

TABLE 4

EXAMPLES OF CERAMIC MATERIAL COMPOSITIONS

| # | Ceramic constituents (wt %) | Atomic percentages examples/ranges | Crystal structures that may be present and examples |
|---|---|---|---|
| 1 | $Nd_2O_3$ (e.g., ≤~98 wt %, ≥~30 wt %, ≥~50 wt %) $Y_2O_3$ (e.g., ≥~2 wt %) | Nd: ≤~38.8%, ≥~15% Y: ≥~1.2% O: ≤~60% | Monoclinic, cubic and/or hexagonal $Nd_2O_3$, $Y_2O_3$ and/or $(Nd, Y)_2O_3$ (e.g., monoclinic $(Nd, Y)_2O_3$) |
| 2 | $Nd_2O_3$ (e.g., ≤~98 wt %, ≥~30 wt %, ≥~50 wt %) $ZrO_2$ (e.g., ≥~2 wt %) | Nd: ≤~38.7%, ≥~15% Zr: ≥~1.1% O: ≤~60.2% | Monoclinic, cubic and/or hexagonal $Nd_2O_3$ and/or $(Nd, Zr)_2O_3$ Cubic or orthorhombic $Nd_2Zr_2O_7$ Tetragonal $ZrO_2$ (e.g., at least one of monoclinic $Nd_2O_3$ and cubic $Nd_2Zr_2O_7$; at least one of monoclinic $Nd_2O_3$, cubic $Nd_2Zr_2O_7$ and tetragonal $ZrO_2$) |
| 3 | $Nd_2O_3$ (e.g., ≤~98 wt %, ≥~30 wt %, ≥~50 wt %) TiC (e.g., ≥~2 wt %) | Nd: ≤~38.2%, ≥~15% Ti: ≥~2.2% C: ≥~3.2% O: ≤~57.4% | Monoclinic, cubic and/or hexagonal $Nd_2O_3$ Cubic or hexagonal $TiO_2$ (e.g., at least one of monoclinic $Nd_2O_3$ and cubic TiC) |
| 4 | $Nd_2O_3$ (e.g., ≤~98 wt %, ≥~30 wt %, ≥~50 wt %) SiC (e.g., ≥~2 wt %) | Nd: ≤~37.4%, ≥~15% Si: ≥~3.2% C: ≥~3.2% O: ≤~56.2% | Monoclinic, cubic and/or hexagonal $Nd_2O_3$ Cubic and/or hexagonal SiC (e.g., at least one of monoclinic $Nd_2O_3$ and hexagonal SiC) |
| 5 | $Nd_2O_3$ (e.g., ≤~96 wt %, ≥~30 wt %, ≥~50 wt %) $Y_2O_3$ (e.g., ≥~2 wt %) SiC (e.g., ≥~2 wt %) | Nd: ≤~36.3%, ≥~15% Y: ≥~1.1% Si: ≥~3.2% C: ≥~3.2% O: ≤~56.2% | Monoclinic, cubic and/or hexagonal $Nd_2O_3$, $Y_2O_3$ and/or $(Nd, Y)_2O_3$ Cubic and/or hexagonal SiC (e.g., at least one of monoclinic $(Nd, Y)_2O_3$ and hexagonal SiC) |
| 6 | $Nd_2O_3$ (e.g., ≤~90 wt %, ≥~30 wt %, ≥~50 wt %) $Y_2O_3$ (e.g., ≥~5 wt %) SiC (e.g., ≥~5 wt %) | Nd: ≤~31.5%, ≥~15% Y: ≥~2.6% Si: ≥~7.3% C: ≥~7.3% O: ≤~51.2% | Monoclinic, cubic and/or hexagonal $Nd_2O_3$, $Y_2O_3$ and/or $(Nd, Y)_2O_3$ Cubic and/or hexagonal SiC (e.g., at least one of monoclinic $(Nd, Y)_2O_3$ and hexagonal SiC) |
| 7 | $Nd_2O_3$ (e.g., ≤~94 wt %, ≥~30 wt %, ≥~50 wt %) $Y_2O_3$ (e.g., ≥~3 wt %) $ZrO_2$ (e.g., ≥~3 wt %) | Nd: ≤~36.4%, ≥~15% Y: ≥~1.7% Zr: ≥~1.6% O: ≤~60.3% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$ Cubic or orthorhombic $Nd_2Zr_2O_7$ Monoclinic and/or tetragonal $ZrO_2$ (e.g., at least one of monoclinic $(Nd, Y)_2O_3$, and tetragonal $ZrO_2$; at least one of monoclinic $(Nd, Y)_2O_3$, cubic $Nd_2Zr_2O_7$ and tetragonal $ZrO_2$) |

TABLE 4-continued

EXAMPLES OF CERAMIC MATERIAL COMPOSITIONS

| # | Ceramic constituents (wt %) | Atomic percentages examples/ranges | Crystal structures that may be present and examples |
|---|---|---|---|
| 8 | $Nd_2O_3$ (e.g., ≤~90 wt %, ≥~30 wt %, ≥~50 wt %)<br>$Y_2O_3$ (e.g., ≥~5 wt %)<br>$ZrO_2$ (e.g., ≥~5 wt %) | Nd: ≤~34.1%, ≥~15%<br>Y: ≥~2.8%<br>Zr: ≥~2.6%<br>O: ≤~60.5% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic or orthorhombic $Nd_2Zr_2O_7$<br>Monoclinic and/or tetragonal $ZrO_2$<br>(e.g., at least one of monoclinic $(Nd, Y)_2O_3$ and tetragonal $ZrO_2$; at least one of monoclinic $(Nd, Y)_2O_3$, cubic $Nd_2Zr_2O_7$ and tetragonal $ZrO_2$) |
| 9 | $Nd_2O_3$ (e.g., ≤~85 wt %, ≥~30 wt %, ≥~50 wt %)<br>$Y_2O_3$ (e.g., ≥~5 wt %)<br>$ZrO_2$ (e.g., ≥~5 wt %)<br>SiC (e.g., ≥~5 wt %) | Nd: ≤~29%, ≥~15%<br>Y: ≥~2.5%<br>Zr: ≥~2.3%<br>Si: ≥~7.1%<br>C: ≥~7.1%<br>O: ≤~51.9% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrCO_2$<br>Cubic and/or hexagonal SiC<br>(e.g., at least one of monoclinic $(Nd, Y)_2O_3$, tetragonal $ZrO_2$ and hexagonal SiC; at least one of monoclinic $(Nd, Y, Zr)_2O_3$, cubic $Nd_2(Zr, Si)_2O_7$, tetragonal $ZrO_2$ and hexagonal SiC) |
| 10 | $Nd_2O_3$ (e.g., ≤~80 wt %, ≥~30 wt %, ≥~50 wt %)<br>$Y_2O_3$ (e.g., ≥~5 wt %)<br>$ZrO_2$ (e.g., ≥~10 wt %)<br>SiC (e.g., ≥~5 wt %) | Nd: ≤~26.5%, ≥~10%<br>Y: ≥~2.5%<br>Zr: ≥~4.5%<br>Si: ≥~7%<br>C: ≥~7%<br>O: ≤~52.6% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$, tetragonal $ZrO_2$ and hexagonal SiC; at least one of monoclinic $(Nd, Y, Zr)_2O_3$, cubic $Nd_2(Zr, Si)_2O_7$, tetragonal $ZrO_2$ and hexagonal SiC) |
| 11 | $Nd_2O_3$ (e.g., ≤~80 wt %, ≥~30 wt %, ≥~50 wt %)<br>$Y_2O_3$ (e.g., ≥~5 wt %)<br>$ZrO_2$ (e.g., ≥~5 wt %)<br>SiC (e.g., ≥~10 wt %) | Nd: ≤~24.8%, ≥~10%<br>Y: ≥~2.3%<br>Zr: ≥~2.1%<br>Si: ≥~13%<br>C: ≥~13%<br>O: ≤~44.8% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y, Zr)_2O_3$, tetragonal $ZrO_2$ and hexagonal SiC; at least one of monoclinic $(Nd, Y, Zr)_2O_3$, cubic $Nd_2(Zr, Si)_2O_7$, tetragonal $ZrO_2$ and hexagonal SiC) |
| 12 | $Nd_2O_3$ (e.g., ≤~75 wt %, ≥~30 wt %, ≥~50 wt %)<br>$Y_2O_3$ (e.g., ≥~5 wt %)<br>$ZrO_2$ (e.g., ≥~10 wt %)<br>SiC (e.g., ≥~10 wt %) | Nd: ≤~22.7%, ≥~10%<br>Y: ≥~2.3%<br>Zr: ≥~4.1%<br>Si: ≥~12.7%<br>C: ≥~12.7%<br>O: ≤~45.6% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$ tetragonal $ZrO_2$ and hexagonal SiC; at least one of monoclinic $(Nd, Y, Zr)_2O_3$, cubic $Nd_2(Zr, Si)_2O_7$, tetragonal $ZrO_2$ and hexagonal SiC) |
| 13 | $Nd_2O_3$ (e.g., ≤~70 wt %, ≥~30 wt %, ≥~50 wt %)<br>$Y_2O_3$ (e.g., ≥~5 wt %)<br>$ZrO_2$ (e.g., ≥~15 wt %)<br>SiC (e.g., ≥~10 wt %) | Nd: ≤~20.7%, ≥~10%<br>Y: ≥~2.2%<br>Zr: ≥~6.0%<br>Si: ≥~12.4%<br>C: ≥~12.4%<br>O: ≤~46.4% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$ tetragonal $ZrO_2$ and hexagonal SiC; at least one of monoclinic $(Nd, Y, Zr)_2O_3$, cubic $Nd_2(Zr, Si)_2O_7$, tetragonal $ZrO_2$ and hexagonal SiC) |

TABLE 4-continued

EXAMPLES OF CERAMIC MATERIAL COMPOSITIONS

| # | Ceramic constituents (wt %) | Atomic percentages examples/ranges | Crystal structures that may be present and examples |
|---|---|---|---|
| 14 | $Nd_2O_3$ (e.g., ≤~70 wt %, ≥~30 wt %, ≥~50 wt %)<br>$Y_2O_3$ (e.g., ≥~5 wt %)<br>$ZrO_2$ (e.g., ≥~10 wt %)<br>SiC (e.g., ≥~15 wt %) | Nd: ≤~19.4%, ≥~10%<br>Y: ≥~2.1%<br>Zr: ≥~3.8%<br>Si: ≥~17.5%<br>C: ≥~17.5%<br>O: ≤~39.8% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$ tetragonal $ZrO_2$ and hexagonal SiC; at least one of monoclinic (Nd, Y, Zr)$_2O_3$, cubic $Nd_2(Zr, Si)_2O_7$, tetragonal $ZrO_2$ and hexagonal SiC) |
| 15 | $Nd_2O_3$ (e.g., ≤~65 wt % ≥~30 wt %, ≥~50 wt %)<br>$Y_2O_3$ (e.g., ≥~5 wt %)<br>$ZrO_2$ (e.g., ≥~15 wt %)<br>SiC (e.g., ≥~15 wt %) | Nd: ≤~17.6%, ≥~8%<br>Y: ≥~2.0%<br>Zr: ≥~5.6%<br>Si: ≥~17.1%<br>C: ≥~17.1%<br>O: ≤~40.6% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$ tetragonal $ZrO_2$ and hexagonal SiC; at least one of monoclinic (Nd, Y, Zr)$_2O_3$, cubic $Nd_2(Zr, Si)_2O_7$, tetragonal $ZrO_2$ and hexagonal SiC) |
| 16 | $Nd_2O_3$ (e.g., ≤~65 wt %, ≥~30 wt %, ≥~50 wt %)<br>$Y_2O_3$ (e.g., ≥~5 wt %)<br>$ZrO_2$ (e.g., ≥~20 wt %)<br>SiC (e.g., ≥~10 wt %) | Nd: ≤~18.7%, ≥~8%<br>Y: ≥~2.1%<br>Zr: ≥~7.9%<br>Si: ≥~12.1%<br>C: ≥~12.1%<br>O: ≤~47.1% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$ tetragonal $ZrO_2$ and hexagonal SiC; at least one of monoclinic (Nd, Y, Zr)$_2O_3$, cubic $Nd_2(Zr, Si)_2O_7$, tetragonal $ZrO_2$ and hexagonal SiC) |
| 17 | $Nd_2O_3$ (e.g., ≤~50 wt %, ≥~30 wt %)<br>$Y_2O_3$ (e.g., ≥~10 wt %)<br>$ZrO_2$ (e.g., ≥~20 wt %)<br>SiC (e.g., ≥~20 wt %) | Nd: ≤~12.1%, ≥~6%<br>Y: ≥~3.6%<br>Zr: ≥~6.6%<br>Si: ≥~20.4%<br>C: ≥~20.4%<br>O: ≤~36.9% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$ tetragonal $ZrO_2$ and hexagonal SiC; at least one of monoclinic (Nd, Y, Zr)$_2O_3$, cubic $Nd_2(Zr, Si)_2O_7$, tetragonal $ZrO_2$ and hexagonal SiC) |
| 18 | $Nd_2O_3$ (e.g., ≤~40 wt %, ≥~30 wt %)<br>$Y_2O_3$ (e.g., ≥~10 wt %)<br>$ZrO_2$ (e.g., ≥~25 wt %)<br>SiC (e.g., ≥~25 wt %) | Nd: ≤~8.9%, ≥~8%<br>Y: ≥~3.3%<br>Zr: ≥~7.6%<br>Si: ≥~23.3%<br>C: ≥~23.3%<br>O: ≤~33.5% | Monoclinic, cubic and/or hexagonal $Nd_2O_3$, $Y_2O_3$, $(Nd, Y)_2O_3$, $(Nd, Zr)_2O_3$ and/or $(Nd, Y, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $(Nd, Y)_2O_3$ tetragonal $ZrO_2$ and hexagonal SiC; at least one of monoclinic (Nd, Y, Zr)$_2O_3$, cubic $Nd_2(Zr, Si)_2O_7$, tetragonal $ZrO_2$ and hexagonal SiC) |
| 19 | $Nd_2O_3$ (e.g., ≤~94 wt %, ≥~30 wt %, ≥~50 wt %)<br>$ZrO_2$ (e.g., ≥~2 wt %)<br>SiC (e.g., ≥~2 wt %) | Nd: ≤~36.2%, ≥~15%<br>Zr: ≥~1.0%<br>Si: ≥~3.2%<br>C: ≥~3.2%<br>O: ≤~56.4% | Monoclinic, cubic and/or hexagonal $Nd_2O_3$ and/or $(Nd, Zr)_2O_3$<br>Cubic and/or orthorhombic $Nd_2Zr_2O_7$ and/or $Nd_2(Zr, Si)_2O_7$<br>Monoclinic and/or tetragonal $ZrO_2$<br>Cubic and/or hexagonal SiC<br>(e.g., at least one of monoclinic $Nd_2O_3$, tetragonal $ZrO_2$ and |

TABLE 4-continued

EXAMPLES OF CERAMIC MATERIAL COMPOSITIONS

| # | Ceramic constituents (wt %) | Atomic percentages examples/ranges | Crystal structures that may be present and examples |
|---|---|---|---|
| | | | hexagonal SiC; at least one of monoclinic (Nd, Zr)$_2$O$_3$, cubic Nd$_2$(Zr, Si)$_2$O$_7$, tetragonal ZrO$_2$ and hexagonal SiC) |
| 20 | Nd$_2$O$_3$ (e.g., ≤~90 wt %, ≥~30 wt %, ≥~50 wt %) ZrO$_2$ (e.g., ≥~5 wt %) SiC (e.g., ≥~5 wt %) | Nd: ≤~31.3%, ≥~15% Zr: ≥~2.4% Si: ≥~7.3% C: ≥~7.3% O: ≤~51.7% | Monoclinic, cubic and/or hexagonal Nd$_2$O$_3$ and/or (Nd, Zr)$_2$O$_3$ Cubic and/or orthorhombic Nd$_2$Zr$_2$O$_7$ and/or Nd$_2$(Zr, Si)$_2$O$_7$ Monoclinic and/or tetragonal ZrO$_2$ Cubic and/or hexagonal SiC (e,g., at least one of monoclinic Nd$_2$O$_3$, tetragonal ZrO$_2$ and hexagonal SiC; at least one of monoclinic (Nd, Zr)$_2$O$_3$, cubic Nd$_2$(Zr, Si)$_2$O$_7$, tetragonal ZrO$_2$ and hexagonal SiC) |
| 21 | Nd$_2$O$_3$ (e.g., ≤~80 wt %, ≥~30 wt %, ≥~50 wt %) ZrO$_2$ (e.g., ≥~10 wt %) SiC (e.g., ≥~10 wt %) | Nd: ≤~24.6%, ≥~10% Zr: ≥~4.2% Si: ≥~12.9% C: ≥~12.9% O: ≤~45.3% | Monoclinic, cubic and/or hexagonal Nd$_2$O$_3$ and/or (Nd, Zr)$_2$O$_3$ Cubic and/or orthorhombic Nd$_2$Zr$_2$O$_7$ and/or Nd$_2$(Zr, Si)$_2$O$_7$ Monoclinic and/or tetragonal ZrO$_2$ Cubic and/or hexagonal SiC (e,g., at least one of monoclinic Nd$_2$O$_3$, tetragonal ZrO$_2$ and hexagonal SiC; at least one of monoclinic (Nd, Zr)$_2$O$_3$, cubic Nd$_2$(Zr, Si)$_2$O$_7$, tetragonal ZrO$_2$ and hexagonal SiC) |
| 22 | Nd$_2$O$_3$ (e.g., ≤~75 wt %, ≥~30 wt %, ≥~50 wt %) ZrO$_2$ (e.g., ≥~5 wt %) SiC (e.g., ≥~15 wt %) | Nd: ≤~23.1%, ≥~10% Zr: ≥~2.0% Si: ≥~18.2% C: ≥~18.2% O: ≤~38.6% | Monoclinic, cubic and/or hexagonal Nd$_2$O$_3$ and/or (Nd, Zr)$_2$O$_3$ Cubic and/or orthorhombic Nd$_2$Zr$_2$O$_7$ and/or Nd$_2$(Zr, Si)$_2$O$_7$ Monoclinic and/or tetragonal ZrO$_2$ Cubic and/or hexagonal SiC (e,g., at least one of monoclinic Nd$_2$O$_3$, tetragonal ZrO$_2$ and hexagonal SiC; at least one of monoclinic (Nd, Zr)$_2$O$_3$, cubic Nd$_2$(Zr, Si)$_2$O$_7$, tetragonal ZrO$_2$ and hexagonal SiC) |
| 23 | Nd$_2$O$_3$ (e.g., ≤~75 wt %, ≥~30 wt %, ≥~50 wt %) ZrO$_2$ (e.g., ≥~15 wt %) SiC (e.g., ≥~5 wt %) | Nd: ≤~26.4%, ≥~10% Zr: ≥~6.8% Si: ≥~6.9% C: ≥~6.9% O: ≤~53.1% | Monoclinic, cubic and/or hexagonal Nd$_2$O$_3$ and/or (Nd, Zr)$_2$O$_3$ Cubic and/or orthorhombic Nd$_2$Zr$_2$O$_7$ and/or Nd$_2$(Zr, Si)$_2$O$_7$ Monoclinic and/or tetragonal ZrO$_2$ Cubic and/or hexagonal SiC (e,g., at least one of monoclinic Nd$_2$O$_3$, tetragonal ZrO$_2$ and hexagonal SiC; at least one of monoclinic (Nd, Zr)$_2$O$_3$, cubic Nd$_2$(Zr, Si)$_2$O$_7$, tetragonal ZrO$_2$ and hexagonal SiC) |
| 24 | Nd$_2$O$_3$ (e.g., ≤~70 wt %, ≥~30 wt %, ≥~50 wt %) ZrO$_2$ (e.g., ≥~15 wt %) SiC (e.g., ≥~15 wt %) | Nd: ≤~19.3%, ≥~10% Zr: ≥~5.7% Si: ≥~17.4% C: ≥~17.4% O: ≤~40.3% | Monoclinic, cubic and/or hexagonal Nd$_2$O$_3$ and/or (Nd, Zr)$_2$O$_3$ Cubic and/or orthorhombic Nd$_2$Zr$_2$O$_7$ and/or Nd$_2$(Zr, Si)$_2$O$_7$ Monoclinic and/or tetragonal ZrO$_2$ Cubic and/or hexagonal SiC (e,g., at least one of monoclinic Nd$_2$O$_3$, tetragonal ZrO$_2$ and hexagonal SiC; at least one of monoclinic (Nd, Zr)$_2$O$_3$, cubic Nd$_2$(Zr, Si)$_2$O$_7$, tetragonal ZrO$_2$ and hexagonal SiC) |
| 25 | Nd$_2$O$_3$ (e.g., ≤~94 wt %, ≥~30 wt %, ≥~50 wt %) ZrO$_2$ (e.g., ≥~3 wt %) TiC (e.g., ≥~5 wt %) | Nd: ≤~34.0%, ≥~15% Zr: ≥~1.5% Ti: ≥~5.2% C: ≥~5.2% O: ≤~54.1% | Monoclinic, cubic and/or hexagonal Nd$_2$O$_3$ and/or (Nd, Zr)$_2$O$_3$ Cubic and/or orthorhombic Nd$_2$Zr$_2$O$_7$ and/or Nd$_2$(Zr, Ti)$_2$O$_7$ Monoclinic and/or tetragonal ZrO$_2$ Cubic and/or hexagonal TiC (e.g., at least one of monoclinic Nd$_2$O$_3$, tetragonal ZrO$_2$ and cubic TiC; at least one of monoclinic (Nd, Zr)$_2$O$_3$, cubic Nd$_2$Zr$_2$O$_7$, tetragonal ZrO$_2$ and cubic TiC) |

TABLE 4-continued

EXAMPLES OF CERAMIC MATERIAL COMPOSITIONS

| # | Ceramic constituents (wt %) | Atomic percentages examples/ranges | Crystal structures that may be present and examples |
|---|---|---|---|
| 26 | Nd$_2$O$_3$ (e.g., ≤~85 wt %, ≥~30 wt %, ≥~50 wt %)<br>ZrO$_2$ (e.g., ≥~5 wt %)<br>TiC (e.g., ≥~10 wt %) | Nd: ≤~29.4%, ≥~15%<br>Zr: ≥~2.4%<br>Ti: ≥~9.7%<br>C: ≥~9.7%<br>O: ≤~48.8% | Monoclinic, cubic and/or hexagonal Nd$_2$O$_3$ and/or (Nd, Zr)$_2$O$_3$<br>Cubic and/or orthorhombic Nd$_2$Zr$_2$O$_7$ and/or Nd$_2$(Zr, Ti)$_2$O$_7$<br>Monoclinic and/or tetragonal ZrO$_2$<br>Cubic and/or hexagonal TiC<br>(e,g., at least one of monoclinic Nd$_2$O$_3$, tetragonal ZrO$_2$ and cubic TiC; at least one of monoclinic (Nd, Zr)$_2$O$_3$, cubic Nd$_2$Zr$_2$O$_7$, tetragonal ZrO$_2$ and cubic TiC) |
| 27 | Nd$_2$O$_3$ (e.g., ≤~89 wt %, ≥~30 wt %, ≥~50 wt %)<br>Y$_2$O$_3$ (e.g., ≥~3 wt %)<br>ZrO$_2$ (e.g., ≥~ 3 wt %)<br>TiC (e.g., ≥~5 wt %) | Nd: ≤~32.5%, ≥~15%<br>Y: ≥~1.6%<br>Zr: ≥~1.5%<br>Ti: ≥~5.1%<br>C: ≥~5.1%<br>O: ≤~54.1% | Monoclinic, cubic and/or hexagonal Nd$_2$O$_3$, Y$_2$O$_3$, (Nd, Y)$_2$O$_3$, (Nd, Zr)$_2$O$_3$ and/or (Nd, Zr, Y)$_2$O$_3$<br>Cubic and/or orthorhombic Nd$_2$Zr$_2$O$_7$ and/or Nd$_2$(Zr, Ti)$_2$O$_7$<br>Monoclinic and/or tetragonal ZrO$_2$<br>Cubic and/or hexagonal TiC<br>(e,g., at least one of monoclinic (Nd, Y)$_2$O$_3$ tetragonal ZrO$_2$ and cubic TiC; at least one of monoclinic (Nd, Zr, Y)$_2$O$_3$, cubic Nd$_2$Zr$_2$O$_7$, tetragonal ZrO$_2$ and cubic TiC) |
| 28 | Nd$_2$O$_3$ (e.g., ≤~85 wt %, ≥~30 wt %, ≥~50 wt %)<br>Y$_2$O$_3$ (e.g., ≥~5 wt %)<br>ZrO$_2$ (e.g., ≥~ 5 wt %)<br>TiC (e.g., ≥~5 wt %) | Nd: ≤~30.4%, ≥~15%<br>Y: ≥~2.7%<br>Zr: ≥~2.4%<br>Ti: ≥~5.0%<br>C: ≥~5.0%<br>O: ≤~54.5% | Monoclinic, cubic and/or hexagonal Nd$_2$O$_3$, Y$_2$O$_3$, (Nd, Y)$_2$O$_3$, (Nd, Zr)$_2$O$_3$ and/or (Nd, Zr, Y)$_2$O$_3$<br>Cubic and/or orthorhombic Nd$_2$Zr$_2$O$_7$ and/or Nd$_2$(Zr, Ti)$_2$O$_7$<br>Monoclinic and/or tetragonal ZrO$_2$<br>Cubic and/or hexagonal TiC<br>(e,g., at least one of monoclinic (Nd, Y)$_2$O$_3$ tetragonal ZrO$_2$ and cubic TiC; at least one of monoclinic (Nd, Zr, Y)$_2$O$_3$, cubic Nd$_2$Zr$_2$O$_7$, tetragonal ZrO$_2$ and cubic TiC) |
| 29 | Nd$_2$O$_3$ (e.g., ≤~88 wt %, ≥~30 wt %, ≥~50 wt %)<br>Y$_2$O$_3$ (e.g., ≥~3 wt %)<br>ZrO$_2$ (e.g., ≥~ 3 wt %)<br>TiC (e.g., ≥~3 wt %)<br>SiC (e.g., ≥~3 wt %) | Nd: ≤~30.8%, ≥~15%<br>Y: ≥~1.6%<br>Zr: ≥~1.4%<br>Si: ≥~4.4%<br>Ti: ≥~3.0%<br>C: ≥~7.4%<br>O: ≤~51.5% | Monoclinic, cubic and/or hexagonal Nd$_2$O$_3$, Y$_2$O$_3$, (Nd, Y)$_2$O$_3$, (Nd, Zr)$_2$O$_3$ and/or (Nd, Zr, Y)$_2$O$_3$<br>Cubic and/or orthorhombic Nd$_2$Zr$_2$O$_7$, Nd$_2$(Zr, Si)$_2$O$_7$ and/or Nd$_2$(Zr, Ti, Si)$_2$O$_7$<br>Monoclinic and/or tetragonal ZrO$_2$<br>Cubic and/or hexagonal TiC<br>Cubic and/or hexagonal SiC<br>(e,g., at least one of monoclinic (Nd, Y)$_2$O$_3$, tetragonal ZrO$_2$ and cubic TiC; at least one of monoclinic (Nd, Zr, Y)$_2$O$_3$, cubic Nd$_2$(Zr, Si)$_2$O$_7$, tetragonal ZrO$_2$, cubic TiC and hexagonal SiC) |

TABLE 4 provides examples of ceramic material compositions. A ceramic material may have a composition as listed in TABLE 4. A ceramic material may have a composition as listed in TABLE 4 and may also comprise constituents that are greater than or less than the amount specified in TABLE 4. For example, a constituent may be provided in a different amount than listed in TABLE 4, one or more constituents may be added or removed, and so on.

In an example, the ceramic material may comprise less than or equal to about 85 wt % and/or greater than about 30 wt % Nd$_2$O$_3$, with less than or equal to about 5 wt % Y$_2$O$_3$, less than or equal to about 5 wt % ZrO$_2$ (or TZP) and less than or equal to about 5 wt % SiC. In this example, the ceramic material may comprise Nd$_2$O$_3$, Y$_2$O$_3$, SiC, Nd$_2$Zr$_2$O$_7$ and/or ZrO$_2$ crystal structures. In some instances, it may be difficult to distinguish between two or more crystal structures (e.g., Nd$_2$O$_3$ and Y$_2$O$_3$) and/or other phases may not be detected (e.g., SiC and/or ZrO$_2$). The observed crystal structures may include, for example, monoclinic Nd$_2$O$_3$ (or Y$_2$O$_3$) and/or cubic Nd$_2$Zr$_2$O$_7$. The ceramic material may comprise less than or equal to about 29 at % Nd and/or greater than about 15 at % Nd, and greater than or equal to about 2.5 at % Y, 2.3 at % Zr, 7.1 at % Si, 7.1 at % C and 51.9 at % O.

In another example, the ceramic material may comprise less than or equal to about 85 wt % and/or greater than about 30 wt % Nd$_2$O$_3$, with less than or equal to about 5 wt % Y$_2$O$_3$, greater than or equal to about 5 wt % ZrO$_2$ (or TZP) and greater than or equal to about 5 wt % SiC. In this example, the ceramic material may comprise Nd$_2$O$_3$, Y$_2$O$_3$, SiC, Nd$_2$Zr$_2$O$_7$ and/or ZrO$_2$ crystal structures. The ceramic material may comprise less than or equal to about 29 at % Nd and/or greater than about 15 at % Nd, less than or equal to about 2.5 at % Y, and greater than or equal to about 2.3 at % Zr, 7.1 at % Si, 7.1 at % C and 51.9 at % O.

In another example, the ceramic material may comprise less than or equal to about 75 wt % and/or greater than about 30 wt % $Nd_2O_3$, with less than or equal to about 5 wt % $Y_2O_3$, greater than or equal to about 10 wt % $ZrO_2$ (or TZP) and greater than or equal to about 10 wt % SiC. In this example, the ceramic material may comprise $Nd_2O_3$, $Y_2O_3$, SiC, $Nd_2Zr_2O_7$ and/or $ZrO_2$ crystal structures. The ceramic material may comprise less than or equal to about 22.7 at % Nd and/or greater than about 10 at % Nd, less than or equal to about 2.3 at % Y, and greater than or equal to about 12.7 at % Si, 12.7 at % C, 4.1 at % Zr and 45.6 at % O.

In another example, the ceramic material may comprise less than or equal to about 90 wt % and/or greater than about 30 wt % $Nd_2O_3$, with greater than or equal to about 5 wt % $ZrO_2$ (or TZP) and greater than or equal to about 5 wt % TiC. In this example, the ceramic material may comprise $Nd_2O_3$, TiC, $Nd_2Zr_2O_7$ and/or $ZrO_2$ crystal structures. The ceramic material may comprise less than or equal to about 32.9 at % Nd and/or greater than about 15 at % Nd, and greater than or equal to about 5.1 at % Ti, 5.1 at % C, 2.5 at % Zr and 54.3 at % O.

In yet another example, the ceramic material may comprise less than or equal to about 85 wt % and/or greater than about 30 wt % $Nd_2O_3$, with less than or equal to about 5 wt % $Y_2O_3$, greater than or equal to about 5 wt % $ZrO_2$ (or TZP) and greater than or equal to about 5 wt % TiC. In this example, the ceramic material may comprise $Nd_2O_3$, $Y_2O_3$, TiC, $Nd_2Zr_2O_7$ and/or $ZrO_2$ crystal structures. The ceramic material may comprise less than or equal to about 30.4 at % Nd and/or greater than about 15 at % Nd, less than or equal to about 2.7 at % Y, and greater than or equal to about 5.0 at % Ti, 5.0 at % C, 2.4 at % Zr and 54.5 at % O.

The ceramic material may comprise $Nd_2O_3$. The ceramic material may comprise a primary ceramic material (e.g., $Nd_2O_3$), and one or more secondary ceramic materials (e.g., AlN). The ceramic material may be substantially or wholly formed of the primary ceramic material. The ceramic material may comprise various levels of secondary ceramic material(s). The ceramic material may comprise the secondary ceramic material (e.g., AlN) at a concentration greater than or equal to about 2 wt %, 5 wt % or 10 wt %. As an alternative, the ceramic material may comprise the secondary ceramic material (e.g., AlN) at a concentration less than about 10 wt %, 5 wt % or 2 wt %. The ceramic material may comprise additional secondary ceramic materials (e.g., at similar or different concentrations). Such additional secondary ceramic materials may include, for example, SiC, TiC, $Y_2O_3$ and/or $ZrO_2$.

The ceramic material may have a tensile strength or tensile yield strength greater than or equal to about 50 MPa, 100 MPa, 150 MPa, 200 MPa, 250 MPa, 300 MPa, 350 MPa, 400 MPa, 450 MPa, 500 MPa, 550 MPa, 600 MPa, 700 MPa, 800 MPa, 900 MPa or 1000 MPa.

There are various examples of such ceramic material compositions. The ceramic material may comprise $Nd_2O_3$, and less than or equal to about 5 wt % AlN (e.g., AlN particles). The ceramic material may comprise $Nd_2O_3$, and greater than or equal to about 2 wt %, 5 wt % or 10 wt % AlN. The ceramic material may comprise $Nd_2O_3$, and less than or equal to about 10 wt % AlN. A ceramic comprising $Nd_2O_3$, and, for example, less than or equal to about 5 wt % AlN may have a CTE that closely matches (e.g., within about 10% or less, or within less than or equal to about 0.1%, 0.5%, 1%, 5%, 10%, 20% or 50%) the CTE of steel or stainless steel alloys (e.g., 430 stainless steel, 441 stainless steel, 18CrCb ferritic stainless steel, Inconel 600, ATI alloy 600 or Hastelloy S) (or another suitable material used instead of stainless steel, such as, for example, Ni or Fe—Ni alloys) at the operating temperature of the cell and/or system.

The ceramic material may comprise $Y_2O_3$. The ceramic material may comprise a primary ceramic material (e.g., $Y_2O_3$), and one or more secondary ceramic materials (e.g., MgO). The ceramic material may be substantially or wholly formed of the primary ceramic material. The ceramic material may comprise various levels of secondary ceramic material(s). The ceramic material may comprise the secondary ceramic material (e.g., MgO) at a concentration greater than or equal to about 12.5 wt %. As an alternative, the ceramic material may comprise the secondary ceramic material (e.g., MgO) at a concentration less than about 12.5 wt %. The ceramic material may comprise additional secondary ceramic materials in (e.g., at similar or different concentrations). The ceramic material and/or the secondary ceramic material(s) may comprise one or more additives as described elsewhere herein.

There are various examples of such ceramic material compositions. The ceramic material may comprise $Y_2O_3$, and greater than or equal to about 12.5 wt % MgO (e.g., MgO particles). A ceramic comprising $Y_2O_3$, and, for example, greater than or equal to about 12.5 wt % MgO may have a CTE that closely matches (e.g., within about 10% or less, or within less than or equal to about 0.1%, 0.5%, 1%, 5%, 10%, 20% or 50%) the CTE of steel or stainless steel alloys (e.g., 430 stainless steel or 439 stainless steel) (or another suitable material used instead of stainless steel, such as, for example, Ni or Fe—Ni alloys) at the operating temperature of the cell and/or system.

The ceramic material may comprise AlN. The ceramic material may comprise a primary ceramic material (e.g., AlN), and one or more secondary ceramic materials (e.g., $Y_2O_3$, SiC, or combinations thereof). The ceramic material may be substantially or wholly formed of the primary ceramic material. The ceramic material may comprise various levels of secondary ceramic material(s). For example, the ceramic material may comprise a first secondary ceramic material and a second secondary ceramic material. The ceramic material may comprise the first secondary ceramic material (e.g., $Y_2O_3$) at a concentration greater than or equal to about 3 wt %. As an alternative, the ceramic material may comprise the first secondary ceramic material (e.g., $Y_2O_3$) at a concentration less than about 3 wt %. The ceramic material may comprise the first secondary ceramic material in combination with at least the second secondary ceramic material (e.g., SiC), the second secondary ceramic material being at a concentration greater than or equal to about 25 wt % (or 25 volume-% (also "v %," "vol %" and "volume percent" herein). As an alternative, the ceramic material may comprise the first secondary ceramic material in combination with at least the second secondary ceramic material (e.g., SiC), the second secondary ceramic material being at a concentration less than about 25 wt % (or v %). In some instances, a concentration (e.g., of a secondary ceramic material) expressed in v % may be substantially the same or similar as when expressed in wt % (e.g., for AlN and SiC, wt % and v % can be very similar). The ceramic material may comprise the second secondary ceramic material without the first secondary ceramic material. The ceramic material may comprise additional secondary ceramic materials (e.g., at similar or different concentrations). The ceramic material and/or the secondary ceramic material(s) may comprise one or more additives as described elsewhere herein. For example, the secondary ceramic material (e.g., SiC) may also comprise about 2% carbon and about 0.5% boron.

The tensile strength of the ceramic material comprising AlN and SiC (e.g., AlN+$Y_2O_3$+SiC) may be greater than about 400 MPa, 500 MPa, 600 MPa, 700 MPa, 800 MPa or 900 MPa.

At least a portion (or all) of the second secondary ceramic material (e.g., SiC) may be present in the ceramic material as particles (e.g., SiC particles) that are not whiskers (e.g., at least some of the SiC particles may not be whiskers). One or more of the secondary ceramic materials (e.g. $Y_2O_3$) may function as a sintering aid.

There are various examples of such ceramic material compositions. The ceramic material may comprise AlN, and greater than or equal to about 3 wt % $Y_2O_3$ and/or greater than or equal to about 25 wt % or volume-% SiC. The ceramic material may comprise AlN, and less than about 3 wt % $Y_2O_3$ and/or less than about 25 wt % (or v %) SiC. The ceramic material may comprise AlN, and greater than or equal to about 3 wt % $Y_2O_3$ and/or less than about 25 wt % (or v %) SiC. The ceramic material may comprise AlN, and less than about 3 wt % $Y_2O_3$ and/or greater than or equal to about 25 wt % (or v %) SiC. The grain size of SiC in the ceramic material may be less than about 10 μm, 5 μm, 2 μm, 1 μm, 0.75 μm, 0.5 μm or 0.2 μm.

The ceramic material may comprise AlN. The ceramic material may comprise a primary ceramic material (e.g., AlN), and one or more secondary ceramic materials (e.g., $Y_2O_3$, $Nd_2O_3$, SiC, TiC, or any combination thereof). The ceramic material may be substantially or wholly formed of the primary ceramic material. The ceramic material may comprise various levels of secondary ceramic material(s). For example, the ceramic material may comprise a first secondary ceramic material and a second secondary ceramic material. The ceramic material may comprise the first secondary ceramic material (e.g., $Nd_2O_3$) at a concentration greater than or equal to about 1 wt %, 3 wt %, 5 wt % or 10 wt %. As an alternative, the ceramic material may comprise the first secondary ceramic material (e.g., $Nd_2O_3$) at a concentration less than about 10 wt %, 3 wt %, 5 wt % or 1 wt %, of. The ceramic material may comprise the first secondary ceramic material in combination with at least the second secondary ceramic material (e.g., $Y_2O_3$, SiC or TiC), the second secondary ceramic material being at a concentration greater than or equal to about 5 wt % (or v %), 10 wt % (or v %), 15 wt % (or v %), 20 wt % (or v %), 25 wt % (or v %), 30 wt % (or v %) or 40 wt % (or v %). As an alternative, the ceramic material may comprise the first secondary ceramic material in combination with at least the second secondary ceramic material (e.g., $Y_2O_3$, SiC or TiC), the second secondary ceramic material being at a concentration less than about 40 wt % (or v %), 30 wt % (or v %), 25 wt % (or v %), 20 wt % (or v %), 15 wt % (or v %), 10 wt % (or v %) or 5 wt % (or v %). In some instances, a concentration (e.g., of a secondary ceramic material) expressed in v % may be substantially the same or similar as when expressed in wt % (e.g., for AlN and SiC, wt % and v % can be very similar). The ceramic material may comprise the second secondary ceramic material without the first secondary ceramic material. The first secondary material may be selected, for example, among the aforementioned one or more secondary materials (e.g., $Y_2O_3$, SiC or TiC may be selected instead of $Nd_2O_3$). The second secondary material may then be suitably selected from the remainder of the one or more secondary ceramic materials. The ceramic material may comprise additional secondary ceramic materials (e.g., at similar or different concentrations). The ceramic material and/or the secondary ceramic material(s) may comprise one or more additives as described elsewhere herein. During processing (e.g., sintering) the primary ceramic material and at least one of the secondary ceramic materials may react to form a new phase (e.g., $Nd_2AlNO_3$), and/or the primary ceramic material and at least one additive may react to form a new phase. Secondary ceramic materials may or may not react with each other.

The second secondary ceramic material may have a smaller grain size than either the first ceramic material and/or other secondary ceramic material(s). In an example, the second secondary ceramic material is SiC or TiC and the particle size of the SiC to TiC particles in the ceramic is less than or equal to about 10 μm, 5 μm, 2 μm, 1 μm, 0.7 μm, 0.5 μm, 0.45 μm, 0.1 μm or 0.01 μm. In another example, the ceramic material comprises AlN, about 5 wt % $Nd_2O_3$, and about 5 wt % SiC or TiC where the SiC or TiC particle size is about 0.7 μm or 0.45 μm, and $Nd_2O_3$ material has reacted with AlN material to form $Nd_2AlNO_3$.

At least a portion (or all) of the second secondary ceramic material (e.g., SiC) may be present in the ceramic material as particles (e.g., SiC particles) that are not whiskers (e.g., at least some of the SiC particles may not be whiskers). One or more of the secondary ceramic materials (e.g. $Y_2O_3$) may function as a sintering aid.

The ceramic material (e.g., AlN+$Nd_2O_3$+SiC or AlN+$Nd_2O_3$+TiC, e.g., AlN+5 wt % $Nd_2O_3$+5 wt % SiC) may have a tensile yield strength greater than or equal to about 300 MPa, 350 MPa, 400 MPa, 450 MPa, 500 MPa, 550 MPa, 600 MPa, 700 MPa, 800 MPa, 900 MPa, 1000 MPa, 1200 MPa, 1400 MPa, 1600 MPa, 1800 MPa or 2000 MPa. The KIC fracture toughness of the ceramic material (e.g., AlN+5 wt % $Nd_2O_3$+5 wt % SiC) may be greater than or equal to about 5 MPa-m$^{1/2}$, 6 MPa-m$^{1/2}$, 7 MPa-m$^{1/2}$, 8 MPa-m$^{1/2}$, 9 MPa-m$^{1/2}$, 10 MPa-m$^{1/2}$, 11 MPa-m$^{1/2}$, 12 MPa-m$^{1/2}$, 13 MPa-m$^{1/2}$, 14 MPa-m$^{1/2}$ or 15 MPa-m$^{1/2}$ (as measured through micro hardness indentation tests). The ceramic material may have such strength and/or fracture toughness, for example, when the particle size of the second secondary ceramic material is less than or equal to about 10 μm, 5 μm, 2 μm, 1 μm, 0.7 μm, 0.5 μm, 0.45 μm, 0.1 μm, 0.01 μm or less.

There are various examples of such ceramic material compositions. The ceramic material may comprise AlN, and greater than or equal to about 3 wt % $Nd_2O_3$ and/or greater than or equal to about 5 wt % (or v %) SiC or TiC. The ceramic material may comprise AlN, and less than or equal to about 10 wt % $Nd_2O_3$ and/or less than or equal to about 40 wt % (or v %) SiC or TiC. The ceramic material may comprise AlN, and greater than or equal to about 1 wt % $Nd_2O_3$ and/or less than or equal to about 40 wt % (or v %) SiC or TiC. The ceramic material may comprise AlN, and less than or equal to about 10 wt % $Nd_2O_3$ and/or greater than or equal to about 5 wt % (or v %) SiC. In an example, the ceramic material comprises AlN, and about 5 wt % $Nd_2O_3$ and/or about 25 wt % (or v %) SiC or TiC.

Some examples of ceramic material compositions comprising AlN are provided in TABLE 5. Examples of raw materials with amounts/levels, and atomic percentages (including oxygen and carbon atoms) are provided in the same format as in TABLE 4. The first ceramic material constituent in each row in the "Ceramic constituents" column may be considered the primary ceramic material (e.g., AlN), and all other ceramic materials in the row may be considered secondary ceramic materials. The primary ceramic material (e.g., AlN) may form greater than or equal to about 30 wt %, 40 wt %, 50 wt % or 60 wt % of the ceramic material for the compositions listed in TABLE 5 (e.g., the primary ceramic material may form greater than about 30 wt %, 40 wt %, 50 wt % or 60 wt % of the final ceramic material). Further details regarding the format of TABLE 5 are provided in relation to TABLE 4 and accompanying description. A discussion of crystal structures is provided below.

TABLE 5

EXAMPLES OF CERAMIC MATERIAL COMPOSITIONS

| # | Ceramic Constituents (wt %) | Atomic percentages examples/ranges |
|---|---|---|
| 1 | AlN (e.g., ≤~97 wt %, ≥~30 wt %, ≥~50 wt %)<br>$Y_2O_3$ (e.g., ≥~3 wt %) | Al: ≤~49.3%, ≥~25%<br>N: ≤~49.3%, ≥~25%<br>Y: ≥~0.6%<br>O: ≥~0.8% |
| 2 | AlN (e.g., ≤~97 wt %, ≥30 wt %, ≥50 wt %)<br>$Nd_2O_3$ (e.g., ≥~3 wt %) | Al: ≤~49.5%, ≥~25%<br>N: ≤~49.5%, ≥~25%<br>Nd: ≥~0.4%<br>O: ≥~0.6% |
| 3 | AlN (e.g., ≤~95 wt %, ≥~30 wt %, ≥~50 wt %)<br>SiC (e.g., ≥~5 wt %) | Al: ≤~47.4%, ≥~20%<br>N: ≤~47.4%, ≥~20%<br>Si: ≥~2.6%<br>C: ≥~2.6% |
| 4 | AlN (e.g., ≤~95 wt %, ≥~30 wt %, ≥~50 wt %)<br>TiC (e.g., ≥~5 wt %) | Al: ≤~48.3%, ≥~20%<br>N: ≤~48.3%, ≥~20%<br>Ti: ≥~1.7%<br>C: ≥~1.7% |
| 5 | AlN (e.g., ≤~72 wt %, ≥~30 wt %, ≥~50 wt %)<br>$Y_2O_3$ (e.g., ≥~3 wt %)<br>SiC (e.g., ≥~25 wt %) | Al: ≤~36.4%, ≥~20%<br>N: ≤~36.4%, ≥~20%<br>Y: ≥~0.6%<br>O: ≥~0.8%<br>Si: ≥~12.9%<br>C: ≥~12.9% |
| 6 | AlN (e.g., ≤~87 wt %, ≥~30 wt %, ≥~50 wt %)<br>$Y_2O_3$ (e.g., ≥~3 wt %)<br>SiC (e.g., ≥~10 wt %) | Al: ≤~44.1%, ≥~20%<br>N: ≤~44.1%, ≥~20%<br>Y: ≥~0.6%<br>O: ≥~0.8%<br>Si: ≥~5.2%<br>C: ≥~5.2% |
| 7 | AlN (e.g., ≤~82 wt %, ≥~30 wt %, ≥~50 wt %)<br>$Y_2O_3$ (e.g., ≥~3 wt %)<br>SiC (e.g., ≥~15 wt %) | Al: ≤~41.5%, ≥~20%<br>N: ≤~41.5%, ≥~20%<br>Y: ≥~0.6%<br>O: ≥~0.8%<br>Si: ≥~7.8%<br>C: ≥~7.8% |
| 8 | AlN (e.g., ≤~77 wt %, ≥~30 wt %, ≥~50 wt %)<br>$Y_2O_3$ (e.g., ≥~3 wt %)<br>SiC (e.g., ≥~20 wt %) | Al: ≤~39.0%, ≥~20%<br>N: ≤~39.0%, ≥~20%<br>Y: ≥~0.6%<br>O: ≥~0.8%<br>Si: ≥~10.3%<br>C: ≥~10.3% |
| 9 | AlN (e.g., ≤~70 wt %, ≥~30 wt %, ≥~50 wt %)<br>$Y_2O_3$ (e.g., ≥~10 wt %)<br>SiC (e.g., ≥~20 wt %) | Al: ≤~36.9%, ≥~20%<br>N: ≤~36.9%, ≥~20%<br>Y: ≥~1.9%<br>O: ≥~2.9%<br>Si: ≥~10.8%<br>C: ≥~10.8% |
| 10 | AlN (e.g., ≤~91 wt %, ≥~30 wt %, ≥~50 wt %)<br>$Al_2O_3$ (e.g., ≤~1 wt %)<br>$Y_2O_3$ (e.g., ≥~3 wt %)<br>SiC (e.g., ≥~5 wt %) | Al: ≤~46.6%, ≥~20%<br>N: ≤~46.2%, ≥~20%<br>Y: ≥~0.6%<br>O: ≥~1.4%<br>Si: ≥~2.6%<br>C: ≥~2.6% |
| 11 | AlN (e.g., ≤~89 wt %, ≥~30 wt %, ≥~50 wt %)<br>$Al_2O_3$ (e.g., ≤~1 wt %)<br>$Y_2O_3$ (e.g., ≥~3 wt %)<br>SiC (e.g., ≥~7 wt %) | Al: ≤~45.6%, ≥~20%<br>N: ≤~45.2%, ≥~20%<br>Y: ≥~0.6%<br>O: ≥~1.4%<br>Si: ≥~3.6%<br>C: ≥~3.6% |
| 12 | AlN (e.g., ≤~86 wt %, ≥~30 wt %, ≥~50 wt %)<br>$Al_2O_3$ (e.g., ≤~1 wt %)<br>$Y_2O_3$ (e.g., ≥~3 wt %)<br>SiC (e.g., ≥~10 wt %) | Al: ≤~44.0%, ≥~20%<br>N: ≤~43.6%, ≥~20%<br>Y: ≥~0.6%<br>O: ≥~1.4%<br>Si: ≥~5.2%<br>C: ≥~5.2% |
| 13 | AlN (e.g., ≤~76 wt %, ≥~30 wt %, ≥~50 wt %)<br>$Al_2O_3$ (e.g., ≤~1 wt %)<br>$Y_2O_3$ (e.g., ≥~3 wt %)<br>SiC (e.g., ≥~20 wt %) | Al: ≤~38.9%, ≥~20%<br>N: ≤~38.5%, ≥~20%<br>Y: ≥~0.6%<br>O: ≥~1.4%<br>Si: ≥~10.3%<br>C: ≥~10.3% |
| 14 | AlN (e.g., ≤~94 wt %, ≥~30 wt %, ≥~50 wt %)<br>$Y_2O_3$ (e.g., ≥~3 wt %)<br>$Nd_2O_3$ (e.g., ≥~3 wt %) | Al: ≤~48.8%, ≥~25%<br>N: ≤~48.8%, ≥~25%<br>Y: ≥~0.6%<br>Nd: ≥~0.4%<br>O: ≥~1.4% |
| 15 | AlN (e.g., ≤~85 wt %, ≥~30 wt %, ≥~50 wt %)<br>$Y_2O_3$ (e.g., ≥~3 wt %)<br>$Nd_2O_3$ (e.g., ≥~10 wt %) | Al: ≤~47.6%, ≥~25%<br>N: ≤~47.6%, ≥~25%<br>Y: ≥~0.6%<br>Nd: ≥~1.3%<br>O: ≥~2.9% |
| 16 | AlN (e.g., ≤~92 wt %, ≥~30 wt %, ≥~50 wt %)<br>$Nd_2O_3$ (e.g., ≥~3 wt %)<br>SiC (e.g., ≥~5 wt %) | Al: ≤~46.9%, ≥~20%<br>N: ≤~46.9%, ≥~20%<br>Nd: ≥~0.4%<br>O: ≥~0.6%<br>Si: ≥~2.6%<br>C: ≥~2.6% |
| 17 | AlN (e.g., ≤~87 wt %, ≥~30 wt %, ≥~50 wt %)<br>$Nd_2O_3$ (e.g., ≥~3 wt %)<br>SiC (e.g., ≥~10 wt %) | Al: ≤~44.3%, ≥~20%<br>N: ≤~44.3%, ≥~20%<br>Nd: ≥~0.4%<br>O: ≥~0.6%<br>Si: ≥~5.2%<br>C: ≥~5.2% |
| 18 | AlN (e.g., ≤~72 wt %, ≥~30 wt %, ≥~50 wt %)<br>$Nd_2O_3$ (e.g., ≥~3 wt %)<br>SiC (e.g., ≥~25 wt %) | Al: ≤~36.6%, ≥~20%<br>N: ≤~36.6%, ≥~20%<br>Nd: ≥~0.4%<br>O: ≥~0.6%<br>Si: ≥~13.0%<br>C: ≥~13.0% |
| 19 | AlN (e.g., ≤~80 wt %, ≥~30 wt %, ≥~50 wt %)<br>$Nd_2O_3$ (e.g., ≥~10 wt %)<br>SiC (e.g., ≥~10 wt %) | Al: ≤~42.9%, ≥~20%<br>N: ≤~42.9%, ≥~20%<br>Nd: ≥~1.3%<br>O: ≥~2.0%<br>Si: ≥~5.5%<br>C: ≥~5.5% |
| 20 | AlN (e.g., ≤~70 wt %, ≥~30 wt %, ≥~50 wt %)<br>$Nd_2O_3$ (e.g., ≥~20 wt %)<br>SiC (e.g., ≥~10 wt %) | Al: ≤~40.6%, ≥~20%<br>N: ≤~40.6%, ≥~20%<br>Nd: ≥~2.6%<br>O: ≥~4.2%<br>Si: ≥~5.9%<br>C: ≥~5.9% |
| 21 | AlN (e.g., ≤~87 wt %, ≥~30 wt %, ≥~50 wt %)<br>$Y_2O_3$ (e.g., ≥~3 wt %)<br>$Nd_2O_3$ (e.g., ≥~5 wt %)<br>SiC (e.g., ≥~5 wt %) | Al: ≤~45.8%, ≥~20%<br>N: ≤~45.8%, ≥~20%<br>Y: ≥~0.6%<br>Nd: ≥~0.6%<br>O: ≥~1.8%<br>Si: ≥~2.7%<br>C: ≥~2.7% |
| 22 | AlN (e.g., ≤~77 wt %, ≥~30 wt %, ≥~50 wt %)<br>$Y_2O_3$ (e.g., ≥~3 wt %)<br>$Nd_2O_3$ (e.g., ≥~10 wt %)<br>SiC (e.g., ≥~10 wt %) | Al: ≤~42.0%, ≥~20%<br>N: ≤~42.0%, ≥~20%<br>Y: ≥~0.6%<br>Nd: ≥~1.3%<br>O: ≥~2.9%<br>Si: ≥~5.4%<br>C: ≥~5.4% |
| 23 | AlN (e.g., ≤~92 wt %, ≥~30 wt %, ≥~50 wt %)<br>$Y_2O_3$ (e.g., ≥~3 wt %)<br>TiC (e.g., ≥~5 wt %) | Al: ≤~47.5%, ≥~20%<br>N: ≤~47.5%, ≥~20%<br>Y: ≥~0.6%<br>O: ≥~0.8%<br>Ti: ≥~1.8%<br>C: ≥~1.8% |
| 24 | AlN (e.g., ≤~92 wt %, ≥~30 wt %, ≥~50 wt %)<br>$Nd_2O_3$ (e.g., ≥~3 wt %)<br>TiC (e.g., ≥~5 wt %) | Al: ≤~47.7%, ≥~20%<br>N: ≤~47.7%, ≥~20%<br>Nd: ≥~0.4%<br>O: ≥~0.6%<br>Ti: ≥~1.8%<br>C: ≥~1.8% |
| 25 | AlN (e.g., ≤~87 wt %, ≥~30 wt %, ≥~50 wt %)<br>$Y_2O_3$ (e.g., ≥~3 wt %)<br>$Nd_2O_3$ (e.g., ≥~5 wt %)<br>TiC (e.g., ≥~5 wt %) | Al: ≤~46.6%, ≥~20%<br>N: ≤~46.6%, ≥~20%<br>Y: ≥~0.6%<br>Nd: ≥~0.7%<br>O: ≥~1.9%<br>Ti: ≥~1.8%<br>C: ≥~1.8% |

TABLE 5-continued

EXAMPLES OF CERAMIC MATERIAL COMPOSITIONS

| # | Ceramic Constituents (wt %) | Atomic percentages examples/ranges |
|---|---|---|
| 26 | AlN (e.g., ≤~73 wt %, ≥~30 wt %, ≥~50 wt %)<br>$Y_2O_3$ (e.g., ≥~3 wt %)<br>$Nd_2O_3$ (e.g., ≥~10 wt %)<br>TiC (e.g., ≥~15 wt %) | Al: ≤~41.5%, ≥~20%<br>N: ≤~41.5%, ≥~20%<br>Y: ≥~0.6%<br>Nd: ≥~1.4%<br>O: ≥~3.1%<br>Ti: ≥~5.9%<br>C: ≥~5.9% |
| 27 | AlN (e.g., ≤~92 wt %, ≥30 wt %, ≥50 wt %)<br>$Nd_2O_3$ (e.g., ≥~3 wt %)<br>TiC (e.g., ≥~5 wt %) | Al: ≤~47.7%, ≥~20%<br>N: ≤~47.7%, ≥~20%<br>Nd: ≥~0.4%<br>O: ≥~0.6%<br>Ti: ≥~1.8%<br>C: ≥~1.8% |
| 28 | AlN (e.g., ≤~87 wt %, ≥30 wt %, ≥50 wt %)<br>$Nd_2O_3$ (e.g., ≥~3 wt %)<br>TiC (e.g., ≥~10 wt %) | Al: ≤~45.9%, ≥~20%<br>N: ≤~45.9%, ≥~20%<br>Nd: ≥~0.4%<br>O: ≥~0.6%<br>Ti: ≥~3.6%<br>C: ≥~3.6% |

The crystal structure of ceramic materials with AlN as the primary ceramic component may include one or more crystal structures based on the compounds used to fabricate the ceramic material (e.g., ceramic constituents), as well as phases that may form based on interactions between the various ceramic constituents. Ceramic compositions comprising AlN and $Y_2O_3$ may comprise, for example, hexagonal (e.g., wurtzite) AlN and/or cubic or monoclinic $Y_2O_3$. In some cases, trace amounts of trigonal $Al_2O_3$ may be present due to residual amounts on the surface of AlN used to fabricate sintered ceramic materials, resulting in additional yttria-alumina phases such as, for example, orthorhombic YAP ($YAlO_3$), cubic YAG ($Y_3Al_5O_{12}$) and/or monoclinic YAM ($Y_4Al_2O_9$). Ceramic compositions comprising AlN and $Nd_2O_3$ may comprise, for example, hexagonal AlN, hexagonal or monoclinic $Nd_2O_3$ and/or tetragonal $Nd_2AlNO_3$. In some cases, AlN used to fabricate ceramics may also contain small amounts of $Al_2O_3$, which may cause ceramics fabricated from AlN and $Nd_2O_3$ to form an additional rhombohedral $Nd(AlO_3)$ crystal structure. Ceramic compositions comprising SiC and/or TiC secondary ceramic components (e.g., other ceramic compositions comprising SiC and/or TiC secondary ceramic components) may (e.g., also) include, for example, hexagonal SiC and/or cubic TiC crystal structures. SiC or TiC may also react with $Nd_2O_3$ to form $SiO_2$, $TiO_2$ and/or $NdC_2$. In an example, the ceramic material may comprise AlN (e.g., greater than about 30 wt % AlN), at least about 5 vol % or 20 vol % SiC, and at least about 5 wt % $Nd_2AlNO_3$. The $Nd_2AlNO_3$ may be formed, for example, as a result of reaction of AlN with $Nd_2O_3$. Such a composition of crystal structures/phases (or at least a subset thereof) may result from sintering and/or may be used as a raw material.

In an example, the ceramic material may comprise less than or equal to about 72 wt % and greater than about 50 wt % AlN, greater than or equal to about 3 wt % $Y_2O_3$, and greater than or equal to about 25 wt % SiC. In this example, the ceramic material may comprise less than or equal to about 36.4 at % Al and/or greater than 15 at % Al, less than or equal to about 36.4 at % N and/or greater than about 20 at % N, greater than or equal to about 0.6 at % Y, greater than or equal to about 0.8 at % O, greater than or equal to about 12.9 at % Si, and greater than or equal to about 12.9 at % C. The ceramic material may comprise hexagonal AlN, orthorhombic YAP, cubic YAG, monoclinic YAM, monoclinic $Y_2O_3$ and/or hexagonal SiC.

In another example, the ceramic material may comprise less than or equal to about 72 wt % and greater than about 50 wt % AlN, greater than or equal to about 3 wt % $Nd_2$—$O_3$, and greater than or equal to about 25 wt % SiC. In this example, the ceramic material may comprise less than or equal to about 36.6 at % Al and/or greater than about 20 at % Al, less than or equal to about 36.6 at % N and/or greater than about 20 at % N, greater than or equal to about 0.4 at % Nd, greater than or equal to about 0.6 at % O, greater than or equal to about 13.0 at % Si, and greater than or equal to about 13.0 at % C. The ceramic material may comprise hexagonal AlN, hexagonal or monoclinic $Nd_2O_3$, $Nd_2AlNO_3$ and/or hexagonal SiC.

In yet another example, the ceramic material may comprise less than or equal to about 92 wt % and greater than about 50 wt % AlN, greater than or equal to about 3 wt % $Nd_2O_3$, and greater than or equal to about 5 wt % TiC. In this example, the ceramic material may comprise less than or equal to about 47.7 at % Al and/or greater than about 20 at % Al, less than or equal to about 47.7 at % N and/or greater than about 20 at % N, greater than or equal to about 0.4 at % Nd, greater than or equal to about 0.6 at % O, greater than or equal to about 1.8 at % Ti, and greater than or equal to about 1.8 at % C. The ceramic material may comprise hexagonal AlN, hexagonal or monoclinic $Nd_2O_3$, $Nd_2AlNO_3$ and/or cubic TiC.

The primary and/or secondary ceramic material may comprise grains of ceramic material(s) (e.g., neodymium oxide, aluminum nitride, silicon carbide, silicon nitride, magnesium oxide, zirconium oxide or yttrium oxide) that are less than or equal to about 0.01 micrometers (µm), 0.05 µm, 0.1 µm, 0.2 µm, 0.5 µm, 1 µm, 2 µm, 3 µm, 4 µm, 5 µm, 6 µm, 7 µm, 8 µm, 9 µm, 10 µm, 15 µm, 20 µm, 30 µm, 40 µm, 50 µm, 60 µm, 70 µm, 80 µm, 90 µm, 100 µm, 150 µm, 200 µm, 400 µm, 500 µm or 1,000 µm in size. The primary and/or secondary ceramic material may comprise grains of ceramic material(s) that are greater than about 0.1 µm, 0.2 µm, 0.5 µm, 1 µm, 2 µm, 3 µm, 4 µm, 5 µm, 6 µm, 7 µm, 8 µm, 9 µm, 10 µm, 15 µm, 20 µm, 30 µm, 40 µm, 50 µm, 60 µm, 70 µm, 80 µm, 90 µm, 100 µm, 150 µm, 200 µm, 400 µm, 500 µm or 1,000 µm in size. The primary and/or secondary ceramic material may comprise grains of ceramic material(s) between about 0.1 µm and 5 µm, 1 µm and 5 µm, 2 µm and 4 µm, 2 µm and 10 µm, 10 µm and 40 µm, 20 µm and 100 µm, 100 µm and 500 µm, 0.1 µm and 1,000 µm, or 1 µm and 1000 µm in size. Grain size may refer to diameter, length, width or any other dimension of a grain (e.g., grains may be less than about 1 µm in size).

After densifying the ceramic though one or more processes (e.g., sinter, HIP process, hot press process, or sinter and HIP process), the ceramic may comprise grains of the primary and/or secondary ceramic material(s) that have an atomic configuration (e.g., crystal structure) consistent with a phase that is the most thermodynamically stable phase at room temperature. After densifying the ceramic though one or more processes (e.g., HIP, hot press process, or sinter and HIP process), the ceramic may comprise grains or portions of grains of the primary and/or secondary ceramic material(s) that have an atomic configuration (e.g., crystal structure) consistent with a phase that is different than the most thermodynamically stable phase at room temperature. For example, the combination of materials (composition) and densification process may result in a ceramic material that comprises grains or portions of grains of the primary or secondary ceramic material in a phase (e.g., crystal structure) that is different than the phase that is most thermodynamically stable at room temperature. The ceramic may comprise one or more phases of the primary and/or secondary ceramic material(s) (e.g., for each primary or secondary ceramic material, the ceramic material may comprise the most thermodynamically stable phase and/or one or more phases different from the most thermodynamically stable phase).

The phase that is different than the most thermodynamically stable phase at room temperature may in some cases correspond to a given phase (e.g., the most thermodynamically stable phase) at a temperature other than the room temperature (e.g., at a higher temperature). Such a phase may be stabilized using suitable composition and process. For example, a higher temperature $Nd_2O_3$ phase may be stabilized in a monoclinic $Nd_2O_3$ crystal structure. In some examples, stabilizing a crystal structure that is not the most thermodynamically stable crystal structure at room temperature may improve the stability of the ceramic material (e.g., improve its chemical stability against corrosion from water or moist air, improve its stability with reactive material, improve its stability in air at high temperature and in moist air at room temperature, etc.). For example, the crystal structure of $Nd_2O_3$ that is the most thermodynamically stable at room temperature may be the hexagonal crystal structure. At suitable composition and densification condition, a ceramic comprising $Nd_2O_3$ and other secondary ceramic materials (e.g., $Y_2O_3$ and/or SiC) may result in a ceramic material comprising $Nd_2O_3$ grains that are configured in a monoclinic crystal structure (e.g., yttria stabilized neodymia). In some examples, a ceramic material comprising $Nd_2O_3$ grains in the monoclinic crystal structure may be more stable in the presence of air, moist air and/or water (e.g., may not crumble in air at room temperature due to moisture).

Primary and/or secondary material(s) with such grain size(s) may be provided in one or more ceramic materials of the disclosure. For example, the ceramic material of the seal can comprise $Nd_2O_3$, and greater than about 5 wt % AlN, with grains that are about 2 μm to 4 μm in size. The primary ceramic material may have a different grain size than one or more of the secondary materials. The grain size (e.g., diameter, radius, thickness, width, length or another characteristic grain dimension) may refer to a grain size of the primary or secondary material(s) individually (e.g., the size of atomically aligned regions of the ceramic). Ceramic materials comprising grains may in some cases be compacted (e.g., pressed). Morphology and/or particle size distribution of the primary and/or secondary ceramic material may be modified using, for example, high energy milling and/or different mixing/milling methods (e.g., ball milling, high energy grinding/milling, attrition milling, planetary mixing or centrifugal mixing).

CTE-matching characteristics may depend on composition (e.g., identity and amount of primary and secondary material(s)), morphology (e.g., grain size and distribution of each of primary and secondary material(s)) and/or other factors (e.g., mechanical processing, casting or shaping/forming). In an example, a ceramic material comprising $Nd_2O_3$, and greater than or equal to about 5 wt % AlN, with about 2 micrometer to 4 micrometer grain size, may have a CTE that is substantially similar or nearly identical to 430 SS, 18CrCb ferritic stainless steel and/or 441 stainless steel. In another example, a ceramic material comprising $Nd_2O_3$, and greater than or equal to about 3 wt % $Y_2O_3$ and/or greater than or equal to about 5 wt % SiC or TiC, with about 0.01 micrometer to 20 micrometer grain size, may have a CTE that is substantially similar or nearly identical to a Ni alloy (e.g., alloy 42 or alloy 52) or a stainless steel (e.g., 430 stainless steel, 18CrCb ferritic stainless steel or 441 stainless steel).

Examples of primary ceramic materials and/or secondary ceramic materials may include any ceramic material described herein, such as, for example, aluminum nitride (AlN), beryllium nitride ($Be_3N_2$), boron nitride (BN), calcium nitride ($Ca_3N_2$), silicon nitride ($Si_3N_4$), aluminum oxide ($Al_2O_3$), beryllium oxide (BeO), calcium oxide (CaO), cerium oxide ($Ce_2O_3$), erbium oxide ($Er_2O_3$), lanthanum oxide ($La_2O_3$), magnesium oxide (MgO), neodymium oxide ($Nd_2O_3$), samarium oxide ($Sm_2O_3$), scandium oxide ($Sc_2O_3$), ytterbium oxide ($Yb_2O_3$), yttrium oxide ($Y_2O_3$), zirconium oxide ($ZrO_2$), yttria partially stabilized zirconia (YPSZ), boron carbide ($B_4C$), silicon carbide (SiC), titanium carbide (TiC), zirconium carbide (ZrC), titanium diboride ($TiB_2$), chalcogenides, quartz, glass, or any combination thereof.

The ceramic material (e.g., one or more ceramic materials comprising $Nd_2O_3$, such as, for example, listed in TABLE 4) may retain mechanical strength after exposure to air at a temperature of at least about 20° C., 100° C., 200° C., 300° C., 400° C., 500° C., 600° C., 700° C., 800° C. or 900° C. (e.g., at an operating temperature of a high temperature reactive material device) for at least about 1 hour (h), 5 h, 10 h, 1 day, 2 days, 3 days, 4 days, 100 h, 5 days, 7 days, 10 days, 2 weeks, 1 month, 2 months, 6 months, 9 months, 1 year, 2 years, 3 years, 4 years, 5 years, 10 years or more. The ceramic material (e.g., one or more ceramic materials comprising $Nd_2O_3$, such as, for example, listed in TABLE 4) may retain mechanical strength after being submerged in a reactive material (e.g., lithium metal-saturated molten LiCl—LiBr—LiF salts) at a temperature of at least about 20° C., 100° C., 200° C., 300° C., 400° C., 500° C., 600° C., 700° C., 800° C. or 900° C. (e.g., at an operating temperature of a high temperature reactive material device) for at least about 1 minute, 5 minutes, 10 minutes, 20 minutes, 30 minutes, 1 h, 2 h, 3 h, 4 h, 5 h, 6 h, 7 h, 8 h, 9 h, 10 h, 1 day, 2 days, 3 days, 4 days, 5 days, 7 days, 10 days, 2 weeks, 1 month, 2 months, 6 months, 9 months, 1 year, 2 years, 3 years, 4 years, 5 years or more. The ceramic material (e.g., one or more ceramic materials comprising $Nd_2O_3$, such as, for example, listed in TABLE 4) may retain mechanical strength after being submerged in water at a temperature of at least about 25° C., 40° C., 50° C., 60° C., 70° C., 80° C., 90° C. or 100° C. for at least about 1 h, 5 h, 10 h, 1 day, 2 days, 3 days, 4 days, 100 h, 5 days, 7 days, 10 days, 2 weeks, 1 month, 2 months, 6 months, 9 months, 1 year, 2 years, 3 years, 4 years, 5 years, 10 years or more. Mechanical strength may be retained, for example, to within about 1%, 2%, 5%, 10%, 20%, 30%, 40% or 50% of initial value.

Figure 40:
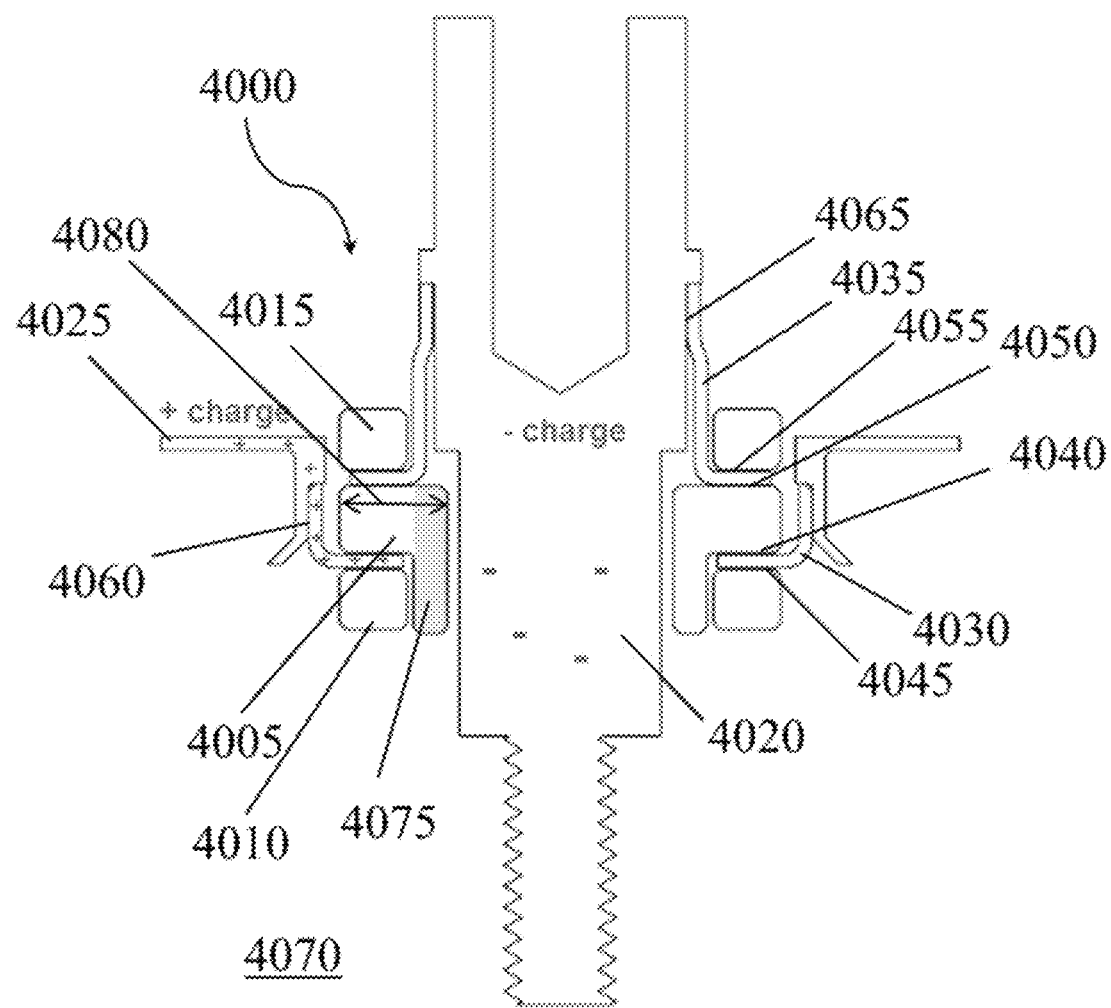
FIG. 40 shows a cross-sectional view of an example of a seal with a shaped ceramic component.
Figure 41:
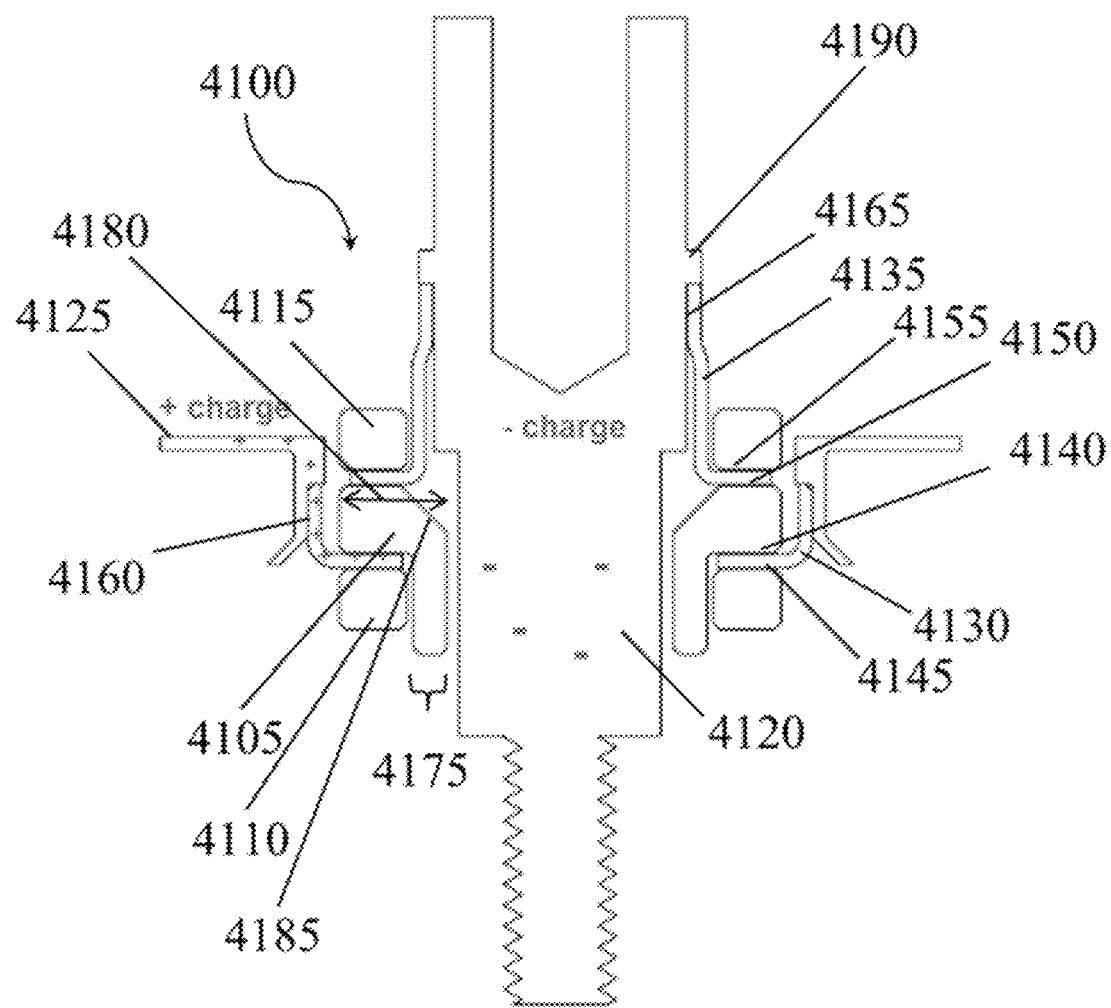
FIG. 41 is another example of the seal in FIG. 40.

While such ceramic materials may be described herein primarily in the context of seals (e.g., the ceramic materials described in the context of TABLE 4 and TABLE 5 may be used, for example in seals of FIG. 12, FIG. 13, FIG. 14, FIG. 15, FIG. 16, FIG. 17, FIG. 18, FIG. 19, FIG. 20, FIG. 21, FIG. 30, FIG. 35, FIG. 36, FIG. 37, FIG. 38, FIG. 40 and/or FIG. 41), the ceramic materials can be used in other applications. Such applications may be as described elsewhere herein (e.g., in relation to reactor vessel linings). Examples of applications may include applications that utilize or depend on one or more characteristics or properties of such ceramic materials (e.g., strength, air stability, corrosion resistance and/or other characteristics/properties described herein). In an example, stronger ceramic materials (e.g., ceramic materials comprising AlN, such as, for example, AlN+Nd$_2$O$_3$+SiC or AlN+Nd$_2$O$_3$+TiC) may be used in bullet-proof vests. In another example, a ceramic material (e.g., AlN+3 wt % Y$_2$O$_3$ and at least about 25 vol % SiC, or AlN+at least about 3 wt % Nd$_2$O$_3$+at least about 5 vol % or 20 vol % SiC) may be used in a device that protects against ballistic penetration, such as, for example, ballistic armor.

The braze can be a passive braze or an active braze. Passive brazes can melt and wet a ceramic material or wet a ceramic material that has a metallization layer deposited onto it. Copper and silver are examples of passive brazes. Active brazes can react with the ceramic (e.g., chemically reduce the metal component of the ceramic (e.g., Al is reduced from AlN)). In some cases, active brazes can comprise a metal alloy having an active metal species such as titanium (Ti) or zirconium (Zr) that reacts with the ceramic material (e.g., AlN+Ti→Al+TiN or AlN+Zr→Al+ZrN). The active braze can further comprise one or more passive components (e.g., Ni). The passive component(s) can, for example, reduce the melting point of the braze and/or improve the chemical stability of the braze. In some cases, the active metal braze beads up on the ceramic and/or does not wet the ceramic.

The seal can hermetically seal the electrochemical cell. In some cases, the seal is inert to an atmosphere in contact with the electrochemical cell. The atmosphere in contact with the electrochemical cell can comprise oxygen (O$_2$), nitrogen (N$_2$), water (H$_2$O), or a combination thereof. In some cases, the ceramic material, metal sleeve or collar material, and/or the braze material are coated to provide resistance to the atmosphere (e.g., air stability) in contact with the electrochemical cell. For example, the coating can comprise silicon dioxide (SiO$_2$), yttrium oxide (Y$_2$O$_3$), aluminum oxide (Al$_2$O$_3$), phosphate glass (e.g., P$_2$O$_5$), aluminophosphate glass (e.g., AlPO$_4$, doped AlPO$_4$, AlPO$_4$ comprising small (e.g., nanoscale/nanometer scale) carbon particles (e.g., encapsulated within the aluminophosphate glass), aluminophosphate comprising Al—O—Al bonds, amorphous aluminophosphate glass that resists crystallization above at least 800° C.), or any combination thereof. In some cases, the coating may form a transparent thin film.

The seal can be at least partially inert to metal vapors and molten salts. In some cases, the metal vapors comprise lithium, sodium, potassium, magnesium, calcium, or any combination thereof. The ceramic material and/or the braze material can be coated to provide resistance to the metal vapors and metal salts. For example, the coating can be yttrium oxide (Y$_2$O$_3$), erbium oxide (Er$_2$O$_3$), boron nitride (BN), aluminum nitride (AlN), silicon nitride (Si$_3$N$_4$), silicon carbide (SiC), or any combination thereof.

In some cases, the coefficients of thermal expansion of the ceramic material and the braze material match the coefficients of thermal expansion of the electrically conductive housing and/or the conductor (e.g., to within about 1%, 5%, 10%, 15%, 20% or 30%). In some cases, a hermetic joint can be formed if the braze is not of a similar CTE compared with the CTE of the ceramic and/or other components or subassembly of the seal (e.g., a metal sleeve).

The seal can be welded or brazed to the electrically conductive housing, cell (housing) lid, and/or the conductor. In some cases, the electrically conductive housing and/or the conductor comprises 400-series stainless steel, 300-series stainless steel, nickel, or any combination thereof.

Figure 7:
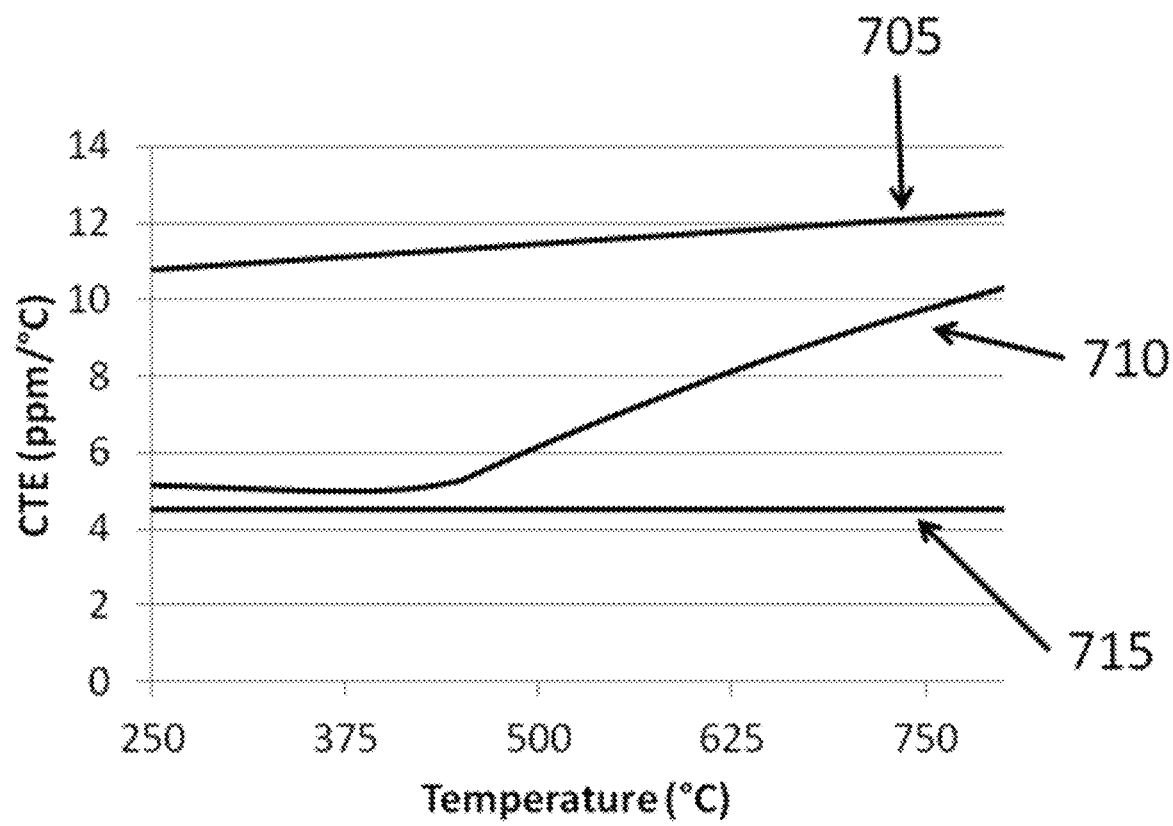
FIG. 7 shows coefficients of thermal expansion in units of parts per million (ppm) per ° C. for various types of steel and an insulating ceramic.

FIG. 7 shows the CTE in units of parts per million (ppm) per ° C. for various types of steel and an insulating ceramic. The CTE for 430 stainless steel 705 can range approximately linearly from about 10 ppm/° C. to about 12 ppm/° C. between about 250° C. and 800° C. The CTE for nickel-cobalt ferrous alloy 710 can range non-linearly from about 5 ppm/° C. to about 10 ppm/° C. between about 250° C. and 800° C. The CTE for aluminum nitride ceramic 715 can be relatively constant at about 4.5 ppm/° C. between about 250° C. and 800° C.

Figure 8:
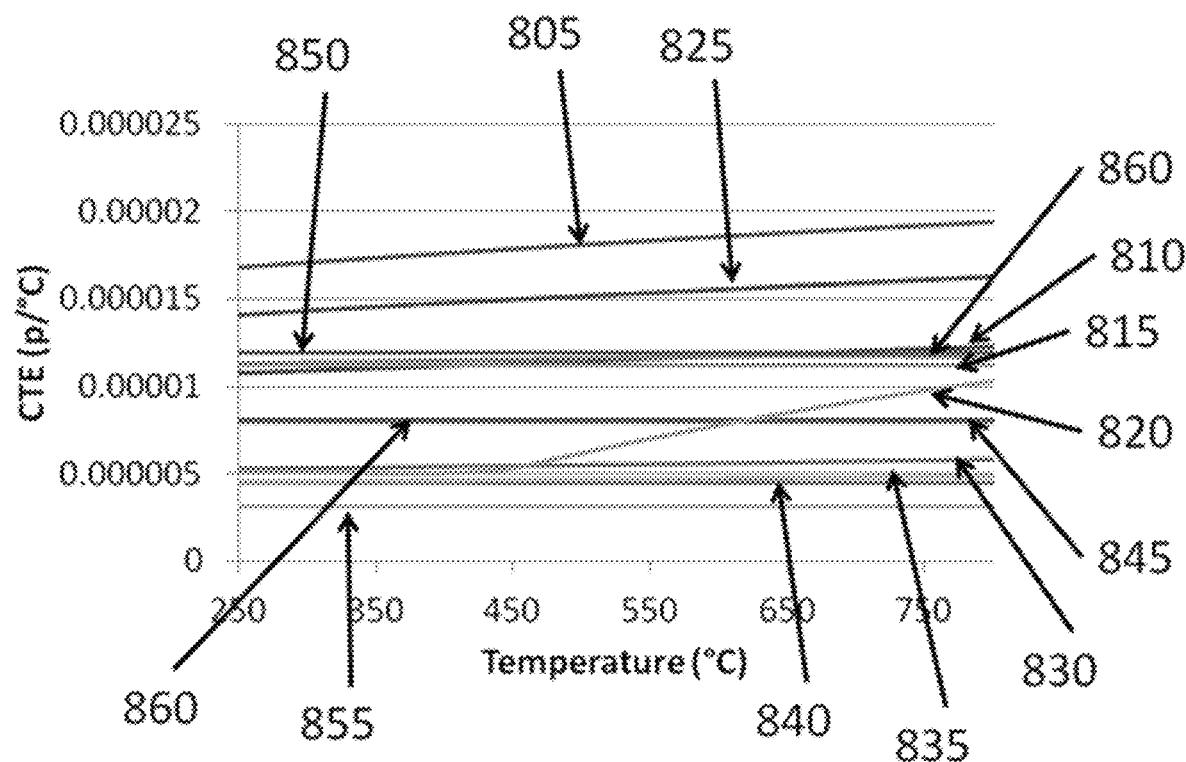
FIG. 8 shows the coefficient of thermal expansion in units of parts (p) per ° C. for various types of sleeve or collar materials, braze materials and insulating ceramics.

FIG. 8 shows the CTE in units of parts (p) per ° C. for various types of sleeve or collar materials (e.g., steel), braze materials and insulating ceramics. The sleeve or collar materials can include, for example, 304 stainless steel 805, 430 stainless steel 810, 410 stainless steel 815, and nickel-cobalt ferrous alloy 820. The braze materials can include, for example, nickel-100 825, molybdenum (Mo) 830 and tungsten (W) 835. The ceramic materials can include, for example, aluminum nitride (AlN) 840, aluminum oxide (Al$_2$O$_3$) 845, boron nitride (BN) in the direction parallel to the grain orientation 850, boron nitride (BN) in the direction perpendicular to the grain orientation 855, yttrium oxide (Y$_2$O$_3$) 860 and yttria partially stabilized zirconia (YPSZ) 865.

The CTE of the seal can match the CTE of the housing and/or conductor to any suitable tolerance. In some cases, the seal electrically isolates the conductor from the electrically conductive housing, where the CTE of the seal is at least about 1%, 5%, 10%, 15%, 20%, 30%, 50%, 60%, 70% or 80% different and/or less than the CTE of the electrically conductive housing and/or the conductor. In some instances, the seal electrically isolates the conductor from the electrically conductive housing, where the CTE of the seal is less than about 1%, 5%, 10%, 15%, 20%, 30%, 50%, 60%, 70% or 80% different and/or less than the CTE of the electrically conductive housing and/or the conductor.

The CTE of the seal can be matched to the conductive housing or the conductor at the operating temperature and/or during start-up of the cell (e.g., starting from non-molten metal electrodes). In some cases, the CTE of the seal is less than about 5%, 10%, 15% or 20% different than the CTE of the electrically conductive housing and/or the conductor at the temperature at which the electrochemical cell is operated. In some instances, the CTE of the seal is less than about 5%, 10%, 15% or 20% different than the CTE of the electrically conductive housing and/or the conductor at all temperatures between about −10° C. and the operating temperature.

The materials comprising the seal (e.g., ceramic insulator, braze alloy, and sleeve/collar) can be chosen to be chemically compatible with (e.g., stable in contact with) the interior and/or exterior environments of the cell.

Figure 9:
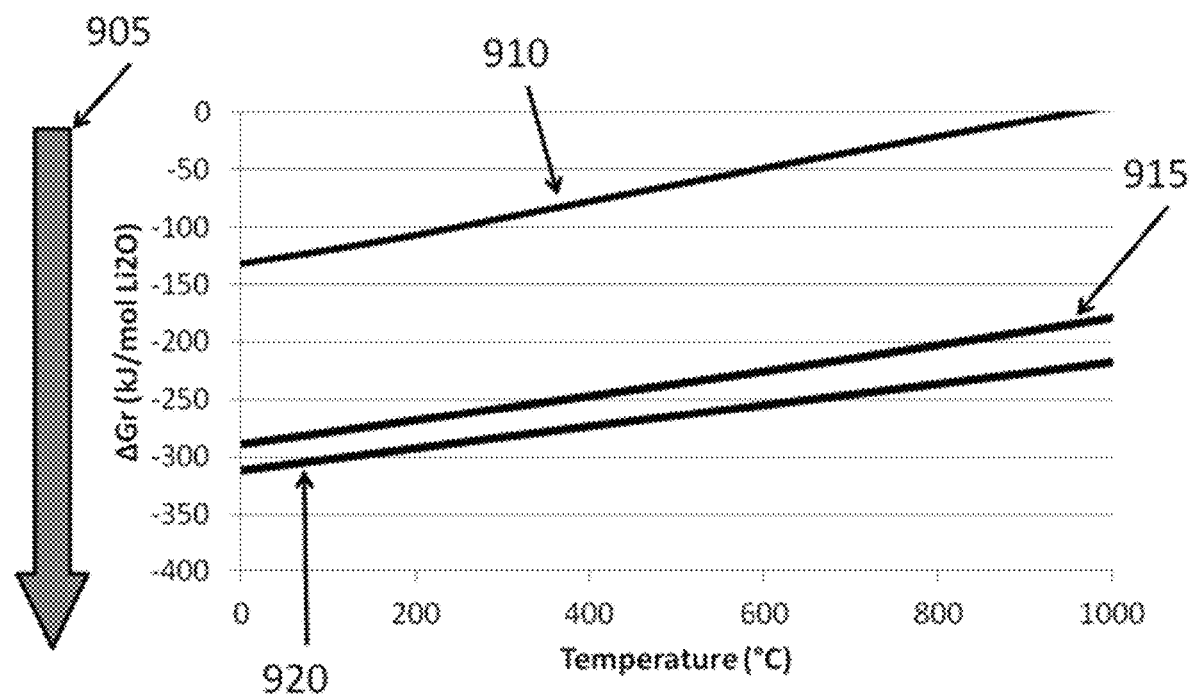
FIG. 9 shows the Gibbs free energy of formation ($\Delta G_r$) for various materials at a range of temperatures with negative numbers being more thermodynamically stable.

FIG. 9 shows the Gibbs free energy of formation ($\Delta G_r$) for various materials at a range of temperatures with negative numbers being more thermodynamically stable 905. Examples include $\Delta G_r$ curves for lithium nitride (Li$_3$N) 910, aluminum nitride (AlN) 915 and titanium nitride (TiN) 920. A thermodynamic evaluation of different insulating ceramic materials can indicate that aluminum nitride (an electrically insulating ceramic) can be stable in the presence of lithium (e.g., since the $\Delta G_r$ per mole of N of AlN is more negative than Li$_3$N). Also, the $\Delta G_r$ per mole of N of TiN is more negative than Li$_3$N and also more negative than AlN. Thus, a titanium-alloy braze can chemically reduce AlN and form TiN (e.g., by the reaction AlN+Ti→TiN+Al), which, in turn, can bond well with the titanium-alloy braze. The reactive material (e.g., reactive metal), ceramic and braze materials can be selected such that the stability (e.g., normalized Gibbs free energy of formation ($\Delta G_{r,n}$), such as, for example, Gibbs free energy of formation of the nitride compounds normalized by the number of nitride atoms in each compound formula) of the reactive metal-, ceramicand braze-nitride compounds exist in rank order. In an example where nitride compounds are rank-ordered, $\Delta G_{r,n}$ of the reactive metal nitride (e.g., $Li_3N$) is less negative (i.e., more positive) than the $\Delta G_{r,n}$ of the ceramic nitride (e.g., AlN) which is less negative than the $\Delta G_{r,n}$ of the braze nitride (e.g., TiN). Rank-ordering the materials in this manner may reduce or eliminate a driving force for the rank-ordered compounds to degrade. In some cases, the braze material also comprises materials that show low mutual solubility in the reactive material (e.g., reactive metal or molten salt) and/or do not react with the reactive material (e.g., do not form intermetallic compounds with the reactive metal). Such a selection of materials can ensure thermodynamic stability of the reactive material (e.g., reactive metal), ceramic, and braze material. Additional materials can in some cases be added based on such rank-ordering. For example, a component (e.g., ceramic) can be replaced by two or more components with more suitable rank-ordering characteristics.

In an example, a $\Delta G_{r,n}$ (normalized by mole of oxygen) rank-ordered material set includes $Y_2O_3$ (most stable compound of material set), $Nd_2O_3$ (intermediate stability compound of material set), and $Li_2O$ (least stable compound of material set). The seal comprises $Nd_2O_3$ insulating ceramic and an active braze material comprising yttrium, and seals a vessel containing lithium metal/metal vapors.

Nickel-cobalt ferrous alloy, titanium (Ti), nickel (Ni), zirconium (Zr) and 430 stainless steel (430 SS) can be stable in the presence of molten lithium (Li), as indicated, for example, by phase diagrams that show that lithium and the metal components of nickel-cobalt ferrous alloy and 430 SS (e.g., Fe, Ni, Cr, Co) do not form intermetallic compounds with Li and that their respective solubility into (or with) Li is relatively low (e.g., less than about 1 mol-%). Titanium-alloy braze can bond to ferrous alloys, such as, for example, nickel-cobalt ferrous alloy and/or 430 SS. In some cases, AlN, titanium-alloys, and nickel-cobalt ferrous alloy/430 SS are all stable in the presence of air at elevated temperatures. Thus, in an example, the method for choosing seal materials described herein shows that a seal comprising an insulating ceramic that comprises AlN, a braze that comprises Ti-alloy, and a sleeve or collar that comprises one or more of a nickel-cobalt ferrous alloy, 430 SS and zirconium forms a suitable seal material set. Another example of a suitable seal material set based on the process described herein includes an $Nd_2O_3$ ceramic, a braze and/or pre-metallization layer(s) comprising yttrium and nickel, and a sleeve or collar that comprises one or more of a nickel-cobalt ferrous alloy and 430 SS.

Figure 32:
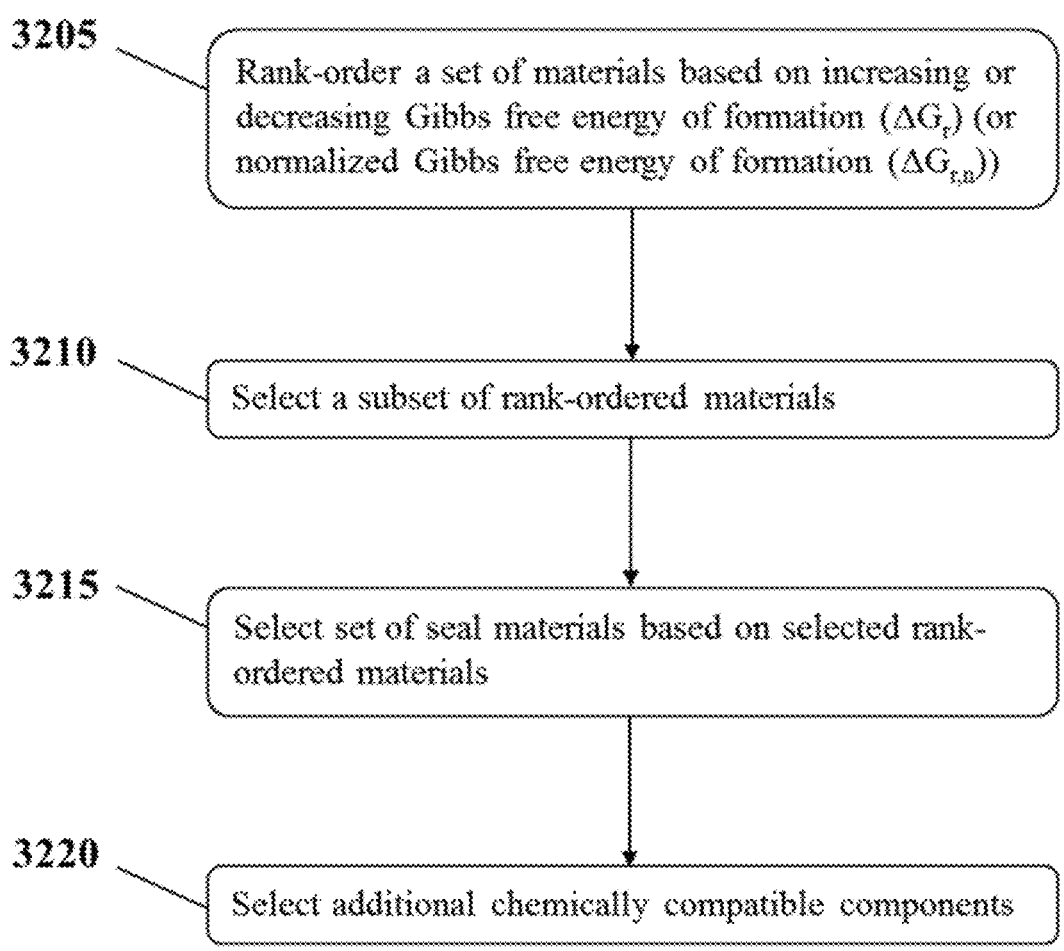
FIG. 32 in an example of a method for selecting materials to form a seal based on a rank-ordered free energy of formation selection process.

FIG. 32 is an example of a method 3200 for selecting materials to form a seal for a high-temperature device. The device can comprise a reactive material. The method can comprise a rank-ordered free energy of formation selection process. Such a selection process can provide a path toward a seal that has long-term stability. Such a seal can comprise thermodynamically stable materials (e.g., stable ceramic, stable (active) braze material, braze that can reduce the ceramic). The method can include rank-ordering a set of materials based on increasing or decreasing Gibbs free energy of formation ($\Delta G_r$) of each of the materials (3205). In some cases, the materials that are compared in the Gibbs free energy comparison (i.e., the set of materials) comprise compounds associated with one or more seal materials (e.g., compounds associated with the set of seal materials, e.g., compounds associated with a ceramic material and a braze material, such as, for example, an active braze material) and/or compounds associated with the reactive material that is to be contained. The associated compounds may be ranked in accordance with their $\Delta G_r$ (e.g., $Li_3N$ as the compound associated with the reactive material Li, TiN as the compound associated with the active braze material Ti; or $Li_2O$ as the compound associated with the reactive material Li, $Y_2O_3$ as the compound associated with the active braze material). In some cases, the compounds comprise a common element (e.g., nitrogen in $Li_3N$, AlN and TiN, or oxygen in $Li_2O$, $Nd_2O_3$ and $Y_2O_3$). In such cases, the rank-ordering can be based on increasing or decreasing normalized Gibbs free energy of formation ($\Delta G_{r,n}$, where $\Delta G_{r,n}$ is equal to $\Delta G_r$ divided by the stoichiometric number of atoms of the common elements in the formula of the compound, such as, for example, $\Delta G_r = \Delta G_{r,n}/1$ for $Li_3N$ and $\Delta G_r = \Delta G_{r,n}/3$ for $Nd_2O_3$ where nitrogen and oxygen, respectively, is considered the common element) of each of the materials (e.g., the associated compounds). The common element can be capable of forming a compound with the reactive material (e.g., $Li_3N$ or $Li_2O$). The common element can be, for example, nitrogen, oxygen or sulfur (e.g., the compounds are nitrides, oxides or sulfides). As previously described, reaction(s) involving the common element may aid in bonding between the selected rank-ordered materials (e.g., $AlN+Ti \rightarrow TiN+Al$, or $Nd_2O_3+2Y \rightarrow Y_2O_3+2Nd$).

The method can further include selecting a subset of the rank-ordered materials (3210) (e.g., such that the selected materials remain rank-ordered). Next, in a step 3215, the method can include selecting a set of seal materials (e.g., a ceramic material and an active braze material) based on the selected rank-ordered materials. This may eliminate a driving force for the selected rank-ordered materials to degrade when provided in the seal and/or exposed to the reactive material (e.g., Li). The selected set of seal materials can comprise a ceramic material and an active braze material. Selecting the set of seal materials can comprise selecting one or more seal materials (e.g., first a ceramic and then a braze) with associated compounds that have a $\Delta G_{r,n}$ that is more negative than a compound associated with the reactive material. The selection (e.g., a first step of the selection) may include selection of a ceramic material (e.g., AlN or $Nd_2O_3$, respectively) that is electrically insulating and that has a $\Delta G_{r,n}$ that is more negative than a compound associated with the reactive material (e.g., $Li_3N$ or $Li_2O$, respectively). The selection (e.g., a second step of the selection) may include selection of an active braze material (e.g., Ti-alloy or Y-alloy, respectively) with an associated compound (e.g., TiN or $Y_2O_3$, respectively) that has a $\Delta G_{r,n}$ that is equal to or more negative than the ceramic material. In an example, the reactive material contained in the high-temperature device comprises lithium (Li). The selected rank-ordered materials in this example can be, in order, lithium nitride ($Li_3N$), aluminum nitride (AlN) and titanium nitride (TiN); the selected ceramic material can comprise aluminum nitride (AlN) and the selected active braze material can comprise titanium (Ti). Alternatively, the selected rank-ordered materials in this example can be, in order, lithium oxide ($Li_2O$), neodymium oxide ($Nd_2O_3$) and yttrium oxide ($Y_2O_3$); the selected ceramic material can comprise neodymium oxide ($Nd_2O_3$) and the selected active braze material can comprise yttrium (Y). In some cases, the active braze material is also selected based on its stability with the reactive metal (e.g., a stable active braze material may have low (e.g., <1%, <0.1%) mutual solubility with the reactive material and/or the active braze material and the reactive material may be stable in the presence of each other and/or not form intermetallic compounds). In some cases, the selected ceramic (AlN or $Nd_2O_3$, respectively) and active braze material (Ti or Y, respectively) are thermodynamically stable with Li. In some examples, the seal may comprise a ceramic material that is thermodynamically stable in the presence of the reactive material, an active braze material that is chemically stable with the reactive material, and where the active braze material chemically reacts with the ceramic material (e.g., $Ti+AlN \rightarrow TiN+Al$ or $Nd_2O_3+2Y \rightarrow Y_2O_3+2Nd$, respectively) and the compound product of that reaction (e.g., TiN or $Y_2O_3$, respectively) is stable in the presence of the reactive material.

The method 3200 can further include selecting a sleeve or collar to join to the seal (3220) and/or selecting a container of the device to join to the sleeve or collar (3220). As described in greater detail elsewhere herein, the sleeve or collar can comprise a material that is chemically compatible with the seal and/or with one or more other materials of the device, and the container can comprise a material that is chemically compatible with the sleeve or collar and/or with one or more other materials of the device or seal. In some cases, one or more pairs of the selected rank-ordered materials can be CTE-matched. The steps of method 3200 may be performed in a different order, or one or more steps may be omitted. Further, the method 3200 may in some cases include additional or different step(s). One or more steps of method 3200 may be modified without altering its scope. For example, the method may be modified to account for presence of additional materials (e.g., a reactive atmosphere or a reactive compound or element) during bonding (e.g., allowing compounds with improved properties to be formed during bonding, such as, for example, by introducing an additional common element). Such additional materials may allow a modified set of rank-ordered materials to be formed (e.g., including one or more compounds comprising the additional material). A modified subset of rank-ordered materials (e.g., including one or more compounds comprising the additional material) and/or a modified set of seal materials may then be selected.

The coefficient of thermal expansion (CTE) may be considered when designing a seal. The seal may comprise structural features that can compensate for CTE mismatch. A CTE mismatch between various materials may not be a major concern during initial fabrication heat-up and brazing process of the high temperature seal (e.g., since the components may not be bonded, which allows for sliding interfaces). In some instances, during cool-down (e.g., after the braze has melted, bonded and solidified), the materials can contract at different rates (e.g., the insulator and metal sleeves can be exposed to large stresses). Therefore, one or more transition pieces may be added. The transition pieces may have CTE values intermediate to that of the insulator and the cell top and/or can have spring-like design features (e.g., a nickel-cobalt ferrous alloy, 430 SS or zirconium sleeve). In some cases, the transition pieces are thin relative to the insulator (e.g., the transition piece can have a thickness that is less than about 50% or 10% the thickness of the insulator). In some cases, the braze material is separated (e.g., kept away) from intended welding joints. In some cases, the seal includes a chemically stable material set (e.g., aluminum nitride ceramic, titanium-alloy braze, and nickel-cobalt ferrous alloy or 430 stainless steel sleeve), and can be CTE-matched or have a design that can accommodate differences in CTE.

In some cases, the seal does not comprise materials that are exactly matched in CTE and/or matched to the CTE of the housing and/or conductor. A mismatch in CTE can be compensated for by structural features and/or geometries such that the seal remains hermetically sealed and/or forms a suitable electrical insulation (e.g., at the operating temperature of the battery) and/or following one or more start-ups of the battery (e.g., melting of the liquid metal electrodes). For example, the seal can have a shape (i.e., suitable geometry) such that the electrochemical cell is hermetically sealed (e.g., the geometry of the seal can comprise a ceramic material bonded to a flexible metal component).

The CTE of the seal material may not be the same as the electrically conductive housing and/or the conductor. The materials of the seal, the conductive housing and/or the conductor can have any amount of CTE mismatch. In some cases, the CTE of the seal or seal material (or a portion thereof) is greater than or equal to about 1%, 5%, 10%, 15%, 20%, 25%, 30%, 40%, 50%, 60%, 70%, 80%, 90%, 100%, 125%, 150%, 300%, 400%, 500%, 600% or 700% different than the CTE of the electrically conductive housing and/or the conductor. In some cases, the CTE of a first seal material (e.g., metal collar) is less than about 1%, 5%, 10%, 15%, 20%, 25%, 30%, 40%, 50%, 60%, 70%, 80%, 90%, 100%, 125%, 150%, 300%, 400%, 500%, 600% or 700% different than the CTE of a second seal material (e.g., electrically isolating ceramic). In some cases, the CTE of a first seal material (e.g., metal collar) is at least about 1%, 5%, 10%, 15%, 20%, 25%, 30%, 40%, 50%, 60%, 70%, 80%, 90%, 100%, 125%, 150%, 300%, 400%, 500%, 600% or 700% different than the CTE of a second seal material (e.g., electrically isolating ceramic).

The CTE of the seal can be mismatched (e.g., intentionally or purposely mismatched) to the CTE of the conductive housing and/or the conductor at the operating temperature and/or during start-up of the cell (e.g., starting from non-molten metal electrodes). In some cases, the CTE of the seal is at least about 10% different than the CTE of the electrically conductive housing and/or the conductor at the temperature at which the electrochemical cell is operated. In some instances, the CTE of the seal is at least about 1%, 5%, 10%, 15%, 20%, 25%, 30%, 40%, 50%, 75%, 100%, 125%, 150% or 300% different than the CTE of the electrically conductive housing and/or the conductor at any or all temperatures between about −10° C. and the operating temperature (e.g., at least about 200° C., 250° C., 300° C., 350° C., 400° C., 450° C. or 500° C.).

In some cases, the geometry of the seal comprises a ceramic material bonded to a flexible metal component. The flexible metal component can be joined (e.g., welded or brazed) to the electrically conductive housing and/or the conductor.

Figure 10:
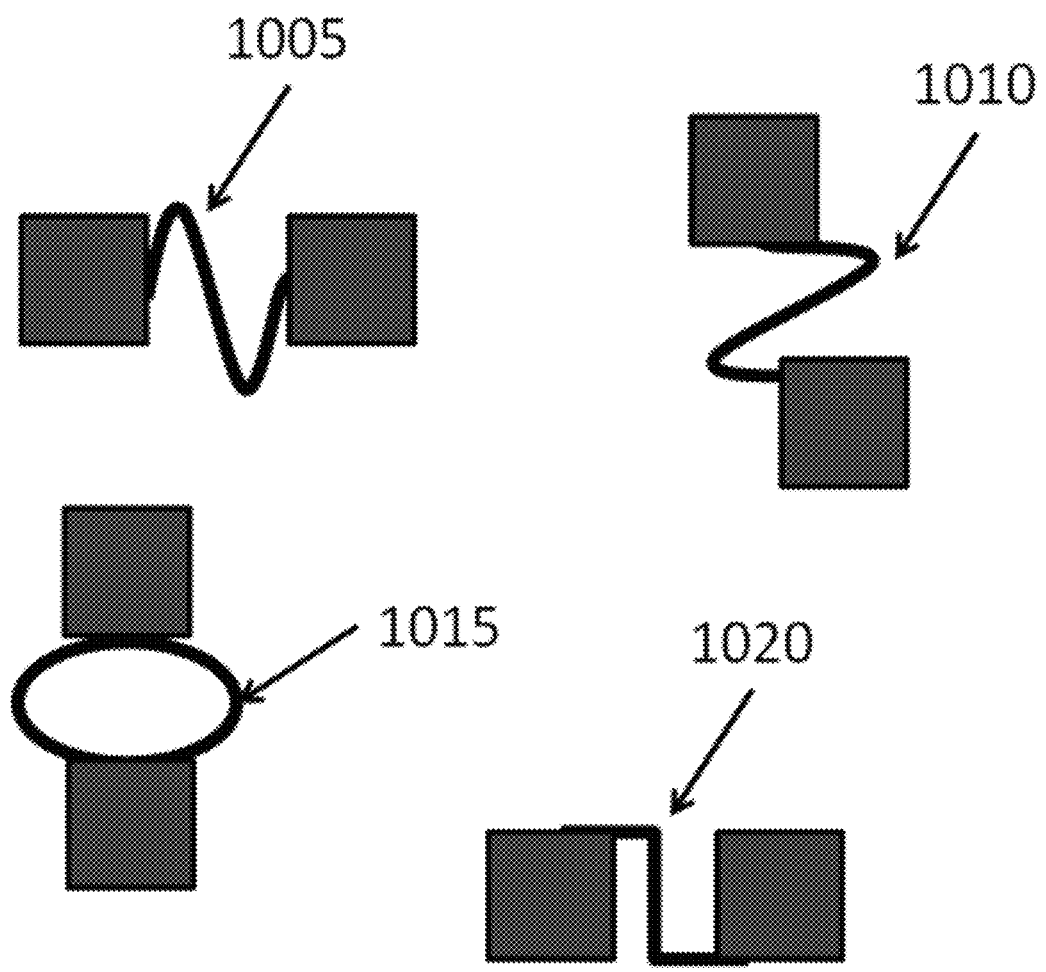
FIG. 10 shows examples of features that can compensate for a coefficient of thermal expansion mismatch.

FIG. 10 shows examples of features that can compensate for a CTE mismatch. Examples include fins, cuts or bends in any configuration that can accommodate CTE mismatch (e.g., by spatial compliance). For example, a bend can be sinusoidal (either horizontally 1005 or vertically 1010), oval or tubular 1015, a sharp bend 1020, etc. The feature can be attached at a point above, below or in line with the top of the cell and/or current collector. The feature can be joined to, part of, or cut away from the cell housing and/or conductive feed-through. The feature can be coated (e.g., to improve chemical stability to the internal or external environments of the cell). The orientation, thickness and/or shape can be optimized to increase stability and resistance to failure from vibration and mechanical forces.

Low CTE mismatch may be achieved through suitable material selection. In some cases, one or more of the electrically conductive components of the seal comprise an electrically conductive ceramic (e.g., tungsten carbide) with a CTE that matches or is within less than or equal to about 1%, 2%, 5%, 10% or 20% of the CTE of the electrically insulating ceramic. The electrically conductive (CTE-matched) ceramic can be joined to both the insulating ceramic component and a metal collar. The joining process may involve brazing, diffusion bonding, and/or welding. The conductive ceramic may comprise, for example, tungsten carbide (WC), titanium carbide (TiC) and/or other carbides. The conductive ceramic may be sintered with some fraction (e.g., between about 2% and 10%, or at least about 2%, 3%, 4%, 5%, 6%, 7%, 8%, 9% or 10% in terms of weight, atomic, molar or volumetric composition) of metal (e.g., Co or Ni) which can allow for direct wetting of braze to the conductive ceramic.

In some cases, the electrically conductive components of the seal comprise a metal with low CTE (e.g., less than about 1 ppm/° C., 2 ppm/° C., 3 ppm/° C., 4 ppm/° C., 5 ppm/° C., 6 ppm/° C., 7 ppm/° C., 8 ppm/° C., 9 ppm/° C., 10 ppm/° C., 11 ppm/° C., 12 ppm/° C. or 15 ppm/° C.), low Young's modulus (e.g., less than about 0.1 GPa, 0.5 GPa, 1 GPa, 10 GPa, 50 GPa, 100 GPa, 150 GPa, 200 GPa or 500 GPa), high ductility (e.g., an ultimate strength greater than about 100%, 200%, 300%, 400% or 500% that of the yield strength), or any combination thereof. In some cases, the ultimate strength can be greater than about 50%, 100% or 200% that of the yield strength of the material for it to have sufficient ductility. In some cases, the electrically conductive components do not comprise an electrically conductive ceramic. Low CTE, low Young's modulus and/or high ductility component characteristics can lead to low stress concentrations in the ceramic. Low Young's modulus component characteristics can result in less stress generated between components with different CTE values (e.g., for a given CTE mismatch between two materials that are bonded together, if at least one material has a low Young's modulus, the strain generated by the CTE difference can cause the material with the low Young's modulus to "stretch," resulting in a relatively small stress force between the two materials). Low CTE, low Young's modulus and/or high ductility component characteristics may reduce likelihood of failure (e.g., due to reduced stress concentrations and/or less stress generated). Metals that meet these specifications (in addition to corrosion resistance to the internal and external cell environment) can include, for example, zirconium (Zr), high-zirconium content alloys, tungsten (W), titanium (Ti), niobium (Nb), tantalum (Ta), nickel (Ni) and/or molybdenum (Mo).

In some implementations, the seal comprises a ceramic, one or more braze materials and one or more metal collars. For example, two metal collars may be joined to the ceramic, one to each side of the ceramic. Each such metal collar may be further joined to additional metal collar(s). Thus, a compound metal collar may be created that comprises two or more metal collars. In some examples, the compound metal collar comprises at least two metal collars, of which at least one metal collar comprises a material that is suitably joined (e.g., using one type of braze) to the ceramic and at least one metal collar comprises a material that is suitably joined to another component of the seal or of the cell (e.g., using another type of braze). The two metal collars may also be joined (e.g., using yet another type of braze). In some instances, at least a portion (e.g., all) of the brazes used to join the metal collars of the seal to each other and/or to other parts of the cell may be of the same type. In other instances, at least a portion or all of the brazes may be of different types. Further, one or more of the metal collars may be welded rather than brazed, or welded and brazed. The seal may comprise one or more compound metal collars. In some examples, the seal comprises at least about 1, 2, 3, 4, 5, 6, 7, 8, 9, 10, 12, 14, 16, 18, 20, 25, 30, 40 or more individual metal collars. In an example, the seal comprises 4 individual metal collars forming two compound metal collars. In some examples, at least a portion of the individual metal collars may comprise the same material. For example, metal collars comprising the same material may be used for joining metal collars to similar materials (e.g., similar cell housing or conductors materials).

In some cases, the seal comprises a ceramic, a braze material, a first (e.g., thin) metal collar, and/or a second metal collar. The first metal collar may be brazed to the ceramic, and the second metal collar may be brazed to the first metal collar. In some cases, the first metal collar is a low CTE material such as zirconium (Zr) or tungsten (W) and the second metal collar is a ferrous alloy, such as steel, stainless steel or 400 series stainless steel (e.g., 430 stainless steel). In some examples, the first metal collar is less than about 10 micrometers (μm, or microns) thick, 20 μm, 50 μm, 100 μm, 150 μm, 250 μm, 500 μm, 1,000 μm, μm 1,500 or 2,000 μm thick.

In some cases, the seal comprises a ceramic, a braze, a first metal collar, a second metal collar and a third metal collar. The first metal collar may be joined to one part of the ceramic, and the second metal collar may be joined to the first metal collar. The third metal collar may be joined to a different part of the ceramic such that the first metal collar and the third metal collar are separated by an electronically insulating ceramic material. Joints between the first metal collar and the ceramic and between the third metal collar and the ceramic may both be hermetic. In some cases, the seal further comprises a fourth metal collar that is joined to the third metal collar (e.g., the first metal collar is joined to one part of the ceramic, the second metal collar is joined to the first metal collar, the third metal collar is joined to another part of the ceramic and the fourth metal collar is joined to the third metal collar). The braze material used to join the first metal collar to the second metal collar may comprise or be similar to any of the braze compositions described herein. The first metal collar or the second metal collar may be joined (e.g., using a braze composition similar to any of the braze compositions described herein, or welded) to the cell lid. The third metal collar may be joined to the fourth metal collar or directly to a negative current lead (e.g., brazed using any of the braze compositions of the disclosure).

Figure 23:
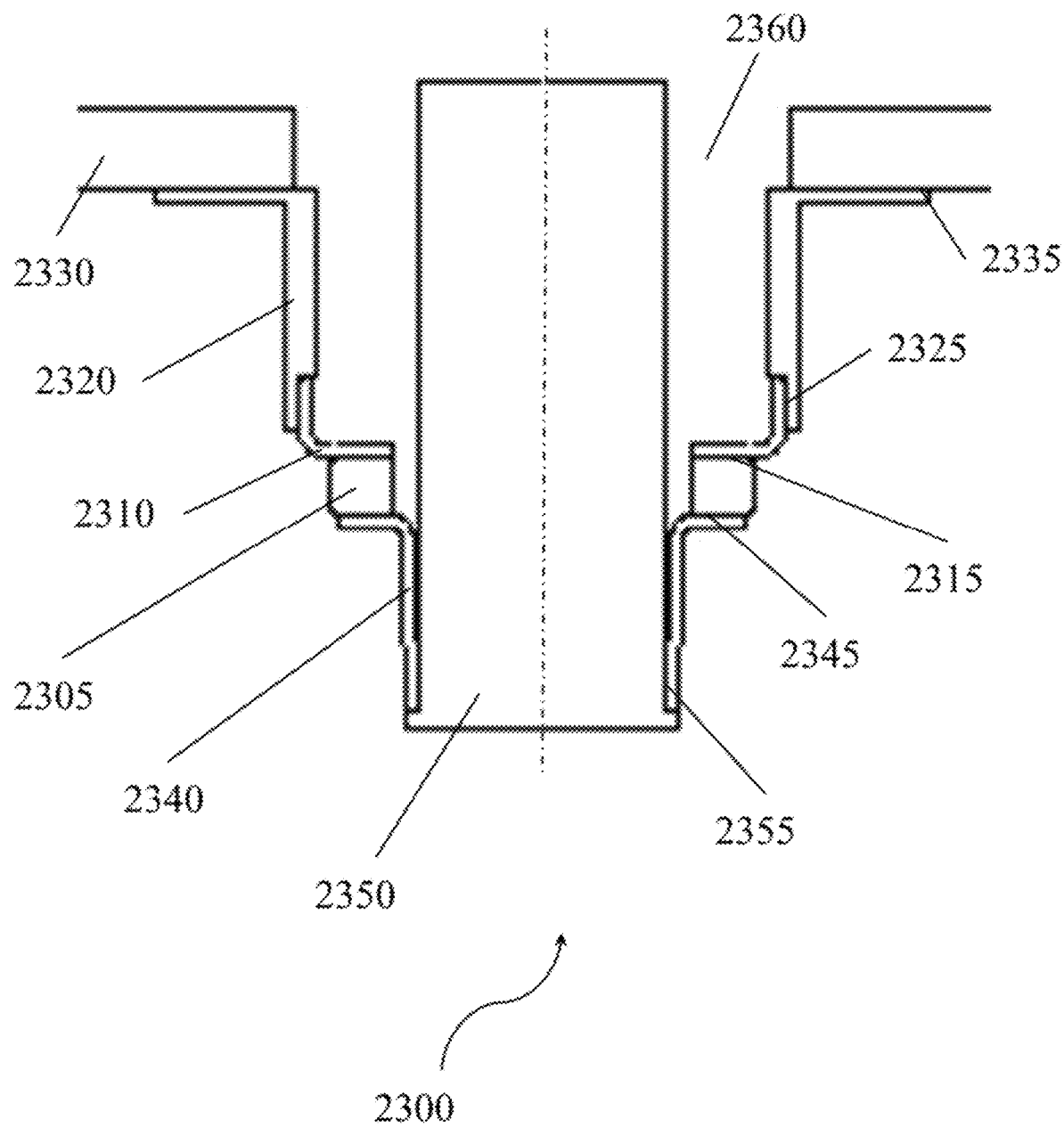
FIG. 23 shows a seal design having a single ceramic insulator disposed between one or more metal sleeves.

FIG. 23 is an example of a seal 2300 that comprises one ceramic component (e.g., AlN) 2305. The ceramic component may be a washer. The ceramic component may be electrically insulating. The ceramic component 2305 is joined with a first metal collar (e.g., Zr) 2310 via a first metal-to-ceramic joint (e.g., braze) 2315. The first metal collar 2310 is joined with a second metal collar (e.g., 430 SS) 2320 via a first metal-to-metal joint (e.g., weld, braze) 2325. The second metal collar 2320 is joined to a cell lid (e.g., 430 SS) 2330 via a second metal-to-metal joint (e.g., weld, braze) 2335. The seal further comprises a third metal collar (e.g., Zr) 2340 joined to the ceramic component 2305 via a second metal-to-ceramic joint (e.g., braze) 2345. The third metal collar 2340 is joined with a conductor (e.g., negative current lead) 2350 via a third metal-to-metal joint (e.g., weld, braze) 2355. The seal 2300 may comprise one or more gaps (e.g., air gaps) 2360.

In some cases, the first, second, third, and/or the fourth metal collar comprise structural features to relieve mismatches in the CTE of the joined materials, described in greater detail elsewhere herein. Such configurations may enable mechanically robust joining of the ceramic to one or more metal collars (e.g., the first metal collar, or the third metal collar), and the joining of one or more metal collars (e.g., the second metal collar, or the third or fourth metal collar) to the cell lid or a current conducting rod (also "conductor" herein) by simple welding (e.g., TIG welding, or laser welding) or brazing.

Figure 11:
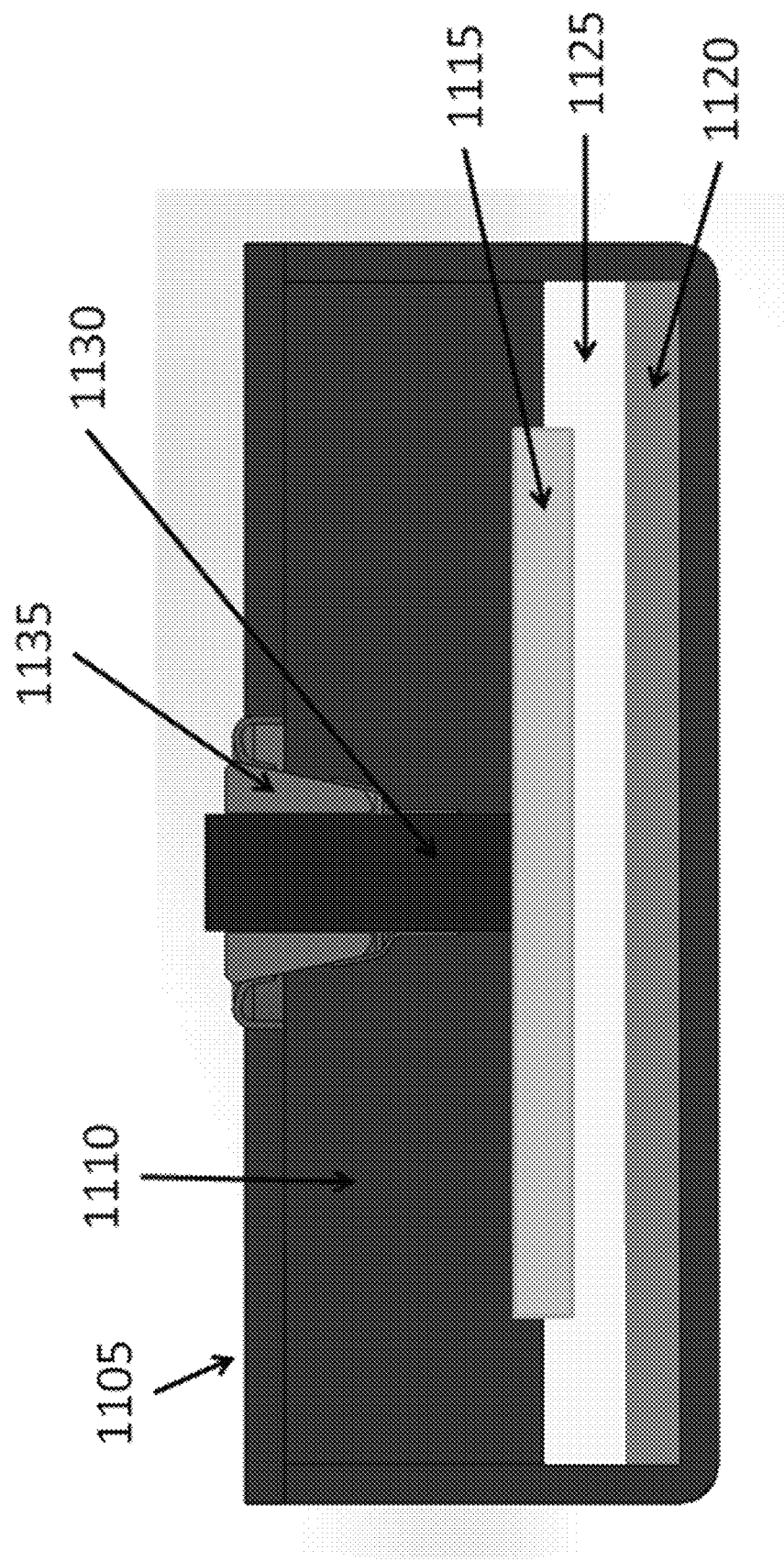
FIG. 11 shows an electrochemical cell having a brazed ceramic seal.

A brazed ceramic seal may be used to hermetically and/or electrically seal a system or vessel comprising a reactive material (e.g., an electrochemical cell having liquid metals). FIG. 11 shows an electrochemical cell having a brazed ceramic seal. A cell housing 1105 can have an empty head space 1110, a molten negative electrode (e.g., anode during discharge) 1115, a molten positive electrode (e.g., cathode during discharge) 1120 and a molten electrolyte 1125 disposed therebetween. The liquid metal anode can be in contact with a conductive feed-through 1130 that passes through the housing and serves as a negative terminal. The conductive feed-through can be electrically isolated from the housing by the seal 1135. The liquid metal cathode can be in contact with the housing, which can serve as a positive terminal.

In some cases, a brazed ceramic seal comprises a sub-assembly. The sub-assembly can comprise the insulating ceramic bonded to one or more (e.g., two) flexible, spring-like or accordion-like components, referred to herein as metal sleeves. After the sub-assembly is fabricated, the sleeves can be brazed or welded to other cell components such as the cell lid and/or the negative current lead. Alternatively, all of the joints can be created on the complete cap assembly by brazing (e.g., if tolerance limits are sufficiently tight). The chemical compatibility between the braze materials and the atmospheres the materials will be exposed to, and the thermal robustness during high temperature operation and thermal cycling can be evaluated during design of the sub-assembly. In some instances, the ceramic material is aluminum nitride (AlN) or silicon nitride ($Si_3N_4$), and the braze is a titanium alloy, titanium doped nickel alloy, a zirconium alloy or a zirconium doped nickel alloy.

Figure 12:
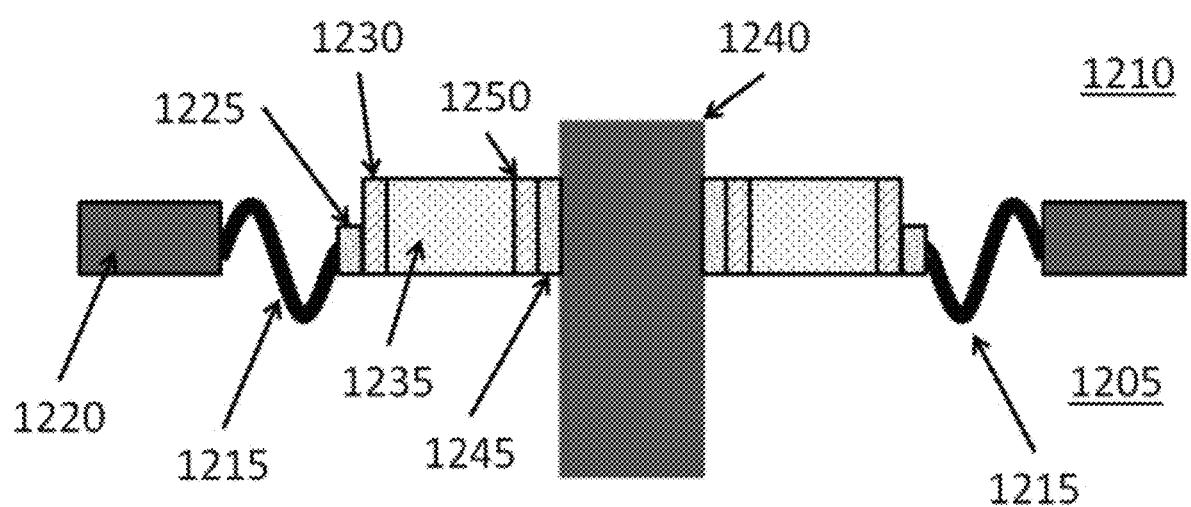
FIG. 12 shows a schematic drawing of a brazed ceramic seal where the materials are thermodynamically stable with respect to the internal and external environments of the cell.

FIG. 12 shows a schematic drawing of a brazed ceramic seal with materials that are thermodynamically stable with respect to internal 1205 and/or external 1210 environments of a cell. Such materials may not require a coating. The various materials can have mismatched CTEs that can be accommodated for with one or more geometric or structural features 1215 (e.g., a flexible metal bend, fin, or fold). The CTE-accommodating feature 1215 can be welded to a cell housing 1220 (e.g., 400-series stainless steel) on one end and brazed 1225 to a first metalized surface 1230 of a ceramic material 1235 on the other end. The ceramic material 1235 can be, for example, aluminum nitride (AlN), boron nitride (BN) or yttrium oxide ($Y_2O_3$) as described herein. The ceramic material can be brazed to a current collector (conductive feed-through) 1240 by a braze 1245. The braze 1245 can comprise, for example, iron (Fe), nickel (Ni), titanium (Ti) or zirconium (Zr). The braze 1245 can be in contact with a second metalized surface of the ceramic 1250 (e.g., titanium or titanium nitride). Several layers of materials placed adjacent to each other can result in a CTE gradient that can mitigate mismatch.

Figure 13:
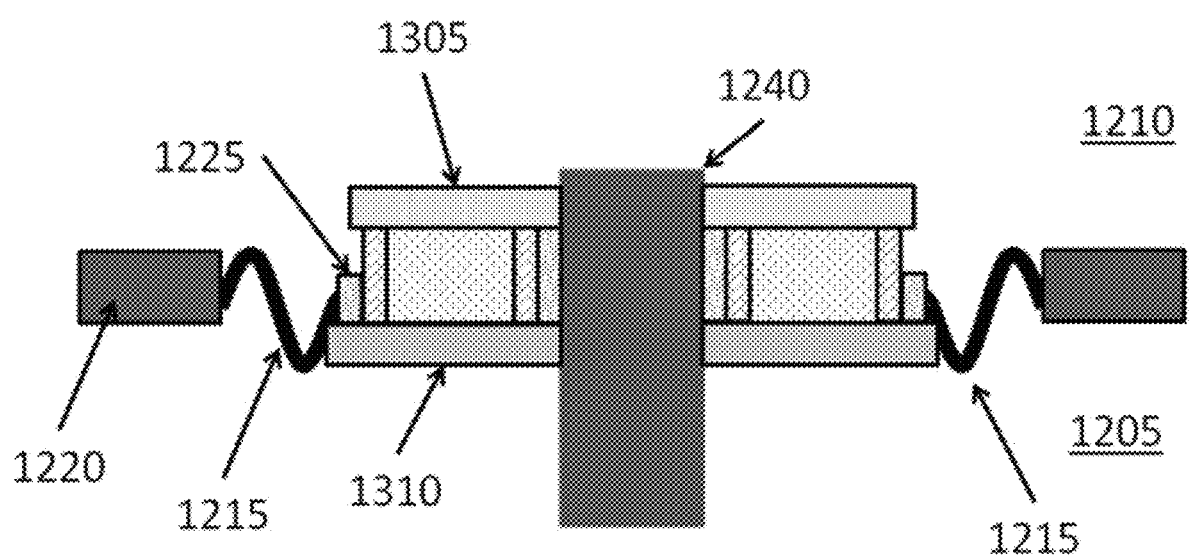
FIG. 13 shows a seal where the ceramic and/or braze materials are not thermodynamically stable with respect to the internal and external environments.

FIG. 13 shows a seal where the ceramic and/or braze materials are not thermodynamically stable with respect to the internal 1205 and external 1210 environments. In some instances, a coating can be applied to an outside 1305 and/or an inside 1310 of the seal or enclosure components.

Figure 14:
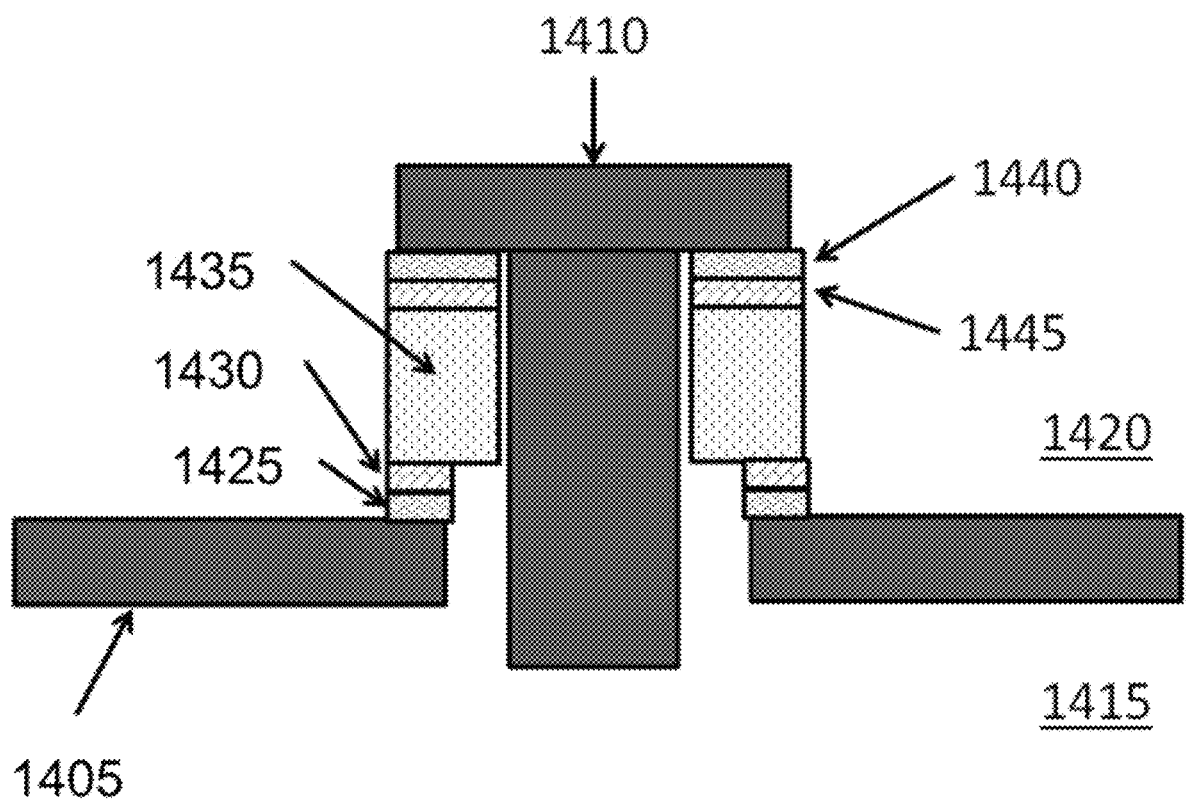
FIG. 14 shows an example of a brazed ceramic seal.

FIG. 14, FIG. 15, FIG. 16 and FIG. 17 show more examples of brazed ceramic seals. In some cases, the seals extend above the housing by a greater distance. FIG. 14 shows an example of a seal on a cell which may advantageously not need a coating, not need a CTE mismatch accommodation feature, and/or provide increased structural stability against vibration and mechanical forces during operation, manufacturing or transportation. In this example, a housing 1405 can be sealed from a current collector 1410. This arrangement can hermetically seal an inside 1415 of the cell from an outside 1420 of the cell. The components of the seal can be arranged vertically and can include a first braze 1425, a ceramic 1435, a first metalized surface 1430 of the ceramic, a second braze 1440, and a second metalized surface 1445 of the ceramic.

Figure 15:
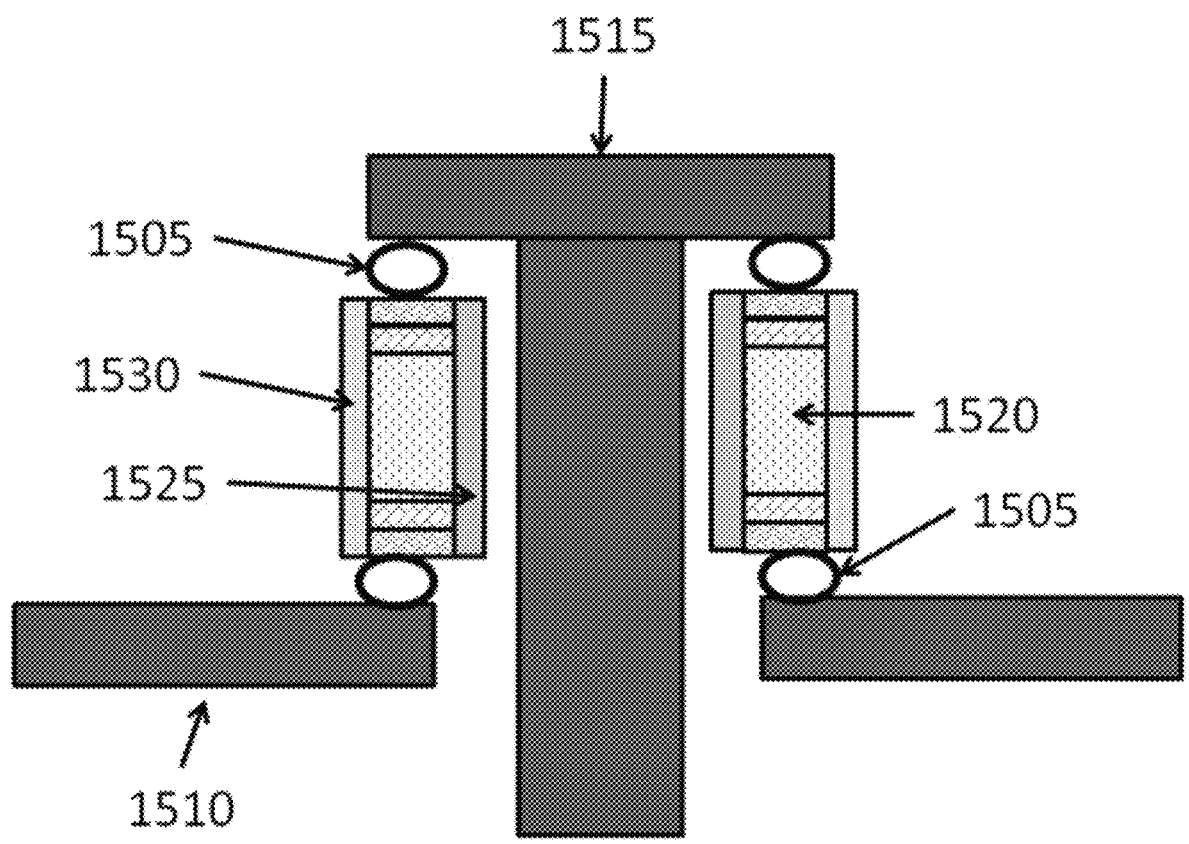
FIG. 15 shows an example of a brazed ceramic seal.

FIG. 15 shows a seal 1520 that can provide structural stability against vibration and mechanical forces during operation, manufacturing and transportation. In this example, CTE accommodating features 1505 are disposed between a housing 1510 and a current collector 1515. The seal 1520 can comprise a ceramic and two brazes in contact with metalized surfaces of the ceramic. In some cases, the seal is coated on an inside 1525 and/or an outside 1530. In some cases, the coating(s) can comprise yttrium oxide ($Y_2O_3$).

Figure 16:
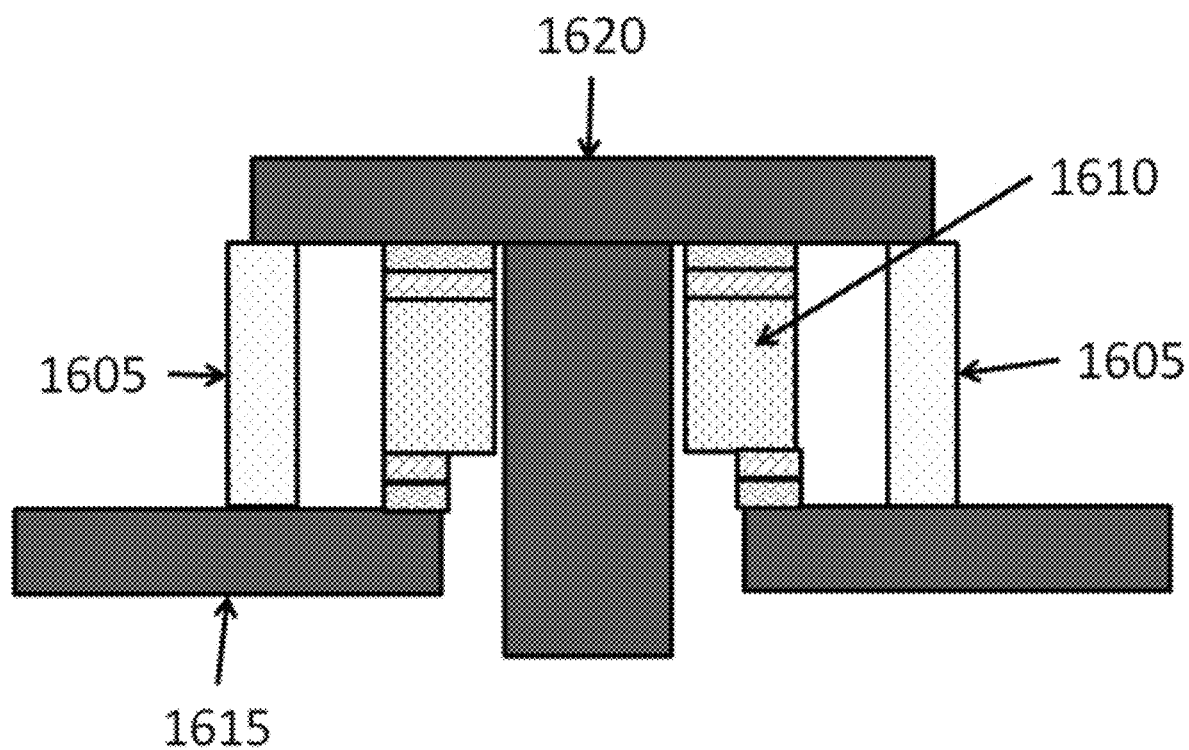
FIG. 16 shows an example of a brazed ceramic seal.

FIG. 16 shows a seal 1610 with secondary mechanical load bearing components 1605. The load bearing components are electrically insulating in some cases. In some instances, the load bearing components do not form a hermetic seal. The seal 1610 (e.g., including a ceramic, two brazes in contact with metalized surfaces of the ceramic, etc.) can hermetically seal a cell housing 1615 from a current collector 1620.

Figure 17:
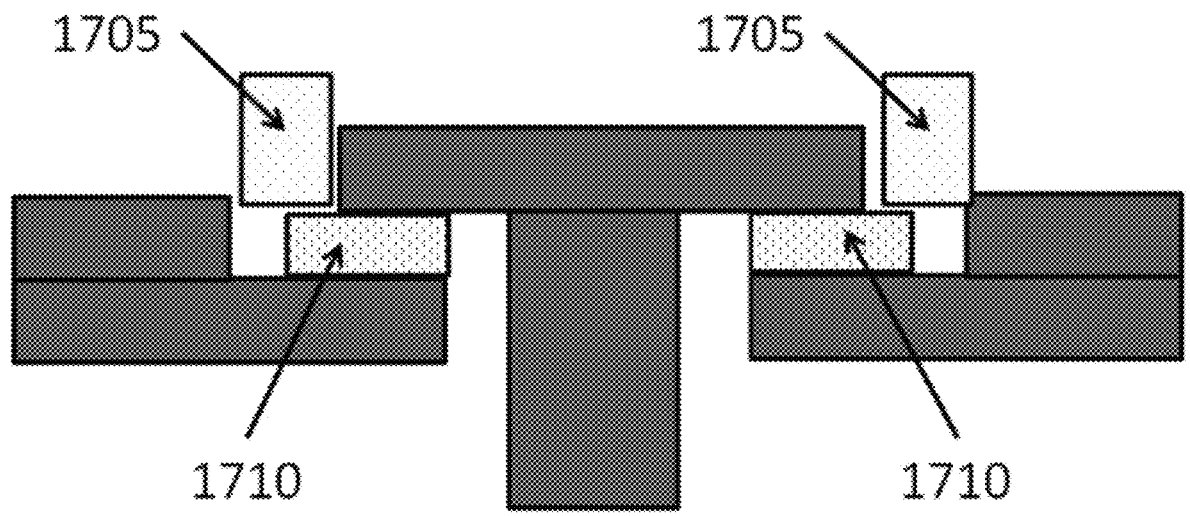
FIG. 17 shows an example of a brazed ceramic seal.

FIG. 17 shows an example of a secondary back-up seal 1705 (e.g., in case of failure of a primary seal 1710). The secondary seal can fall onto and/or bond over the primary seal in the case of failure of the primary seal. In some cases, the secondary seal comprises glass that melts and becomes flowable in the case of the primary seal failing. The melted secondary seal can pour down onto the failed primary seal and block leaks. In some cases, the seal 1705 and/or the seal 1710 can be axisymmetric (e.g., doughnut-shaped around a vertical axis through the aperture in the cell lid).

Figure 18:
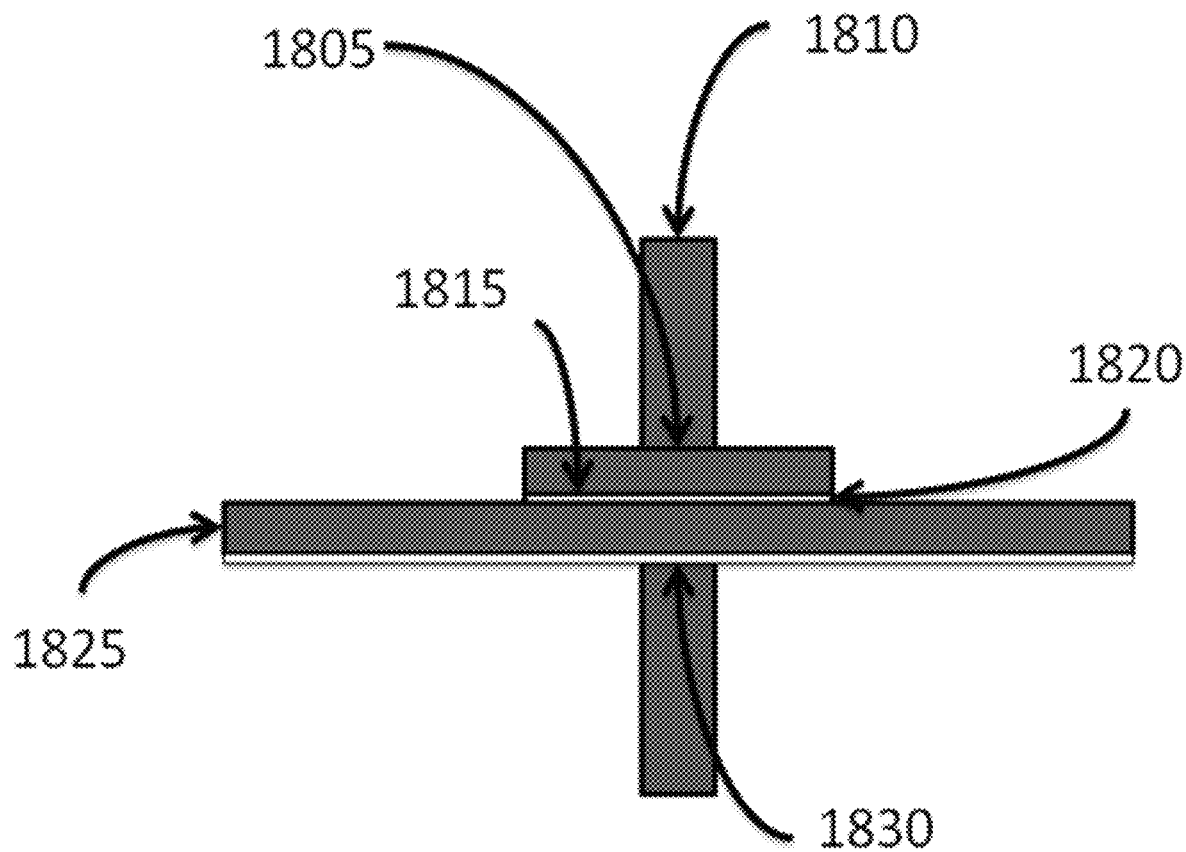
FIG. 18 shows an example of a seal having an alumina or zirconia seal with yttrium oxide ($Y_2O_3$) coating and iron-based braze.

FIG. 18 shows another example of a seal configuration or sub-assembly (e.g., an alumina or zirconia seal with yttrium oxide ($Y_2O_3$) coating and iron- or titanium-based braze). The seal can include a collar 1805. The collar can provide mechanical support. The collar can comprise ferritic stainless steel welded to a rod. The seal configuration can include a conductor 1810. The conductor can be made of ferritic stainless steel (e.g., having a CTE of about 12). The conductor can be tolerant of one or more reactive materials (e.g., tolerant of liquid lithium). The conductor can be unlikely to change mechanical properties or form due to a phase transition. The conductor can have greater than or equal to about 40% higher electrical conductivity than 304 stainless steel. The seal can include a braze 1815. The braze can be disposed above and below a ceramic washer 1820. The braze can be iron-based. The braze can have a CTE of about 12 and withstand high temperatures (e.g., 850° C. or greater). The ceramic washer 1820 can be made of alumina (e.g., with a CTE of about 7), or zirconia (e.g., tetragonal with CTE of about 11). The low CTE mismatch of a zirconia washer can allow higher brazing temperature without cracking. A cell housing 1825 can be made from ferritic steel and provide mechanical support through the ceramic (e.g., the ceramic washer) to the collar. The seal configuration can comprise a coating (e.g., spray coating) 1830 (e.g., comprising yttrium oxide ($Y_2O_3$)). The coating can be provided on the cell housing (e.g., lid). The coating can be capable of being resistant to reactive materials (e.g., lithium (Li) vapor), inexpensive and/or mitigate ceramic compatibility.

The length (e.g., horizontal extent) of the braze interface can be about three to six times the thickness of the thinnest component being brazed. If the ratio of thickness to braze interface length is too low (e.g., less than about three), the sealing area may be mechanically too weak to hold the brazed joint together. If the ratio is too high (e.g., greater than about six), the stresses on the sleeve due to CTE mismatch may cause the sleeve to fracture or pull away from the ceramic. In some cases, the braze interface absorbs the stresses induced by the mismatch of the CTEs of the sleeve, braze and ceramic induced by forming the joint at high temperature and cooling down to room temperature after fabrication.

Figure 19:
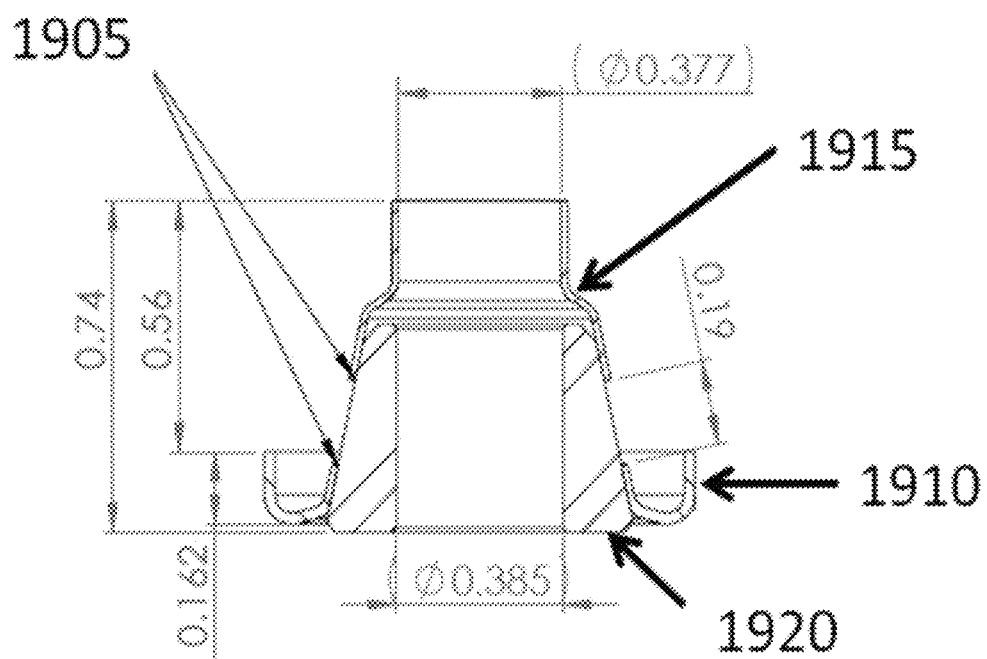
FIG. 19 shows an example of a sub-assembly.

FIG. 19 shows an example of a sub-assembly with braze length equal to between about 3 and 6 times the thickness of a metal sleeve. The metal sleeve (e.g., nickel-cobalt ferrous alloy, zirconium alloy) can have a thickness of about 0.01 inches, 0.0080 inches, 0.0060 inches, 0.0030 inches, 0.0015 inches or less. The sub-assembly can comprise a braze 1905, one or more (e.g., nickel-cobalt ferrous alloy or stainless steel) sleeves (e.g., 1910 and 1915) and an insulator 1920.

Figure 20:
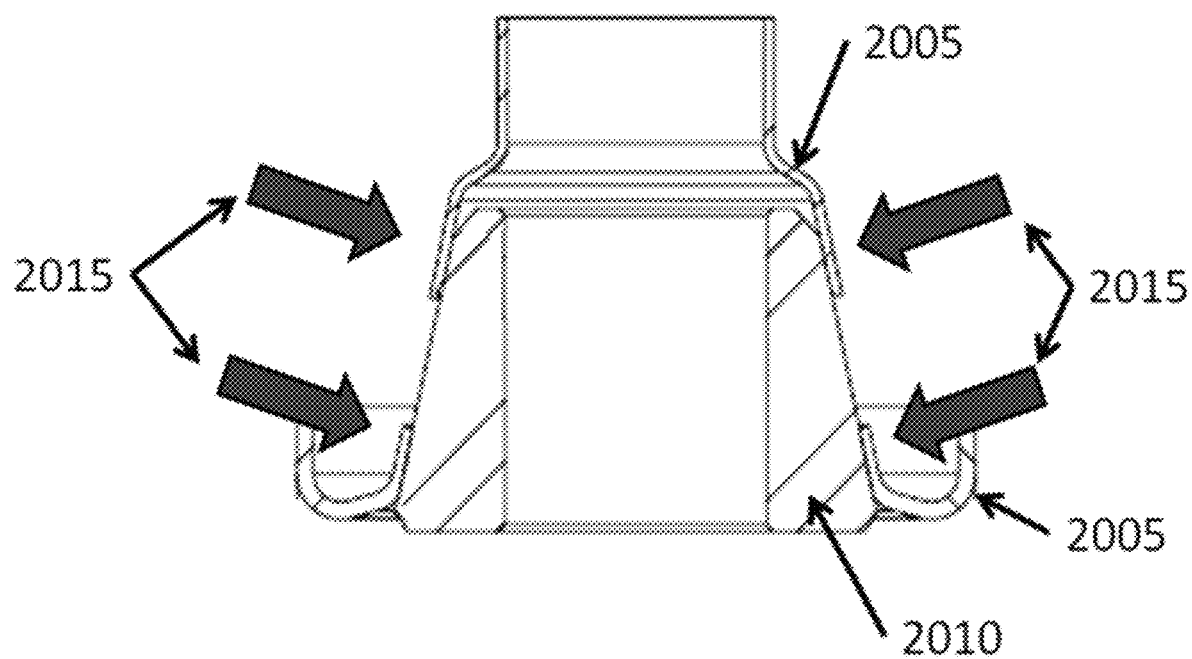
FIG. 20 shows how the shape of a sub-assembly can accommodate coefficient of thermal expansion mismatch.

FIG. 20 shows an example of a shape of a sub-assembly that can accommodate CTE mismatch. The sub-assembly (i.e., seal) can comprise a sleeve (e.g., a nickel-cobalt ferrous alloy sleeve) 2005 and an insulator (e.g., a ceramic) 2010. Compressive forces can act in the direction of indicated arrows 2015. Ceramic materials may be capable of withstanding a high level of compression. In some cases, seal designs can utilize this characteristic of ceramics to provide a reliable seal. In order to produce a compressive seal, outer material of the seal can have a higher CTE value than inner material of the seal. During processing and fabrication, the sub-assembly can be heated, causing the materials to expand. After reaching the braze melting temperature, the braze joint can be formed, and upon cooling, the higher CTE material can contract at a higher rate than the inner material to create a compressive seal. Due to the high temperature brazing operation and subsequent cool-down, the sleeves (e.g., nickel-cobalt ferrous alloy or stainless steel sleeves) can apply a compressive force to the sealed bonding interface (e.g., nickel-cobalt ferrous alloy or stainless steel/insulator interface) due to the insulator in the center contracting less. The example in FIG. 20 utilizes a Ti-alloy braze to form the sealing joint, and the compressive forces 2015 formed during the cool-down to press the sleeve 2005 (e.g., nickel-cobalt ferrous alloy sleeve) onto the insulator (e.g., ceramic) 2010, thus providing a stable and robust seal. The seal in FIG. 20 is an example of a circumferential seal.

Figure 21:
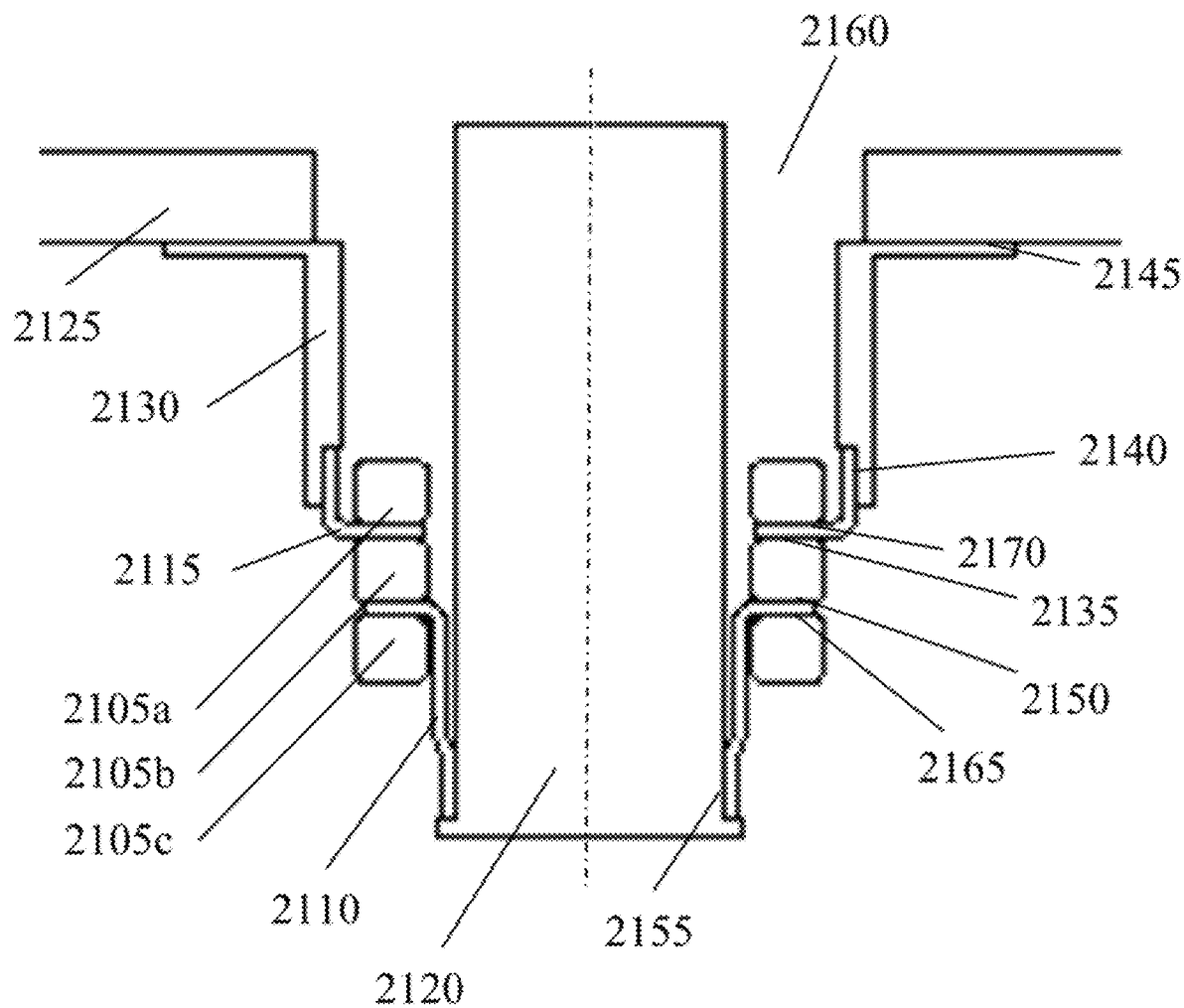
FIG. 21 shows a seal design having multiple ceramic insulators disposed between one or more metal sleeves.

FIG. 21 is an example of a seal 2100 that comprises multiple ceramic components. The ceramic components may be washers. The ceramic components may be electrically insulating. The seal can electrically isolate a conductor (e.g., negative current lead) 2120 from a cell housing (e.g., cell lid) 2125 (e.g., by a hermetic seal). The seal in FIG. 21 is an example of a stacked seal design. In this seal design, three separate ceramic components (e.g., AlN) 2105a, 2105b and 2105c are positioned vertically on top one another. The ceramic components (e.g., insulators) are disposed between one or more metal sleeves or collars 2110, 2115 and 2130 (e.g., zirconium metal, zirconium alloy, or nickel-cobalt ferrous alloy forming a flexible joint). In some cases, the collar 2130 may not be used and the collar 2115 may be joined directly to the cell housing 2125. The ceramic 2105b may provide sealing. The ceramic components 2105a and 2105c may provide stress and/or support for the seal. The ceramic components 2105a and 2105c may or may not provide sealing. In some situations, the ceramic components 2105a and 2105c may break (e.g., break and fall off). In such situations, the sealing provided by the central (in this case middle) ceramic component may not be affected.

The ceramic component 2105b is joined with a first metal collar (e.g., Zr) 2115 via a first metal-to-ceramic joint (e.g., braze) 2135. The first metal collar 2115 may further be joined to the ceramic component 2105a via a fourth metal-to-ceramic joint 2170. In some cases, the first metal-to-ceramic joint 2135 and the fourth metal-to-ceramic joint 2170 are the same type of joint (e.g., comprise the same braze material). The first metal collar 2115 is joined with a second metal collar (e.g., 430 SS) 2130 via a first metal-to-metal joint (e.g., weld, braze) 2140. The second metal collar 2130 is joined to a cell lid (e.g., 430 SS) 2125 via a second metal-to-metal joint (e.g., weld, braze) 2145. The seal further comprises a third metal collar (e.g., Zr) 2110 joined to the ceramic component 2105b via a second metal-to-ceramic joint (e.g., braze) 2150. The third metal collar 2110 may further be joined to the ceramic component 2105c via a third metal-to-ceramic joint (e.g., braze) 2165. In some cases, the second metal-to-ceramic joint (e.g., braze) 2150 and the third metal-to-ceramic joint 2165 are the same type of joint (e.g., comprise the same braze material). The third metal collar 2110 is joined with a conductor (e.g., negative current lead) 2120 via a third metal-to-metal joint (e.g., weld, braze) 2155. The seal 2100 may comprise one or more gaps (e.g., air gaps) 2160.

In some cases, the sealing is provided by a central ceramic (e.g., the middle ceramic 2105b in FIG. 21) that is joined to metal collars (e.g., metal collar 2110 and 2115 in FIG. 21) on opposite sides of parallel faces of the ceramic (e.g., along interfaces/joints 2150 and 2135 in FIG. 21) in a stacked fashion. Two additional ceramic components (e.g., the top ceramic 2105a and the bottom ceramic 2105c in FIG. 21) are included in the design and joined on the face of each metal collar that is opposite to the face that is bonded to the central ceramic (e.g., along brazing interfaces/joints 2170 and 2165 in FIG. 21). A stacked configuration with three ceramic components may create symmetric braze lengths on either side of the metal collars. Braze joints comprising symmetric braze lengths on either side of a metal collar may create symmetric forces on the metal collar. This may enhance the overall strength of the braze joint (e.g., by minimizing stress concentrations and placing the metal under tension and the ceramic components under compression). In some cases, a joint comprising a flat ceramic surface that is bonded to a flat metal surface is considered to be a face seal.

Different applications may benefit from different seal designs. A circumferential (e.g., conical) seal design (e.g., see FIG. 20) may provide a robust seal design with a single ceramic component. The angled circumferential surface on the ceramic may enable easier assembly (e.g., the parts may fall into the proper configuration without the need for fixtures with tight tolerances or without the need for careful assembly prior to brazing). The circumferential design may in some cases be able to withstand greater CTE-mismatches between the metal collars and the ceramic since the primary force exerted by the metal onto the ceramic after cooling down from the brazing temperature may be a radially symmetric compressive force (e.g., due to ceramics generally being stronger in compression than in tension). A stacked seal design (e.g., see FIG. 21, or FIG. 23 which may be considered a special case of the stacked design with just one ceramic) may allow for lower cost components based on simpler machining of flat parallel surfaces on the top and bottom of the ceramic instead of machining the outer diameter and/or machining the side of the ceramic to a specific conical angle (e.g., a conical angle of at least about 5, 10, 15, 20, 25, 30, 35, 40, 50, or 75 degrees relative to a vertical orientation, or a conical angle of less than or equal to about 5, 10, 15, 20, 25, 30, 35, 40, 50, or 75 degrees relative to a vertical orientation) as may be required by a circumferential seal. The stacked design may also enable designs with lower seal height (e.g., since the sealing interfaces are perpendicular to the height of the design). The seals of the disclosure (e.g., the seals in FIG. 20, FIG. 21 and FIG. 23) may be axially symmetric to aid in balancing forces on the seal. In some configurations, the stacked configuration may include 1, 2, 3, 4, 5, 6, 7, 8, 9, 10, 12, 14, 16, 18, 20 or more ceramic components. The number of ceramic components may be configured to balance the forces in a given seal configuration. In some cases, the ceramic components may be symmetrically distributed on two sides of a central (e.g., middle) ceramic component. In some cases, the ceramic components may be non-symmetrically distributed on two sides of a central (e.g., middle) ceramic component. In some cases, the ceramic components may be distributed in any configuration around (e.g., on two sides of, such as, for example, above and below) one or more ceramic components that provide sealing. Further, thickness of the ceramic components and/or of the metal collars may be selected to balance the forces in a given seal configuration. For example, metal collars joined or bonded to the ceramic (e.g., the first metal collar or the third metal collar) may have a first thickness, metal collars joined or bonded only to other metal collars (e.g., in compound metal collars) may have a second thickness, and metal collars joined or bonded to a conductor, cell housing lid and/or other part of the housing may have a third thickness (e.g., the third thickness may be equal to the first thickness if the metal collar is also directly joined to the ceramic).

Brazing can be provided on either side of the sleeve or flexible joint (e.g., a balanced seal as shown in FIG. 21) or on just one side of the joint (e.g., an unbalanced seal as shown in FIG. 23). Brazing on either side of each metal sleeve can balance the forces experienced by the sealing interfaces. An advantage of the balanced seal design may be that there can be limited force applied to the ceramic and minimal torque present during the cooling of the system. Such configurations can place the sleeves (e.g., nickel-cobalt ferrous alloy sleeves) in tension and the ceramics in compression. In an example, balancing of the seal may enable stress (e.g., stress generated during a post-fabrication cooling process) to be less than the tensile strength of the ceramic. In another example, balancing of the seal may enable strain (e.g., strain generated during a post-fabrication cooling process) to be less than the strain strength (e.g., maximum strain that the ceramic can withstand prior to breaking) of the ceramic. The ceramic may have a given strength. In some examples, a strength value (e.g., tensile strength, ultimate strength, yield strength) of a ceramic material, such as, for example, AlN, BN, $Al_2O_3$, $La_2O_3$, $Y_2O_3$, MgO, SiC, TiC or $Si_3N_4$, can be greater than about 10 mega-Pascals (MPa), 50 MPa, 100 MPa, 150 MPa, 200 MPa, 250 MPa, 300 MPa, 350 MPa, 400 MPa, 450 MPa, 500 MPa, 550 MPa, 600 MPa, 650 MPa, 700 MPa, 750 MPa, 800 MPa, 900 MPa, 1,000 MPa, 1,500 MPa, 2,000 MPa, 3,000 MPa, or 5,000 MPa.

Figure 22:
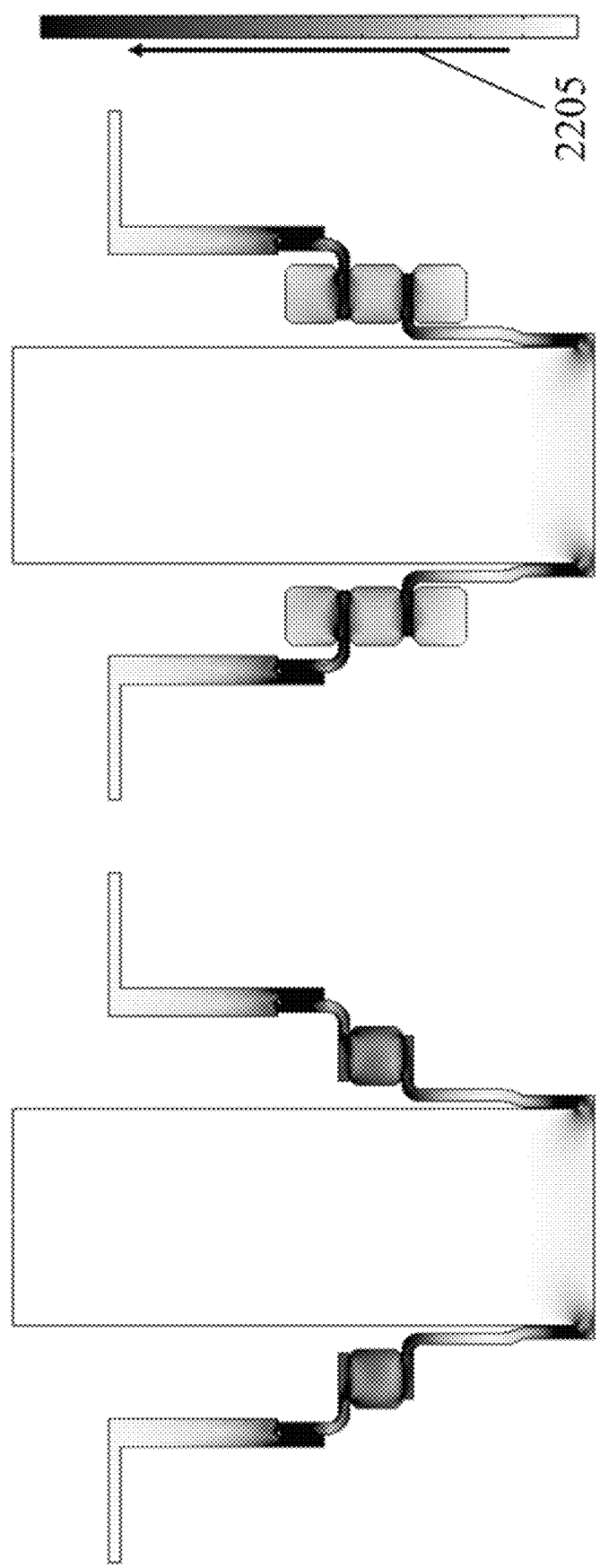
FIG. 22 shows an example of the forces on a seal.

FIG. 22 shows examples of forces on seals by providing images of results from computational models that predict stress and strain generated during a post-fabrication cooling process for a seal due to CTE mismatch (without incorporating plastic deformation). The models show the von Mises stress distribution (e.g., a calculated stress distribution based on forces applied in three spatial dimensions that provides insight into the likelihood of a stress-induced mechanical failure, e.g., if the calculated von Mises stress exceeds the strength of the material, the material is predicted to fail) generated using a linear elastic model for a process involving joining ceramic and metal components together at contacting interfaces at 850° C. and cooling the system to 25° C. In the example image on the left in FIG. 22, the seal comprises only one ceramic insulator (e.g., as shown in FIG. 23). In the example image on the right in FIG. 22, the seal comprises three ceramic insulators (e.g., as shown in FIG. 21). As shown in these examples, the single ceramic seal on the left in FIG. 22 can be subject to larger von Mises stresses and/or strain than the three ceramic seal on the right in FIG. 22. The shades in FIG. 22 represent different levels of the von Mises stress, with white being zero stress and black being the maximum stress on the scale, as indicated by an arrow in the direction of increasing stress 2205.

While the sub-assembly is cooled, stresses may build up, leading to immediate failure or failure when the seal is joined with the rest of the components of the cell top assembly. Since nickel-cobalt ferrous alloy can experience a phase transition at around 425° C. (e.g., as noted by the sudden change in CTE as a function of temperature in FIG. 7 and FIG. 8), it can maintain a higher stress level unless annealed below that temperature. In some cases, annealing of nickel-cobalt ferrous alloy is completed by a 30 minute soak at 850° C., which can ultimately yield high stresses in the sub-assembly. Higher temperature braze materials may use 430 stainless steel sleeves, since they do not experience grain growth after a phase transition leading to a change in shape or properties that may occur at prolonged periods of time at the device's (e.g., liquid metal battery's) operating temperature.

Figure 24:
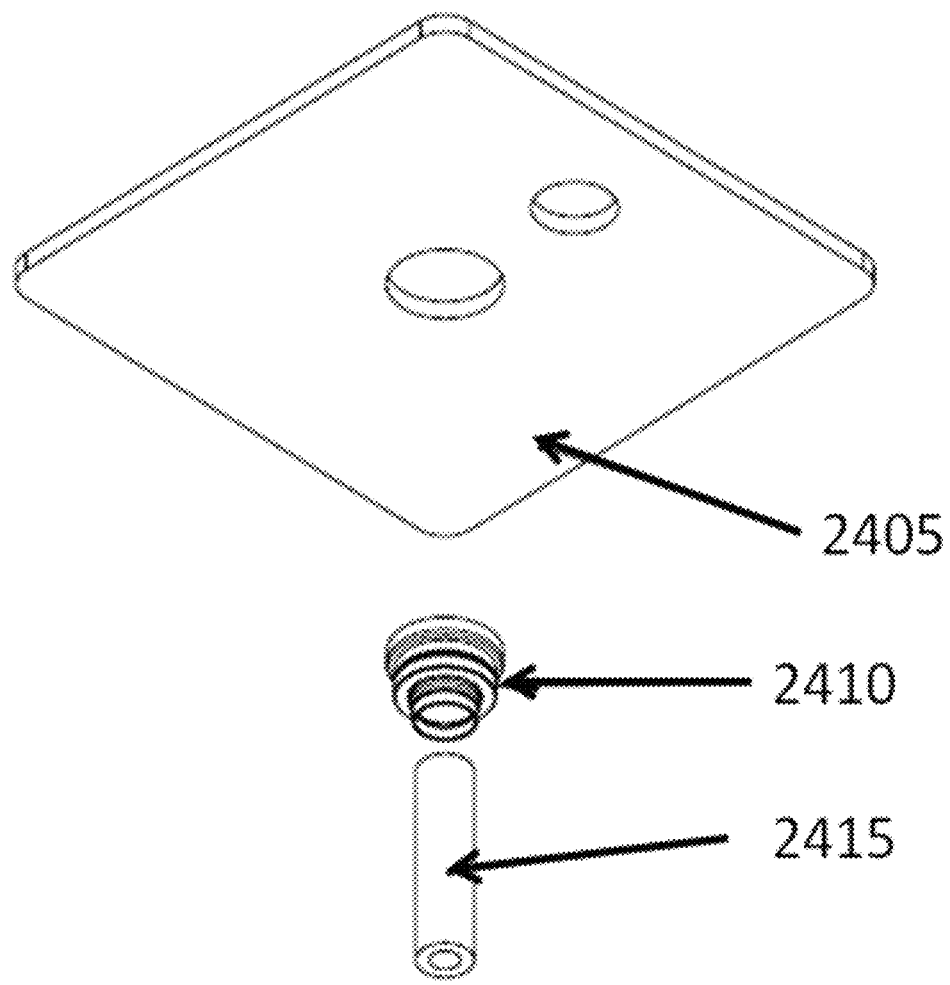
FIG. 24 shows a cell cap assembly.

FIG. 24 shows an exploded view of a cell cap assembly having a cell top 2405, a sub-assembly 2410 and a conductor 2415. The cell top can have any suitable geometry (e.g., as long as it interfaces with the cell body and allows for features such as, for example, gas management (if necessary), and a hole for the sub-assembly to be welded to). For example, the cell top can comprise a first aperture for the conductor/sub-assembly and a second aperture for a gas management connection. Each aperture may be sealed with a seal of the disclosure. In some cases, the conductor has a low CTE (e.g., so that the part does not short or crack the ceramic or fail).

Figure 25:
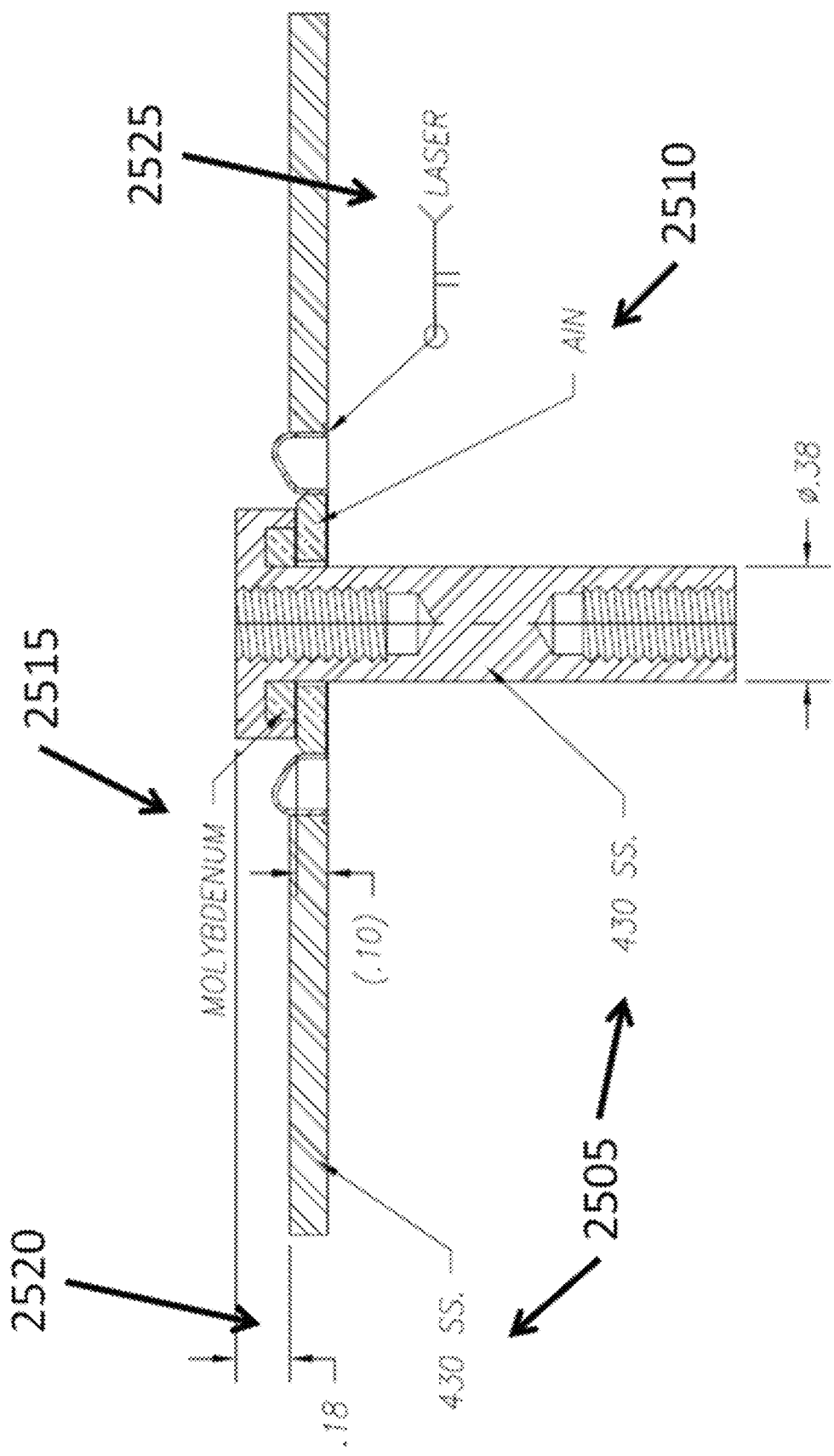
FIG. 25 shows examples and features of seals.
Figure 26:
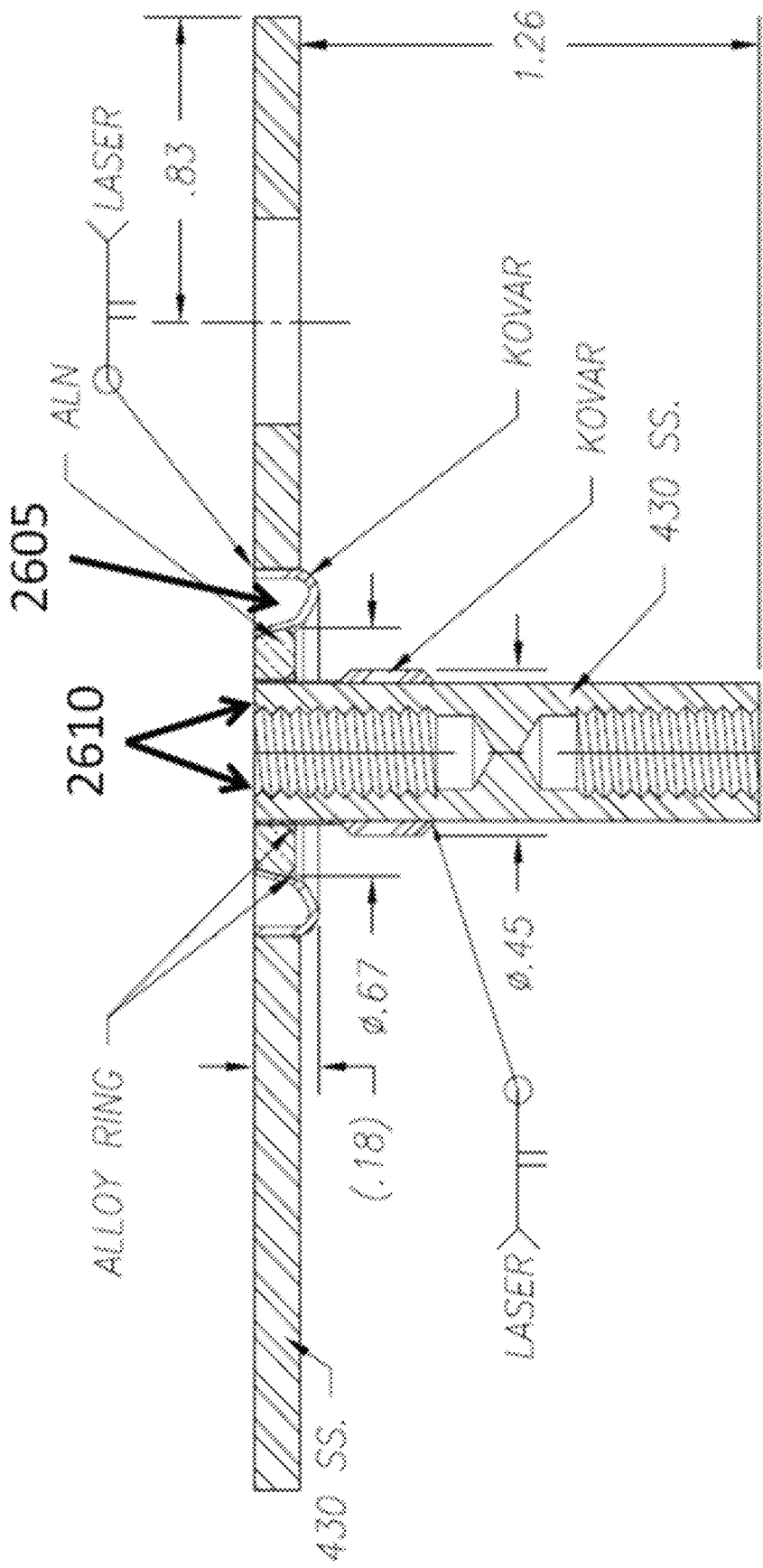
FIG. 26 shows examples and features of seals.
Figure 27:
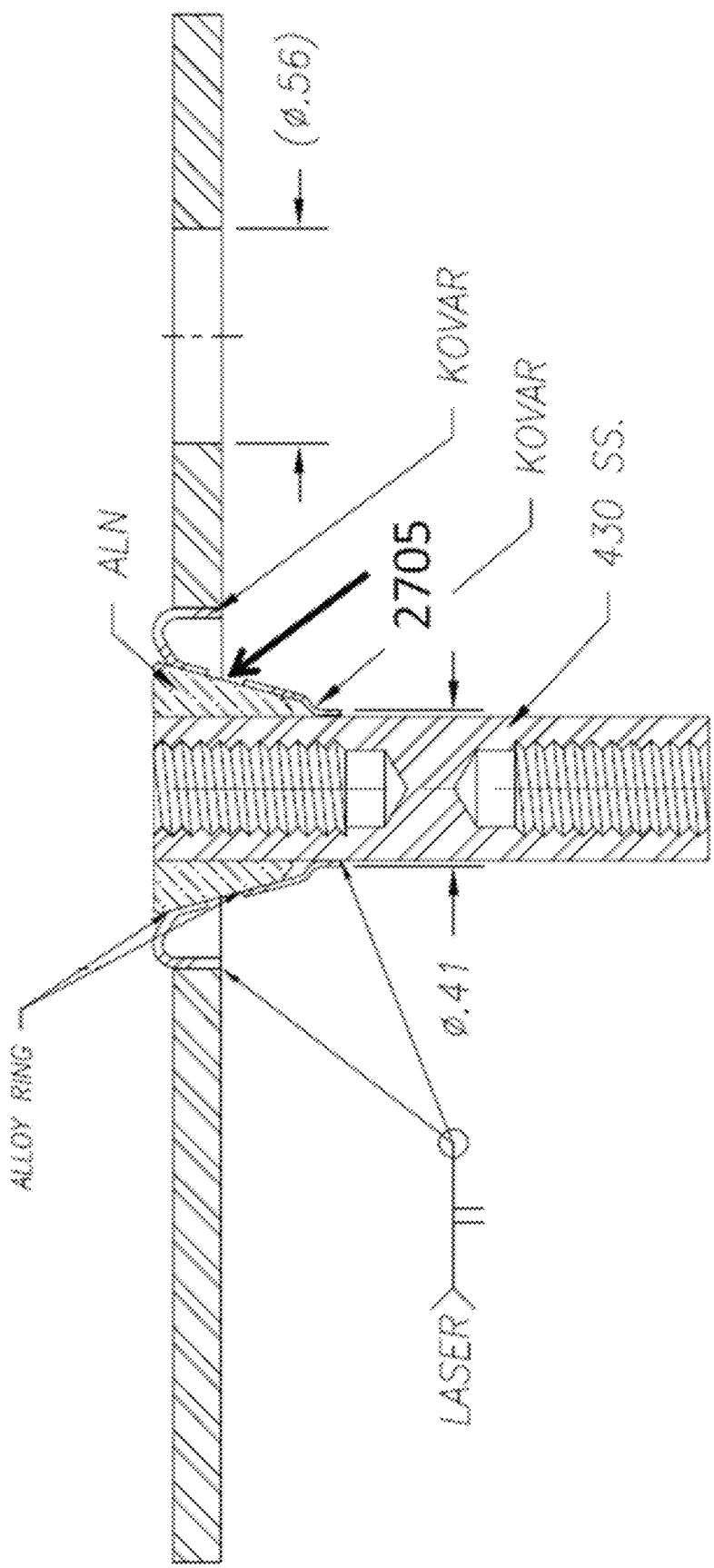
FIG. 27 shows examples and features of seals.

FIG. 25, FIG. 26 and FIG. 27 show examples of various features of seals. The seal in FIG. 25 utilizes corrosion resistant metals such as molybdenum, tungsten, 630 SS or 430 SS 2505 (e.g., having a low CTE of less than about 4 ppm/° C. or 10 ppm/° C.) and ceramics 2510 (e.g., aluminum nitride (AlN)). The seal comprises a CTE-matching component 2515 (e.g., at about 5.5 ppm/° C.) to allow for reduced or minimal stress build-up (e.g., between the metal 2505 and the ceramic 2510). The CTE-matching component 2515 can comprise, for example, molybdenum, or an alloy of tungsten and/or molybdenum. Examples of such materials are provided in Example 1. The seal has a robust design for mechanical loading and is resistant to electrical bridging shorts. The seal has a low profile design 2520 (e.g., about 0.25 inches), and can be welded or brazed in a commercially scalable way 2525 (e.g., by laser or during sub-assembly brazing).

In FIG. 26, parts of the seal are submerged into the cell such that the seal does not extend up beyond the surface of the cell lid. The seal can include a gas management port and nickel-cobalt ferrous alloy in place of molybdenum. A flipped metal collar 2605 can reduce or eliminate the catching of debris. In some cases, an inner diameter braze (e.g., between nickel-cobalt ferrous alloy and aluminum nitride (AlN)) 2610 can result in undesirable amounts of stress.

The cell shown in FIG. 27 can be sealed by a vacuum brazing process. The seal can enter about ⅜ inch below the cell top, with about 0.05 inch extension above the cell top. The cell can have increased structural capability when compared to the cell in FIG. 26. The design can allow for addition of a central pin after brazing, allowing for more control and flexibility during assembly. In some cases, the smaller gap between the metal pieces can lead to a short by wetting of the ceramic 2705.

Seal ceramic component(s) (e.g., seal ceramic washers or isolators/insulators) may have a complex or compound shape. Such shaped ceramic components may, for example, allow compressive forces on a sealing ceramic (e.g., the middle ceramic 2105b in FIG. 21 or the ceramic component 2305) in a stacked configuration to improve sealing and durability (e.g., thereby enabling a hermetic seal that does not crack during brazing or cell operation), facilitate easier assembly and/or fixturing, and/or increase or physically block an electrical shorting path. Such seals may be configured for sealing a container comprising a reactive material maintained at a temperature of at least about 200° C. (e.g., at least about 600° C. in some cases).

Figure 39:
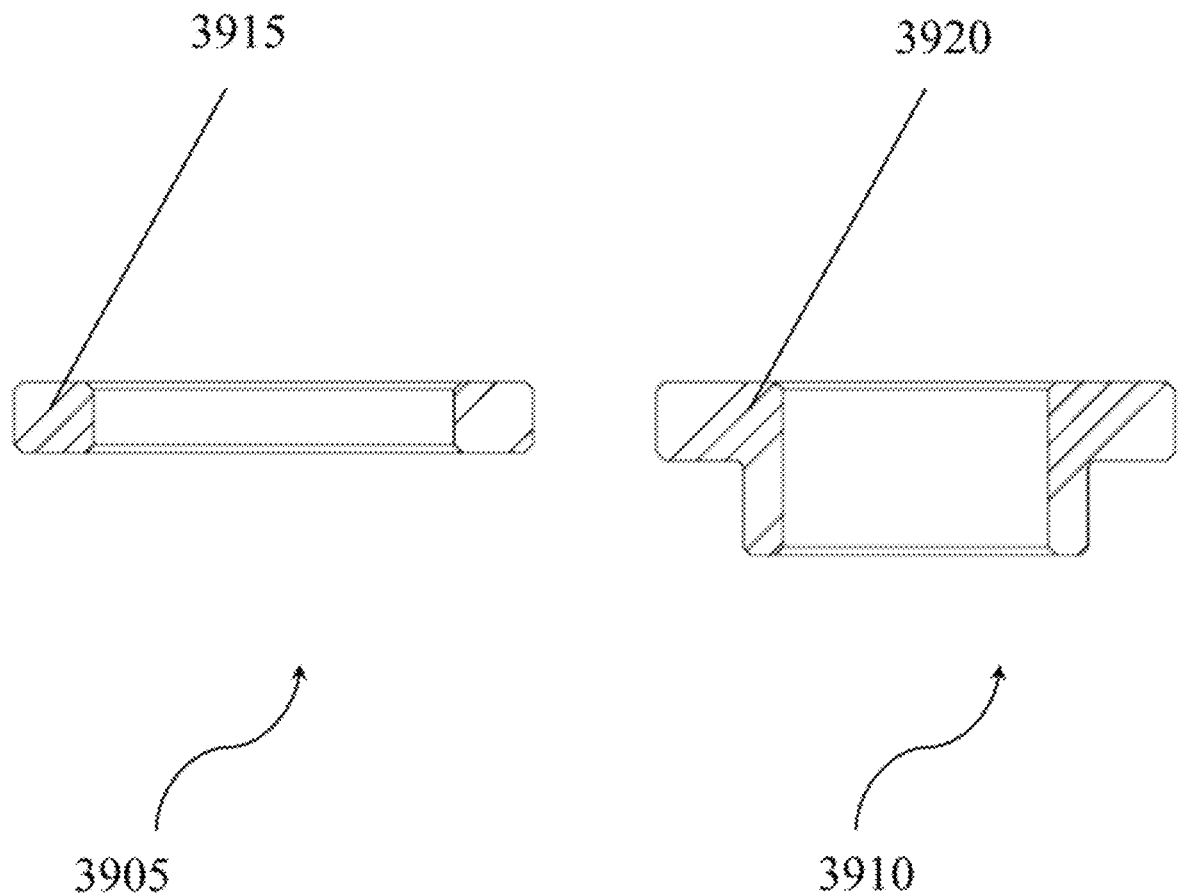
FIG. 39 shows cross-sectional views of a portion or component of a seal that comprises a simple ceramic component and a portion or component of a seal that comprises a shaped ceramic component.

FIG. 39 shows cross-sectional views of a portion or component 3905 of a seal that comprises a simple ceramic component 3915 and a portion or component 3910 of a seal that comprises a shaped ceramic component (e.g., L-shaped) 3920. The seal portions or components 3905 and 3910 can be configured in stacked configurations (e.g., with one or more sealing interfaces that are perpendicular to a direction parallel to a conductor that passes through the seal). For example, the ceramic components 3915 and 3920 can be center ceramic components that form a seal around a conductor (not shown).

FIG. 40 shows a cross-sectional view of an example of a seal 4000 with a shaped ceramic component 4005. The ceramic component 4005 may be electrically isolating. The seal can electrically isolate a conductor (e.g., negative current lead) 4020 from a cell housing (e.g., cell lid). The ceramic component 4005 can be exposed to reactive material 4070 within the cell housing. The ceramic component (e.g., AlN) 4005 may or may not be surrounded by additional ceramic components (e.g., AlN). For example, the ceramic component 4005 can form a center ceramic component of the seal 4000 (e.g., the ceramic component can be positioned in the center of a vertical stack of ceramic components). The ceramic component 4005 can be surrounded by additional ceramic components (e.g., second and third ceramic components 4010 and 4015 adjacent to the ceramic component).

The ceramic component(s) (e.g., comprising aluminum nitride (AlN), silicon nitride ($Si_3N_4$) or magnesium oxide (MgO)) can be disposed between one or more metal sleeves or collars (e.g., zirconium metal, zirconium alloy, or nickel-cobalt ferrous alloy) forming a flexible joint. For example, a metal sleeve can be joined to the ceramic component 4005, and the metal sleeve can be directly or indirectly joined to the container (not shown). An additional metal sleeve can be joined to the conductor 4020. In some implementations, the metal sleeve can be joined to the container at a bottom surface of the ceramic component and the additional metal sleeve can be joined to the conductor at a top surface of the ceramic component.

The first (e.g., center) ceramic component 4005 can be joined with a first metal sleeve (e.g., Zr) 4030 via a first metal-to-ceramic joint (e.g., braze) 4040. The first metal sleeve 4030 may further be joined to the second ceramic component 4010 via a second metal-to-ceramic joint 4045. The first metal sleeve 4030 can be joined with a third metal sleeve (e.g., 430 SS) 4025 via a first metal-to-metal joint (e.g., weld, braze) 4060. In some cases, the third metal sleeve (e.g., cell top sleeve) 4025 may not be used and the sleeve 4030 may be joined directly to the cell housing (not shown). A second metal sleeve (e.g., Zr) 4035 can be joined to the first ceramic component 4005 via a third metal-to-ceramic joint (e.g., braze) 4050. The second metal sleeve 4035 may further be joined to the third ceramic component 4015 via a fourth metal-to-ceramic joint (e.g., braze) 4055. The second metal sleeve 4035 can be joined with the conductor 4020 via a second metal-to-metal joint (e.g., weld, braze) 4065. At least a subset of the metal-to-ceramic joints 4040, 4045, 4050 and 4055 may be the same type of joint (e.g., comprise the same braze material). At least a subset of the metal-to-metal joints 4060 and 4065 may be the same type of joint (e.g., comprise the same weld or braze material).

In some implementations, the metal sleeve (e.g., the first metal sleeve 4030) that is directly or indirectly joined with the container (e.g., cell lid) may be joined with the ceramic component 4005 at the vertically lower sealing interface 4040, while the metal sleeve that is directly or indirectly joined with the conductor may be joined with the ceramic component 4005 at the vertically higher sealing interface 4050.

The ceramic component 4005 can have a compound shape (e.g., L-shape). For example, the ceramic component 4005 can comprise a protruding portion 4075 (shaded region) that substantially protrudes beyond a sealing interface (e.g., beyond a sealing interface on the ceramic component or beyond any combination of the sealing interfaces 4040, 4045, 4050 and 4055). The protruding portion can have a thickness 4080 that substantially exceeds a thickness of the sealing interface (e.g., sealing interface 4040), thereby allowing the protruding portion to substantially protrude beyond the sealing interface (e.g., braze joint). The protruding portion can be adjacent to the conductor 4020. The ceramic component 4005 can increase or physically block an electrical shorting path between the conductor 4020 and the metal sleeve 4030. As indicated in FIG. 40, the third metal sleeve 4025 may be at a positive potential ("+ charge" and "+" signs to indicate positive polarity) with respect to the conductor 4020 at a negative potential ("− charge" and "−" signs to indicate negative polarity). The second metal sleeve 4035 may also be at a positive potential when joined with the cell lid via the third metal sleeve 4025. The thickness 4080, which may be greater for a shaped ceramic component than for a simple ceramic component, may aid in isolating the components with a positive polarity from the components with a negative polarity. Additionally, the protruding portion 4075 may protrude vertically downward from the seal in a direction parallel to the conductor. This downwardly protruding portion may also aid in providing additional isolation or blockage between the components with positive polarity and the conductor. Further, it may allow fixturing (e.g., guided fixturing) of the seal and/or the conductor (e.g., when assembling the seal, or when fixturing the seal and/or the conductor in the container), as described in greater detail with reference to FIG. 41.

FIG. 41 is another example of the seal in FIG. 40. In this example, a seal 4100 comprises a shaped first (e.g., center) ceramic component 4105 joined with a first metal sleeve (e.g., Zr) 4130 via a first metal-to-ceramic joint (e.g., braze) 4140. The first metal sleeve 4130 can further be joined to a second ceramic component 4110 via a second metal-to-ceramic joint 4145. The first metal sleeve 4130 can be joined with a third metal sleeve (e.g., 430 SS) 4125 via a first metal-to-metal joint (e.g., weld, braze) 4160. The third metal sleeve (e.g., cell top sleeve) can be joined with the cell lid (e.g., 430 SS) (not shown). A second metal sleeve (e.g., Zr) 4135 can be joined to the first ceramic component 4105 via a third metal-to-ceramic joint (e.g., braze) 4150. The second metal sleeve 4135 may further be joined to a third ceramic component 4115 via a fourth metal-to-ceramic joint (e.g., braze) 4155. The second metal sleeve 4135 can be joined with a conductor 4120 via a second metal-to-metal joint (e.g., weld, braze) 4165. The metal-to-ceramic joints 4140, 4145, 4150 and 4155 may be face-sealing. The metal-to-metal joints 4160 and 4165 may be "diameter" braze joints in some implementations. The metal sleeve 4135 may have a diameter of, for example, about 0.625 inches.

The metal sleeves can be joined to the first (e.g., center) ceramic component and the second and third ceramic components via sealing interfaces (e.g., metal-to-ceramic joints such as braze joints) with substantially the same (symmetric) sealing interface lengths (e.g., braze lengths). The braze lengths may be, for example, less than or equal to about 0.040 inches, 0.050 inches, 0.060 inches, 0.070 inches, 0.080 inches, 0.090 inches, 0.10 inches, 0.11 inches or 0.12 inches wide (e.g., from inner radius to outer radius), and less than or equal to about 0.0005 inches, 0.001 inches, 0.015 inches, 0.020 inches, 0.025 inches, 0.030 inches or 0.035 inches thick. For example, two or more (e.g., each) of the braze joints 4140, 4145, 4150 and 4155 can be about 0.080 inches wide (e.g., from inner radius to outer radius) and about 0.002 inches thick. The symmetric sealing interface lengths (e.g., braze lengths) may advantageously reduce asymmetric forces on the seal (e.g., in a balanced configuration). For example, substantially the same (e.g., identical) braze lengths for all braze joints may ensure that adjacent materials have substantially matching CTEs (e.g., closest CTE match between adjacent materials), thus reducing potential for cracks forming within the ceramic upon brazing or cell operation.

The first ceramic component 4105 can comprise at least two portions that are neither parallel nor perpendicular to each other when viewed in an axially symmetric cross-section (e.g., a cross-section through the center of the conductor in a direction parallel to the conductor). For example, the first ceramic component can comprise an inner diameter chamfer 4185. Further, the compound shape can comprise a protruding portion 4175 that substantially protrudes beyond a sealing interface (e.g., beyond a sealing interface on the ceramic component or beyond any combination of the sealing interfaces 4140, 4145, 4150 and 4155). The protruding portion can have a thickness 4180 and can substantially protrude beyond the sealing interface (e.g., braze joint) toward the conductor 4120. The inner diameter chamfer can extend along greater than or equal to about 10%, 20%, 30%, 40%, 50%, 60%, 70%, 80% or 90% of the thickness 4180. The inner diameter chamfer may be determined by the symmetric sealing interface length. For example, the chamfer may extend along the entire thickness of the protruding portion 4175 in order to match the sealing interface lengths of sealing interfaces without protruding portions. The chamfer may have an angle of greater than or equal to about 5°, 10°, 25°, 45°, 60°, 75° or 80°. Thus, the inner diameter chamfer may allow symmetric sealing interface lengths to be achieved when combining simple and shaped ceramic components within the seal. The protruding portion 4175 may protrude vertically downward from the seal (e.g., from the bottom of the entire seal to allow outer diameter fixturing) in a direction parallel to the conductor (e.g., parallel with the length of the conductor in a vertical direction). In this example, this downwardly protruding portion is longer than in the example of FIG. 40, thereby providing additional aid in fixturing (e.g., guided fixturing) of the seal and/or the conductor. The length of the downwardly protruding portion (e.g., of the L-shape) may allow, for example, the outer diameter fixture of the seal to hold the first ceramic in place. In some cases, external fixturing may be used to align at least a portion of components (e.g., in order to align all components of the seal/container/conductor assembly). Further, the conductor 4120 may comprise one or more shoulders 4190 that protrude from the diameter of the conductor and allow the second metal sleeve 4135 to self-fixture.

Figure 35:
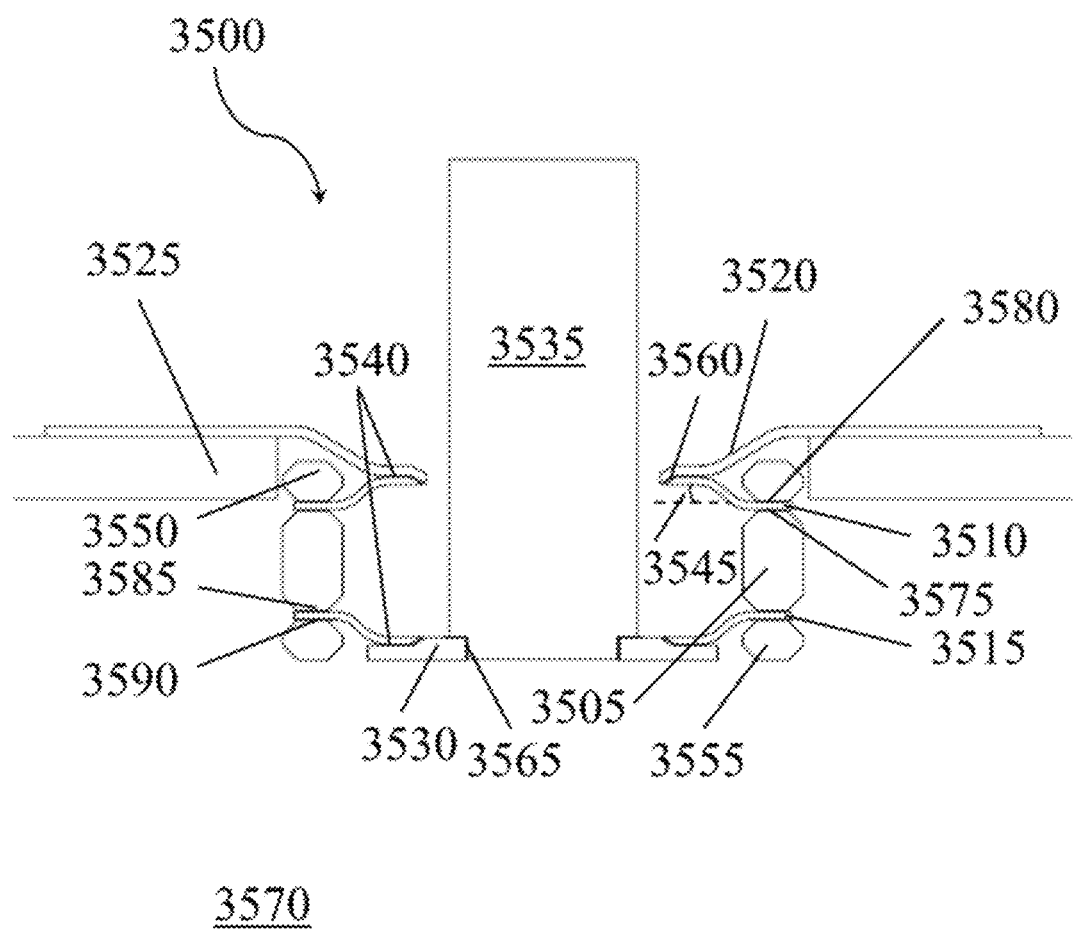
FIG. 35 is a cross-section of a seal with a concentric accordion joint.

FIG. 35 is a cross-section of a seal 3500 with a concentric accordion joint. The seal 3500 is another example of a stacked configuration (e.g., a balanced configuration), and may, for example, increase flexibility (e.g., the cell may be configured to flex like a spring to absorb at least a portion of internal stresses caused by materials expanding/contracting upon heating/cooling without losing hermeticity), improve ease of manufacturing/assembly (e.g., supply chain, fabrication techniques and assembly) and/or improve operational durability (e.g., chemical corrosion resistance, electrochemical corrosion resistance and thermal stress management). Further, the seal may comprise seal ceramic component(s) of a complex shape. The ceramic component(s) may be exposed to reactive material 3570 within the cell housing. The seal may be configured for sealing (e.g., hermetically) a container maintained at a temperature of at least about 200° C. (e.g., at least about 600° C. in some cases).

The seal may comprise one or more (e.g., 1 or 3) ceramic components (e.g., aluminum nitride (AlN), silicon nitride ($Si_3N_4$) or magnesium oxide (MgO) washers). In configurations with multiple ceramic components, additional ceramic components may be distributed (e.g., in a vertically symmetric configuration) around a first (e.g., center) ceramic component. At least two metal sleeves (e.g., zirconium or stainless steel sleeves) may be joined to the ceramic component. The metal sleeves may be flexible (e.g., bendable) to, for example, allow the seal to absorb at least a portion of internal thermal stresses in the seal.

The seal may comprise one or more face-sealing interfaces (e.g., braze joints) that are substantially perpendicular to a direction parallel to a conductor that passes through the seal. In some implementations, all interfaces, including metal-to-ceramic joints as well as metal-to-metal joints, may be face-sealing. This may allow braze foils to be utilized to join the seal and/or a reduced set of manufacturing steps (e.g., a single furnace run) to be performed. The face-sealing interfaces (e.g., braze joints) may be, for example, less than or equal to about 0.040 inches, 0.050 inches, 0.060 inches, 0.070 inches, 0.080 inches, 0.090 inches, 0.10 inches, 0.11 inches or 0.12 inches wide (e.g., from inner radius to outer radius). The face-sealing interfaces may be configured to reduce or minimize stress.

With continued reference to the example in FIG. 35, the seal 3500 comprises a first (e.g., center) ceramic component (e.g., AlN) 3505 joined to a first metal sleeve (e.g., Zr) 3510 and a second metal sleeve (e.g., Zr) 3515. In some implementations, the metal sleeves 3510 and 3515 may be substantially similar (e.g., identical). This may allow fewer unique parts to be manufactured per seal (e.g., the number of different diameters of rod stock and fabrication steps may be reduced). The seal further comprises a first coupler (e.g., 430 SS cell top coupler) 3520 between a container (e.g., cell top) 3525 and the first metal sleeve 3510. The first coupler 3520 may be flexible, thereby allowing the seal to absorb at least a portion of internal thermal stresses. The metal sleeves 3510 and 3515 and the first coupler 3520 may be shaped to create a spring to absorb stresses (e.g., internal stresses) related to thermal expansion, thus decreasing the amount of stress transferred to the ceramic components (e.g., insulators) of the seal. The seal further comprises a second coupler (e.g., 430 SS negative current lead (NCL) coupler) 3530 between a conductor (e.g., 430 SS negative current lead) 3535 and the second metal sleeve 3515. The first coupler 3520 and the second coupler 3530 may be joined with the first metal sleeve 3510 and the second metal sleeve 3515, respectively, via sealing interfaces (e.g., face-sealing braze joints) 3540.

The first metal sleeve 3510, the second metal sleeve 3515, the first coupler 3520 and/or the second coupler may be configured with a bend (e.g., at least about 10°, 20°, 30°, 45°, 60°, 75° or 80° slope) 3545 to allow for self-fixturing of the seal during assembly at room temperature and/or when the (e.g., entire) seal is at its brazing temperature. In an example, a bend of at least about 30° is used. Thus, the couplers may self-fixture with their respective metal sleeves. Gaps between these components may be configured to take into account each material's CTE such that interference is limited or eliminated upon heating up. Further, the first metal sleeve 3510, the second metal sleeve 3515 and/or the first coupler 3520 may comprise angled self-fixturing features. For example, the first metal sleeve 3510 and the first coupler 3520 may comprise complementary kinks or hooks 3560. Such self-fixturing features may allow parts to, for example, slide into position (e.g., align) during assembly. Similarly, the conductor 3535 may self-fixture with the second coupler 3530 (e.g., via mating connection 3565). Providing the conductor and the second coupler separately may in some cases reduce waste upon fabrication. The conductor may nest with second coupler and/or one or more other components of the seal. The metal sleeves 3510 and 3520 and/or the first coupler 3520 may be configured to limit waste upon fabrication (e.g., inner diameter and outer diameter choice of parts may allow more appropriate standard dimensions of feedstock to be used), allow easier (e.g., less time-consuming) and/or allow greater flexibility during fabrication (e.g., capability to use multiple different machining alternatives, such as, for example, lathe, CNC or stamping). The metal sleeves 3510 and 3520 may have a diameter of, for example, about 0.990 inches and a thickness of, for example, about 0.015 inches. In some cases, a single fixture, along with self-fixturing may be used to align all components of the seal and/or of the seal/container/conductor assembly.

In some implementations, the seal may further comprise additional ceramic components (e.g., AlN balancing ceramics). In this example, the seal comprises two additional ceramic components 3550 and 3555 joined with the first metal sleeve 3510 and the second metal sleeve 3515, respectively. One or more of the ceramic components may be chamfered. For example, only the first ceramic component, at least a portion of the ceramic components or all of the ceramic components may be chamfered. Different ceramic components may comprise substantially similar chamfers. Alternatively, different ceramic components may comprise different chamfers. The chamfer(s) may have an angle of greater than or equal to about 5°, 10°, 25°, 45°, 60°, 75° or 80°. The chamfers may aid in fixturing of seal components. Each ceramic component may have a given height (or width or another characteristic dimension). For example, the first ceramic component (e.g., corresponding to a shorting length) may have a height of less than or equal to about 0.200 inches, while the second and third ceramic components may have a height of less than or equal to about 100%, 80%, 60%, 40% or 20% of the height of the first ceramic. Stress modeling optimization may be used in some cases to guide or determine suitable thickness of materials.

At least a portion (e.g., all) of the face-sealing interfaces (e.g., the sealing interfaces between the ceramic components 3505, 3550 and 3555 and the metal collars 3510 and 3515, and the sealing interfaces 3540) can comprise, for example, about 0.060 inches wide (e.g., from inner radius to outer radius) braze joints. At least one of the face-sealing interfaces may be configured as a concentric accordion joint (e.g., concentric accordion in, such as, for example, in an axisymmetric seal as shown FIG. 36). A concentric accordion joint may comprise the first coupler 3520, the first metal sleeve 3510 and a sealing interface 3575. The concentric accordion joint may further comprise the first ceramic component 3505 and, in some cases, the second ceramic component 3550 and/or the sealing interface 3580. Another concentric accordion joint may be at least partially formed by the second coupler 3530, the second metal sleeve 3515 and a sealing interface 3585. This (e.g., partial) accordion joint may further comprise the first ceramic component 3505 and, in some cases, the third ceramic component 3555 and/or the sealing interface 3590. In some implementations, the concentric accordion joint may be used in non-axisymmetric seals (e.g., seals that are square or oval rather than circular).

Figure 36:
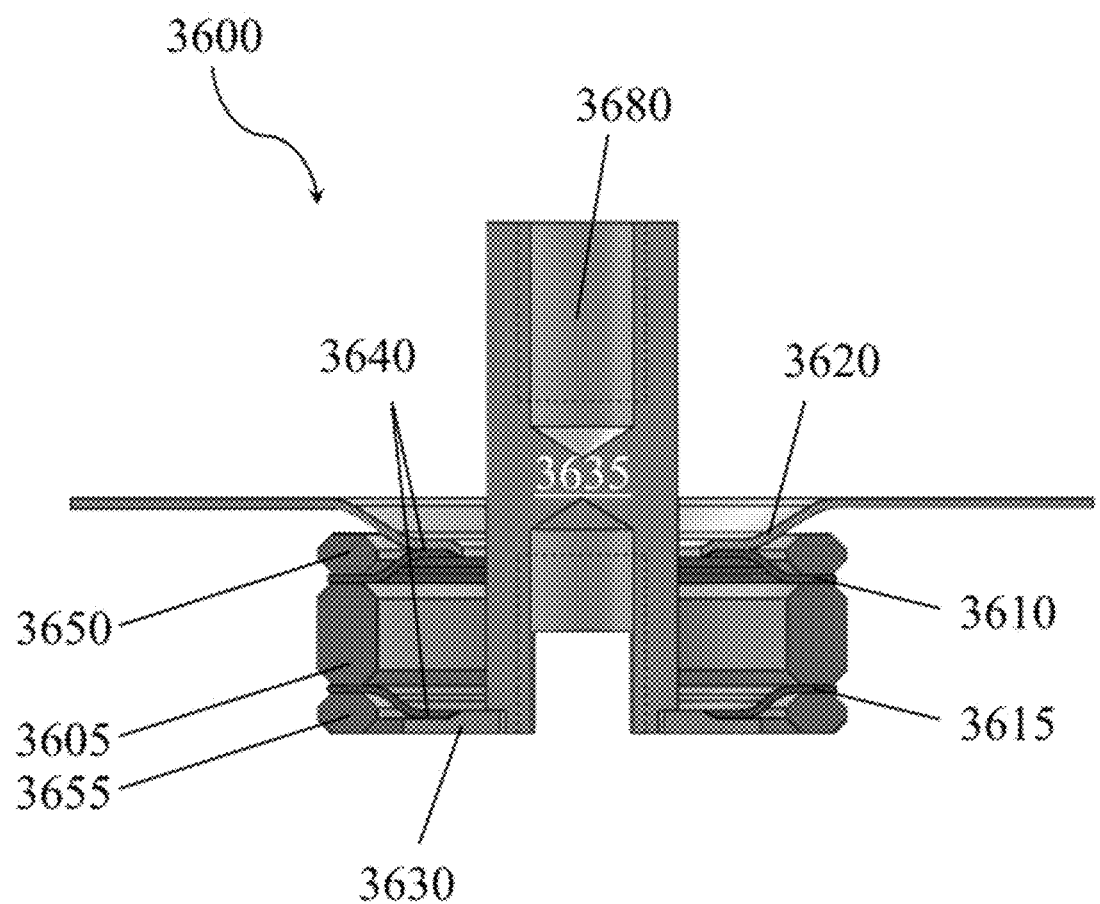
FIG. 36 is a cut-away view of another example of a seal with a concentric accordion joint.

FIG. 36 is a cut-away view of another example of a seal 3600 with a concentric accordion joint. The seal 3600 comprises a first (e.g., center) ceramic component (e.g., AlN) 3605 joined to a first metal sleeve (e.g., Zr) 3610 and a second metal sleeve (e.g., Zr) 3615, a first coupler (e.g., 430 SS cell top coupler) 3620 between a container (e.g., cell top) (not shown) and the first metal sleeve 3610, a second coupler (e.g., 430 SS negative current lead (NCL) coupler) 3630 between a conductor (e.g., 430 SS negative current lead) 3635 and the second metal sleeve 3615. The first coupler 3620 and the second coupler 3630 may be joined with the first metal sleeve 3610 and the second metal sleeve 3615, respectively, via sealing interfaces (e.g., face-sealing braze joints) 3640. The seal further comprises two additional ceramic components 3650 and 3655 joined with the first metal sleeve 3610 and the second metal sleeve 3615, respectively. The seal 3600 may be axially symmetric (as shown) and may be exposed to reactive material 3670 within container. In some cases, the conductor 3635 may comprise a hole 3680 (e.g., a threaded hole used to connect to a busbar/interconnect or an adjacent cell).

Compound Seals

Seals of the disclosure may include compound seals (e.g., double seal) and compound seal cell cap assemblies (e.g., double seal cell cap assembly). Compound seals may seal a high temperature container from an environment external to the container. Such seals may be configured for sealing a container comprising a reactive material maintained at a temperature of at least about 200° C. (e.g., at least about 600° C. in some cases). The seals may be exposed to an internal atmosphere of the container as well as an external atmosphere outside the container. The exposure internal and external atmospheres may place different materials requirements on the compound seal. While single seals may be configured to contain (e.g., hermetically) the internal materials of a cell, battery or other high-temperature device while resisting corrosion from the surrounding environments (e.g., inside and outside environments), a compound seal may divide the environments and address the sealing in different environments individually. For example, a double seal may be capable of withstanding two different environments. The double seal may comprise two seals joined together in such a manner that results in the double seal effectively resisting corrosion from both environments.

A compound seal may be advantageously used, for example, in situations where a set of stability (e.g., due to exposure), durability, lifetime, flexibility, space (e.g., nested seals), strength and/or other requirements are difficult to meet by a single set of materials. For example, a double seal may comprise a first seal that is stable when in contact with the reactive material (also "active stable seal" herein) and a second seal that is stable when in contact with the external environment such as, for example, air or any other type of surrounding atmosphere (collectively referred to as "air stable seal" herein). The reactive material may comprise, for example, a reactive metal or a vapor of a reactive metal, a molten salt or a vapor of a molten salt, or a combination thereof. The reactive metal may be molten or liquid. For example, the first seal may resist or withstand corrosion (e.g., electrochemical and chemical corrosion) by molten lithium and/or a molten lithium salt (e.g., LiCl, LiF or LiBr), and the second seal may (e.g., substantially) resist or withstand oxidation by air. For example, the second seal may resist oxidation by air resulting in an increase in a leakage rate (e.g., gas leakage rate) of the second seal (e.g., after an initial oxidation process resulting in a passivating and stable oxide layer, the second seal may resist further oxidation by air). The first seal may comprise a solid material that is not stable when in contact with the external environment, the second seal may comprise a solid material that is not stable when in contact with the reactive material, or a combination thereof. Alternatively, at least one of the seals may be of multiple types. For example, an air stable seal may in some cases be an active stable seal, and vice versa.

A given seal configuration may be used as an active stable seal and/or an air stable seal. In some cases, a seal configuration may be adapted for use as a given type of seal. For example, materials selection or sizing may be adapted to enable use of a given seal configuration as an active stable seal or an air stable seal. Examples of active stable seals include, for example, the seals in FIG. 35, FIG. 36, FIG. 39, FIG. 40 and FIG. 41. For example, the shaped ceramic seals of FIG. 39, FIG. 40 and FIG. 41 may be stable when in contact with the reactive material. A cell cap assembly of a cell or container that comprises the shaped seal ceramic may further comprise an additional seal that is stable when in contact with the external environment and within which the shaped seal is nested. Another example includes the concentric accordion joint seal of FIG. 35 and FIG. 36. In some examples, this seal may be stable when in contact with the reactive material but not when in contact with the external environment.

The seals of a compound seal may be synergistically combined. For example, if the current lead 4020 (e.g., the top of the protruding current lead 4020) of the seal 4000 in FIG. 40 is physically attached or secured to the metal sleeve 4025 or 4030 or a cell lid (e.g., by one or more additional components not shown in FIG. 40, such as, for example, via an additional (e.g., air stable) seal used in combination (e.g., in a double seal configuration) with the (e.g., active stable) seal 4000), the metal sleeves 4030 and 4035 configured in accordance with FIG. 40 may put the ceramic component (e.g., center ceramic component) 4005 in compression (e.g., rather than in tension which may lead to expanded spaces within the seal as the center ceramic component is squeezed) as the seal is heated or cooled such that the ceramic component is compressed upon thermal expansion of the conductor, the container, and/or the additional seal. Such thermal expansion may be of importance in some implementations where, as the seal components are cooled after forming the seal (e.g., by brazing), they may contract at different rates due to different CTEs (e.g., with ceramics contracting the least and stainless steel parts, such as, for example, the conductor and/or the container, contracting the most) and the thermal expansion may effectively pull at the braze joints and ceramics of the seal, thus leading to mechanical failure in some cases. The switched locations of the metal sleeves 4030 and 4035 (e.g., with respect to the configuration in FIG. 21) may in some cases (e.g., for an AlN ceramic in a balanced ceramic seal configuration) flip the internal stresses of the ceramic component 4005 from being in tension to in compression.

A compound seal may comprise, for example, greater than or equal to 2, 3, 4, 5, 6, 7, 8, 9, 10, 12, 14 or more seals. When the number of seals is equal to or exceeds 2, individual seals may in some cases be exposed to atmospheres intermediate (e.g., mixtures) or altogether different (e.g., inert) from at least one of the internal and external atmospheres previously described. At least a portion (e.g., greater than or equal to about $\frac{1}{10}$, $\frac{1}{5}$, $\frac{1}{4}$, $\frac{1}{3}$, $\frac{1}{2}$ or more) of the seals in a compound seal may be hermetic. For example, the first and second seals in a double seal may each be hermetic.

Figure 33:
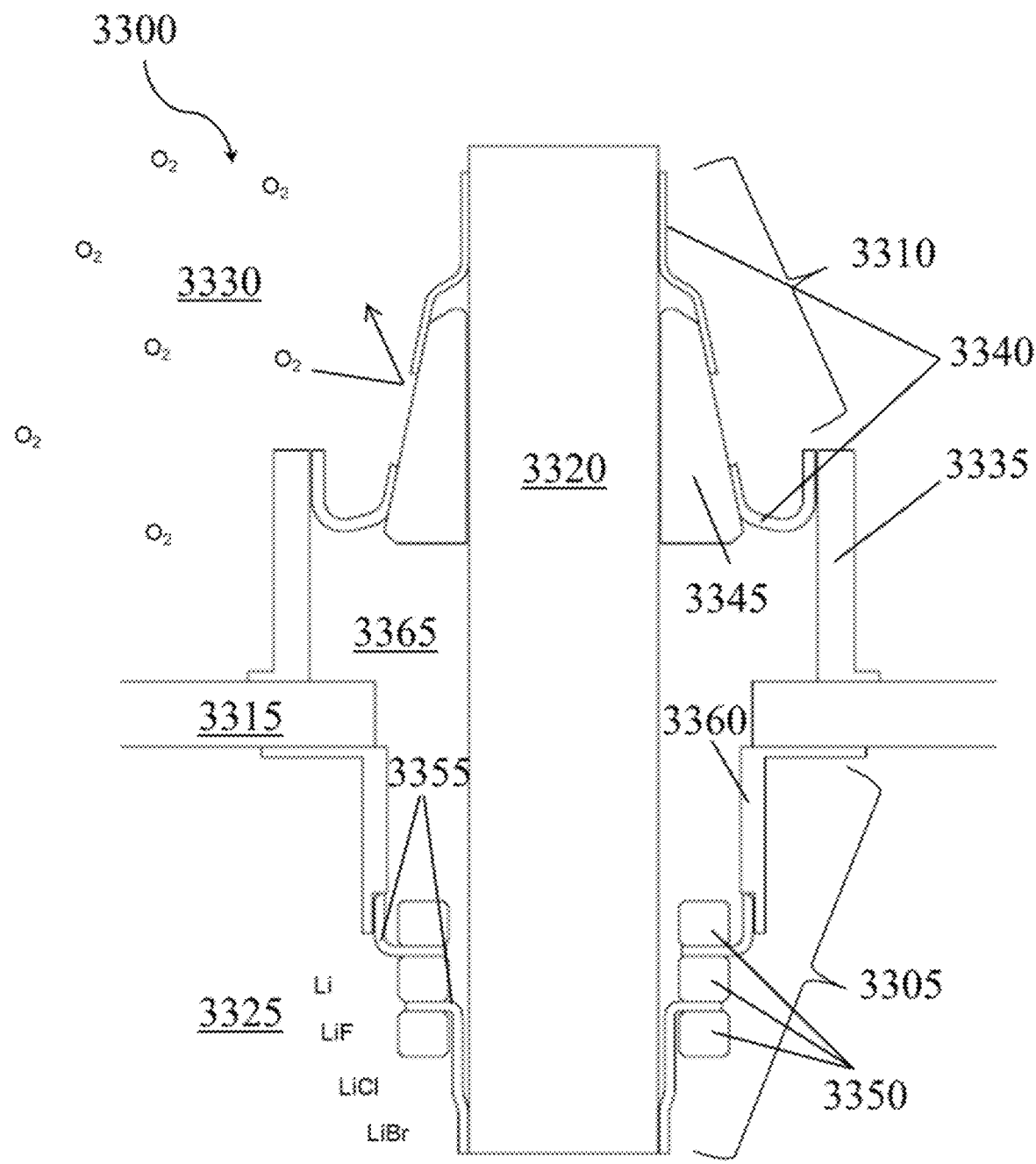
FIG. 33 is a cross-sectional view of an example of a double seal.

FIG. 33 is a cross-sectional view of an example of a double seal 3300. The double seal 3300 comprises a first seal (e.g., active stable seal) 3305 and a second seal (e.g., air stable seal) 3310. The first seal and the second seal may each provide a seal (e.g., electrically isolating seal) between a container (e.g., cell top) 3315 and a conductor (or a thermocouple or voltage sensor) 3320 that protrudes through the container through an aperture in the container. The first seal 3305 may be exposed to an atmosphere 3325 comprising, for example, active (e.g., reactive) cell materials (e.g., Li, LiF, LiCl or LiBr as shown). The first seal 3305 may be stable when in contact with the atmosphere 3325. The second seal 3310 may be exposed to an atmosphere 3330 comprising, for example air (e.g., $O_2$ as shown, with $O_2$ illustratively bouncing off of the seal). The second seal 3310 may be stable when in contact with the atmosphere 3330. The seal 3300 may comprise a pocket 3365 between the first and second seals.

Compound seals may comprise one or more seals arranged in a circumferential configuration, one or more seals arranged in a stacked configuration, or a combination thereof. In this example, the second seal is arranged in a circumferential configuration and the first seal is arranged in a stacked configuration. In a double seal, for example, the first and second seals may each be of any suitable configuration. In this example, the configuration of the first seal may be similar to the seal of FIG. 21 and the configuration of the second seal may be similar to the seal of FIG. 20. The first seal and the second seal may each comprise one or more insulators (e.g., ceramic components) and one or more collar or sleeves (e.g., metal collar or sleeves) adjacent to the insulator (e.g., ceramic component). For example, the first seal subassembly can comprise insulators (e.g., ceramics) 3350 and sleeves (e.g., metal) 3355, and the second seal sub-assembly can comprise an insulator (e.g., a ceramic) 3345 and sleeves (e.g., metal) 3340. The first seal may comprise an additional sleeve (e.g., metal) 3360 that joins the seal, via one of the sleeves 3355, with the cell top 3315. The second seal may be joined with the cell top 3315 via a bushing (e.g., an axisymmetric bushing) 3335 joined with one of the sleeves 3340. The first and second seals may each be joined with the conductor 3320 via one of the sleeves 3355 and 3340, respectively.

Figure 34:
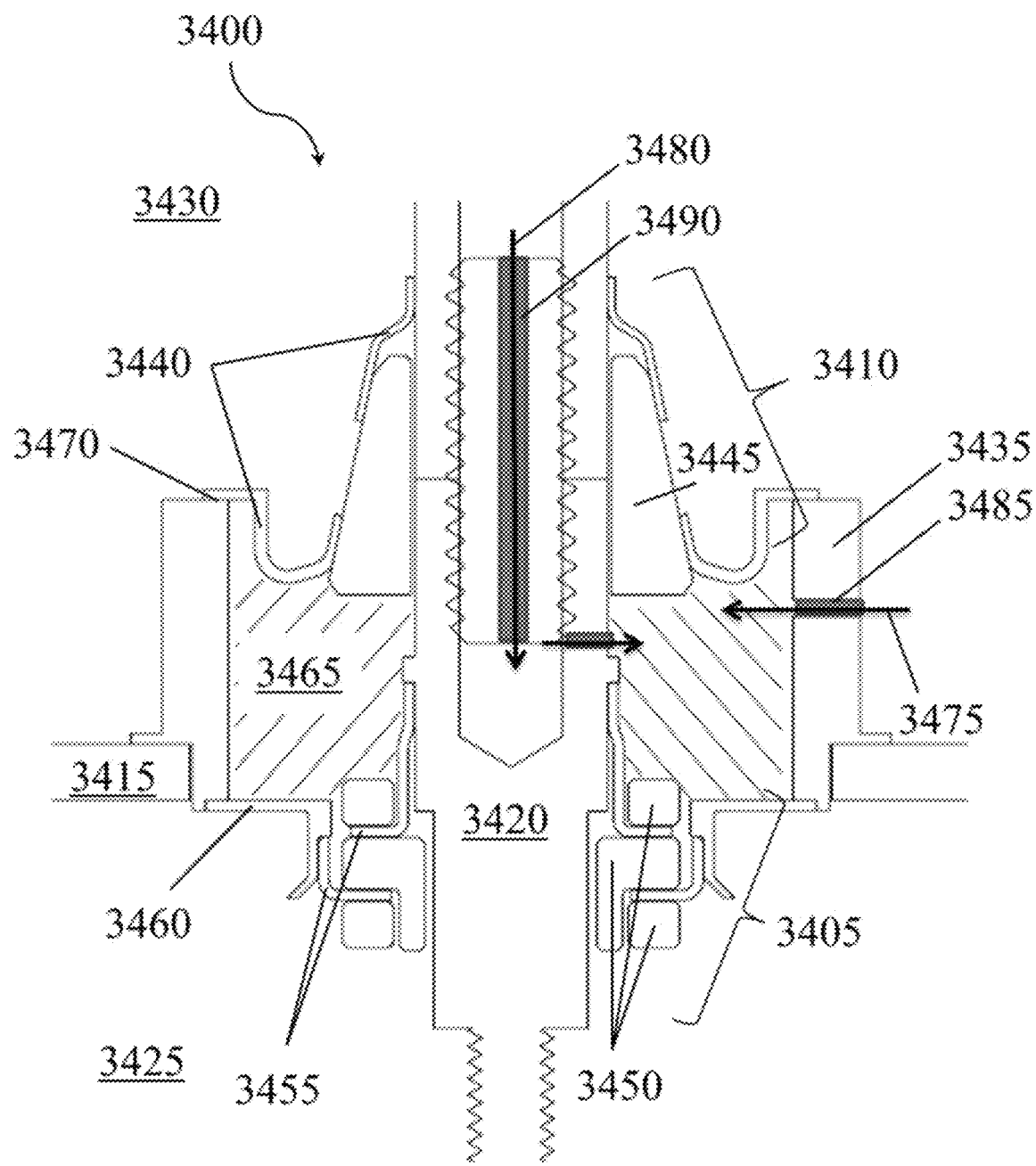
FIG. 34 is another example of a double seal.

FIG. 34 is another example of a double seal 3400 comprising a first seal (e.g., active stable seal) 3405 and a second seal (e.g., air stable seal) 3410. In this example, the configuration of the first seal may be similar to the seal of FIG. 40 and the configuration of the second seal may be similar to or modified the seal of FIG. 20. The first seal subassembly can comprise insulators (e.g., 3 ceramic components including a shaped center ceramic component) 3450 and sleeves (e.g., metal) 3455, and the second seal sub-assembly can comprise an insulator (e.g., a ceramic) 3445 and sleeves (e.g., metal) 3440. The double seal may comprise a bushing 3435. In this example, the first and second seals are first joined with the bushing, and the bushing is joined with a container (e.g., cell top) 3415. The first seal may comprise an additional sleeve (e.g., metal) 3460 that joins the seal, via one of the sleeves 3455, with the bushing 3435. The second seal may be joined with the bushing 3435 via one of the sleeves 3340 (e.g., adapted to seal with the bushing at a horizontal sealing interface 3470 rather than a vertical sealing interface as is FIG. 33). The first and second seals may each be joined with a conductor 3420 via one of the sleeves 3455 and 3440, respectively.

The first seal 3405 may be exposed to an atmosphere 3425 comprising, for example, active (e.g., reactive) cell materials. Sealing of the first seal to the container 3415 may be performed in an environment comprising a first inert gas (e.g., He—Ar or He-inert gas mixture). Thus, the atmosphere 3425 may comprise the active cell materials mixed with inert gas and substantially no air or other external atmosphere 3430. The second seal 3310 may be exposed to an atmosphere 3430 comprising, for example, air. The seal 3400 may comprise a pocket 3465 between the first and second seals. The pocket may be filled, as indicated by arrows 3475 and 3480, with a second inert gas (e.g., He—Ar or He-inert gas mixture) via one or more ports 3485 and 3490, respectively, that allow the second inert gas to enter the pocket. The port 3475 may be provided, for example, in the bushing 3435 or in the conductor (also "negative current lead (NCL)" herein) 3420. The ports 3485 and 3490 may be used as alternatives or in concert. For example, the pocket may be filled either through the port 3490 comprising a hole through the conductor, or through the port 3485 comprising a hole through the bushing between the first seal and the second seal. In the example of FIG. 33, a port may be provided as a hole through the conductor 3320 or as a hole in the bushing 3335 between the second seal and the container 3315. The hole(s) in the conductor/bushing may provide process flexibility when joining the double seal (e.g., when manufacturing and assembling the first and second seals and joining them with the container).

Sealing a high temperature device, container or electrochemical cell comprising a container (e.g., container 3415) with a double seal (e.g., seal 3400) may include sealing a first seal (e.g., first seal 3405) in an environment comprising the first inert gas to capture the first inert gas inside the container. A second seal (e.g., second seal 3410) may then be sealed and may form a pocket (e.g., pocket 3465) between the first seal and the second seal. The first and/or second seals (e.g., each previously formed by laser-welding in an environment comprising a non-inert gas such as, for example, air) may be sealed to the container and a conductor (e.g., conductor 3320), by, for example, TIG-welding. As previously described, the first and second seals may in some cases be indirectly sealed to the container via, for example, a bushing (e.g., bushing 3335 or 3435). The first seal may be sealed to the container/conductor, followed by sealing the second seal to the container/conductor. Alternatively, the first and second seals may both be joined to the conductor and then sealed to the container (e.g., via the bushing), or the first and second seals may both be joined with the bushing/conductor and the bushing can then be sealed to the container. A cap assembly may comprise the container (e.g., cell lid) and the first seal, or the container, the first seal and the second seal.

The pocket may be filled with a second inert gas via a port (e.g., port 3485 and/or 3490) and then sealed (e.g., by closing the port via a weld), thus sealing the pocket and capturing the second inert gas in the pocket. The first and second inert gases may or may not be the same (e.g., may or may not have the same composition). For example, the first and/or second inert gas can comprise helium (He), argon (Ar), a mixture of He and Ar, a mixture of He and another inert gas (e.g., neon, krypton or xenon), a neat or mixed inert gas other than He and Ar, or any combination thereof. An inert gas may or may not be a noble gas and may in some cases include any gas that is stable in a given environment (e.g., stable with reactive material inside the container at cell operating temperature). The first and/or second inert gas may comprise, for example, between about 1% and 5%, 1% and 10%, 1% and 15%, 1% and 25% or 1% and 50% He with balance Ar. In an example, the first and second inert gases suitable for a liquid metal battery cell comprising lithium each comprise between about 1% and 15% He with remainder Ar.

Figure 37:
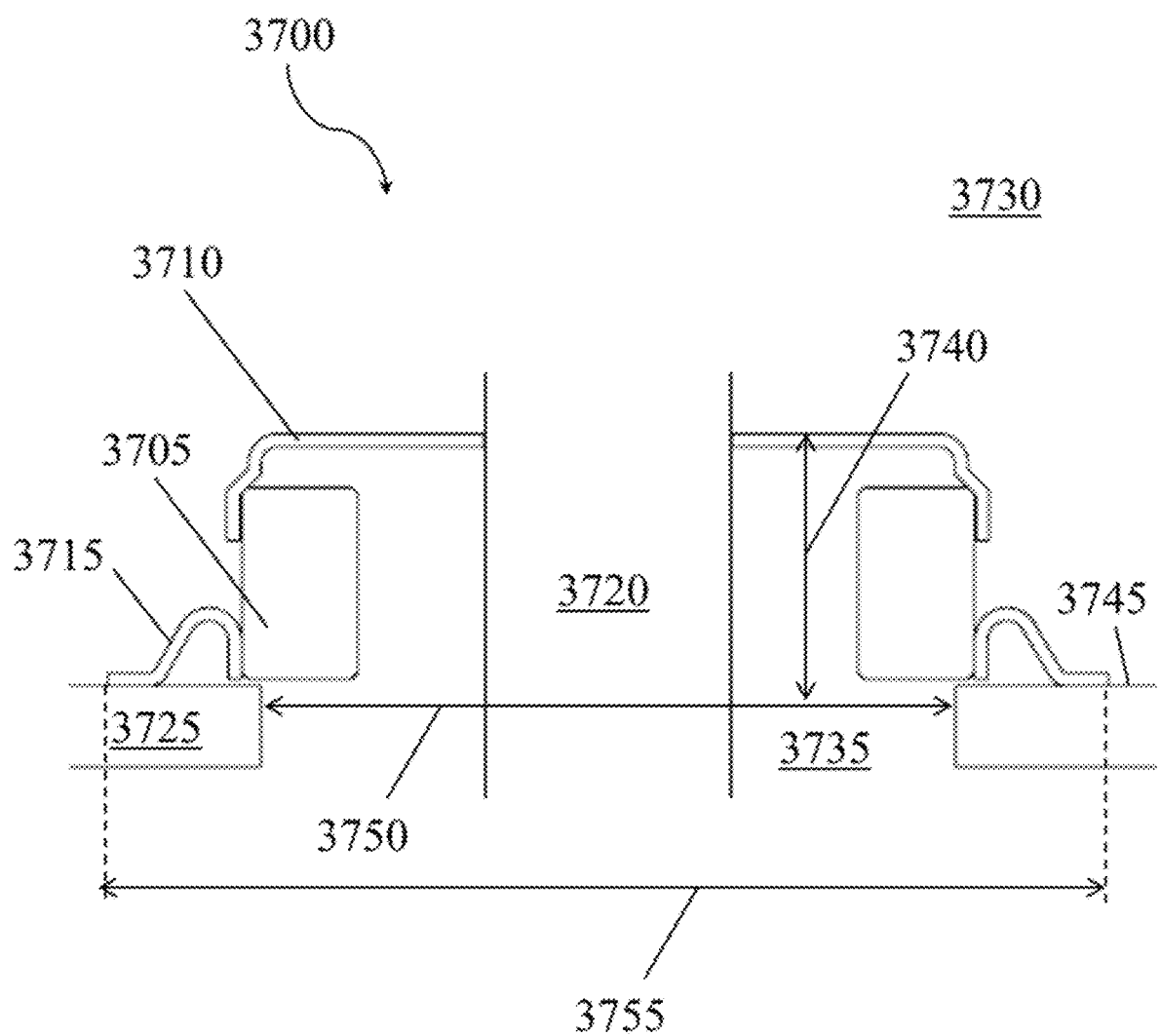
FIG. 37 is a cross-sectional view of an example of an air stable seal.

FIG. 37 is a cross-sectional view of an example of an air stable seal 3700. The air stable seal 3700 comprises an insulator (e.g., a ceramic component) 3705 and at least two (e.g., metal) sleeves 3710 and 3715 joined to the ceramic component. In some cases, a CTE of at least one of the metal sleeves substantially matches a CTE of the ceramic component. For example, the ceramic component 3705 may comprise alumina and the metal sleeves 3710 may comprise an alloy comprising greater than or equal to about 42% Ni and greater than or equal to about 58% Fe, such as, for example, alloy 42. This may reduce internal stresses within the ceramic component (e.g., alloy 42 may be used for both sleeves, and its CTE may closely match the CTE of alumina, allowing low internal stresses within the alumina ceramic). The first metal sleeve (also "NCL sleeve" herein) 3710 may be joined with a conductor or NCL 3720. The second metal sleeve (also "cell top sleeve" herein) 3715 may be joined with a container (e.g., cell top) 3725. In some cases, the cell top sleeve may relieve stress (e.g., upon reheat). The seal 3700 may be stable when in contact with an external environment (e.g., air) 3730. The seal 3700 may also be exposed to and be stable when in contact with an environment (e.g., an inert gas, or a mixture of the environment 3730 and an inert gas) 3735. The seal 3700 may not be exposed to a reactive material or environment within the container (not shown). For example, the ceramic component 3705 may not be exposed to the reactive material. The seal 3700 may not be stable when in contact with the reactive material or environment within the container. In some cases, the seal 3700 may be stable when in contact with a mixture of the environment within the container and an inert gas. The seal 3700 may be hermetic (e.g., when maintained at a temperature of at least about 600° C.).

The seal 3700 may be suitable for use in a compound seal (e.g., in the double seals of FIG. 33 and FIG. 34 instead of the seals 3310 and 3410). For example, a high temperature device, container or electrochemical cell comprising the seal 3700 can also comprise an additional seal nested within the seal 3700 (see examples of nested seals in FIG. 33 and FIG. 34). The additional seal (e.g., active stable seal) may be stable when in contact with the reactive material within the container.

The seal 3700 may be configured to bear an increased amount of vertical load (e.g., to allow increased vertical weight). For example, the seal may be configured of bearing a vertical load of at least about 2 Newtons (N), 4 N, 6 N, 8 N, 10 N, 12 N, 14 N, 16 N, 18 N, 20 N, 25 N, 50 N, 75 N, 100 N, 500 N, 1,000 N, 2,000 N, 5,000 N or more. In an example, the seal is configured to bear a vertical load of at least about 10 Newtons. The vertical load-bearing capability may allow at least a portion of the load (e.g., vertical load from other cells) to be transferred to the container (e.g., as opposed to the additional seal).

The seal 3700 may be configured such that its height 3740 is small (e.g., smaller than in alternative seal configurations). A reduced height may allow cells (e.g., battery cells within a system) to be packed closer to one another (e.g., with a reduced spacing between vertically stacked electrochemical cells). In some cases, closer cell packing may enable or improve self-heating of group(s) of cells (e.g., facilitate implementation of a self-heating core). The height 3740 (e.g., above a top plate 3745 of the container) may be less than about 5 inches, 4 inches, 3 inches, 2 inches, 1 inch, 0.5 inch, 0.25 inch or 0.125 inch. The seal may be configured such that its diameter 3755 is large (e.g., smaller than in alternative seal configurations). The larger diameter may enable, for example, nesting of the additional (e.g., active stable) seal within this seal. The seal may have an outer diameter of, for example, at least about 0.5 inch, 1 inch, 1.5 inch, 2 inches, 2.5 inches, 3 inches or more. The conductor 3720 may protrude through the container through an aperture 3750 with a diameter of at least about 0.5 inch, 1 inch, 1.5 inch or 2 inches. In an example, the seal has an outer diameter of at least about 1 inch or the aperture is at least about 0.5 inches in diameter.

The metal sleeve 3710 and/or 3715 may have a thickness of less than or equal to about 0.040 inches, 0.030 inches, 0.020 inches or 0.010 inches. In an example, the metal sleeve(s) have a thickness of about 0.020 inches. The metal sleeve(s) may allow flexibility during fabrication (e.g., capability to use one or more fabrication methods such as lathe, CNC and stamping). The metal sleeve(s) may have an outer diameter of less than or equal to about 3 inches, 2 inches, 1.5 inches, 1 inch, 0.5 inch or less. In an example, the metal sleeve(s) have an outer diameter of 1.530 inches, which provides flexibility in manufacturing requirements. The NCL sleeve may be configured such that its diameter is, for example, larger than in alternative seal configurations; its shape may be configured to absorb stress as the seal heats up and grows due to thermal expansion. The ceramic component 3705 may have a characteristic dimension (e.g., height) of less than or equal to about 0.100, 0.150, 0.200, 0.250 or 0.300 inches and a width of less than or equal to about 100%, 80%, 60%, 40% or 20% of the characteristic dimension.

A first of the at least two metal sleeves may be joined to the ceramic component and the conductor via a braze joint with a braze length of less than or equal to about 0.040 inches, 0.060 inches, 0.070 inches, 0.080 inches or 0.100 inches (e.g., about 0.080 inches), thereby reducing thermal stresses at the braze joint. The cell top sleeve 3710 may be configured to decrease or minimize stress at the braze joint (e.g., through a reduced braze length between the ceramic and the metal).

Figure 38:
FIG. 38 is a sectioned side view of the seal in FIG. 37.

FIG. 38 is a sectioned side view of the seal in FIG. 37, showing the structured shape of the seal. The seal may comprise a ceramic component 3805 joined with a first metal sleeve 3810 and a second metal sleeve 3815. The first metal sleeve may be joined with a conductor (not shown) and the second metal sleeve may be joined with a container or cell top (not shown).

In some implementations, seals, sub-assemblies, conductors and/or housings may comprise structural features (e.g., mating features) or be combined with structural members such as, for example, flanges, hooks, ledges, interlock features, weldable tabs, brazable tabs, snap fits, screw fits, screws, nuts, bolts and/or other structural members to facilitate a secure connection of the sealing arrangements herein. In some cases, such mating features may be used in concert with welding, brazing, coating, metalized surfaces, structural features for CTE mismatch, etc. Further, seals, sub-assemblies, conductors and/or housings may comprise structural features to facilitate interconnection between cells and groups of cells. In some cases, such features may be directed at reducing or minimizing stress and forces acting on seals as a result of interconnection. Further, the seals herein may be configured for use in concert with various interconnections features (e.g., current transfer plates). Configuration of the seals may in such cases include, for example, material considerations (e.g., material compatibility of seals and interconnections), desired system resistance (e.g., affecting choice of seal with a given resistance), space and operating condition considerations (e.g., affecting choice of a seal that is compatible with space constraints imposed by a given interconnection arrangement and/or operating conditions), and so on.

Interconnections

Wired or wire-less (e.g., direct metal-to-metal) interconnections may be formed between individual electrochemical cells and/or between groups of electrochemical cells (e.g., modules, packs, cores, CEs, systems, or any other group comprising one or more electrochemical cells). In some cases, groups of cells may be joined via one or more cell-to-cell interconnections. In some cases, groups of cells may be joined via a group-level interconnection. The group-level interconnection may further comprise one or more interconnections with one or more individual cells of the group. The interconnections may be structural and/or electrical. Cells and/or groups of cells may be assembled (or stacked) horizontally or vertically. Such assembled cells and/or groups of cells may be arranged in series or parallel configurations. Further, groups of cells may be supported by various frames. The frames may provide structural support and/or participate or aid in forming the interconnections (e.g., frames on groups of cells may mate or be connected).

An interconnect may refer to any electrical connection other than a direct metal-to-metal joint. Interconnects can include wires or bent sheet metal components designed to pass current. Interconnects may be compliant (e.g., flexible). A wire may refer to any cord, strip, or elongated electrical conduit. Wires can be flexible. As used herein, a braided metal strip is a wire. In some cases, a busbar is a wire.

In some implementations, interconnections may be configured to decrease resistance (e.g., internal resistance) in a system (e.g., a battery). A battery with a low system resistance (e.g., such that the battery is capable of efficiently storing energy and delivering power) may be desirable in some cases. The system resistance can be determined by the combined effect of a plurality of resistances along the current flow path such as between electrochemical cells, within electrochemical cells, and between groups of electrochemical cells. In some cases, electrochemical cells or groups thereof are connected using interconnects. In some instances, an interconnect is a wire. However, the shortest possible electrical connection can generally lead to the lowest system resistance. Therefore, the present disclosure describes direct connection of cells to each other (e.g., by brazing), in some cases reducing or eliminating the use of wires to connect electrochemical cells.

The internal resistance of the battery can be any suitably low resistance. In some cases, the internal resistance of the battery (e.g., at the operating temperature) is less than or equal to about $2.5*n*R$, where 'n' is the number of series connected modules of the battery and 'R' (also referred to herein as '$R_{module}$') is the resistance of each of the individual modules or parallel connected modules. In some examples, the inverse of R is the sum of the inverses of the resistance of each electrochemical cell in a given module, as given by, for example, $1/R_{Module} = \Sigma_{i=1}^{m} 1/R_i$, where 'm' is the number of cells in one module. Each module can include a plurality of electrochemical cells in a parallel configuration. Electrochemical cells in adjacent modules can be arranged in a series configuration (e.g., individual cells in a module can be connected in series with corresponding individual cells in an adjacent module, such as, for example, in a configuration where individual cells of a first module are connected in series with individual cells of a second module located above the first module). In some cases, the internal resistance of the battery (e.g., at the operating temperature) is less than or equal to about $2.5*n*R$, $2*n*R$, $1.5*n*R$, $1.25*n*R$ or $1.05*n*R$. In some cases, the total system resistance (e.g., at the operating temperature) is greater than about $1.0*n*R$ due to the resistance contribution of interconnects, busbars, surface contact resistance at connection interfaces, etc. The battery can comprise electrochemical cells connected in series and in parallel. The number of electrochemical cell modules (or parallel connected modules) that are connected in series (i.e., n) can be any suitable number. In some examples, n is at least 3, at least 5, at least 6, at least 10, at least 12, at least 15, at least 16, at least 20, at least 32, at least 48, at least 54, at least 64, at least 108, at least 128, at least 216, or at least 256. In an example, n is 3 (e.g., for a battery comprising a pack), 6 (e.g., for a battery comprising a pack), or 216 (e.g., for a battery comprising a core).

A wired or wire-less (e.g., direct metal-to-metal) interconnection between individual electrochemical cells and/or between groups of electrochemical cells can have a given internal resistance. In some cases, electrochemical cells are not connected with wires. In some examples, series connections (e.g., wire-less cell-to-cell connections, or current transfer plate connections) are created with a connection that has an internal resistance of less than or equal to about 0.05 milli-ohm (mOhm), 0.1 mOhm, 0.5 mOhm, 1 mOhm, 2 mOhm, 5 mOhm, 10 mOhm, 50 mOhm, 100 mOhm or 500 mOhm at an operating temperature greater than about 250° C. In some instances, the resistance is measured by a direct electrical connection between the conductor of a first electrochemical cell and the electrically conducting housing of a second cell. In some cases, one or more busbars and/or interconnects can be used to create a connection between any two groups of cells. In some examples, such a connection has an internal resistance of less than or equal to about 0.01 mOhm, 0.05 mOhm, 0.1 mOhm, 0.2 mOhm, 0.5 mOhm, 1 mOhm, 5 mOhm, 10 mOhm, 50 mOhm or 100 mOhm. In some instances, the resistance is measured by the voltage drop across a busbar (and/or interconnect) while current is flowing through the busbar (and/or interconnect) according to the following formula: $R_{busbar}=V/I$, where '$R_{busbar}$' is the resistance of the busbar (and/or interconnect), 'V' is the measured voltage drop across the busbar (and/or interconnect) and 'I' is the current flowing through the busbar (and/or interconnect). Any aspects of the disclosure described in relation to internal resistance of cell-to-cell connections may equally apply to connections between groups of cells at least in some configurations, and vice versa. Further, any aspects of the disclosure described in relation to internal resistance of series connections may equally apply to parallel connections at least in some configurations, and vice versa.

In some implementations, an electrochemical energy storage system comprises at least a first electrochemical cell adjacent to a second electrochemical cell. Each of the first and second electrochemical cells can comprise a negative current collector, negative electrode, electrolyte, positive electrode and a positive currently collector. At least one of the negative electrode, electrolyte and positive electrode can be in a liquid state at an operating temperature of the first or second electrochemical cell. A positive current collector of the first electrochemical cell can be direct metal-to-metal joined (e.g., brazed or welded) to the negative current collector of the second electrochemical cell. In some examples, the negative current collector comprises a negative current lead.

In some cases, the first and second electrochemical cells are not connected by wires. In some cases, the electrochemical energy storage system comprises one or fewer interconnects for every 2, 3, 4, 5, 6, 7, 8, 9, 10, 11, 12, 13, 14, 15, 16, 17, 18, 19, 20, 21, 22, 23, 24, 25, 26, 27, 28, 29, 30 or more electrochemical cells. In some cases, the electrochemical energy storage system (e.g., battery) comprises one interconnect for at least every 1, 2, 3, 4, 5, 6, 7, 8, 9, 10, 15, 20, 25, 30, 40, 50, 75, 100, 150, 200, or more electrochemical cells.

Figure 28:
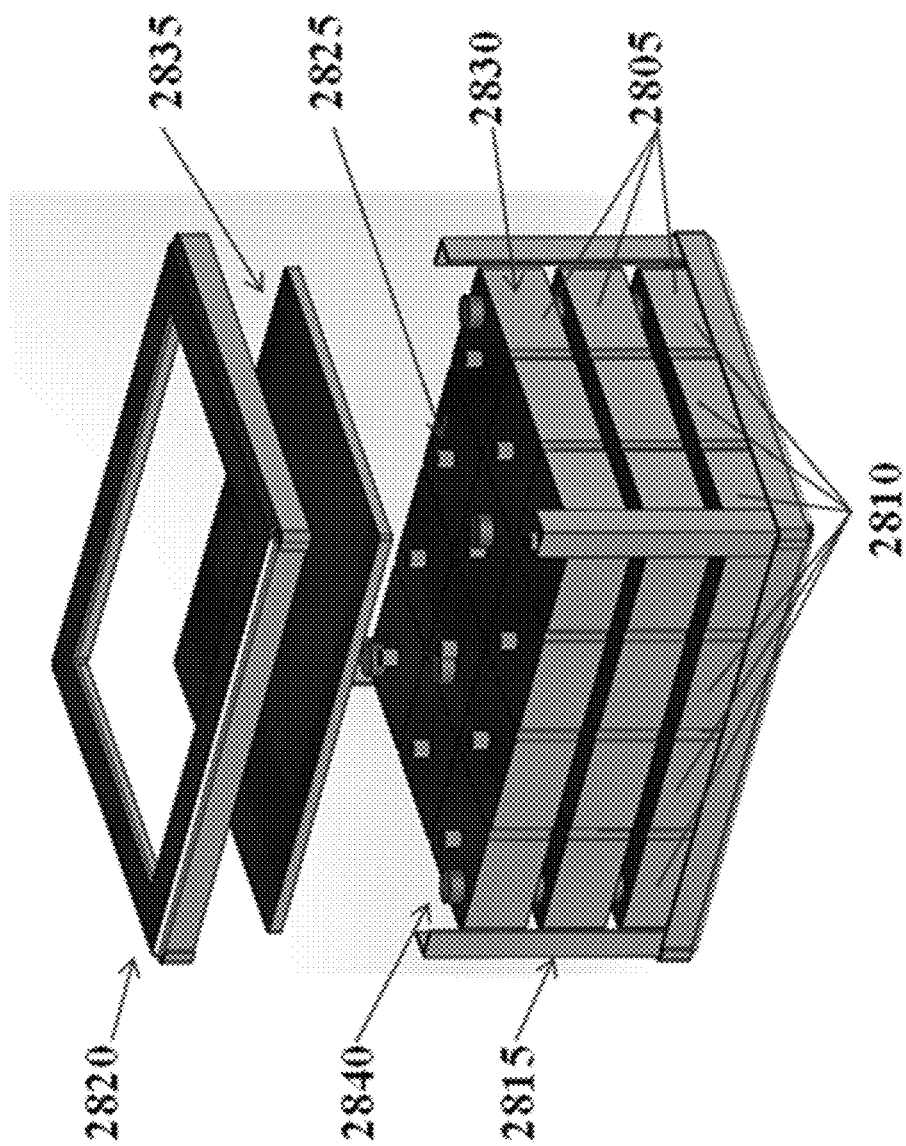
FIG. 28 shows an example of a cell pack.

FIG. 28 shows an example of a cell pack 2800 comprising 3 modules 2805. Each of the modules comprises 12 cells 2830 that are connected in parallel 2810. The modules are held in place with cell pack framing (also "frame" herein) 2815 that includes a top component of the frame 2820. The cells are stacked directly on top of each other with the negative current terminal of one cell 2825 contacted directly with the housing of another cell (e.g., the cell above it). The negative current terminals of the top layer of cells will have no housing of another cell directly above, so can instead be contacted (e.g., brazed to) a negative busbar 2835.

In some configurations, the parallel connections 2810 made in the module can be created using a single piece (or component) with multiple pockets for cell materials. This piece can be a stamped component that allows for direct electrical connection between cells. In some examples, the stamped pocketed electrically conductive housing does not create a barrier between the cells. In some cases, the pocketed electrically conductive housing seals the pockets from each other. This electrically conductive housing can be easier to manufacture and assemble than individual electrically conductive cell housings. In some configurations, the parallel connections 2810 made in the module can be created by direct contact of the housings of the cells in the module.

When stacked vertically, the electrochemical cells bear the weight of the cells stacked above. The cells can be constructed to support this weight. In some cases, cell-to-cell spacers 640 are placed between the layers of cells. These spacers can disperse the weight of the above cells and/or relieve some of the weight applied to the negative current terminals. In some cases, the negative current terminals are electrically isolated from the housing with a seal. This seal can be the weakest structural component of the electrochemical cell, so the spacers can reduce the amount of force applied to the seals.

In some implementations, a liquid metal battery comprises a plurality of electrochemical cells each comprising an electrically conductive housing and a conductor in electrical communication with a current collector. The electrically conductive housing can comprise a negative electrode, electrolyte and positive electrode that are in a liquid state at an operating temperature of the cell. The conductor can protrude through the electrically conductive housing through an aperture in the electrically conductive housing and can be electrically isolated from the electrically conductive housing with a seal. The plurality of electrochemical cells can be stacked in series with the conductor of a first cell in electrical contact with the electrically conductive housing of a second cell. The liquid metal battery can also comprise a plurality of non-gaseous spacers disposed between the electrochemical cells. In some cases, the electrochemical cells are stacked vertically. For example, at least 2, 3, 4, 5, 6, 7, 8, 9, 10, 15, 20, 25, 30, 36, 40, 48, 50, 60, 70, 80, 90, 100, 120, 140, 160, 180, 200, 216, 250, 256, 300, 350, 400, 450, 500, 750, 1000, 1500, 2000 or more electrochemical cells can be stacked in series. In some cases, the battery further comprises at least one additional electrochemical cell connected in parallel to each of the plurality of electrochemical cells that are stacked in series. For example, each vertically stacked cell can be connected in parallel with at least 1, 2, 3, 4, 5, 6, 7, 8, 9, 10, 15, 16, 20, 25, 30, 40, 50, 60, 70, 80, 90, 100, 120, 140, 160, 180, 200, 250, 300, 350, 400, 450, 500, 750, 1000, 1500, 2000 or more additional electrochemical cells. In some cases, the electrically conductive housings are part of a current conducting pathway.

The non-gaseous spacers (also "spacers" herein) can be a solid material. In some cases, the spacers comprise a ceramic material. Non-limiting examples of ceramic materials include aluminum nitride (AlN), boron nitride (BN), yttrium oxide ($Y_2O_3$), zirconium oxide ($ZrO_2$), yttria partially stabilized zirconia (YPSZ), aluminum oxide ($Al_2O_3$), chalcogenides, erbium oxide ($Er_2O_3$), silicon dioxide ($SiO_2$), quartz, glass, or any combination thereof. In some cases, the spacers are electrically insulating.

The spacers can have any suitable thickness. In some cases, the thickness of the spacer is approximately equal to the distance that the conductor protrudes out of the electrically conductive housing (e.g., the thickness of the spacer can be within less than or equal to about 0.005%, 0.01%, 0.05%, 0.1% or 0.5% of the distance that the conductor protrudes out of the electrically conductive housing).

The majority of the force (e.g., the weight of electrochemical cells stacked vertically above a cell) is generally born by the spacers and/or housing rather than the seals. The non-gaseous spacers and/or the electrically conductive housing can support any suitably high percentage of the applied force. In some cases, greater than or equal to about 70%, 80%, 90% or 95% of the force is applied to the non-gaseous spacers and/or the electrically conductive housing.

There can be any suitable amount of force applied to the electrically conductive housing and/or seal. In some instances, the force applied to the seal is no greater than the seal can support. In some cases, the force applied to the seal is less than or equal to about 10, 15, 20, 25, 30, 35, 40, 45, 50, 60, 70, 80, 100, 120, 150 or 200 Newtons (N). In some cases, the force applied to the housing is greater than or equal to about 100, 500, 1,000, 5,000 or 10,000 N.

There can be any suitable amount of pressure applied to the electrically conductive housing and/or seal. In some instances, the pressure applied to the seal is no greater than the seal can support. In some cases, the pressure applied to the seal is less than or equal to about 1, 10, 50, 100, 200, 300 or 500 pounds per square inch (psi). In some cases, the pressure applied to the housing is greater than or equal to about 500, 1,000, 2,000, 2,500, 3,000, 5,000 or 10,000 psi.

The cell to cell connections can be configured in a variety of ways based on tolerances and optimal conductive path. In one configuration, the top face of the negative current lead in one cell can be direct metal-to-metal joined (e.g., brazed, welded) to the bottom of the cell above it (see, for example, FIG. 29). Other configurations can include, for example, alternative direct metal-to-metal joined (e.g., alternative braze joined) configurations, such as an outer diameter braze enhanced by differences in the coefficient of thermal expansion (CTE) of the inner rod and the outer fixture (see, for example, FIG. 30). of thermal expansion (CTE) of the inner rod and the outer fixture (FIG. 30).

Figure 29:
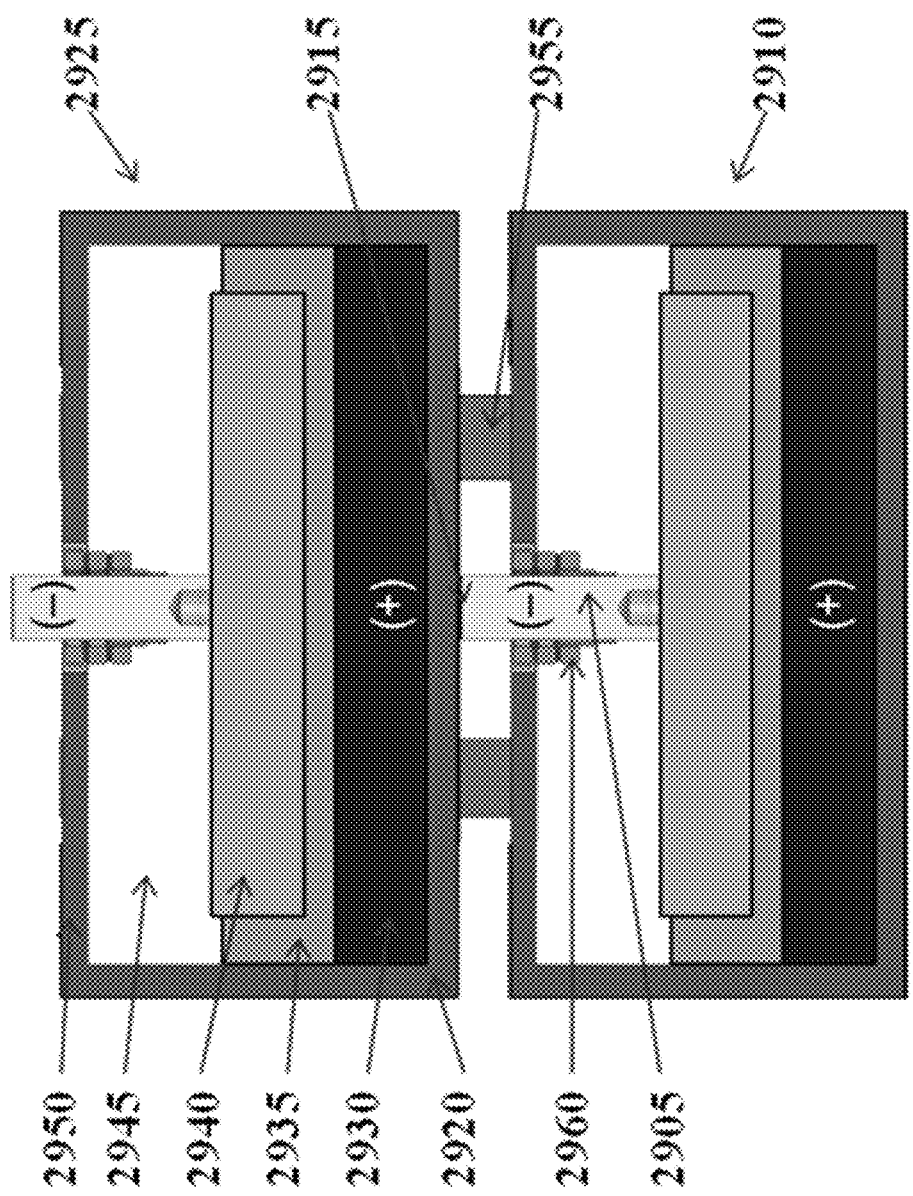
FIG. 29 shows an example of braze connection between the top of a conductive feed-through and the bottom of a cell.
Figure 30:
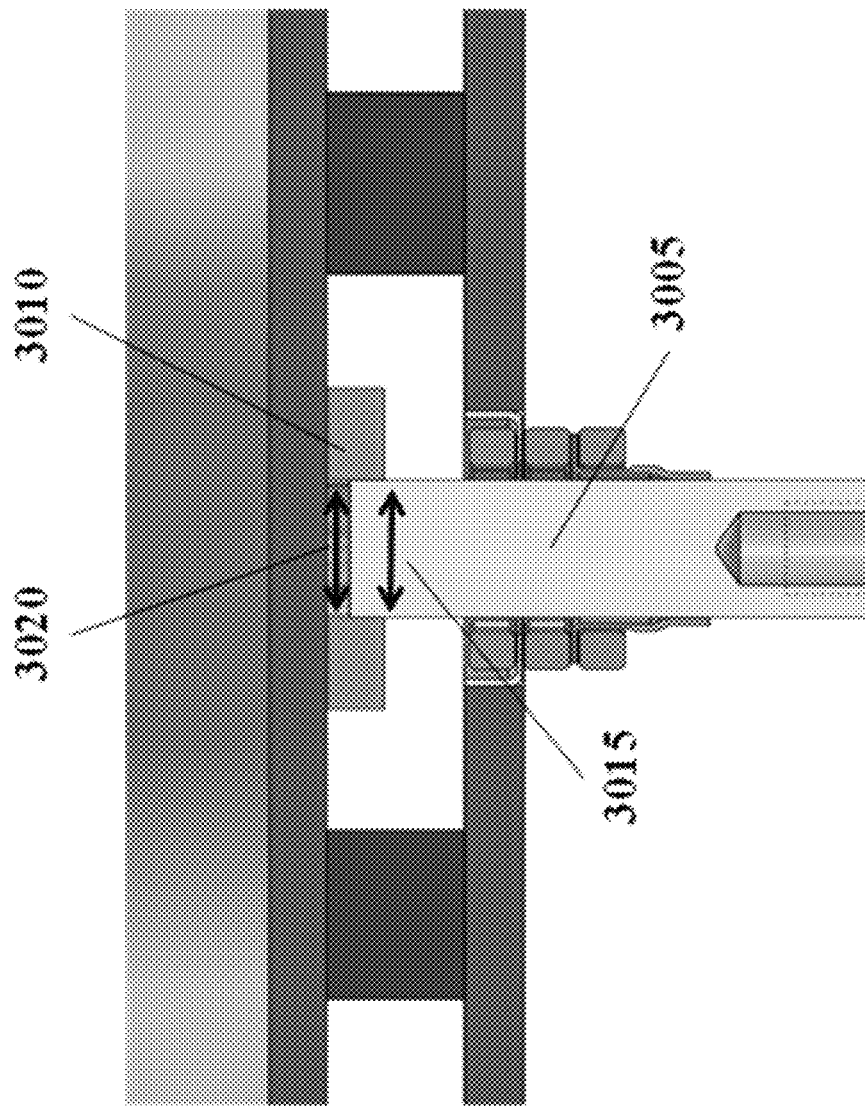
FIG. 30 shows an example of joining two cells using a compression connection between parts that forms at the operating temperature of the battery based on differences in the coefficient of thermal expansion.

In some cases, as shown in FIG. 29, the conductor 2905 of a first cell 2910 is brazed 2915 to the electrically conductive housing 2920 of the second cell 2925. The braze material can be any suitable material. Some non-limiting examples of braze materials include materials that comprise iron (Fe), nickel (Ni), titanium (Ti), chromium (Cr), zirconium (Zr), phosphorus (P), boron (B), carbon (C), silicon (Si), or any combination thereof. The cell can comprise a cathode 2930, an electrolyte 2935 and an anode 2940 connected to the current collector and conductor 2905. The conductor can feed through the cell lid 2950. In some cases, the cell has some empty head space 2945.

In some implementations, the conductor 2905 can feed through a seal 2960 in the cell lid 2950. The conductor (e.g., negative current lead) 2905 may rigid. The seal 2960 may not be rigid. As additional cells are added during assembly, an increasing weight can be exerted on the conductor 2905 of the bottom cell 2910 by the housing 2920 of the top cell 2925 (e.g., at the position 2915). In some instances, the vertical spacing between the cells 2910 and 2925 may decrease if the seal 2960 (with the conductor 2905 and the anode 2940) move downward into the cell 2910 as a result of the compression force. To ensure that modules are electrically isolated from each other, spacers (e.g., ceramics) 2955 can be placed across the surface of the cells to support the cells above them. In this configuration, the cell housing can be used as the main structural support for the system. The ceramic spacer 2955 can relieve the seal 2960 from having to support the weight of the top cell 2925 (and any additional cells added during assembly). In some configurations, there may initially be a gap between the top of the spacers 2955 and the bottom of the housing 2920 of the top cell 2925 (e.g., the thickness of the spacer can be slightly less than the distance that the conductor initially protrudes through the electrically conductive housing), and the spacers (e.g., ceramics) can be placed in compression during assembly as additional cell(s) are added (e.g., as the spacing between the top of the housing of the bottom cell 2910 and the bottom of the housing of the top cell 2925 decreases). As a result, the displacement (also "anode-cathode displacement" herein) between anodes and cathodes (e.g., final displacement after assembly between the anode 2940 and the cathode 2930 in cell 2910) can in some cases be determined by the non-gaseous spacers. In some configurations, the spacers can be placed in compression right away (e.g., if the thickness of the spacer is slightly greater than the distance that the conductor initially protrudes through the electrically conductive housing).

In some cases, differences in the coefficient of thermal expansion (CTE) can be used to connect two cells. As shown in FIG. 30, the conductor of the first cell 3005 sits in a recessed portion of the electrically conductive housing of the second cell 3010, and the coefficient of thermal expansion (CTE) of the conductor 3015 is greater than the CTE of the electrically conductive housing 3020.

The CTE of the conductor can be any amount greater than the CTE of the electrically conductive housing. In some cases, the CTE of the conductor is greater than or equal to about 2%, 5%, 10%, 15%, 20%, 30%, 40%, 50%, 60%, 70%, 80%, 90% or 100% greater than the CTE of the electrically conductive housing.

Cells stacked vertically in series can be attached through a direct or hard electrical connection such that the height from 2950 to 2940 and/or anode-cathode displacement (ACD) can be determined by the dimensional tolerance of 2955. In some examples, the height from 2950 to 2940 can be at least about 3 millimeters (mm), 5 mm, 7 mm, 10 mm, 15 mm, and the like. In some examples, the ACD can be at least about 3 mm, 5 mm, 7 mm, 10 mm, 15 mm or greater. FIG. 29 is an example of how such connections may be configured.

Cells stacked vertically in series can be connected using a direct (e.g., metal-to-metal) electrical connection such that resistance per cell connection is reduced, for example, below about 100 mOhm (or another internal resistance value described elsewhere herein). FIG. 29 is an example of how such connections may be configured. FIG. 29 also provides an example of a CTE mismatched seal connection.

In some implementations, cells can be joined vertically using a current transfer plate that can be connected (e.g., welded) to the negative current lead or conductor on the bottom cell, and the cell body (e.g., electrically conductive housing) on the top cell. The negative current lead can protrude through a housing of the bottom cell through a seal. For example, multiple cells can be connected in parallel into a cell module or a partial cell module, and then connected in series with other cell modules or partial cell modules via vertical stacking. The vertical stacking can be implemented by connecting the current transfer plate from one cell to the cell body or a feature on the cell body on the cell above it (e.g., to form the basis of a cell pack). The current transfer plate can be formed from a conductive material, such as any conductive material described herein. The current can comprise one or more surfaces (e.g., a flat surface) that can be welded or otherwise direct metal-to-metal joined with another surface (e.g., a cell body or a feature on the cell body of an adjacent cell). The current transfer plate can extend from the negative current lead toward the periphery of the cell surface comprising the negative current lead. Such configurations can enable electrical connections to be more conveniently made in tight spaces between cells or in cell assemblies (e.g., more convenient access during vertical stacking of cells).

The current transfer plate may be combined with or comprise a strain relieving function to reduce stress on the seal (e.g., the seal around the negative current lead) that may be generated by the welding/joining process and/or thermal expansion differences during heat-up and/or cool-down, and/or stresses generated when cells and/or packs are vertically stacked on top one another. In some cases, the stresses on the seal may be reduced by including an electrically insulating non-gaseous (e.g., ceramic) spacer. The non-gaseous spacer can support the weight from the current transfer plate and/or cells stacked onto the current transfer plate and direct the weight onto the housing (e.g., the cell cap), thereby reducing the portion of the applied weight that is transmitted through the seal. In some cases, the strain relieving function may include a spiral pattern (e.g., a single spiral arm or multiple spiral arms) or other feature on the current transfer plate to give the current transfer plate compliance and may reduce stress experienced by the seal as the cells are stacked on top one another or during heat-up due to CTE mismatches. The spiral pattern may comprise one or more spiral arms. The spiral arms may be, for example, less than or equal to about 0.5 mm, 1 mm, 2 mm or 4 mm thick. The spiral arms may create a spiral that has a circular or oval external shape that is greater than or equal to about 1 cm, 2 cm, 3 cm or 4 cm or larger in diameter. In some cases, the current transfer plate may be sufficiently compliant such that the strain relieving feature is not needed.

Figure 31:
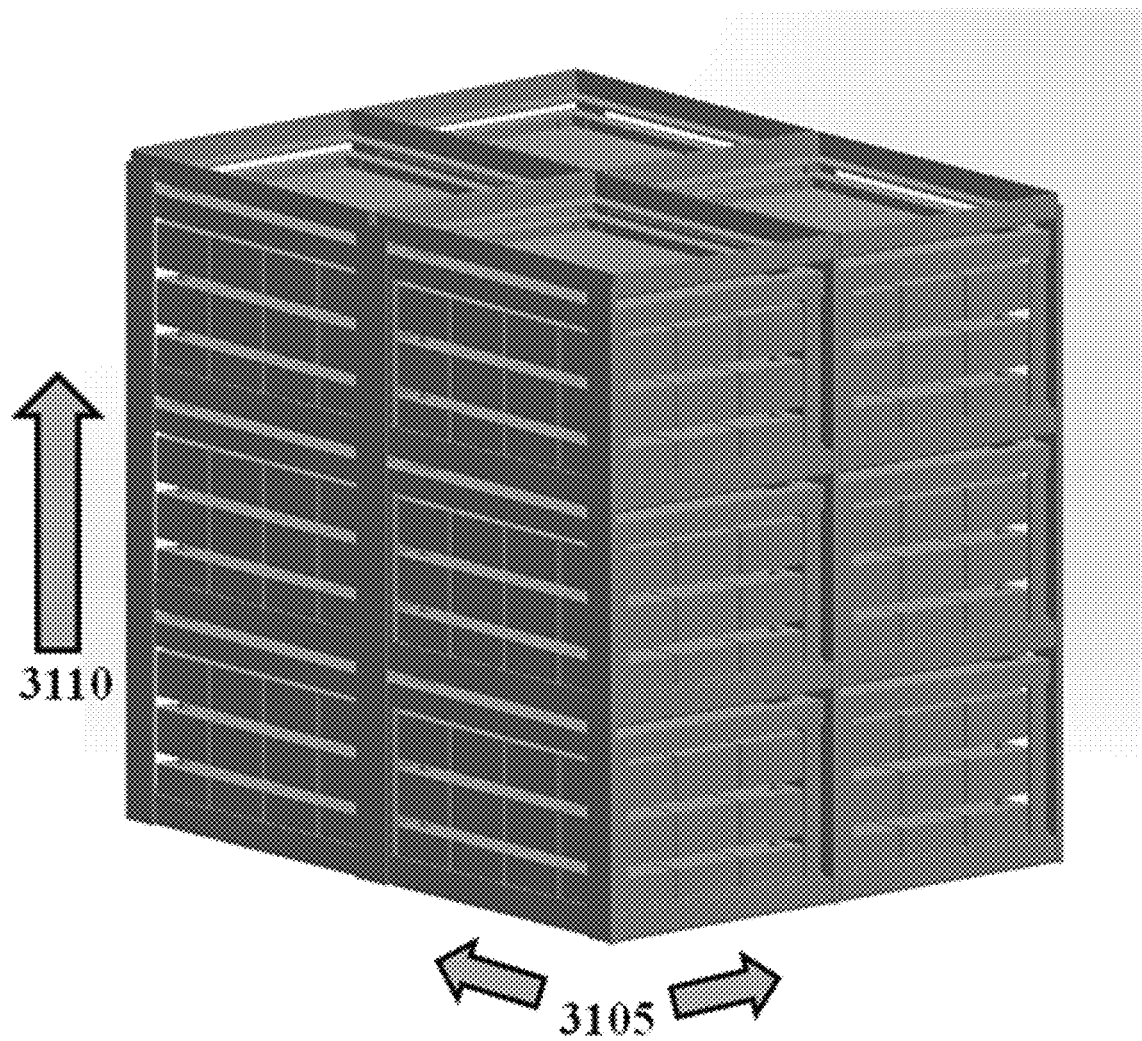
FIG. 31 shows an example of a stack of cell packs, also referred to as a core.

Cell packs can be attached in series and parallel in various configurations to produce cores, CEs, or systems. The number and arrangement of various groups of electrochemical cells can be chosen to create the desired system voltage and energy storage capacity. The packs, cores, CEs, or systems can then be enclosed together in high temperature insulation to create a system that can heat itself using the energy created from cells charging and discharging. For example, FIG. 31 is an example of how packs can be configured, indicating that the cell packs in a given plane are connected to one another in parallel 3105, while the packs connected directly atop one another are connected in series 3110.

The packs themselves can be connected vertically and horizontally to one another through busbars (e.g., unlike the cell-to-cell connections within a pack which can generally be direct connections such as brazes or welds). In some cases, the busbar is flexible or comprises a flexible section (e.g., to accommodate non-isothermal expansion of the system throughout heat up and operation).

A busbar can be used to make an electrical connection with cells in a parallel string (e.g., a parallel string of cells, a parallel string of packs, etc.). In some examples, a busbar can be used to configure a set of cells or cell modules into a parallel string configuration by being electrically connected with the same terminal on all of the cells or cell modules (e.g., the negative terminals of all of the cells or cell modules, or the positive terminals of all of the cell or cell modules). For example, a positive busbar and/or a negative busbar may be used. The positive busbar can be connected to the housing and may or may not need to be flexible. In some cases, the positive busbar may not be used. The negative busbar can be joined to features in (or on) one or more of the cell bodies (e.g., the cell bodies of individual cells in a pack) to provide a strong electrical connection. In some cases, the negative busbar can be attached to conductive feed-throughs (e.g., negative current leads), which may require some compliance for thermal expansion. For example, a flexible connection between a relatively rigid busbar core and the feed-through may be achieved using a compliance feature between the feed-through and the busbar. The compliance feature may involve a spiral pattern (e.g., a single spiral arm or multiple spiral arms) that may be created by cutting away and/or removing material from a flat busbar in the desired pattern. The spiral pattern may comprise one or more spiral arms. The spiral arms may be, for example, less than or equal to about 0.5 mm, 1 mm, 2 mm or 4 mm thick. The spiral arms may create a spiral that has a circular or oval external shape that is greater than or equal to about 1 cm, 2 cm, 3 cm or 4 cm or larger in diameter. In some cases, the busbar may be sufficiently compliant such that the compliance feature is not needed.

One or more interconnects can be used to connect the busbar of one pack to the busbar of another cell pack, thereby placing the cell packs in parallel or in series. In some cases, the negative busbar of one cell pack is connected to the positive busbar of another cell pack using a compliant interconnection component (also "interconnect" herein). In some cases, the interconnect may be braided metal or metal alloy. In some cases, the interconnect may be made from sheet metal and take the form of a bent sheet that is less than or equal to about 1/32 inch, 1/16 inch, 1/8 inch or 1/4 inch thick. In some cases, the interconnect may comprise the same conductive material as the busbar. In some cases, the positive busbar and the interconnect are the same component.

The busbar and/or interconnect components can comprise a conductive material. For example, the busbar and/or interconnect components can comprise (e.g., be made of) stainless steel, nickel, copper, aluminum-copper based alloy, or any combination thereof.

The pack may further comprise or form other interconnections (e.g., to allow the pack to be interconnected with additional packs), including, but not limited to, additional interconnects, additional busbars and/or additional connection interfaces. In some implementations, busbars may be used to provide pack-level electrical connections/interconnections (e.g., only busbars may be used for pack-level electrical connections/interconnections).

In configurations where cells are stacked vertically atop one another, the busbar at the top of the cell stack (e.g., cell pack stack) can comprise only the negative busbar (e.g., since the positive terminal of the stack can be on the bottom cell in the stack).

The thermal insulation and/or the frame may be designed to allow the core (and/or any system of the disclosure) to be cooled, the insulation to be removed, individual or sets of packs to be disconnected and removed from the core to allow for a single pack to be disconnected, removed and replaced, or any combination thereof. The core can then be reassembled and heated back up to operating temperature to allow for resumed operation.

Various interconnection configurations described herein in relation to individual cells or a given group of cells may equally apply to other groups of cells (or portions thereof) at least in some configurations. In one example, interconnections such as, for example, brazed positive and negative current collectors of cells, braze enhanced by differences in coefficients of thermal expansion, connecting (e.g., welding) cell bodies or features in cell bodies, etc., may apply to (or be adapted to) groups of cells such as, for example, modules, packs, etc. In another example, interconnections such as, for example, stamped pocketed electrically conductive housing in cells and/or modules, etc., may apply to (or be adapted to) groups of cells such as, for example, modules, packs, etc. In yet another example, interconnections such as, for example, busbars/interconnects between packs, etc., may in some cases apply to (or be adapted to) groups of cells such as, for example, cores, etc. Further, stress-relieving configurations (e.g., current transfer plates between cells, spacers, spiral relief or compliance features/structures/patterns, etc.) and electrical/structural features (e.g., end-caps, etc.) may in some cases be applied to (or be adapted to) any group of cells herein. The various interconnection configurations may be applied at group level or to individual cells. Thus, in an example, a spacer used between cells may be configured for use as a spacer between packs, a current transfer plate between cells may be configured for use between modules, an interconnection interface comprising a feature on a cell body for connecting cell bodies within a module may be configured for connecting cell bodies of outer cells on adjacent packs, and so on. Further, interconnections described in relation to forming a series connection may be in some cases be adapted to forming a parallel connection, and vice versa.

Devices, systems and methods of the present disclosure may be combined with or modified by other devices, systems and/or methods, such as, for example, batteries and battery components described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), and U.S. Patent Publication No. 2014/0099522 ("LOW-TEMPERATURE LIQUID METAL BATTERIES FOR GRID-SCALED STORAGE"), each of which is entirely incorporated herein by reference.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

EXAMPLES

Example 1: Materials of Construction

Alloys of tungsten (W) and molybdenum (Mo), such as, for example, those listed in TABLE 3, can be used in the seals of the disclosure. The alloys can be used as the component (e.g., W or Mo) that is brazed to the electrically insulating ceramic (e.g., aluminum nitride). In some cases, the tungsten and/or molybdenum alloy has a coefficient of thermal expansion (CTE) that is matched with the ceramic (e.g., within less than or equal to about 1%, 5% or 10% of the CTE of the ceramic), is substantially resistant to oxidation, and/or is substantially resistant to attack, alloying and/or corrosion from the metal vapor of the negative electrode (e.g., lithium, sodium, potassium, magnesium or calcium vapor) or the molten salt.

TABLE 3

EXAMPLES OF TUNGSTEN AND MOLYBDENUM ALLOYS

| Material | Brand | Description | Composition |
|---|---|---|---|
| Mo | Mo | Molybdenum | 99.97% Mo |
| TZM | TZM | Titanium-Zirconium-Molybdenum | 0.5% Ti/0.08% Zr/ 0.01-0.04% C |
| MHC | MHC | Molybdenum-Hafnium-Carbon | 1.2% Hf/0.05-0.12% C |
| Mo-Lanthanoxid (ML) | ML | Molybdenum-Lanthanum Oxide | 0.3% $La_2O_3$-0.7% $La_2O_3$ |
| Mo-Lanthanoxid (ML) | MLR (R = Recrystallized) | Molybdenum-Lanthanum Oxide | 0.7% $La_2O_3$ |
| Mo-Lanthanoxid (ML) | MLS (S = Stress relieved) | Molybdenum-Lanthanum Oxide | 0.7% $La_2O_3$ |
| MoILQ | MoILQ (ILQ = Incandescent Lamp Quality) | Molybdenum-ILQ | 0.03% $La_2O_3$ |
| Mo-Yttriumoxid | MY | Molybdenum-Yttrium-Cerium Oxide | 0.47% $Y_2O_3$/ 0.08% $Ce_2O_3$ |
| MoRe | MoRe5 | Molybdenum-Rhenium | 5.0% Re |
| MoRe | MoRe41 | Molybdenum-Rhenium | 41.0% Re |
| MoW | MW20 | Molybdenum-Tungsten | 20.0% W |
| MoW | MW30 | Molybdenum-Tungsten | 30.0% W |
| MoW | MW50 | Molybdenum-Tungsten | 50.0% W |
| MoCu | MoCu30 | Molybdenum-Copper | 30.0% Cu |
| MoCu | MoCu15 | Molybdenum-Copper | 15.0% Cu |
| MoZrO2 | MZ17 | Molybdenum-Zirconium Oxide | 1.7% $ZrO_2$ |
| MoTa | MT11 | Molybdenum-Tantalum | 11.0% Ta |
| MoNb | MoNb | Molybdenum-Niobium | |
| W (pure) | W (pure) | Tungsten | >99.97 |
| W-NS | W-NS | Tungsten-Non Sag | 60-65 ppm K |
| WVM | WVM | Tungsten Vacuum Metallizing | 30-70 ppm K |
| WVMW | WVMW | WVM-Tungsten | 15-40 ppm K |
| S-WVMW | S-WVMW | S-WVM-Tungsten | 15-40 ppm K |
| WC | WC20 | Tungsten Cerium Oxide | 2.0% $CeO_2$ |
| WL | WL10 | Tungten-Lanthanum Oxide | 1.0% $La_2O_3$ |
| WL | WL15 | Tungten-Lanthanum Oxide | 1.5% $La_2O_3$ |
| WL | WL20 | Tungten-Lanthanum Oxide | 2.0% $La_2O_3$ |
| WL-S | WL-S | Tungsten-Lanthanum Oxide-Stem | 1.0% $La_2O_3$ |
| WLZ | WLZ | Tungsten-Lanthanum Oxide-Zirconium Oxide | 2.5% $La_2O_3$/ 0.07% $ZrO_2$ |
| WT | WT20 | Tungsten-Thorium Oxide | 2.0% $ThO_2$ |
| WT | WVMT10 | Tungsten-Thorium Oxide | 30-70 ppm K/ 1.0% $ThO_2$ |
| WT | WVMWT | Tungsten-Thorium Oxide | 5-30 ppm K/ 2.0% ThO2 |
| WRe | WRe5 | Tungsten-Rhenium | 5.0% Re |
| WRe | WRe26 | Tungsten-Rhenium | 26.0% Re |
| WCu | WCu | Tungsten-Copper | 10-40% Cu |
| W-High-density tungsten-heavy metal alloys | DENSIMET ® | DENSIMET ® | 1.5%-10% Ni, Fe, Mo |
| W-High-density tungsten-heavy metal alloys | INERMET ® | INERMET ® | 5%-9.8% Ni, Cu |
| W-High-density tungsten-heavy metal alloys | DENAL ® | DENAL ® | 2.5%-10% Ni, Fe, Co |

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An electrochemical cell, comprising:
   a container comprising a conductor aperture, wherein said container is configured to contain a reactive material at a temperature of at least about 100° C.;
   a conductor that extends from an environment external to said container through said conductor aperture into said container; and
   a sealing unit that couples said container to said conductor to seal said conductor aperture, wherein said sealing unit comprises a first ceramic component bonded to a second ceramic component, wherein said first ceramic component comprises a first material and said second ceramic component comprises a second material different from said first material, and wherein said first ceramic component or said second ceramic component is configured to be exposed to said reactive material while said sealing unit seals said conductor aperture.

2. The electrochemical cell of claim 1, wherein said first ceramic component and said second ceramic component comprise a mutual reaction compound.

3. The electrochemical cell of claim 1, wherein said second ceramic component is a layer disposed on one or more surfaces of said first ceramic component.

4. The electrochemical cell of claim 3, wherein said sealing unit further comprises a third ceramic component, and wherein said third ceramic component is another layer disposed on said second ceramic component or on another surface of said one or more surfaces of said first ceramic component than said second ceramic component.

5. The electrochemical cell of claim 1, wherein said first material comprises aluminum nitride, silicon nitride, silicon carbide, or a combination thereof.

6. The electrochemical cell of claim 5, wherein said second material comprises yttrium.

7. The electrochemical cell of claim 1, wherein said second material comprises silicon carbide or tungsten carbide.

8. The electrochemical cell of claim 1, wherein said first ceramic component and said second ceramic component are bonded via sintering.

9. The electrochemical cell of claim 1, wherein said first ceramic component is alloyed to said second ceramic component.

10. The electrochemical cell of claim 1, wherein said first ceramic component is a ring, and wherein said ring is disposed around said conductor.

11. The electrochemical cell of claim 1, wherein said sealing unit further comprises a metal sleeve configured to couple said first ceramic component or said second ceramic component to said container or to said conductor.

12. The electrochemical cell of claim 11, wherein said metal sleeve comprises a material selected from the group consisting of grade 304 stainless steel, grade 430 stainless steel, grade 410 stainless steel, zirconium, an iron-nickel alloy, and 18CrCb ferritic stainless steel.

13. The electrochemical cell of claim 11, wherein said metal sleeve has a thickness of greater than or equal to about 75 micrometers ($\mu$m).

14. The electrochemical cell of claim 13, wherein said thickness is less than or equal to about 500 $\mu$m.

15. The electrochemical cell of claim 11, wherein said metal sleeve is coupled to said first ceramic component, said second ceramic component, said container, or said conductor by a braze.

16. The electrochemical cell of claim 15, wherein said braze comprises one or more members selected from the group consisting of silver, aluminum, titanium, nickel, and combinations thereof.

17. The electrochemical cell of claim 1, wherein said second ceramic component is configured to protect said first ceramic component from said reactive material or said environment external to said container.

18. The electrochemical cell of claim 1, wherein said second ceramic component is an active layer configured to permit said first ceramic component to couple to said container or said conductor.

19. The electrochemical cell of claim 1, wherein said reactive material comprises a molten metal and a molten salt.

* * * * *